US008253747B2

(12) United States Patent
Niles et al.

(10) Patent No.: US 8,253,747 B2
(45) Date of Patent: Aug. 28, 2012

(54) USER INTERFACE FOR CONTROLLING ANIMATION OF AN OBJECT

(75) Inventors: Gregory E. Niles, Culver City, CA (US); Stephen M. Sheeler, Santa Monica, CA (US); Guido Hucking, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 12/729,890

(22) Filed: Mar. 23, 2010

(65) Prior Publication Data

US 2010/0201692 A1 Aug. 12, 2010

Related U.S. Application Data

(60) Division of application No. 11/257,882, filed on Oct. 24, 2005, now abandoned, which is a continuation of application No. 10/826,973, filed on Apr. 16, 2004, now abandoned.

(51) Int. Cl.
*G06T 15/00* (2006.01)
(52) U.S. Cl. ......... 345/474; 345/419; 345/619; 715/700
(58) Field of Classification Search .................. None
See application file for complete search history.

(56) References Cited

U.S. PATENT DOCUMENTS

| | | | |
|---|---|---|---|
| 4,841,291 A | 6/1989 | Swix et al. | |
| 5,261,041 A | 11/1993 | Susman | |
| 5,428,721 A | 6/1995 | Sato et al. | |
| 5,467,288 A | 11/1995 | Fasciano et al. | |
| 5,513,303 A | 4/1996 | Robertson et al. | |
| 5,544,295 A | 8/1996 | Capps | |
| 5,583,981 A | 12/1996 | Pleyer | |
| 5,588,098 A | 12/1996 | Chen et al. | |
| 5,596,694 A | 1/1997 | Capps | |
| 5,619,631 A * | 4/1997 | Schott | 345/440 |
| 5,673,380 A | 9/1997 | Suzuki | |
| 5,717,848 A | 2/1998 | Watanabe et al. | |
| 5,731,819 A | 3/1998 | Gagne et al. | |
| 5,835,692 A | 11/1998 | Cragun et al. | |
| 5,835,693 A | 11/1998 | Lynch et al. | |
| 5,844,572 A * | 12/1998 | Schott | 345/440 |
| 5,883,639 A | 3/1999 | Walton et al. | |
| 5,923,561 A | 7/1999 | Higasayama et al. | |
| 5,977,970 A | 11/1999 | Amro et al. | |
| 6,011,562 A | 1/2000 | Gagne et al. | |
| 6,045,446 A | 4/2000 | Ohshima | |

(Continued)

OTHER PUBLICATIONS

Ablan, D., Inside LightWave® Jan. 7, 2002, pp. 736-753, 767-772.*

(Continued)

*Primary Examiner* — Ulka Chauhan
*Assistant Examiner* — Andrew G Yang
(74) *Attorney, Agent, or Firm* — Fenwick & West LLP

(57) ABSTRACT

A user can control the animation of an object via an interface that includes a control area and a user-manipulable control element. In one embodiment, the control area includes an ellipse, and the user-manipulable control element includes an arrow. In yet another embodiment, the control area includes an ellipse, and the user-manipulable control element includes two points on the circumference of the ellipse. In yet another embodiment, the control area includes a first rectangle, and the user-manipulable control element includes a second rectangle. In yet another embodiment, the user-manipulable control element includes two triangular regions, and the control area includes an area separating the two regions.

19 Claims, 136 Drawing Sheets
(49 of 136 Drawing Sheet(s) Filed in Color)

U.S. PATENT DOCUMENTS

| | | | |
|---|---|---|---|
| 6,115,053 A | 9/2000 | Perlin | |
| 6,141,018 A | 10/2000 | Beri et al. | |
| 6,144,381 A * | 11/2000 | Lection et al. | 715/850 |
| 6,154,601 A | 11/2000 | Yaegashi et al. | |
| 6,266,053 B1 | 7/2001 | French et al. | |
| 6,271,863 B1 | 8/2001 | Bose et al. | |
| 6,285,347 B1 * | 9/2001 | Watanabe et al. | 345/684 |
| 6,285,380 B1 | 9/2001 | Perlin et al. | |
| 6,310,621 B1 | 10/2001 | Gagne et al. | |
| 6,317,128 B1 | 11/2001 | Harrison et al. | |
| 6,317,140 B1 | 11/2001 | Livingston | |
| 6,353,437 B1 | 3/2002 | Gagne | |
| 6,369,821 B2 | 4/2002 | Merrill et al. | |
| 6,414,685 B1 | 7/2002 | Takakura et al. | |
| 6,469,711 B2 | 10/2002 | Foreman et al. | |
| 6,500,008 B1 * | 12/2002 | Ebersole et al. | 434/226 |
| 6,512,522 B1 | 1/2003 | Miller et al. | |
| 6,525,736 B1 | 2/2003 | Erikawa et al. | |
| 6,532,014 B1 | 3/2003 | Xu et al. | |
| 6,549,219 B2 * | 4/2003 | Selker | 715/834 |
| 6,573,896 B1 | 6/2003 | Ribadeau Dumas et al. | |
| 6,615,199 B1 | 9/2003 | Bowman-Amuah | |
| 6,636,242 B2 | 10/2003 | Bowman-Amuah | |
| 6,664,986 B1 | 12/2003 | Kopelman et al. | |
| 6,690,376 B1 | 2/2004 | Saito et al. | |
| 6,714,201 B1 | 3/2004 | Grinstein et al. | |
| 6,756,984 B1 | 6/2004 | Miyagawa | |
| 6,760,030 B2 | 7/2004 | Hiroike et al. | |
| 6,762,778 B1 | 7/2004 | Golibrodski et al. | |
| 6,778,195 B2 | 8/2004 | Venolia | |
| 6,809,744 B2 * | 10/2004 | Ebersole et al. | 345/633 |
| 6,828,971 B2 | 12/2004 | Uesaki et al. | |
| 6,909,431 B1 | 6/2005 | Anderson et al. | |
| 6,967,654 B2 | 11/2005 | Steed | |
| 6,989,831 B2 * | 1/2006 | Ebersole et al. | 345/420 |
| 7,027,055 B2 | 4/2006 | Anderson et al. | |
| 7,050,955 B1 | 5/2006 | Carmel et al. | |
| 7,061,486 B2 | 6/2006 | Sowizral et al. | |
| 7,071,919 B2 | 7/2006 | Hinckley et al. | |
| 7,073,127 B2 | 7/2006 | Zhao et al. | |
| 7,124,366 B2 | 10/2006 | Foreman et al. | |
| 7,155,676 B2 | 12/2006 | Land et al. | |
| 7,210,107 B2 * | 4/2007 | Wecker et al. | 715/863 |
| 7,274,375 B1 * | 9/2007 | David | 345/619 |
| 7,441,206 B2 * | 10/2008 | MacPhee | 715/853 |
| 7,932,909 B2 | 4/2011 | Niles et al. | |
| 2002/0003540 A1 | 1/2002 | Unuma et al. | |
| 2004/0036711 A1 | 2/2004 | Anderson | |
| 2004/0039934 A1 | 2/2004 | Land et al. | |
| 2005/0091576 A1 | 4/2005 | Relyea et al. | |
| 2005/0231512 A1 | 10/2005 | Niles et al. | |
| 2005/0268279 A1 | 12/2005 | Paulsen et al. | |
| 2006/0055700 A1 | 3/2006 | Niles et al. | |
| 2006/0155576 A1 * | 7/2006 | Deluz | 705/2 |
| 2006/0274070 A1 | 12/2006 | Herman et al. | |

OTHER PUBLICATIONS

Rosenzweig, G. Special Edition Using® Macromedia® Director® MX, Jun. 13, 2003, pp. 453-462.*

User Guide Boris FX Version 7.0, Oct. 2003, pp. 487-488.*

Adams, A. et al. Inside Maya® 5, Jul. 9, 2003, pp. 347-349.*

Adobe Systems Incorporated, "Product Overview: Adobe Photoshop CS2," 2005, [online] [Retrieved on Jun. 5, 2006] Retrieved from the Internet <URL: http://www.adobe.com/products/photoshop/pdfs/photoshop_overview.pdf>.

Adobe Systems Incorporated, "Product Overview: Adobe After Effects 7.0," Nov. 2005, [online] [Retrieved on Jun. 5, 2006] Retrieved from the Internet <URL: http://www.adobe.com/products/aftereffects/pdfs/aftereffects_overview.pdf>.

Altman, R. B., "Applying Preset Animations" in Visual QuickStart Guide Power Point 2000/98, ProQuest Safari Books, Peachpit Press, May 7, 1999, 7 pages [online] Retrieved from the Internet: <URL: http://proquest.safaribooksonline.com/0201354411>.

Apple Computer, Inc., "Tiger Developer Overview Series: Developing with Core Image," Apr. 29, 2005, [Retrieved on May 3, 2005], Retrieved from the Internet URL: http://developer.apple.com/macosx/coreimage.html.

Apple Computer, Inc., "Core Video Programming Guide," 2004-2005, [Retrieved on May 3, 2005], Retrieved from the Internet URL: http://developer.apple.com/documentation/GraphicsImaging/Conceptual/CoreVideo/CoreVideo.pdf.

Apple Computer, Inc., "Final Cut Pro 5: Real-time editing for DV, SD, HD and film," [Retrieved on May 2, 2005], Retrieved from the Internet URL: http://www.apple.com/finalcutstudio/finalcutpro/.

Apple Computer, Inc., "Technical Specifications for Shake 4," [Retrieved on May 3, 2005], Retrieved from the Internet URL: http://www.apple.com/shake/specs.html.

Apple Computer, Inc., "Motion Product Overview", [online], Jun. 2004 [Retrieved on Sep. 5, 2005] Retrieved from the Internet: <URL: http://images.apple.com/motion/pdf/Motion_PO_20040615.pdf>.

Apple Computer, Inc., "iMovie HD: Getting Started," 2006, [online] [Retrieved on Jun. 5, 2006] Retrieved from the Internet <URL: http://manuals.info.apple.com/en/iMovie_HD_6_Getting_Started.pdf>.

Apple Computer, Inc., "LiveType 2: User Manual," 2005, [online] [Retrieved on Jun. 5, 2006] Retrieved from the Internet <URL: http://manuals.info.apple.com/en/LiveType_2_User_Manual.pdf>.

Autodesk, Inc., "Autodesk Combustion 4: Technical Specification," 2005, [online] [Retrieved on Jun. 5, 2006] Retrieved from the Internet <URL: http://images.autodesk.com/adsk/files/Combustion4_Specs_R2-2.pdf>.

AVID Technology, Inc., "Softimage® |XSI®, Version 4.2: New Features," Nov. 2004 [Retrieved on Apr. 27, 2005], Retrieved from the Internet URL: http://www.softimage.com/products/xsi/v42/Documentation/features.pdf.

Baraff, D., "Analytical Methods for Dynamic Simulation of Non-Penetrating Rigid Bodies," Computer Graphics, Jul. 1989, vol. 23, No. 3, pp. 223-232.

Brennan, J. et al., Boris FX Version 7.0 User Guide, Oct. 2003, USA.

Daz® Productions, Inc., "Bryce 5.0 User Guide for Macintosh® and Windows®," 2004, [Retrieved on Apr. 27, 2005], Retrieved from the Internet URL: http://bryce.daz3d.com/Bryce5_Manual_DAZ.pdf.

Digimation, Inc., "Particle Studio," 1996-2003, [Retrieved on Apr. 27, 2005], Retrieved from the Internet URL:_http://www.digimation.com/software/asp/product.asp?product_id=63.

Dinerstein, Jonathan and Egbert, Parris K., "Improved Behavioral Animation Through Regression," *Proceedings of Computer Animation and Social Agents (CASA) Conference*, 2004, pp. 231-238.

Eyeon Software Inc., "Products: Digital Fusion 4: Fusion 5 Upgrades," [Retrieved on Apr. 27, 2005], Retrieved from the Internet URL: http://eyeonline.com/Web/EyeonWeb/Products/digital_fusion/digital_fusion.aspx.

Korein, J., et al., "Temporal Anti-Aliasing in Computer Generated Animation," ACM SIGGRAPH Computer Graphics, Jul. 1983, p. 377-388, vol. 17, Is. 3.

Kurtenbach et al., "The Design of a GUI Paradigm based on Tablets, Two-hands, and Transparency," CHI 97, Mar. 22, 1997, pp. 35-42, Atlanta, GA.

Lammers, J., et al., "Maya 4.5 Fundamentals: Particles" [online]. Jan. 14, 2003 [retrieved on 2117/2007] Retrieved from Proquest Safari Books Online: <URL:http://proquest.safaribooksonline.com/0735713278>.

Litwinowicz, Peter C., "Inkwell: A 2 1/2-D Animation System," *Computer Graphics*, vol. 25, No. 4, Jul. 1991, pp. 113-122.

Macromedia, Inc., "Director® MX 2004: Using Director," Sep. 2004, [Retrieved on Apr. 27, 2005], Retrieved from the Internet URL: http://download.macromedia.com/pub/documentation/en/director/mx2004/using_drmx2004.pdf.

Macromedia, Inc., "Using Director MX 2004 behaviors," [Retrieved on Apr. 27, 2005], Retrieved from the Internet URL: http://download.macromedia.com/pub/documentation/en/director/mx.2004/drmx2004_behaviors.pdf.

May, Stephen F., "Encapsulated Models: Procedural Representations for Computer Animation", Ph. D. Dissertation, Department of Computer and Information Science, Ohio State University, 1998.

Press, W.H. et al., "Numerical Recipes in C: The Art of Scientific Computing," Oct. 30, 1992, pp. 710-714.

Purcell, T.J. et al., "Ray Tracing on Programmable Graphics Hardware," ACM Transactions on Graphics, Jul. 2002, vol. 21, No. 3, pp. 703-712.

Reynolds, Craig W., "Flocks, Herds, and Schools: A Distributed Behavioral Model," *Computer Graphics*, vol. 21, No. 4, Jul. 1987, pp. 25-34.

"Scalable Vector Graphics (SVG) 1.1 Specification, Chapter 19", [online], Jan. 14, 2003 [Retrieved on Sep. 5, 2005] Retrieved from the Internet: <URL: http://www.w3.org/TR/SVG/animate.html#animation-mod>.

Thalmann, Daniel, "Physical, Behavioral, and Sensor-Based Animation," *Proceedings of the 6th International Conference on Computer Graphics & Vision (GraphiCon)*, St. Petersburg, Russia, 1996, pp. 214-221.

Tu, Xiaoyuan, "Behavioral Animation," Jan. 1996, [Retrieved on Mar. 16, 2005], Retrieved from the Internet URL: http://www.dgp.toronto.edu/people/tu/thesis/node35.html.

Van De Panne, M., "Control Techniques for Physically-Based Animation" (Chapter 5: Control for Turning Motions), Thesis for the Department of Electrical and Computer Engineering University of Toronto, 1994, 42 pages, can be retrieved at <URL: http://www.dgp.utoronto.ca/~van/phd.ps.gz>.

Virtools SA, "Virtools™ Dev: Develop Online and Offline Applications With Rich Interactivity," [Retrieved on Apr. 27, 2005], Retrieved from the Internet URL: http://www.virtools.com/solutions/products/pdfs/VirtoolsDev_3.pdf.

Vital Idea Inc., "Products:Crowd!®," 2004 [Retrieved on May 3, 2005], Retrieved from the Internet URL: http://vitalidea.com/products/crowd/.

Wildform, Inc., "WildfxPro: Wild FX Pro Video Titling and Text Animation Software," 2005 [Retrieved on May 3, 2005], Retrieved from the Internet URL: http://www.wildform.com/wildfx/wildfxpro.php?sid=DCD9-2B90-420a8e669f030&ref=.

Wondertouch, LLC, "particleillusion 3.0 Guide," [Retrieved on Apr. 27, 2005], Retrieved from the Internet URL: http://www.wondertouch.com/downloads/updates/Manual_301.zip.

"Woodland Games: Carpet Golf," Dec. 31, 1998, [online] [Retrieved on Aug. 4, 2006] Retrieved from the Internet <URL:http://www.woodlands-junior.kent.sch.uk/Games/lengame/cgolf/>.

Ziauddin, Ismail, "Behavioral Animation," Jan. 2001 [Retrieved on Mar. 16, 2005], Retrieved from the Internet URL: http://www.gignews.com/behavioral_animation.htm.

PCT International Search Report and Written Opinion, PCT/US2005/012735, Aug. 31, 2006.

PCT Invitation to Pay Additional Fees/Partial International Search; PCT/US2005/012735, Sep. 30, 2005.

U.S. Office Action, U.S. Appl. No. 10/826,973, Feb. 19, 2009, 24 pages.

U.S. Office Action, U.S. Appl. No. 10/826,973, Sep. 2, 2009, 13 pages.

Office Action for U.S. Appl. No. 11/786,850, Apr. 2, 2010, 22 pages.

Conner, D., et al., "Three-dimensional widgets," Proceedings of the 1992 Symposium on interactive 3D Graphics, ACM 1992, pp. 183-188, 230-231.

Derakhshani, D., "Introducing Maya 5 3D for Beginners," Chapter 12, 2003, pp. 327-341.

Fitzmaurice, G., "Graspable User Interfaces," PhD Thesis for the University of Toronto, 1996, 181 Pages.

Kim, W.C., et al., "DON: User Interface Presentation Design Assistant," Proceedings of the 3rd Annual ACM SIGGRAPH Symposium on User interface software and Technology, Oct. 3-5, 1990, pp. 10-20.

Singh, G., et al., "A high-level user interface management system," Chi'89 Proceedings, May 1989, pp. 133-138.

Thalmann, D., "Using Virtual Reality Techniques in the Animation Process," Virtual Reality Systems, 1993, 20 Pages.

Alias Wavefront Education, "Learning Maya 2," Maya Dynamics, 1999, 32 Pages.

Office Action from United States Patent and Trademark Office for U.S. Appl. No. 12/729,912, Feb. 7, 2011, 16 Pages.

Office Action for U.S. Appl. No. 11/257,882, May 27, 2009, 23 Pages.

Office Action for U.S. Appl. No. 12/729,912, Feb. 7, 2011, 16 Pages.

Henriksen, K., et al., Virtual Trackballs Revisited, IEEE Transactions on Visualization and Computer Graphics, Mar./Apr. 2004, vol. 10, No. 2, pp. 206-216.

Brooks, S. et al., "Using Maya: Essentials (Version 3)", 2000, 191 pages, Alias|Wavefront.

Brooks, S. et al., "Using Maya: Dynamics (Version 3)", 2000, 143 pages, Alias|Wavefront.

Office Action for U.S. Appl. No. 13/052,372, Jun. 27, 2011, 20 Pages.

Office Action from United States Patent and Trademark Office for U.S. Appl. No. 12/729,912, Aug. 20, 2010, 18 Pages.

Communication from United States Patent and Trademark Office for U.S. Appl. No. 11/786,850, Jul. 26, 2010, 4 Pages.

He, T., et al., "Virtual input devices for 3D systems," Proceedings of the 4th Conference on Visualization '93, IEEE Visualization, IEEE Computer Society, Oct. 25-29, 1993, pp. 142-148 and CP-14.

Hinckley, K., et al., "Usability Analysis of 3D Rotation Techniques," Proceedings of the 10th Annual ACM Symposium on User Interface Software and Technology, UIST '97, Oct. 14-17, 1997, pp. 1-10.

Shoemake, K., "ARCBALL: A User Interface for Specifying Three-Dimensional Orientation Using a Mouse," Proceedings of the Conference on Graphics Interface '92, 1992, pp. 151-156.

Singh, K., et al., "The IBar: a perspective-based camera widget," Proceedings of the 17th Annual ACM Symposium on User Interface Software and Technology, UIST '04, Oct. 24-27, 2004, pp. 95-98, vol. 6, Issue 2.

Office Action for U.S. Appl. No. 13/052,372, Jan. 9, 2012, 23 Pages.

\* cited by examiner

| On | Preview | Name | | Lock | > |
|---|---|---|---|---|---|
| ☑ | | ▼ ⧈ BG | | 🔓 | |
| ☑ | | 🎞 More Waves | ✿ Grow/Shrink | 🔓 | |
| ☑ | | ▼ 🎞 Waves | ✿ | 🔓 | |
| ☑ | | ✿ Grow/Shrink | | 🔓 | |
| ☑ | | ✿ Fade In/Fade Out | | 🔓 | |

FIG. 18

| ☑ | | ▼ 🎞 Waves | ✿ | 🔓 |
|---|---|---|---|---|
| ☑ | | ✿ Gravity | | 🔓 |
| ☑ | | ✿ Motion Path | | 🔓 |
| ☑ | | ✿ Grow/Shrink | | 🔓 |
| ☑ | | ✿ Fade In/Fade Out | | 🔓 |

FIG. 19

| ☑ | ▼ 🎞 Waves | ✿ | 🔓 | Waves |
|---|---|---|---|---|
| ☑ | ✿ Gravity | | 🔓 | Gravity |
| ☑ | ✿ Motion Path | | 🔓 | Motion Path |
| ☑ | ✿ Grow/Shrink | | 🔓 | Grow/Shrink |
| ☑ | ✿ Fade In/Fade Out | | 🔓 | Fade In/Fade Out |

Continuous Rate ⇅  } —1730

Medium ▼  } —1740
       1744      1742

} —1750

1764
  ↙   ┌─1762
Color  ▨
Red    ──●──  ◀ 0 ▶
Green  ●────  ◀ 0 ▶   } —1760
Blue   ──●──  ◀ 0 ▶
Alpha  ────● ◀ 1 ▶
       176A 176B 176C 176D

USER INTERFACE FOR CONTROLLING ANIMATION OF AN OBJECT

CROSS-REFERENCE TO RELATED APPLICATIONS

This application is a divisional of the following application, the disclosure of which is incorporated herein by reference: U.S. patent application Ser. No. 11/257,882, entitled "User Interface for Controlling Animation of an Object", filed Oct. 24, 2005, now abandoned which is a continuation of the following application, the disclosure of which is incorporated herein by reference: U.S. patent application Ser. No. 10/826,973, entitled "Animation of an Object Using Behaviors", filed Apr. 16, 2004 now abandoned. This application is related to the following commonly owned and co-pending U.S. patent applications, the disclosures of which are incorporated herein by reference:

U.S. patent application Ser. No. 10/826,429, for "Editing within Single Timeline", filed Apr. 16, 2004; and U.S. patent application Ser. No. 10/826,878, for "Gesture Control of Multimedia Editing Applications", filed Apr. 16, 2004.

BACKGROUND OF THE INVENTION

1. Field of the Invention

This invention relates generally to computer animation and, more specifically, to animating an object using behaviors.

2. Background Art

In the last few decades, computers and software have been used to animate objects. Initially, animation software was complicated and difficult to use. A user was generally required to interact with objects using a low level of abstraction. For example, a user would manually create different visual representations of an object (keyframes) and then use software to interpolate between them.

Recently, animation software has become more user-friendly, enabling a user to interact with objects at a higher level of abstraction. For example, a user may animate an object by applying a "behavior" to the object. A behavior is an animation abstraction and can be thought of as a macro, script, or plugin. When a behavior is applied to an object, the object is animated in a particular way (e.g., by growing or shrinking or by moving in a specific direction). Some examples of animation software that support behaviors are Anark Studio and Macromedia Director MX.

Although behaviors make it easier to animate objects, software that supports behaviors can still be difficult to use. Many types of behaviors may be applied to one object, and each type of behavior can be customized based on several parameters. Understanding each of these parameters and its effect on the behavior can be confusing. Providing values for all of these parameters can also be time-consuming.

What is needed is a better user interface for animating objects using behaviors.

SUMMARY OF THE INVENTION

Various embodiments of the invention cover various aspects of behaviors and working with behaviors. One embodiment covers behaviors themselves, including animations that can be produced by applying a behavior to an item and the algorithms underlying these animations. Another embodiment covers using behaviors in conjunction with keyframes. Yet another embodiment covers working with behaviors, including setting parameters of behaviors, saving behaviors, and creating new behaviors. Yet another embodiment covers objects to which behaviors may be applied, including, for example, images, text, particle systems, filters, generators, and other behaviors. Yet another embodiment covers dynamic rendering of objects to which behaviors have been applied, including changing an animation in real-time after the value of a behavior parameter has been changed. Yet another embodiment covers hardware acceleration methods that enable users to work effectively with behaviors.

A user can control the animation of an object via an interface that includes a control area and a user-manipulable control element. In one embodiment, the control area includes an ellipse, and the user-manipulable control element includes an arrow with a straight body that starts in the center of the ellipse and points toward the circumference of the ellipse. In another embodiment, the user-manipulable control element includes an arrow that has a curved body that comprises an arc of the ellipse and that points along the circumference of the ellipse. In yet another embodiment, the control area includes an ellipse, and the user-manipulable control element includes two points on the circumference of the ellipse. In yet another embodiment, the control area includes a first rectangle, and the user-manipulable control element includes a second rectangle. In yet another embodiment, the user-manipulable control element includes two triangular regions, and the control area includes an area separating the two regions.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

FIG. 7 illustrates a parameter behavior in the Layers tab, according to one embodiment of the invention.

FIG. 8 illustrates a parameter behavior in the Timeline, according to one embodiment of the invention.

FIG. 18 illustrates a behavior that is being dragged to another object in the Layers tab, according to one embodiment of the invention.

FIG. 19 illustrates an object with multiple behaviors in the Timeline, according to one embodiment of the invention.

FIG. 20 illustrates an object with multiple behaviors in the Layers tab, according to one embodiment of the invention.

FIG. 125 illustrates a particle system with a Line emitter shape, according to one embodiment of the invention.

FIG. 126 illustrates a particle system with a Circle emitter shape, according to one embodiment of the invention.

FIG. 127 illustrates a particle system with a Filled Circle emitter shape, according to one embodiment of the invention.

FIG. 128 illustrates a particle system with a Geometry emitter shape, according to one embodiment of the invention.

FIG. 129 illustrates the shape that was used as the Geometry emitter shape for the particle system of FIG. 128, according to one embodiment of the invention.

FIG. 130 illustrates a particle system with an Image emitter shape, according to one embodiment of the invention.

FIG. 131 illustrates the image that was used as the Image emitter shape for the particle system of FIG. 130, according to one embodiment of the invention.

FIG. 132 illustrates a particle system with a lower birth rate, according to one embodiment of the invention.

FIG. 133 illustrates the particle system of FIG. 132 but with a higher birth rate, according to one embodiment of the invention.

FIG. 134 illustrates a particle system with a higher initial number, according to one embodiment of the invention.

FIG. 135 illustrates the particle system of FIG. 134 but with a lower initial number, according to one embodiment of the invention.

FIG. 136 illustrates a particle system with a longer life, according to one embodiment of the invention.

Figure 136:
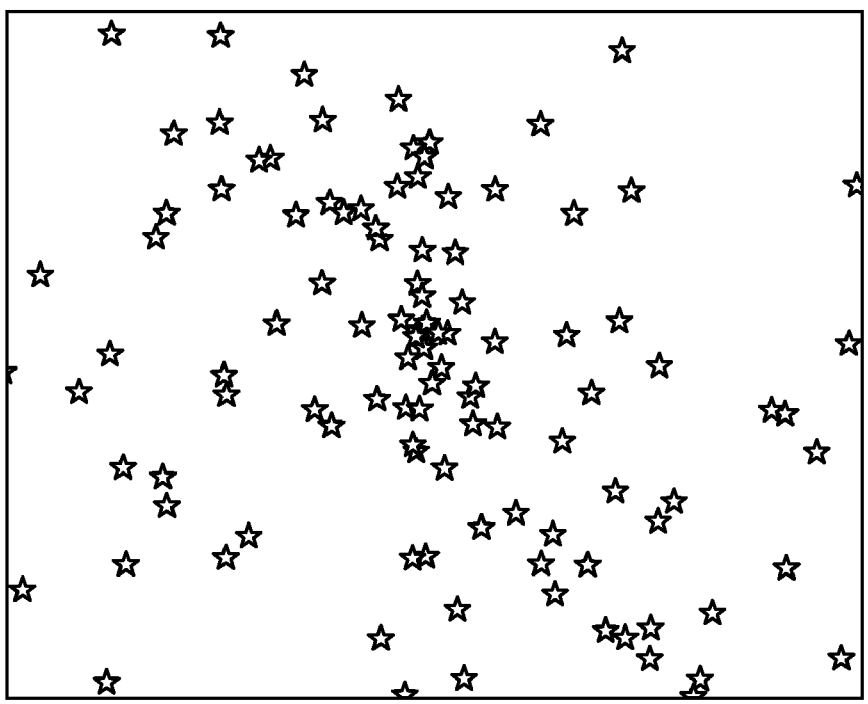
Figure 137:
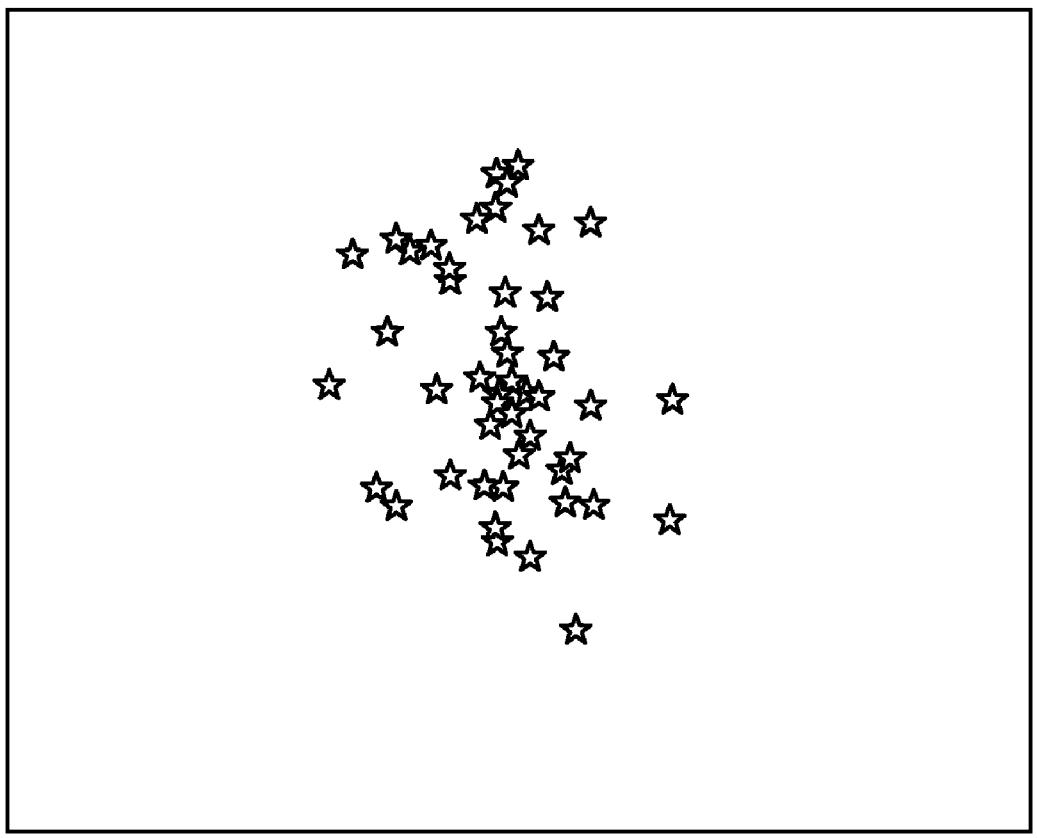

FIG. 137 illustrates the particle system of FIG. 136 but with a shorter life, according to one embodiment of the invention.

Figure 138:
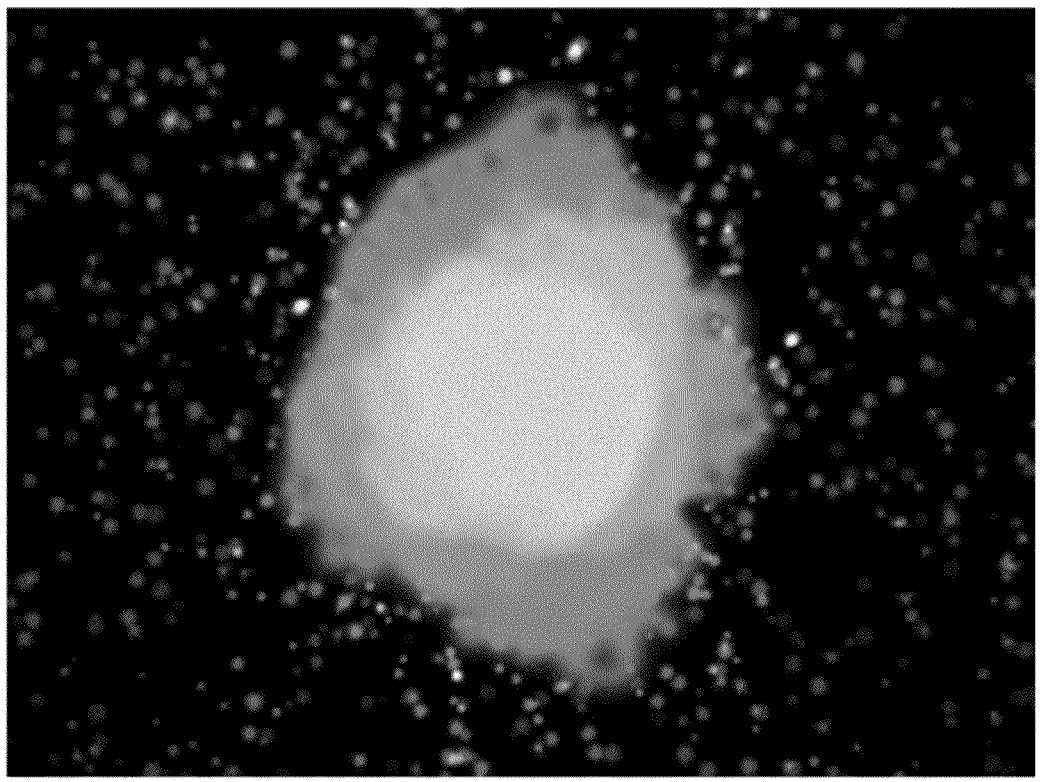

FIG. 138 illustrates a particle system with the Additive Blend parameter turned off, according to one embodiment of the invention.

Figure 139:
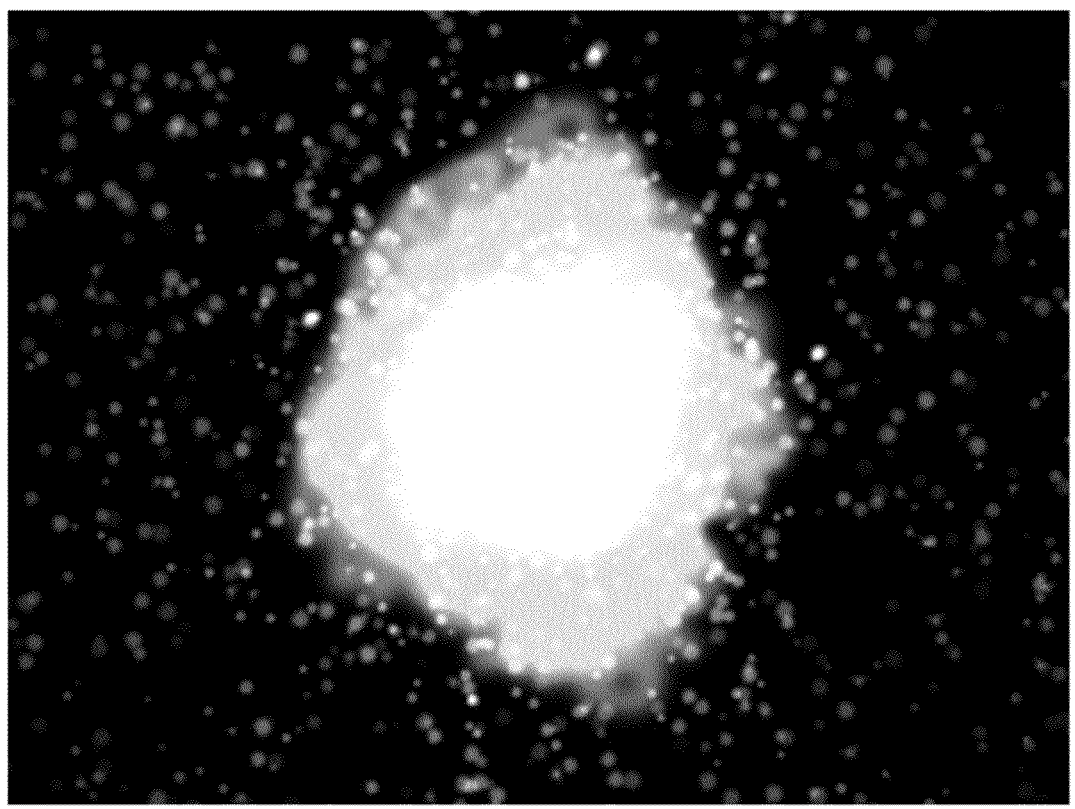

FIG. 139 illustrates a particle system with the Additive Blend parameter turned on, according to one embodiment of the invention.

Figure 140:
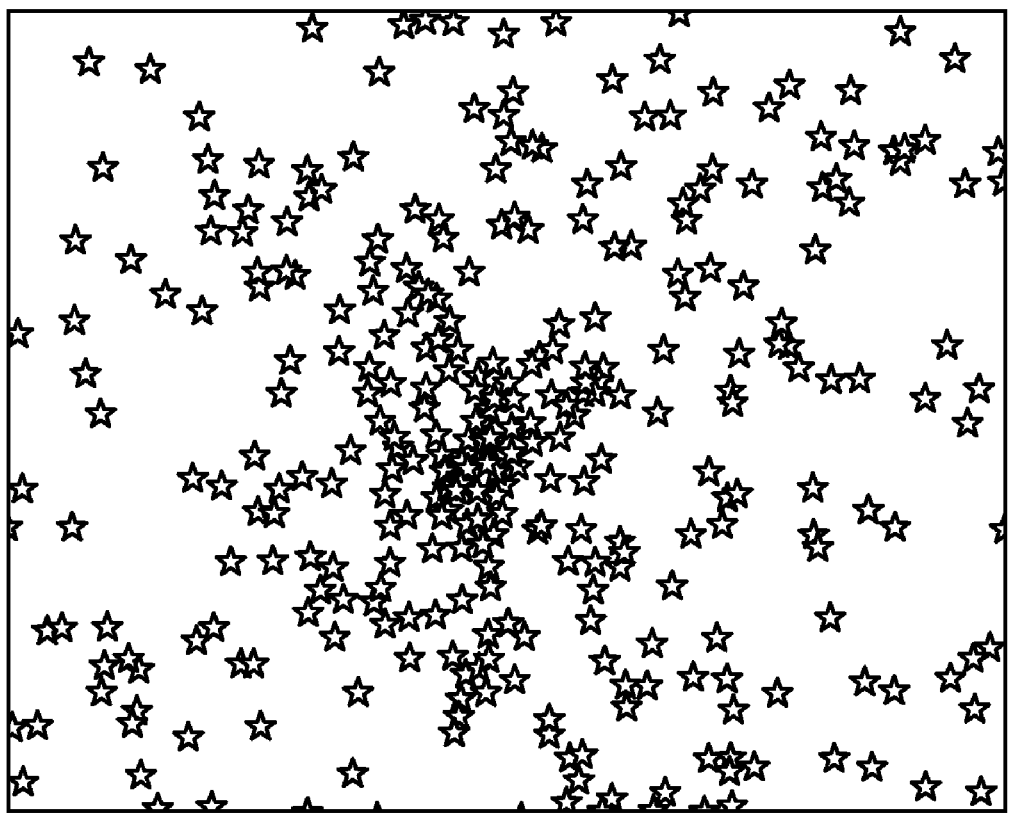

FIG. 140 illustrates a particle system with a Solid Color Mode, according to one embodiment of the invention.

Figure 141:
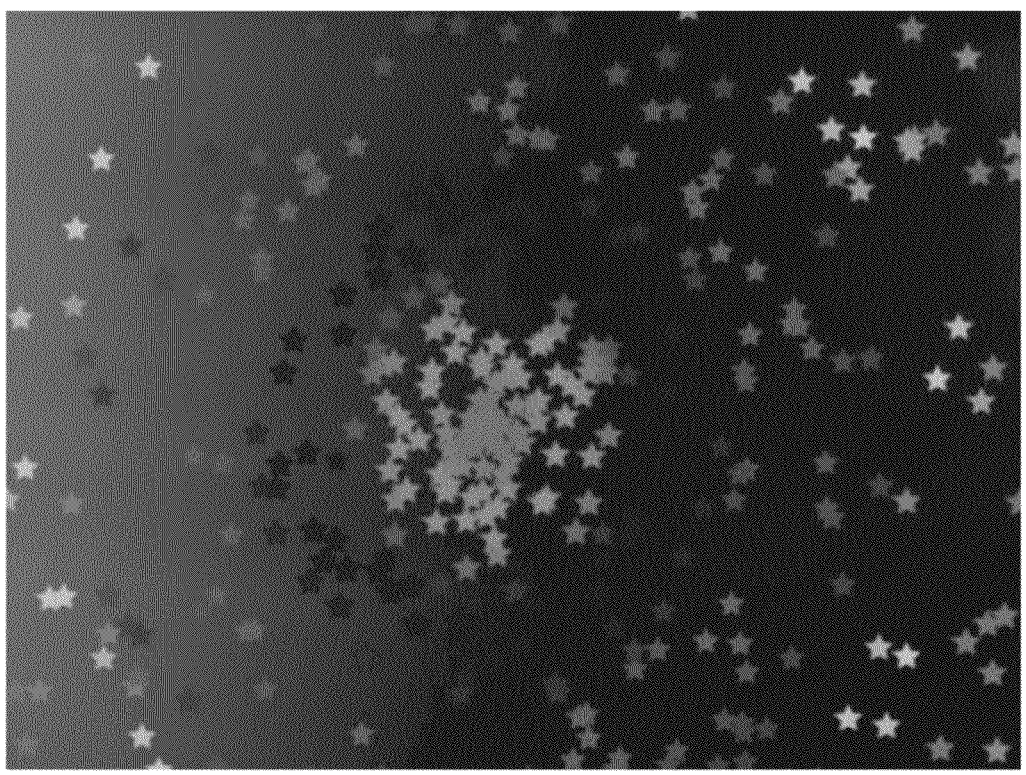

FIG. 141 illustrates a particle system with an Over Life Color Mode, according to one embodiment of the invention.

Figure 142:
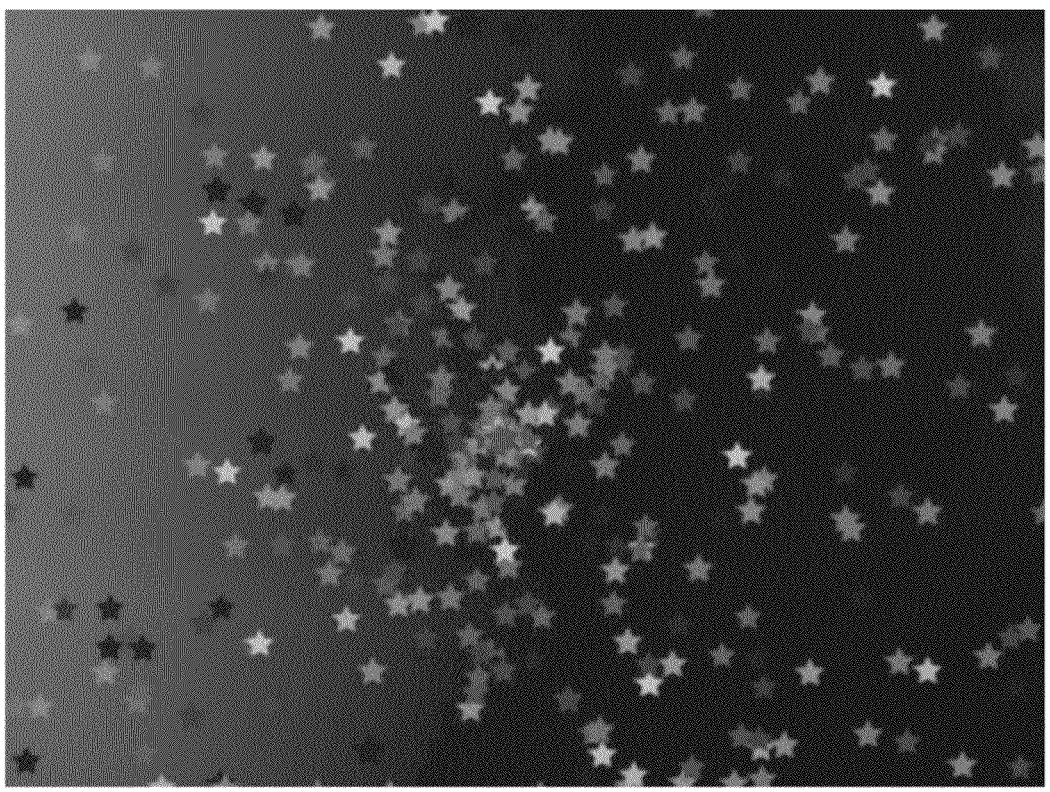

FIG. 142 illustrates a particle system with a Range Color Mode, according to one embodiment of the invention.

Figure 143:
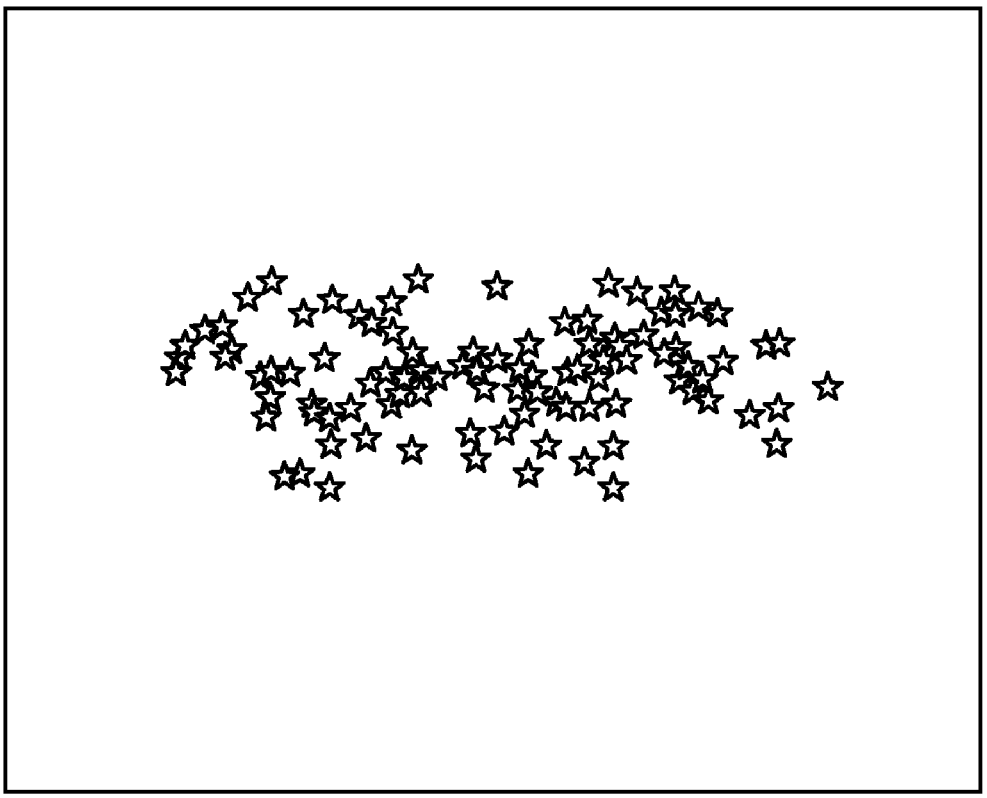

FIG. 143 illustrates a particle system with a Take Image Color Mode, according to one embodiment of the invention.

Figure 144:

FIG. 144 illustrates a particle system with a larger Scale parameter, according to one embodiment of the invention.

Figure 145:
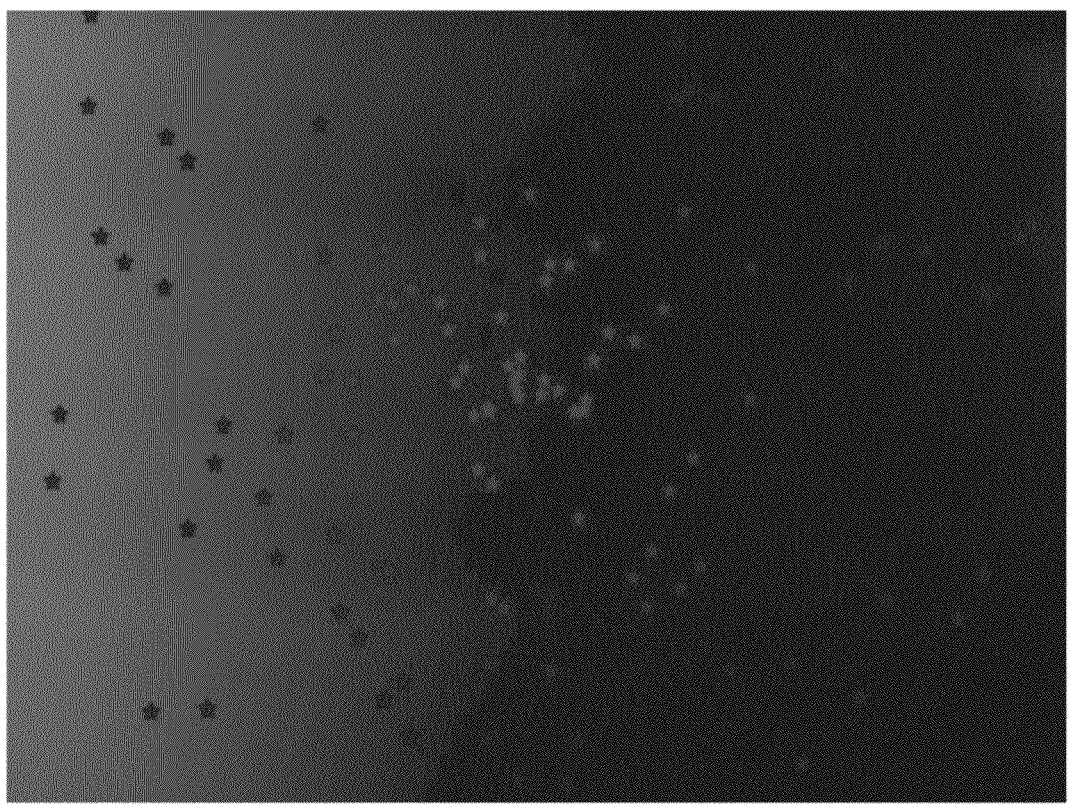

FIG. 145 illustrates the particle system of FIG. 144 but with a smaller Scale parameter, according to one embodiment of the invention.

Figure 146:
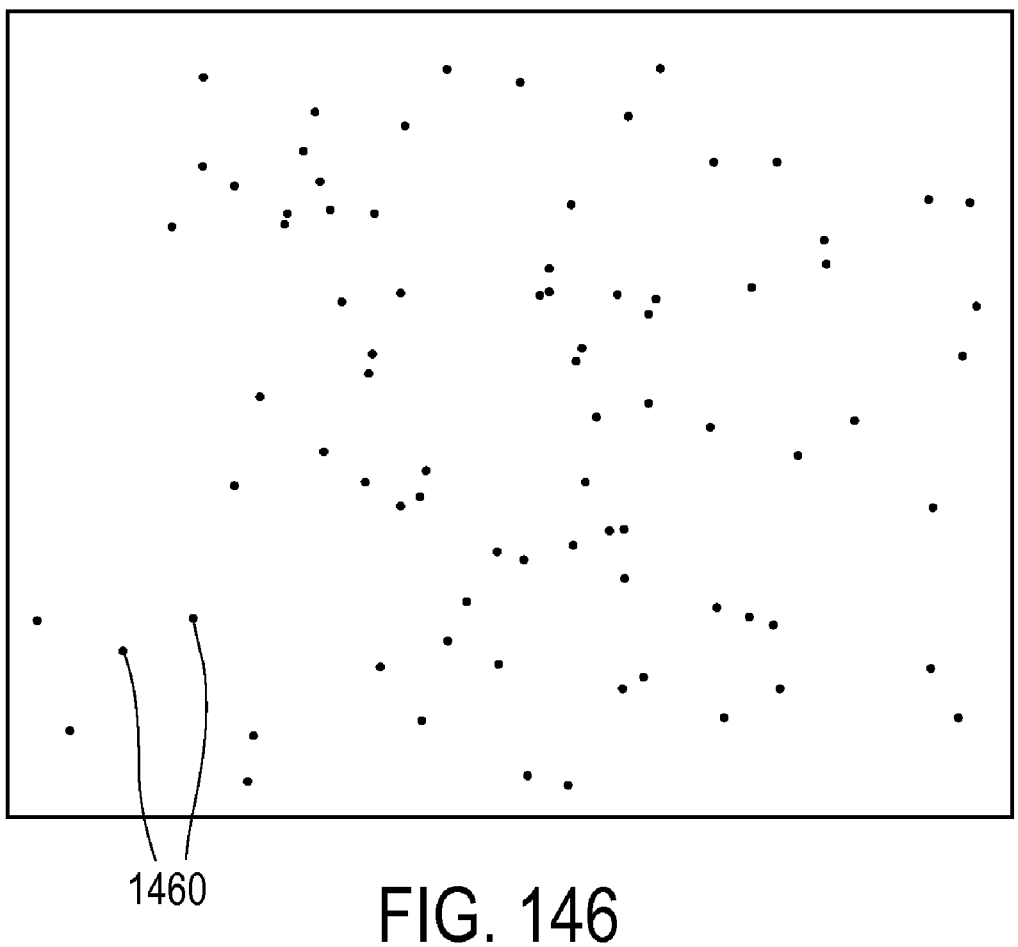

FIG. 146 illustrates a particle system with a Point Show Particles As parameter, according to one embodiment of the invention.

Figure 147:
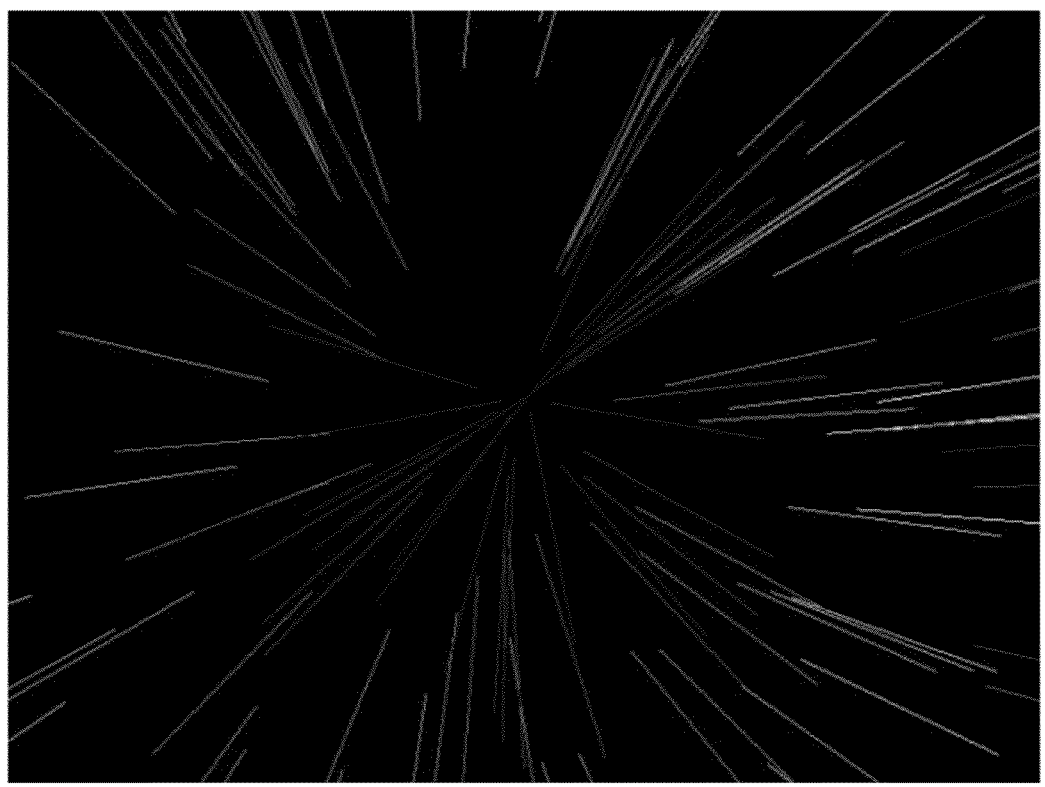

FIG. 147 illustrates a particle system with a Line Show Particles As parameter, according to one embodiment of the invention.

Figure 148:
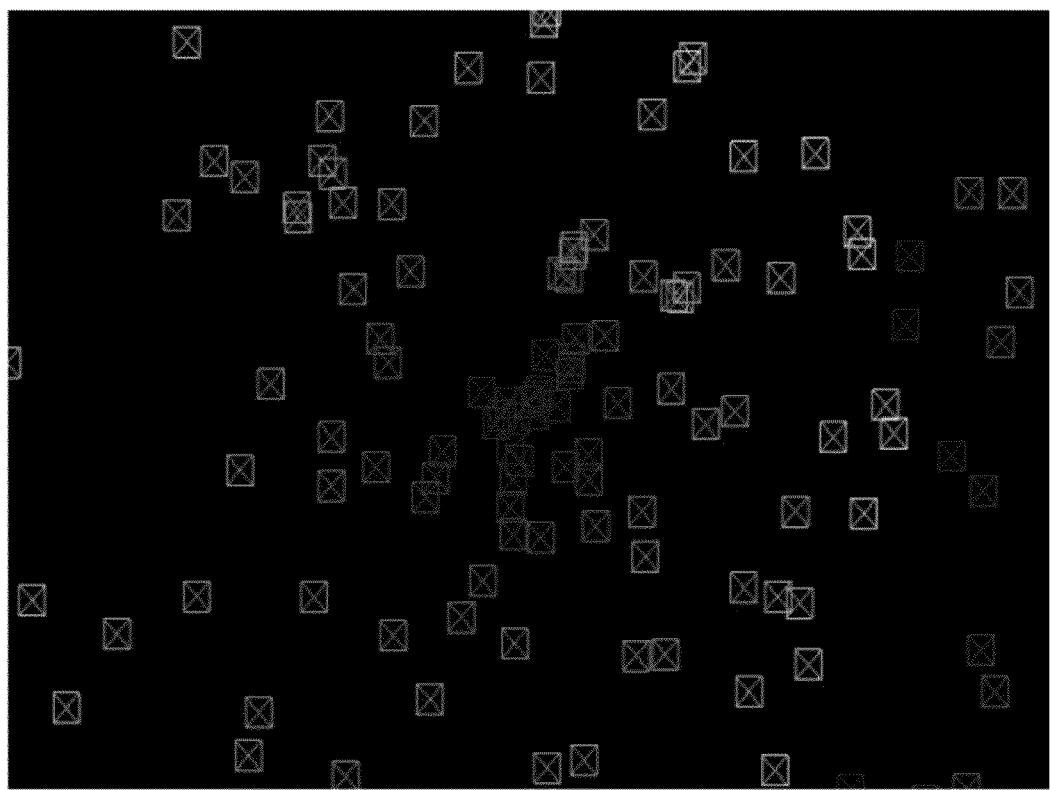

FIG. 148 illustrates a particle system with an Outline Show Particles As parameter, according to one embodiment of the invention.

Figure 149:

FIG. 149 illustrates a particle system with an Image Show Particles As parameter, according to one embodiment of the invention.

Figure 150:
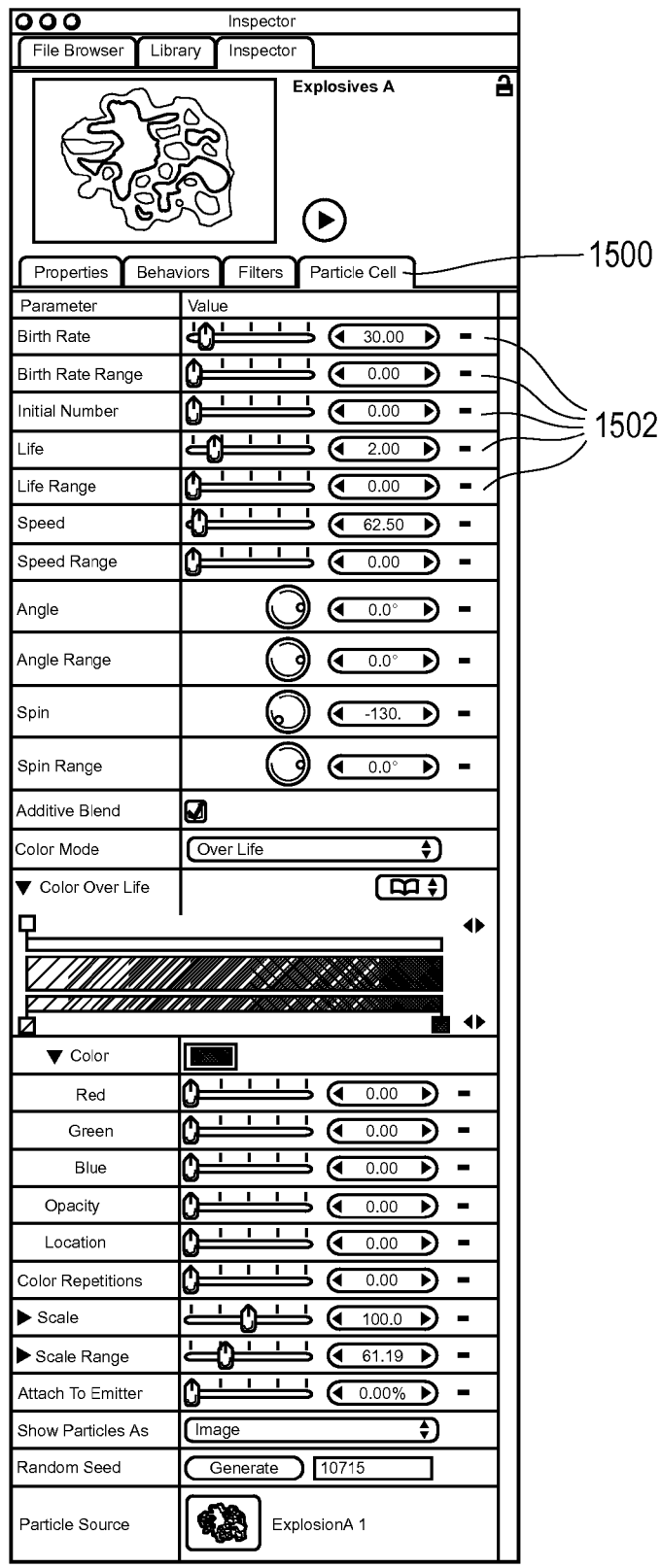

FIG. 150 illustrates a Particle Cell tab, according to one embodiment of the invention.

Figures 151, 152:
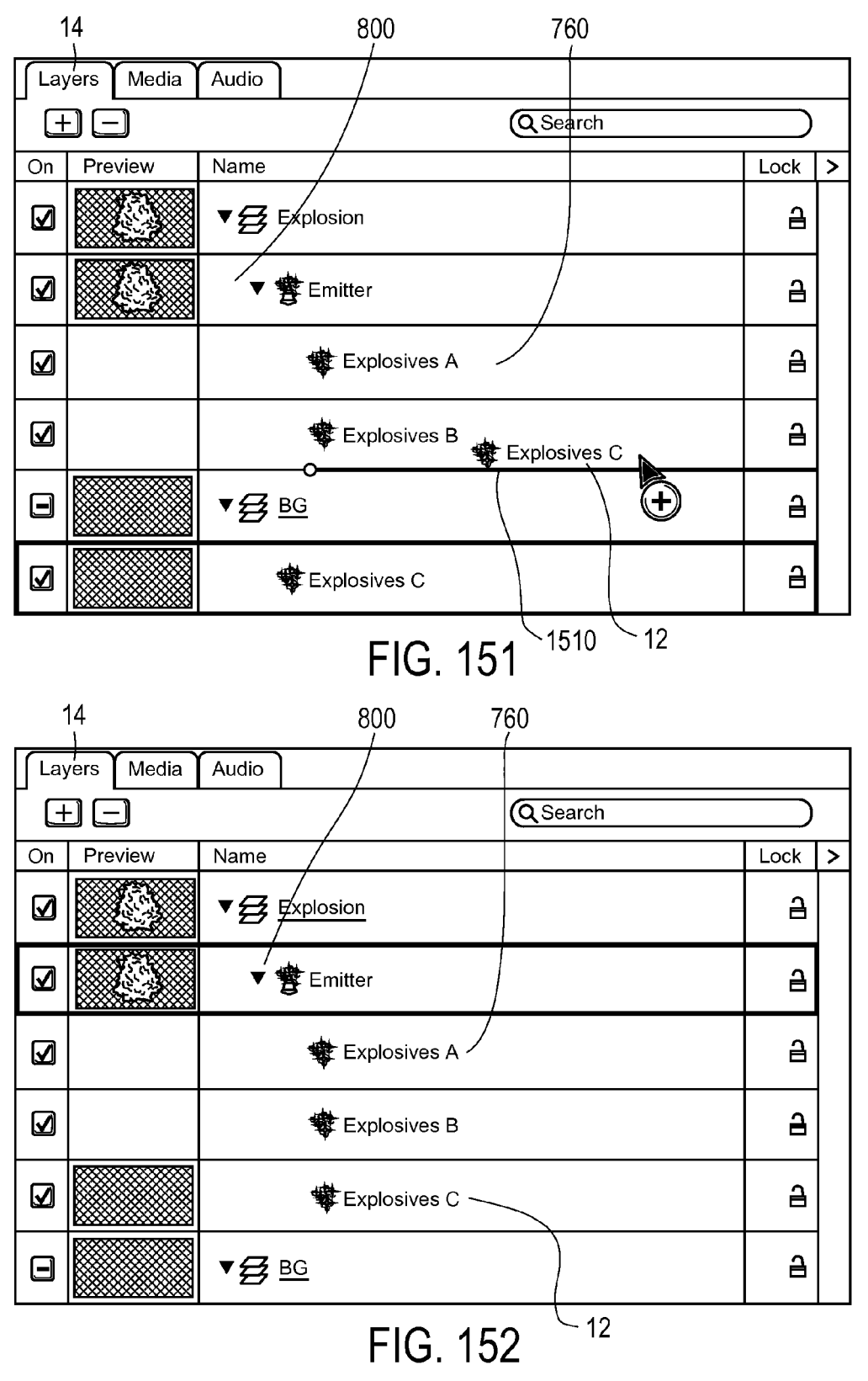

FIG. 151 illustrates an object that is being dragged to a position in the Layers tab, according to one embodiment of the invention.

FIG. 152 illustrates the object of FIG. 151, now nested within an emitter, according to one embodiment of the invention.

Figure 153:
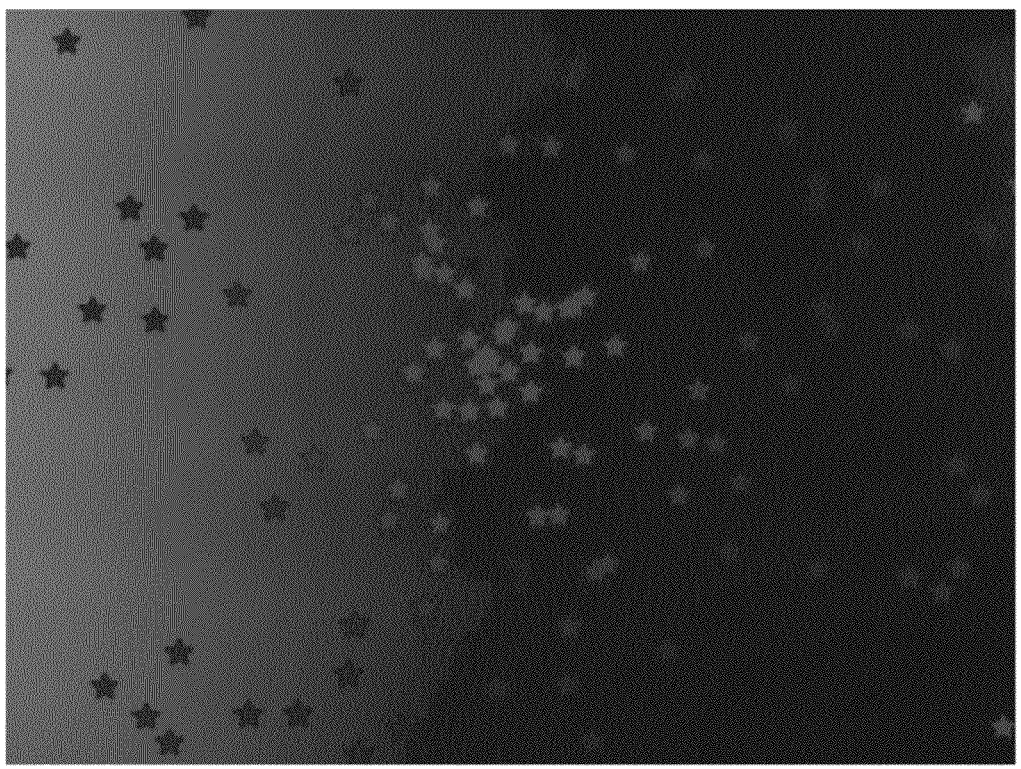

FIG. 153 illustrates a particle system, according to one embodiment of the invention.

Figure 154:
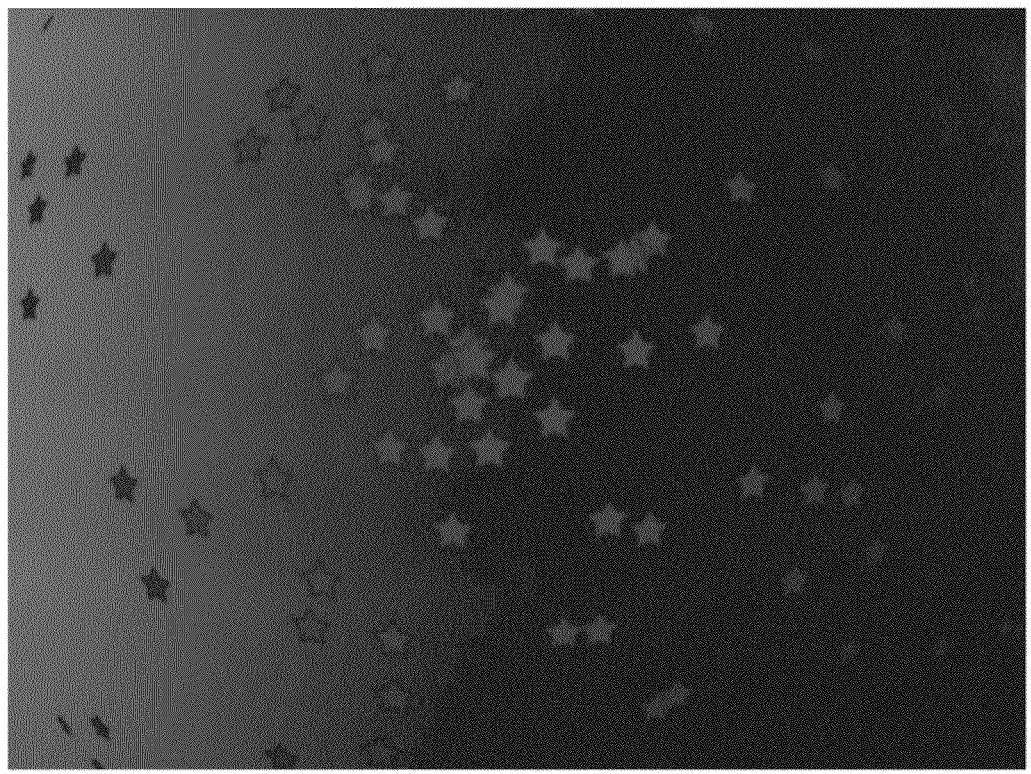

FIG. 154 illustrates the particle system of FIG. 153 after a Sphere filter has been applied, according to one embodiment of the invention.

Figure 155:
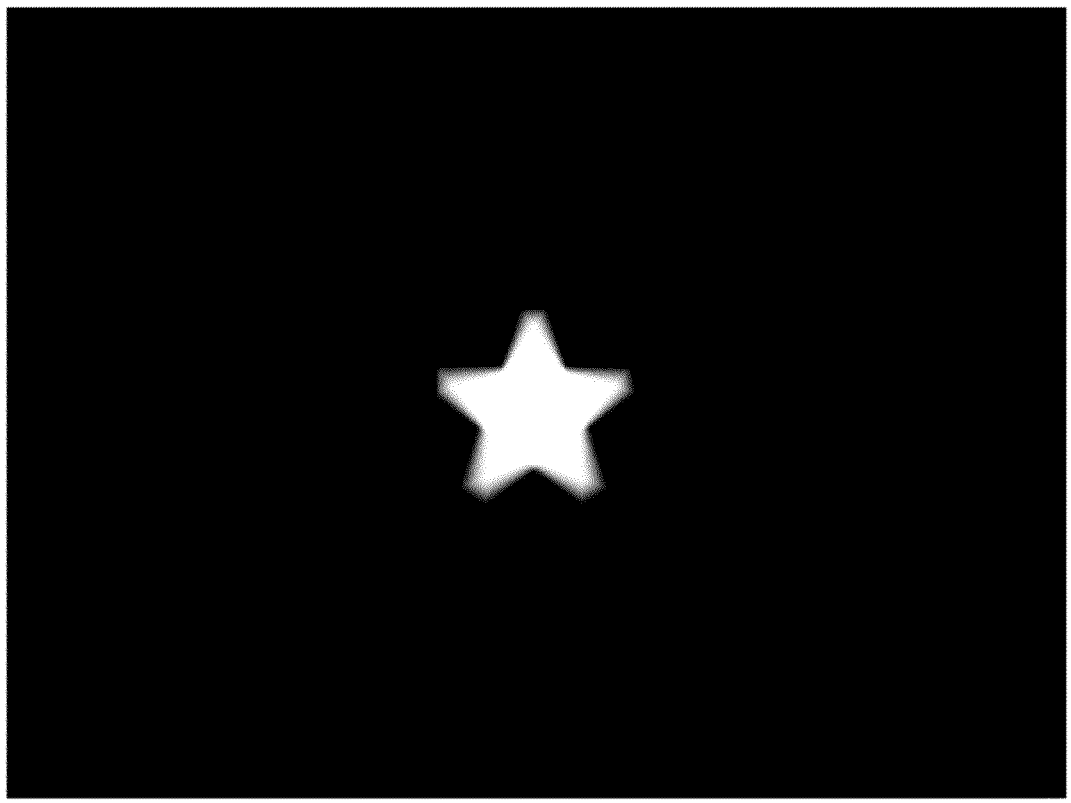

FIG. 155 illustrates a simple graphic with a premultiplied alpha channel, according to one embodiment of the invention.

Figure 156:
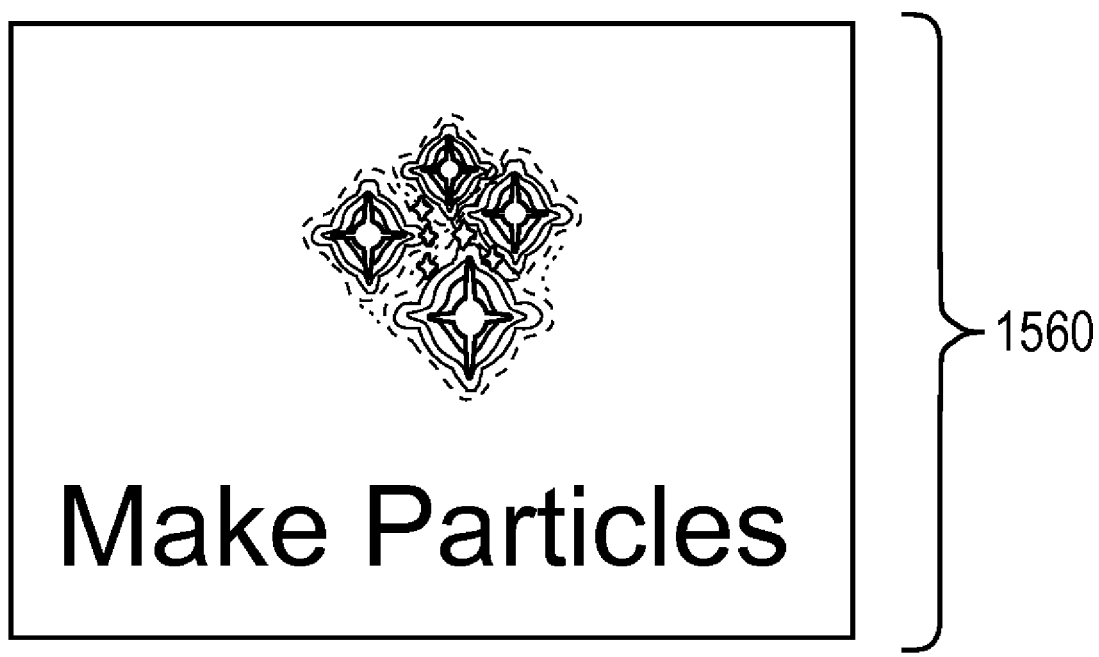

FIG. 156 illustrates an Emitter button, according to one embodiment of the invention.

Figure 157:
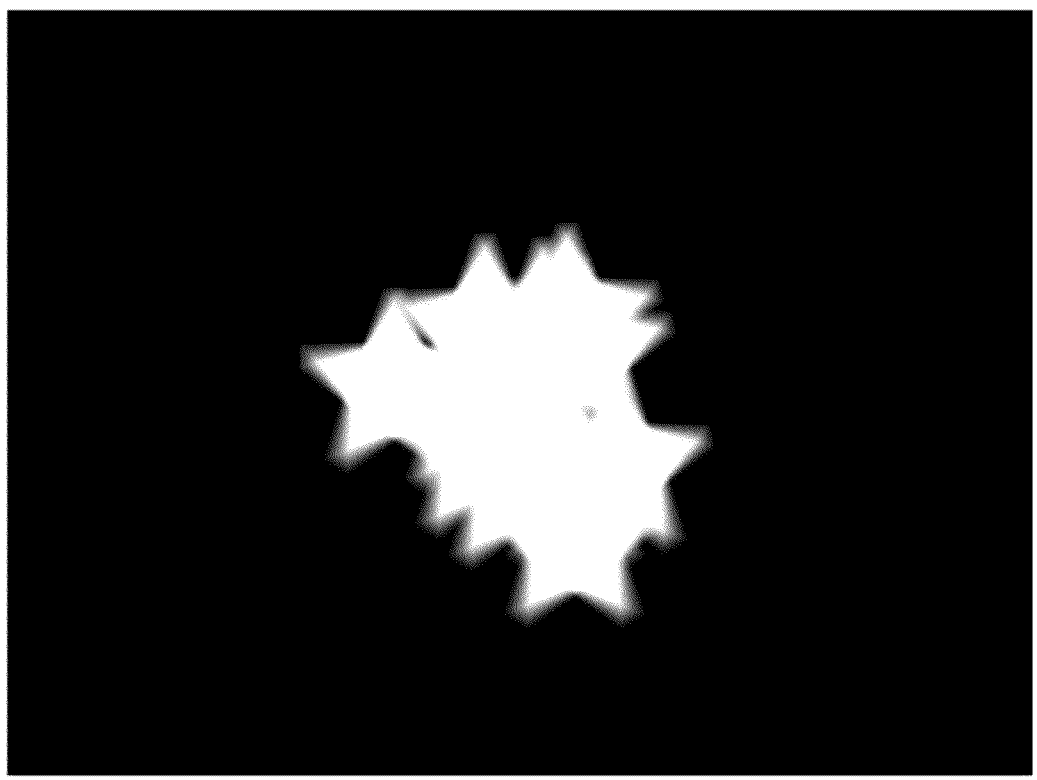

FIG. 157 illustrates a distributed group of particles that partially fills the Canvas, according to one embodiment of the invention.

Figure 158:
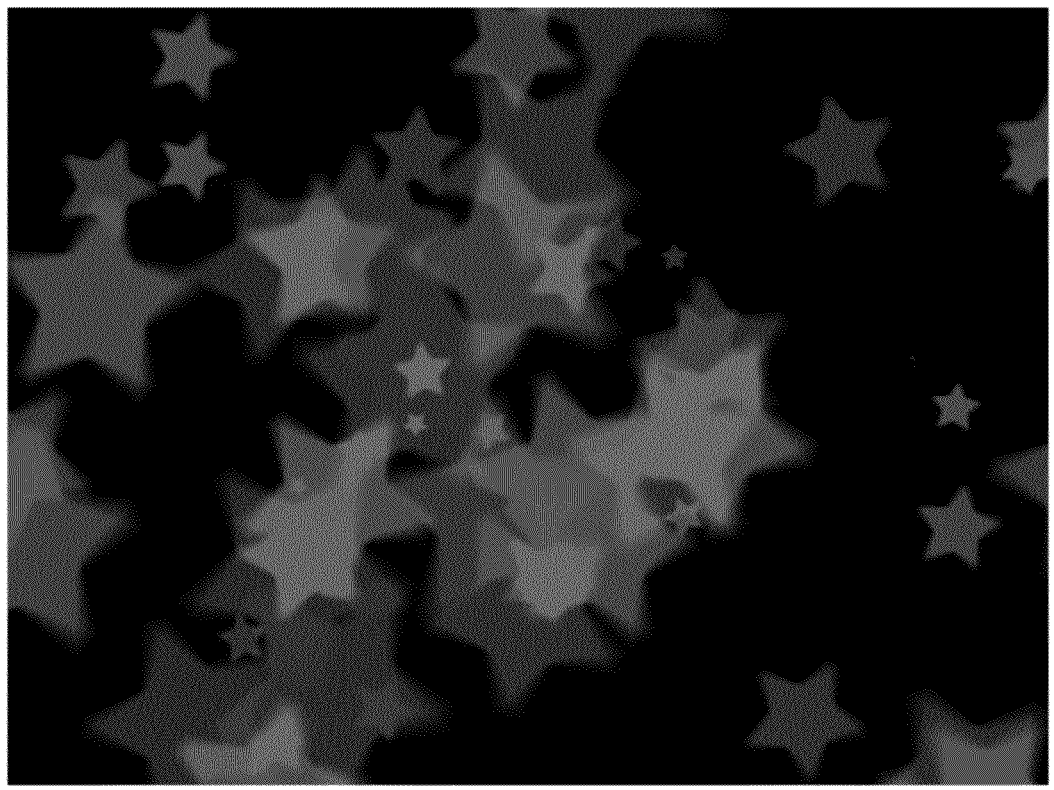

FIG. 158 illustrates the resulting image, according to one embodiment of the invention.

Figure 159:
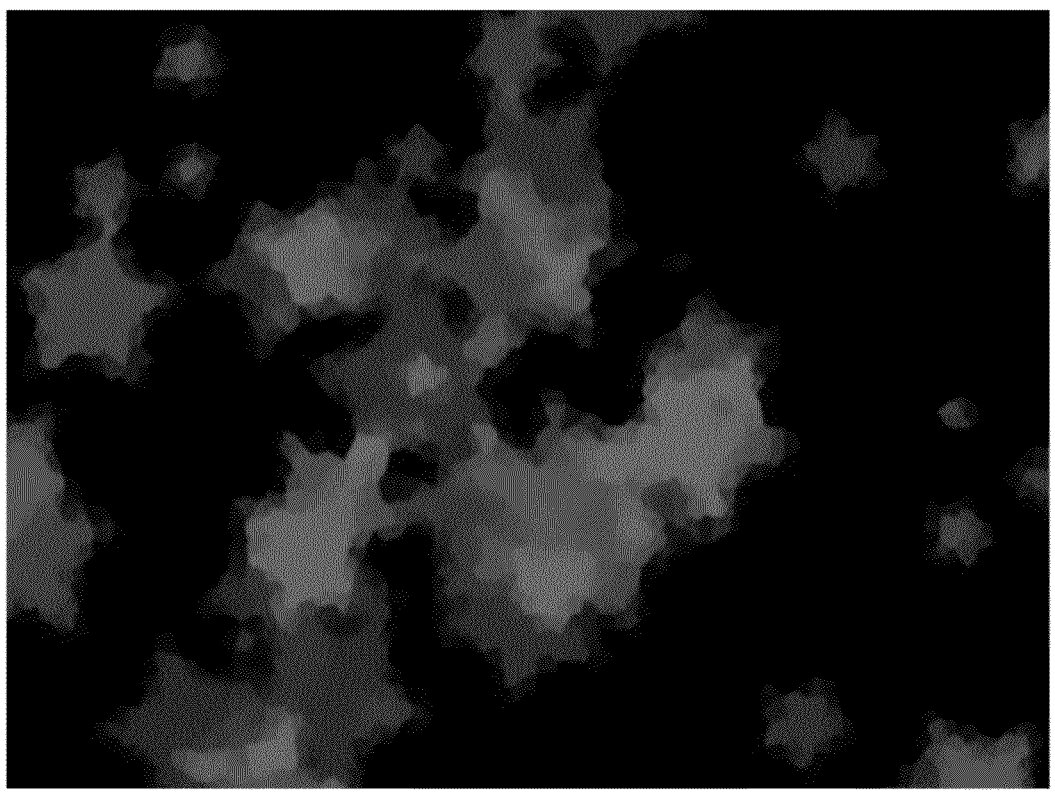

FIG. 159 illustrates the resulting image, according to one embodiment of the invention.

Figure 160:
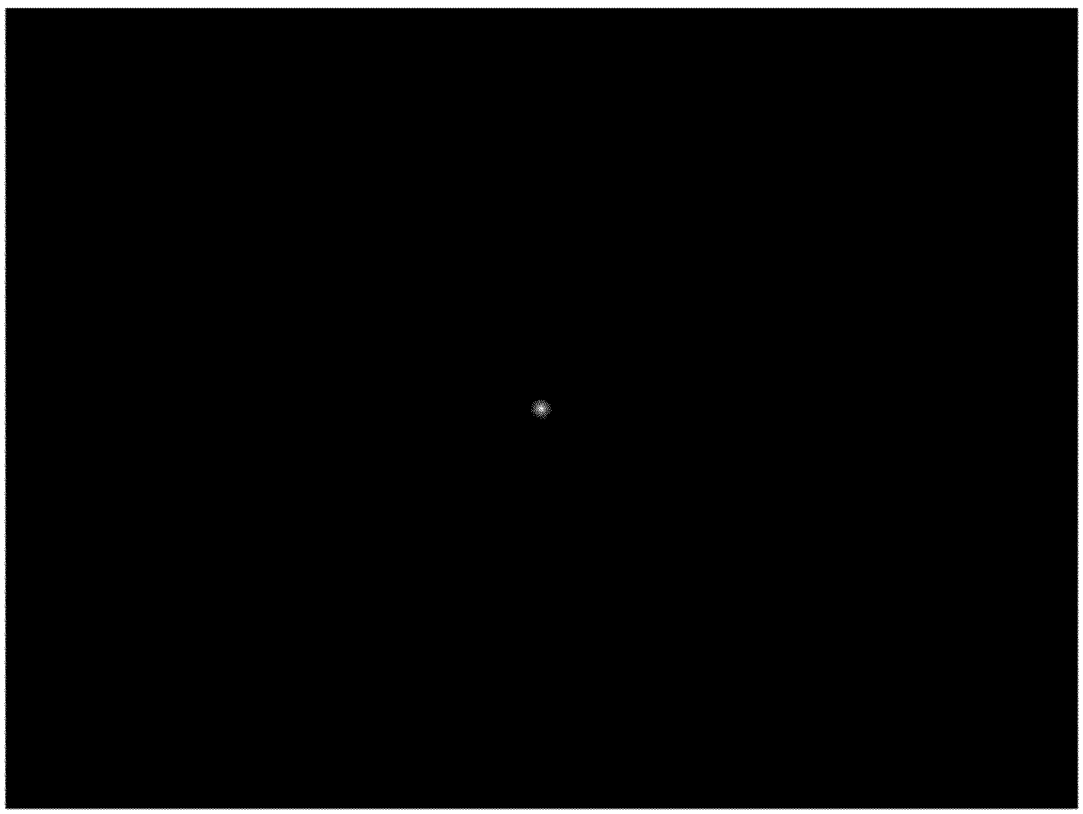

FIG. 160 illustrates the resulting image, according to one embodiment of the invention.

Figure 161:

FIG. 161 illustrates the resulting image, according to one embodiment of the invention.

Figure 162:

FIG. 162 illustrates the resulting image, according to one embodiment of the invention.

Figure 163:
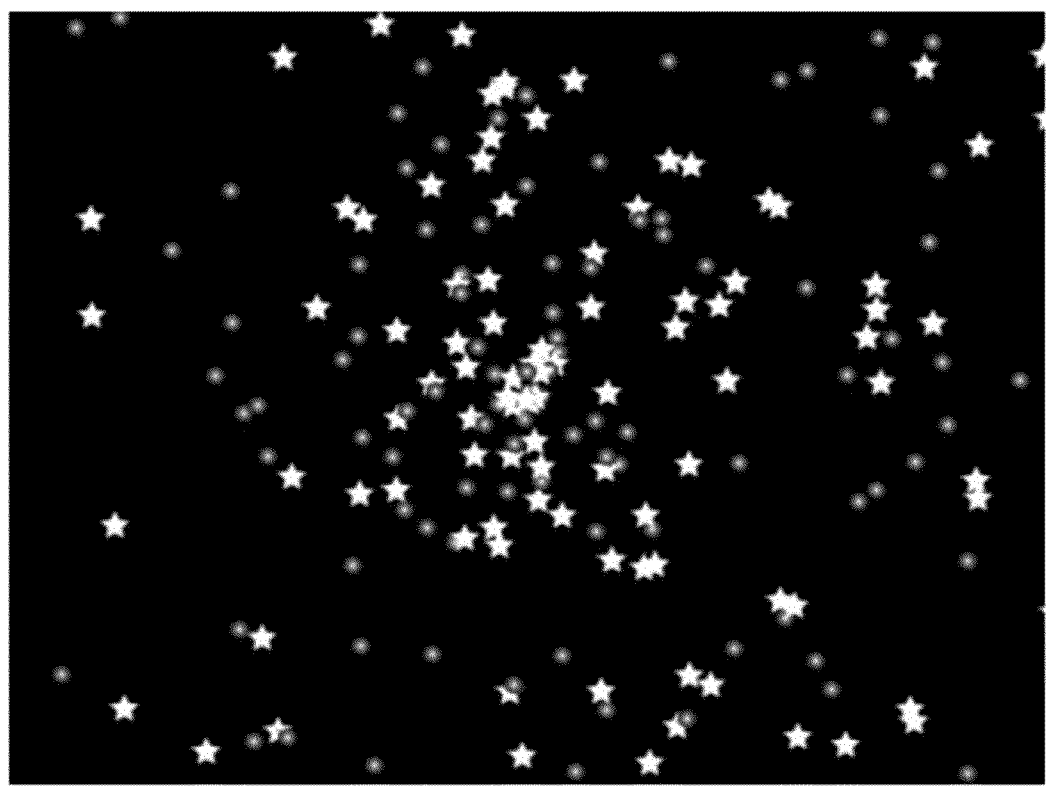

FIG. 163 illustrates the resulting image, according to one embodiment of the invention.

Figure 164:

FIG. 164 illustrates the resulting image, according to one embodiment of the invention.

Figure 165:

FIG. 165 illustrates the resulting image, according to one embodiment of the invention.

Figure 166:

FIG. 166 illustrates the resulting image, according to one embodiment of the invention.

Figure 167:
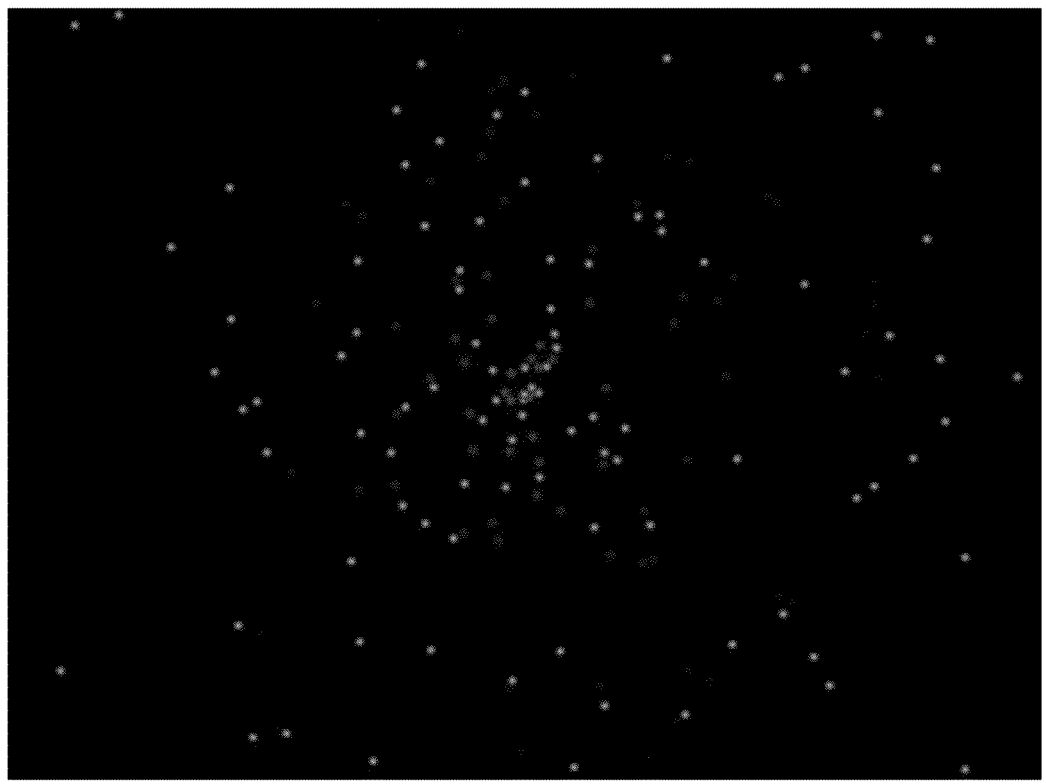

FIG. 167 illustrates the resulting image, according to one embodiment of the invention.

Figure 168:
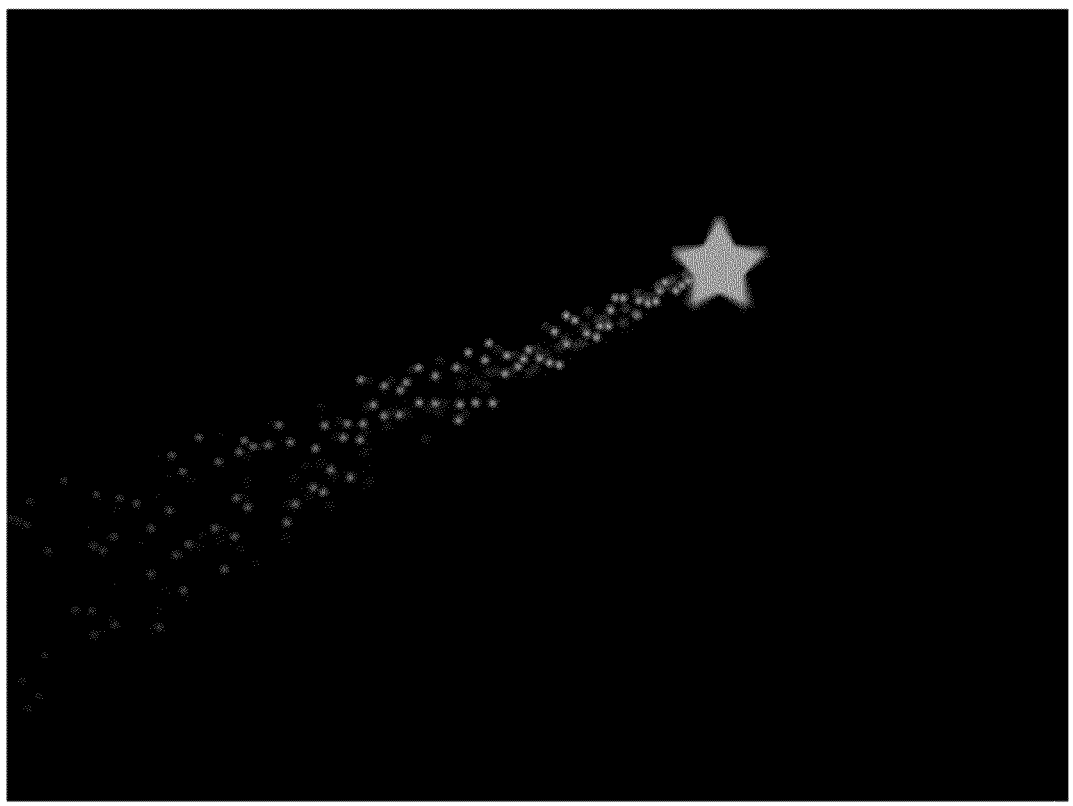

FIG. 168 illustrates the resulting image, according to one embodiment of the invention.

Figure 169:
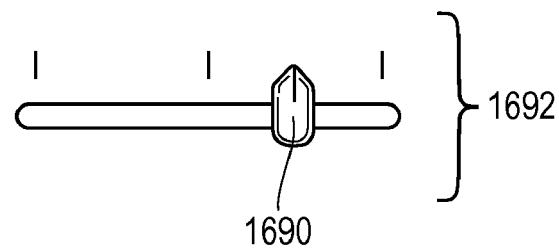

FIG. 169 illustrates one example of a slider, according to one embodiment of the invention.

Figure 170:
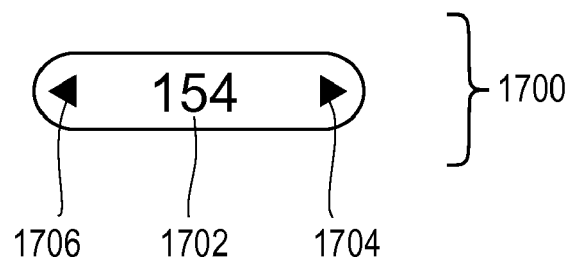

FIG. 170 illustrates one example of a value slider, according to one embodiment of the invention.

Figure 171:
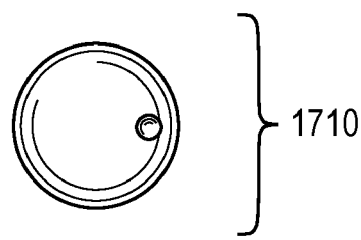

FIG. 171 illustrates one example of a dial, according to one embodiment of the invention.

Figure 172:

FIG. 172 illustrates one example of a value field, according to one embodiment of the invention.

Figures 173, 174, 175, 176:

FIG. 173 illustrates one example of a pop-up menu, according to one embodiment of the invention.

FIG. 174 illustrates one example of a value list, according to one embodiment of the invention.

FIG. 175 illustrates one example of an activation checkbox, according to one embodiment of the invention.

FIG. 176 illustrates one example of a color well, according to one embodiment of the invention.

Figure 177:
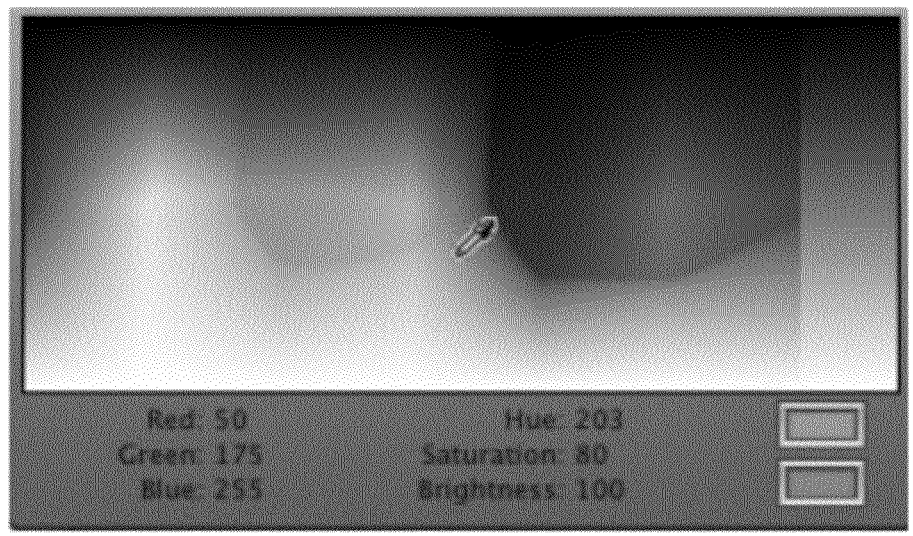

FIG. 177 illustrates one example of a pop-up picker, according to one embodiment of the invention.

Figure 178:
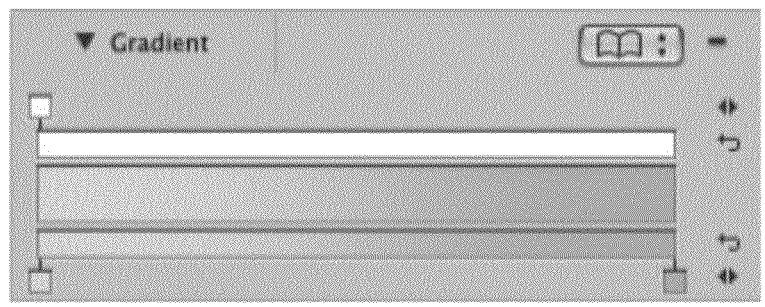

FIG. 178 illustrates one example of a gradient, according to one embodiment of the invention.

Figure 179:
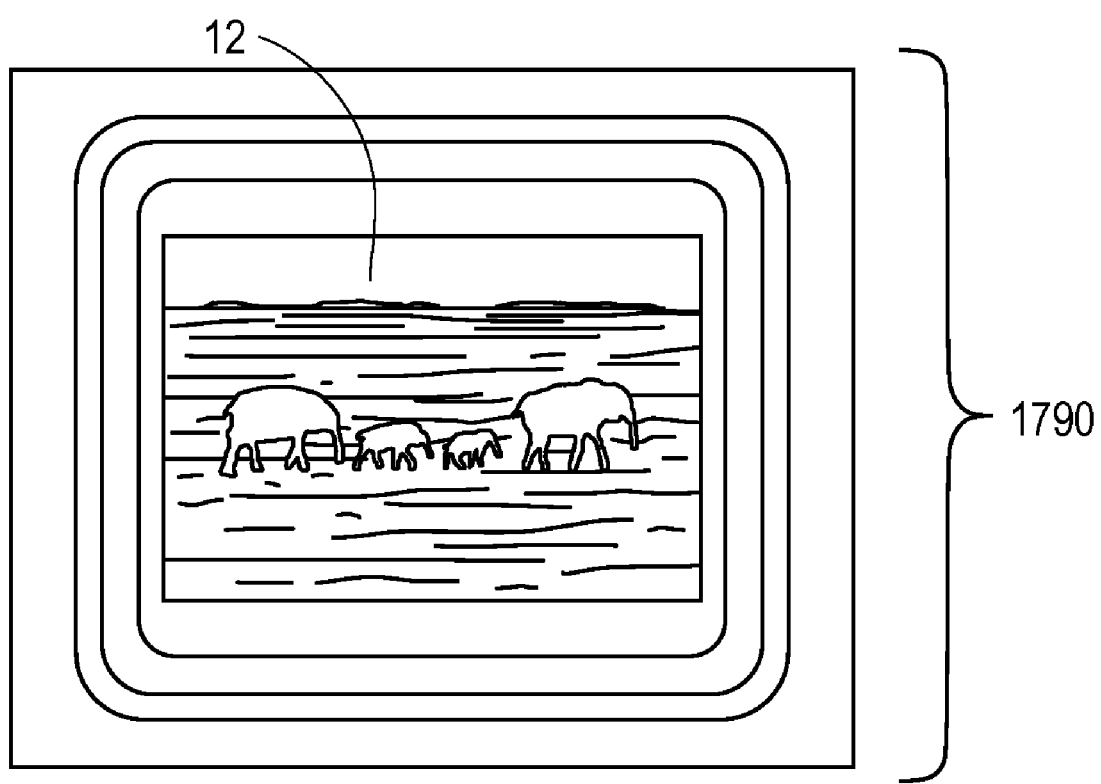

FIG. 179 illustrates one example of a drop well, according to one embodiment of the invention.

Figures 180, 181, 182, 183:
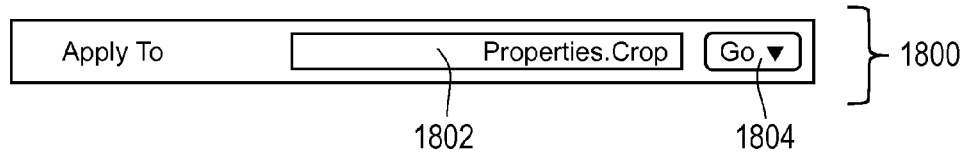

FIG. 180 illustrates one example of a parameter selection field, according to one embodiment of the invention.

FIG. 181 illustrates one example of a reset button, according to one embodiment of the invention.

FIG. 182 illustrates one example of a manage presets button, according to one embodiment of the invention.

FIG. 183 illustrates one example of an animation menu button, according to one embodiment of the invention.

Figure 184:
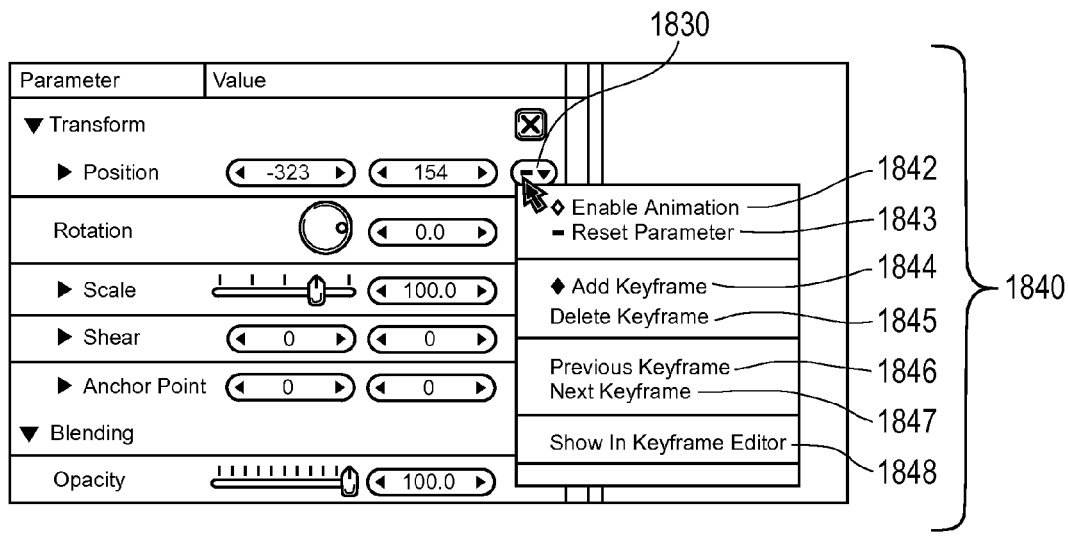

FIG. 184 illustrates one example of a shortcut menu filled with Animation related controls, according to one embodiment of the invention.

Figure 185:
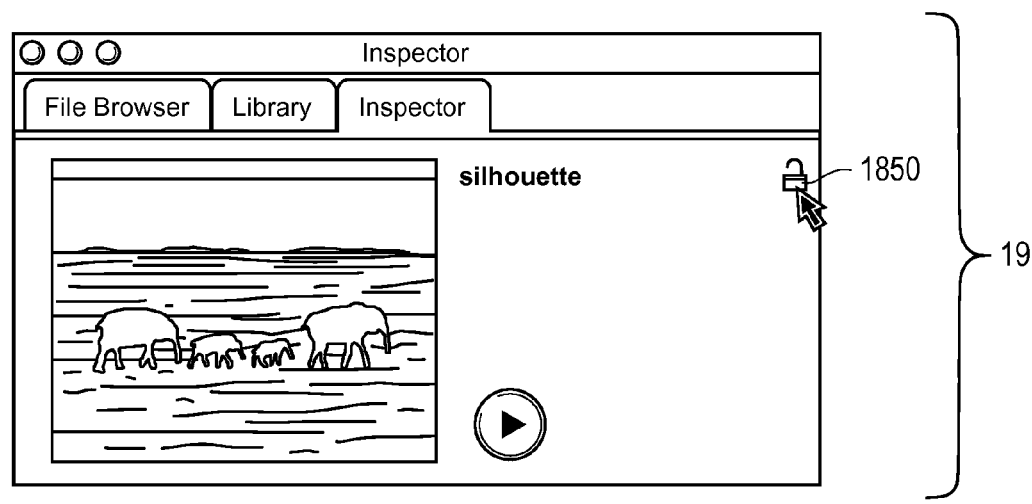

FIG. 185 illustrates one example of a Lock icon, according to one embodiment of the invention.

Figure 186:
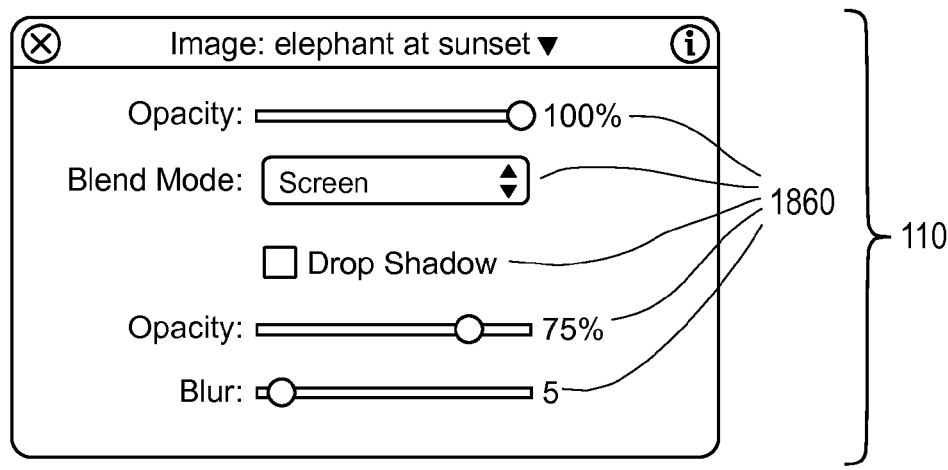

FIG. 186 illustrates one example of a Dashboard, according to one embodiment of the invention.

FIG. 186 illustrates one example of a Dashboard, according to one embodiment of the invention.

Figure 187:
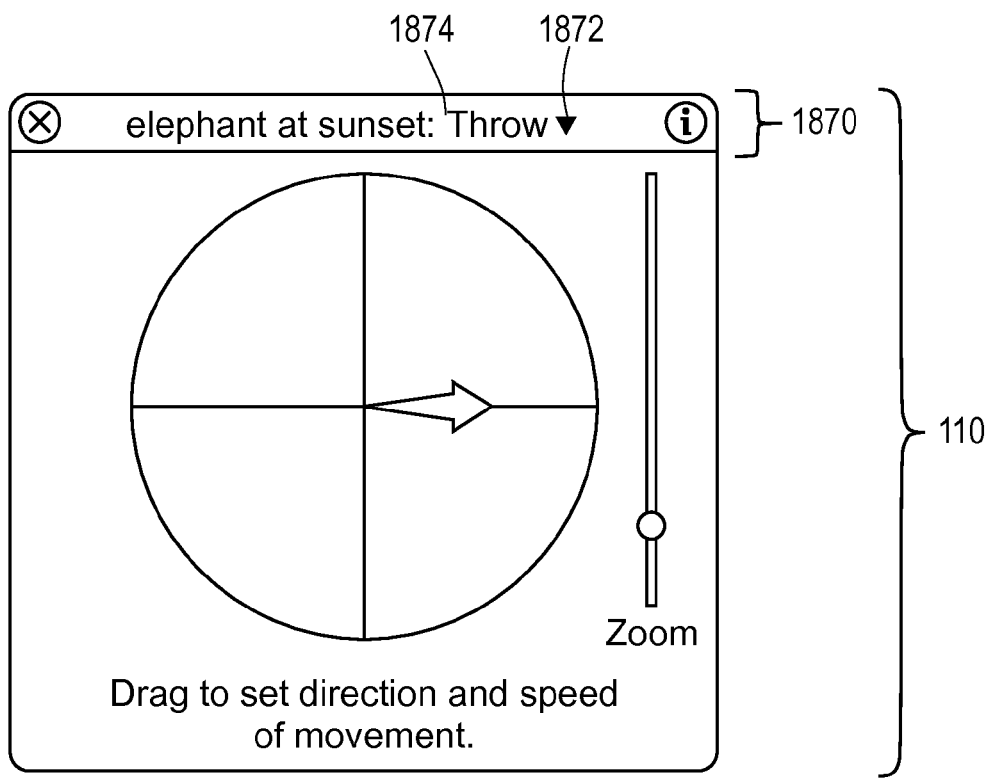

FIG. 187 illustrates one example of a Dashboard title bar displaying a downward facing arrow, according to one embodiment of the invention.

Figure 188:
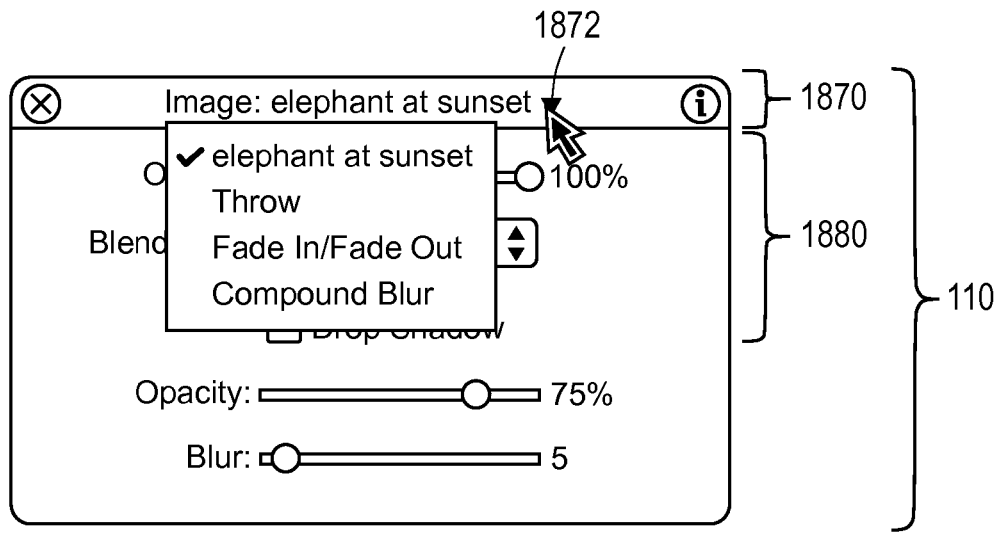

FIG. 188 illustrates one example of a pop-up menu that lists all of the possible control sets that can be displayed in the Dashboard for the selected object, according to one embodiment of the invention.

Figure 189:
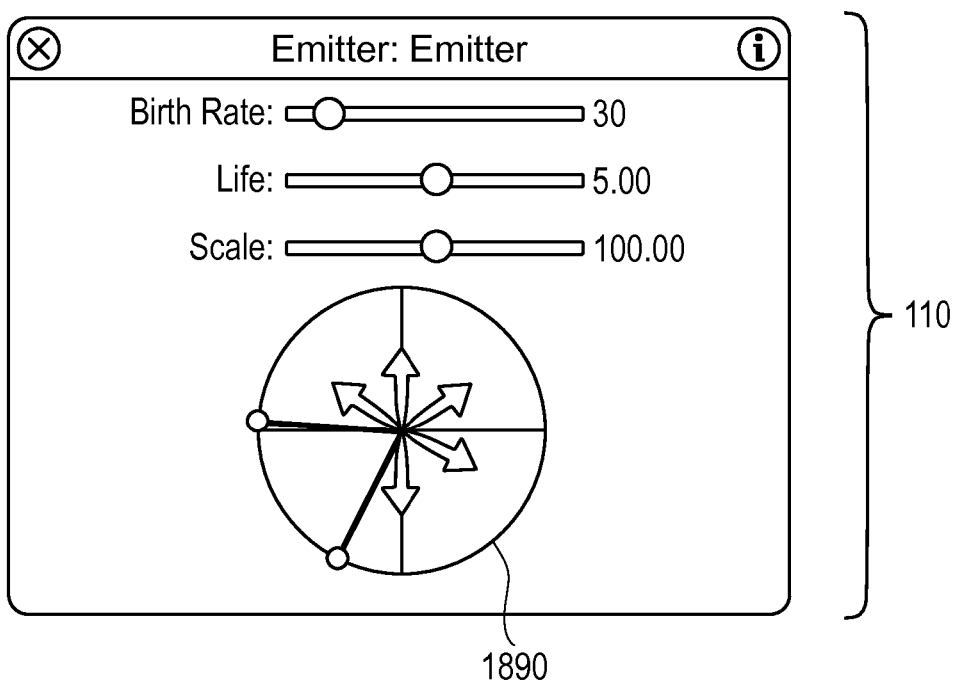

FIG. 189 illustrates one example of a Dashboard for a particle system, according to one embodiment of the invention.

Figure 190:
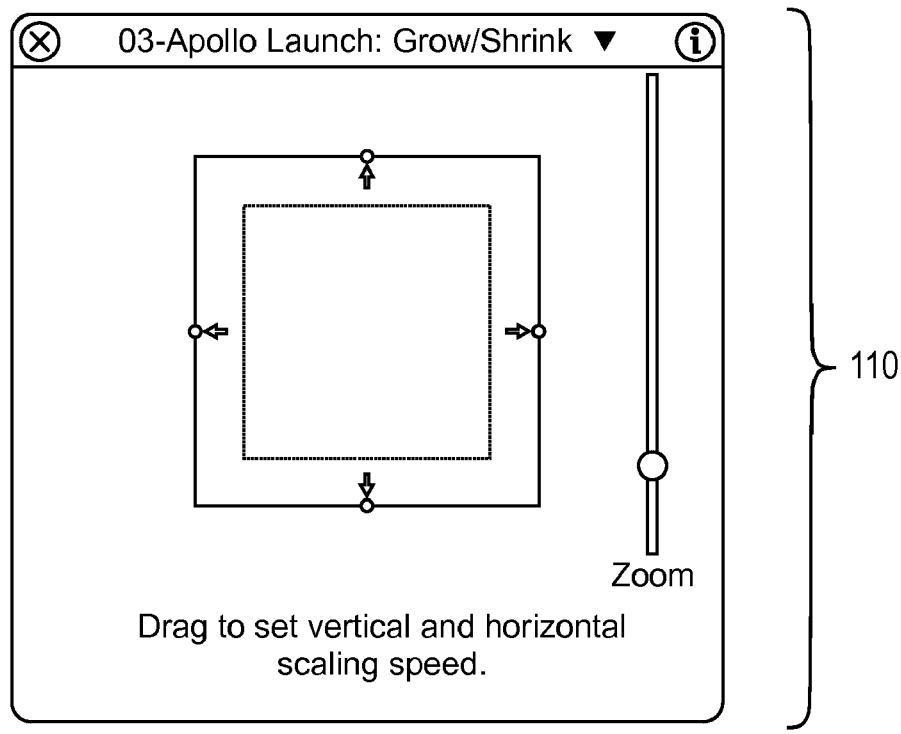

FIG. 190 illustrates one example of a Dashboard for a Grow/Shrink behavior, according to one embodiment of the invention.

Figure 191:
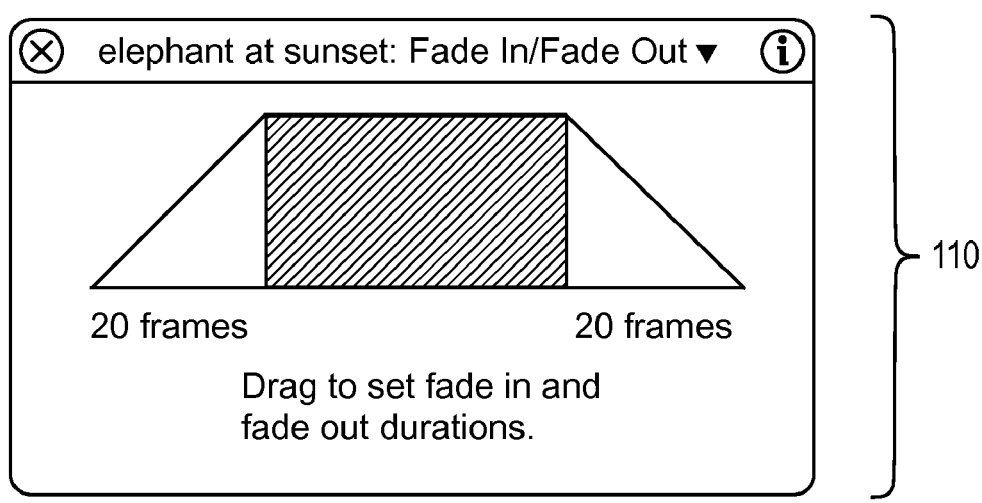

FIG. 191 illustrates one example of a Dashboard for a Fade In/Fade Out behavior, according to one embodiment of the invention.

Figure 192:
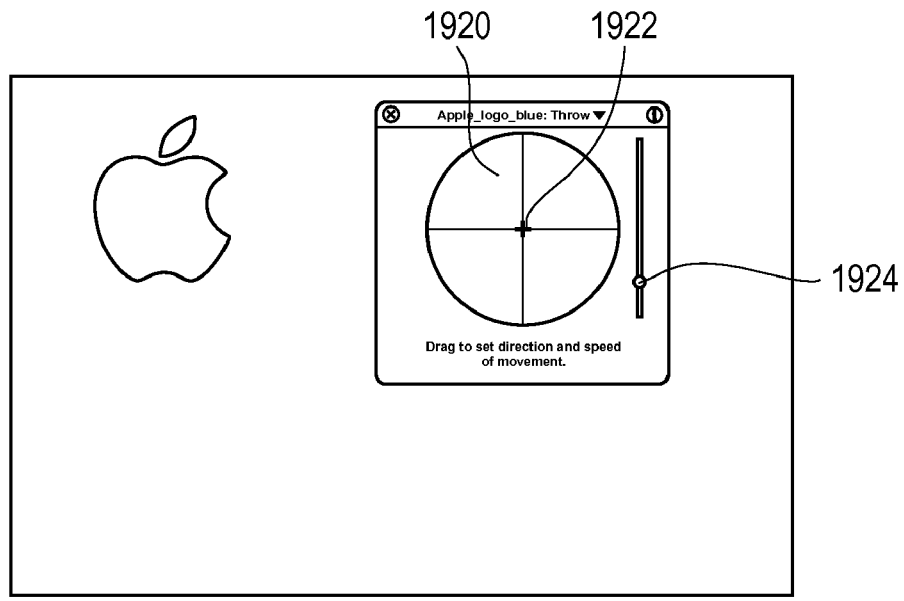

FIG. 192 illustrates one example of a Dashboard for a Throw behavior where the special control specifies no movement, according to one embodiment of the invention.

Figure 193:
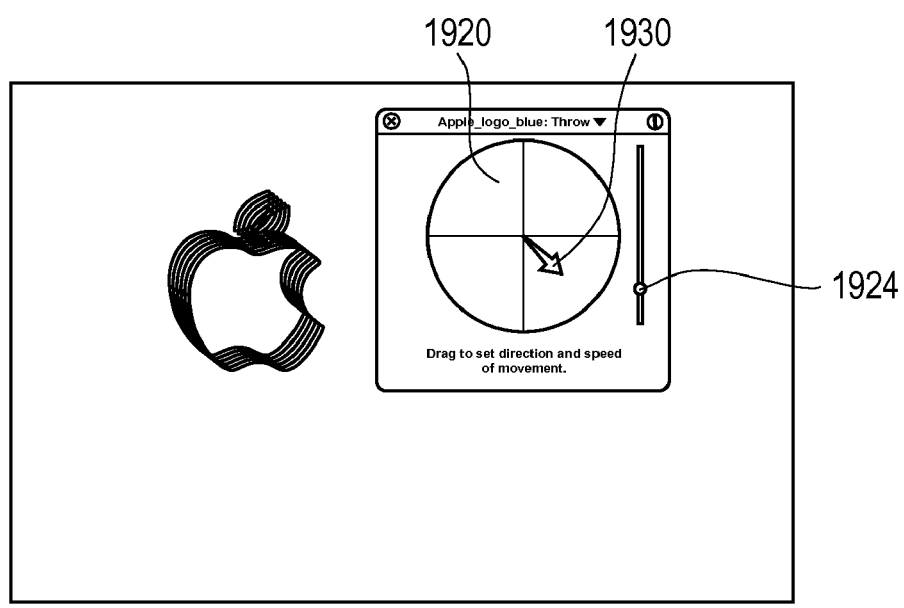

FIG. 193 illustrates one example of a Dashboard for a Throw behavior where the special control specifies movement in a southeastern direction at a low speed, according to one embodiment of the invention.

Figure 194:
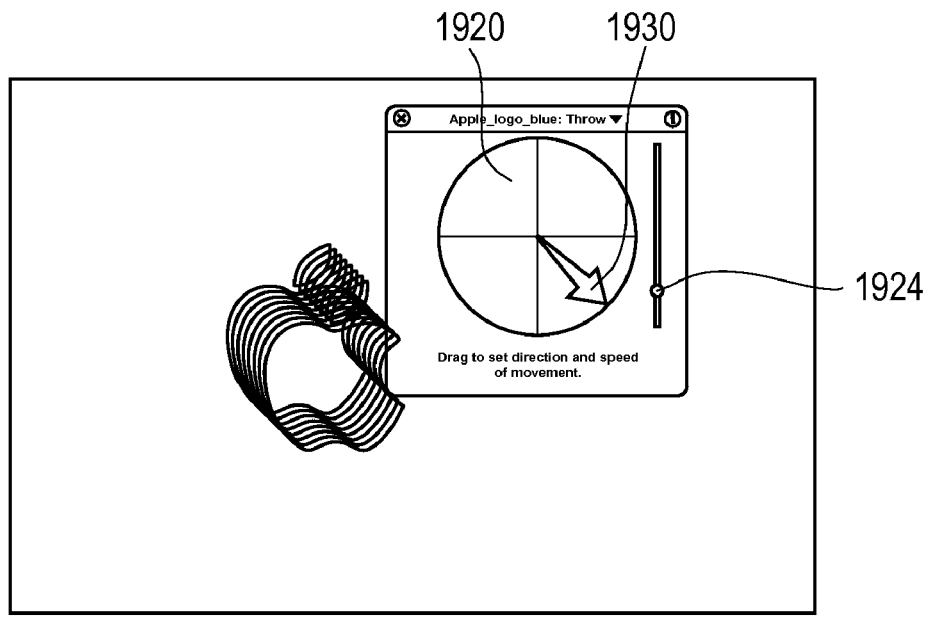

FIG. 194 illustrates one example of a Dashboard for a Throw behavior where the special control specifies movement in the same direction as in FIG. 193, but at a higher speed, according to one embodiment of the invention.

Figure 195:
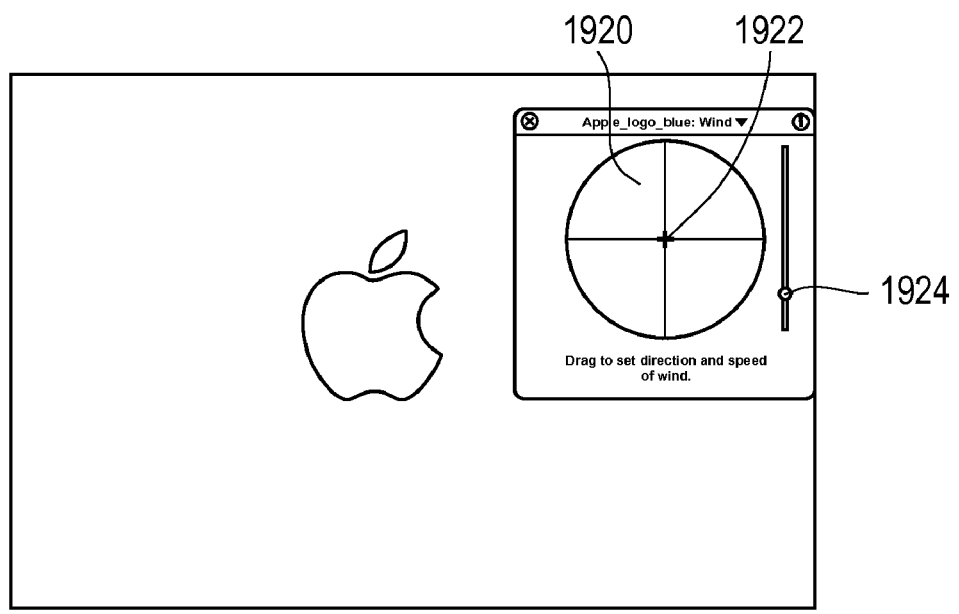

FIG. 195 illustrates one example of a Dashboard for a Wind behavior where the special control specifies no movement, according to one embodiment of the invention.

Figure 196:
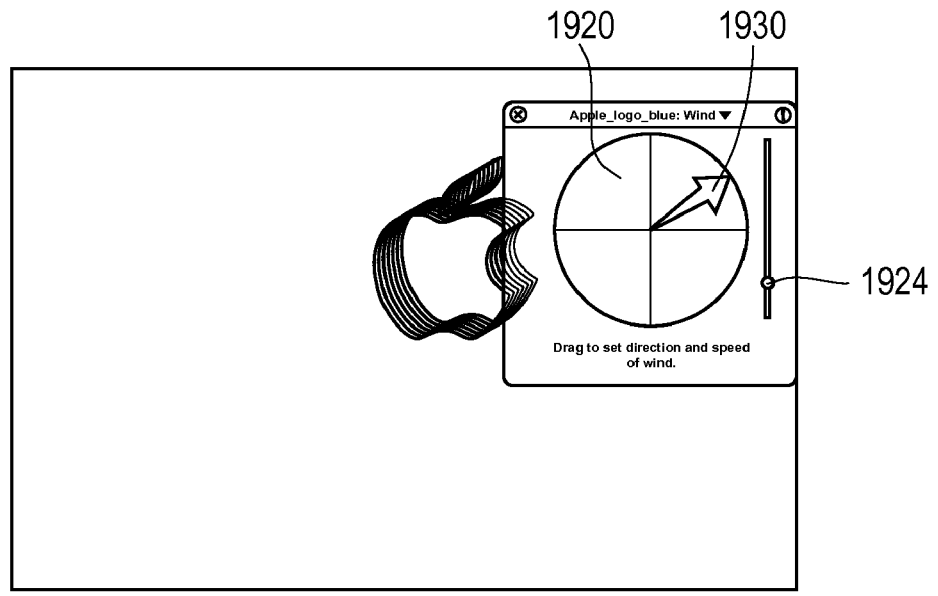

FIG. 196 illustrates one example of a Dashboard for a Wind behavior where the special control specifies movement in a northeastern direction at a high speed, according to one embodiment of the invention.

Figure 197:
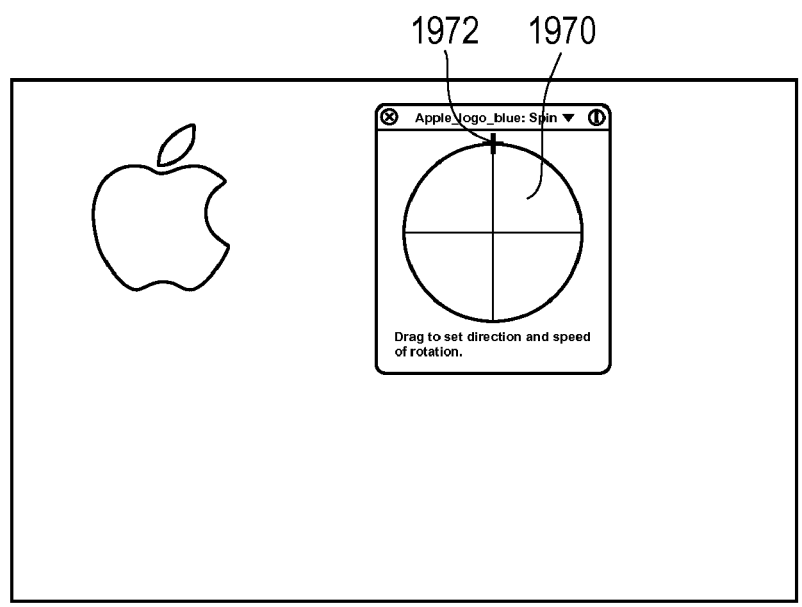

FIG. 197 illustrates one example of a Dashboard for a Spin behavior where the special control specifies no movement, according to one embodiment of the invention.

Figure 198:
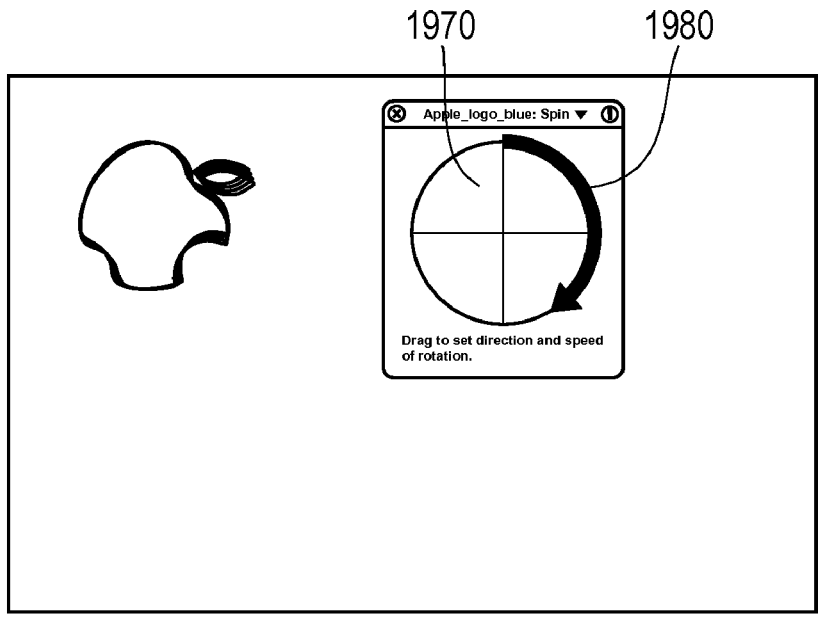

FIG. 198 illustrates one example of a Dashboard for a Spin behavior where the special control specifies movement in a clockwise direction at a low speed, according to one embodiment of the invention.

Figure 199:
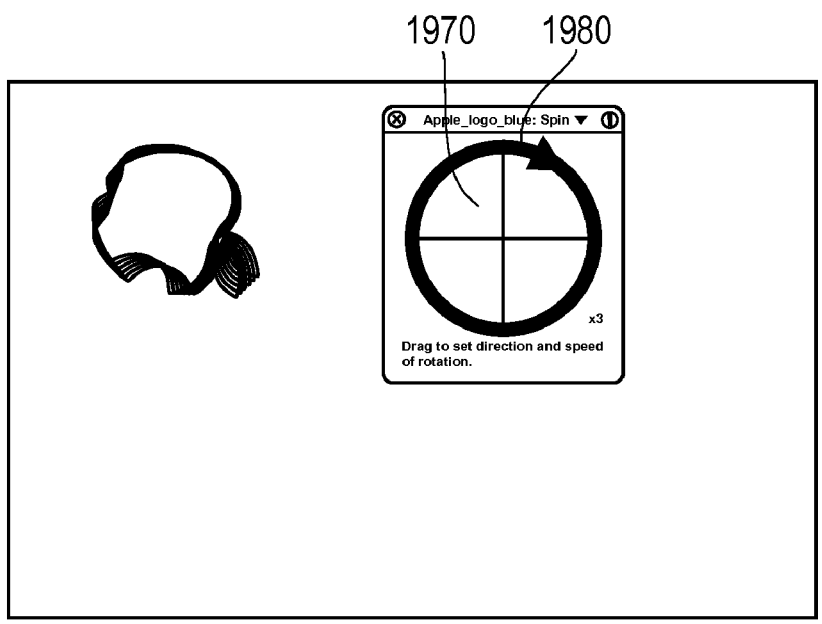

FIG. 199 illustrates one example of a Dashboard for a Spin behavior where the special control specifies movement in the same direction as in FIG. 198, but at a higher speed, according to one embodiment of the invention.

Figure 200:
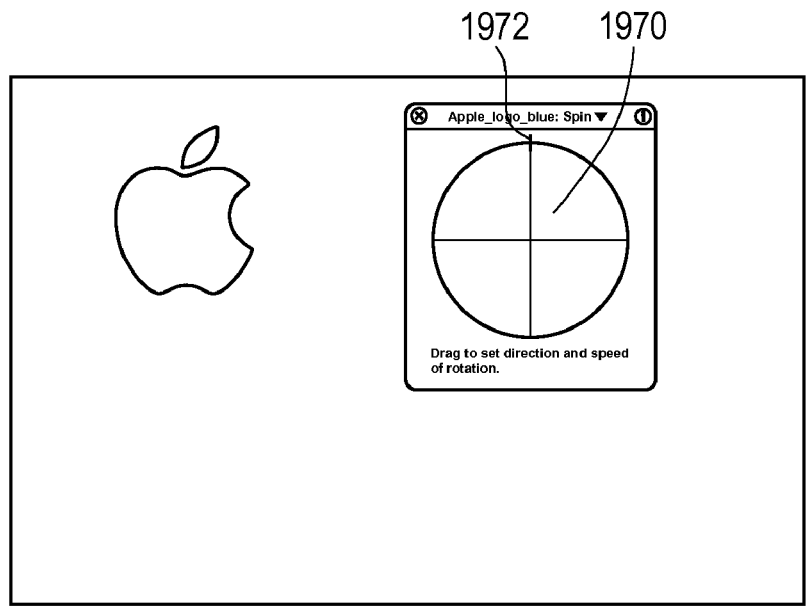

FIG. 200 illustrates one example of a Dashboard for a Spin behavior where the special control specifies no movement, according to one embodiment of the invention.

Figure 201:
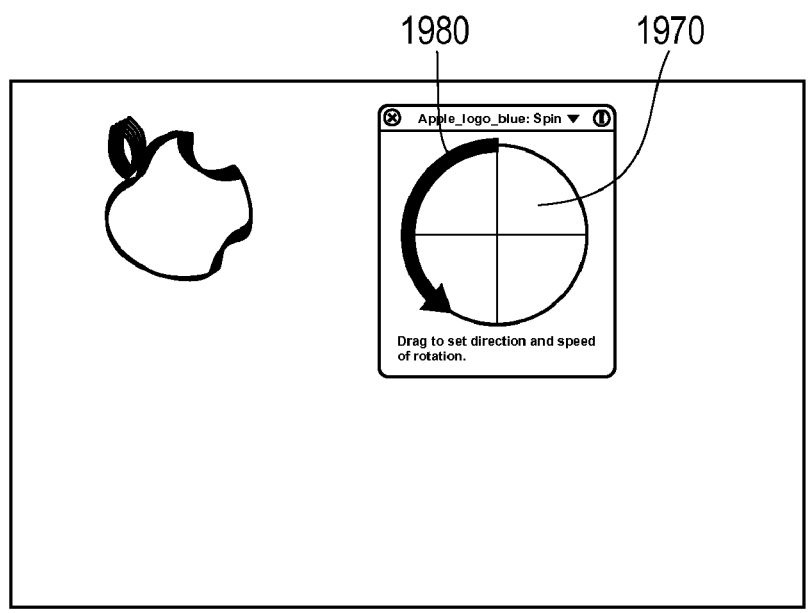

FIG. 201 illustrates one example of a Dashboard for a Spin behavior where the special control specifies movement in a counterclockwise direction at a low speed, according to one embodiment of the invention.

Figure 202:
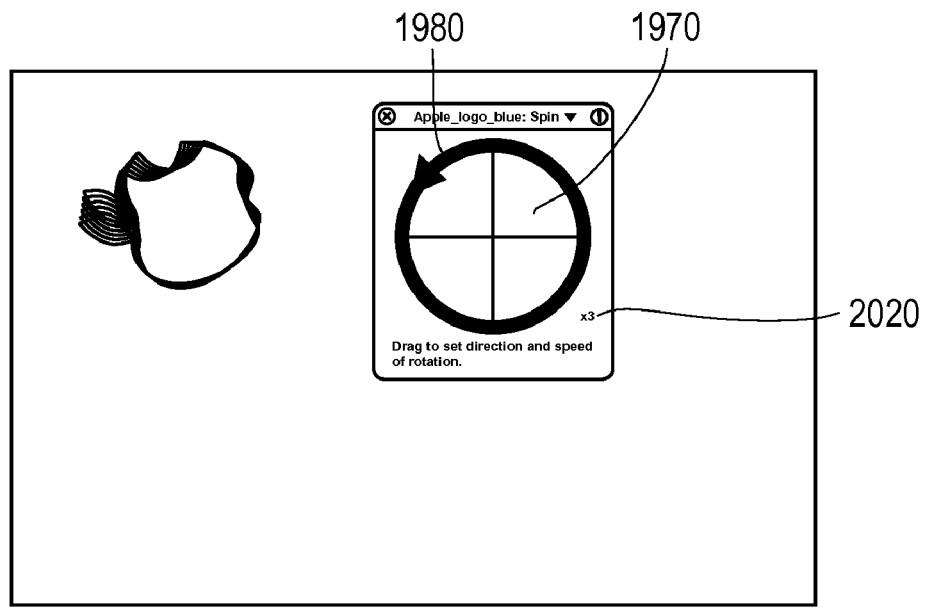

FIG. 202 illustrates one example of a Dashboard for a Spin behavior where the special control specifies movement in the same direction as in FIG. 201, but at a much higher speed, according to one embodiment of the invention.

Figure 203:
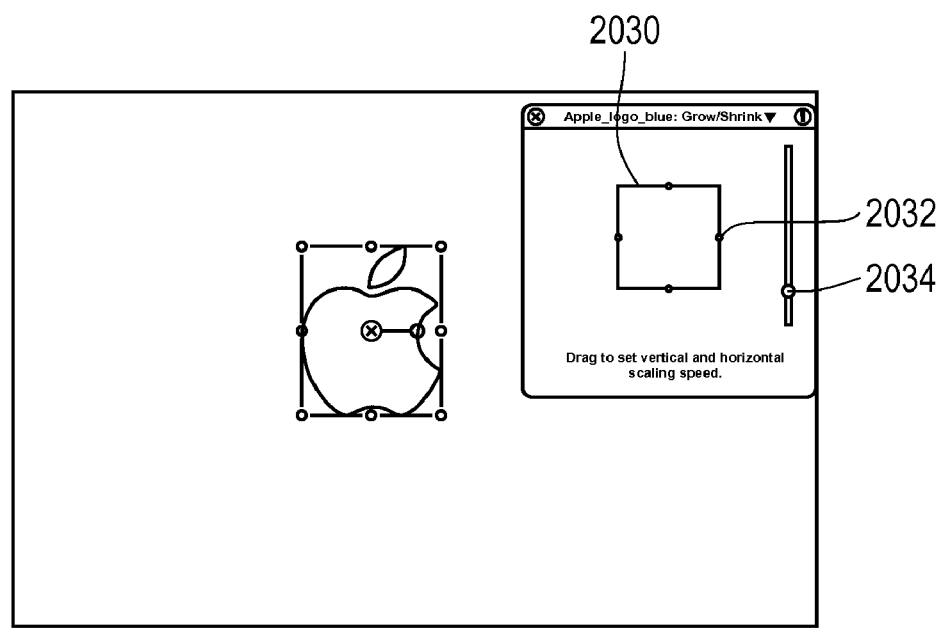

FIG. 203 illustrates one example of a Dashboard for a Grow/Shrink behavior where the special control specifies no movement, according to one embodiment of the invention.

Figure 204:
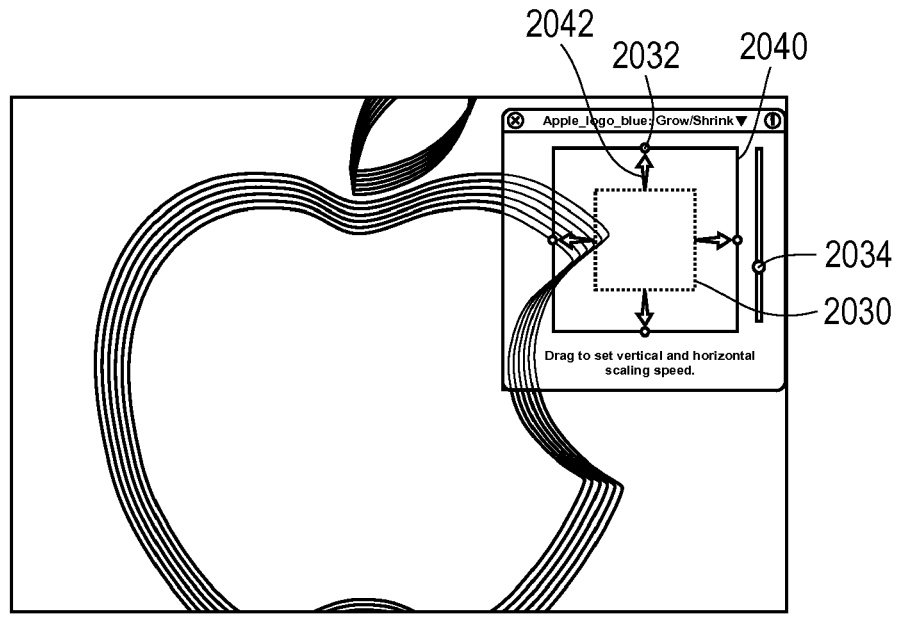

FIG. 204 illustrates one example of a Dashboard for a Grow/Shrink behavior where the special control specifies a high grow rate, according to one embodiment of the invention.

Figure 205:
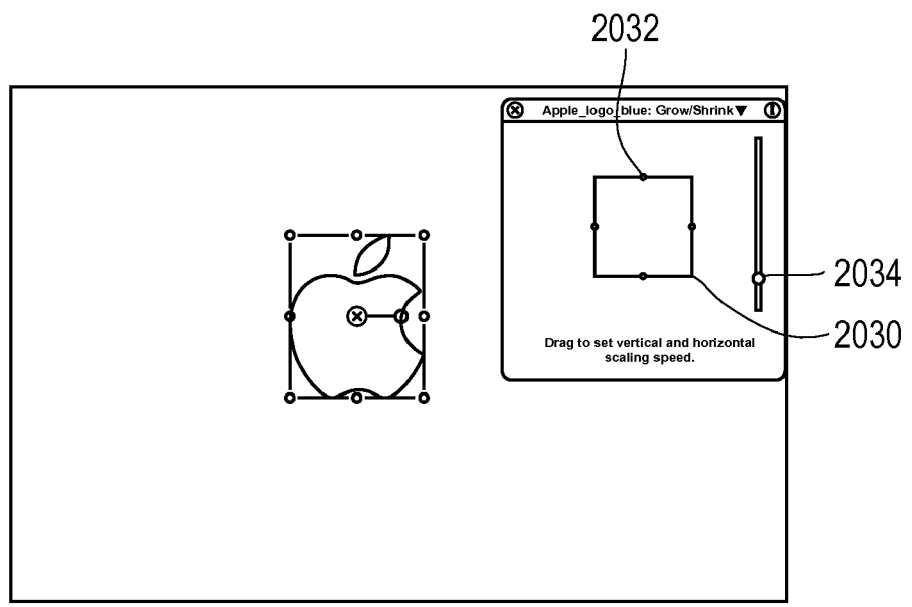

FIG. 205 illustrates one example of a Dashboard for a Grow/Shrink behavior where the special control specifies no movement, according to one embodiment of the invention.

Figure 206:
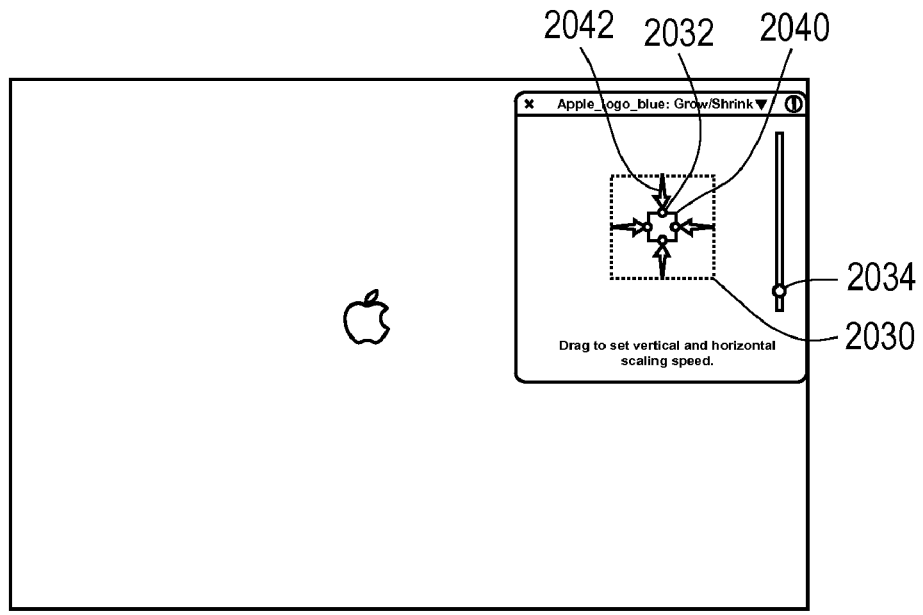

FIG. 206 illustrates one example of a Dashboard for a Grow/Shrink behavior where the special control specifies a high shrink rate, according to one embodiment of the invention.

Figure 207:
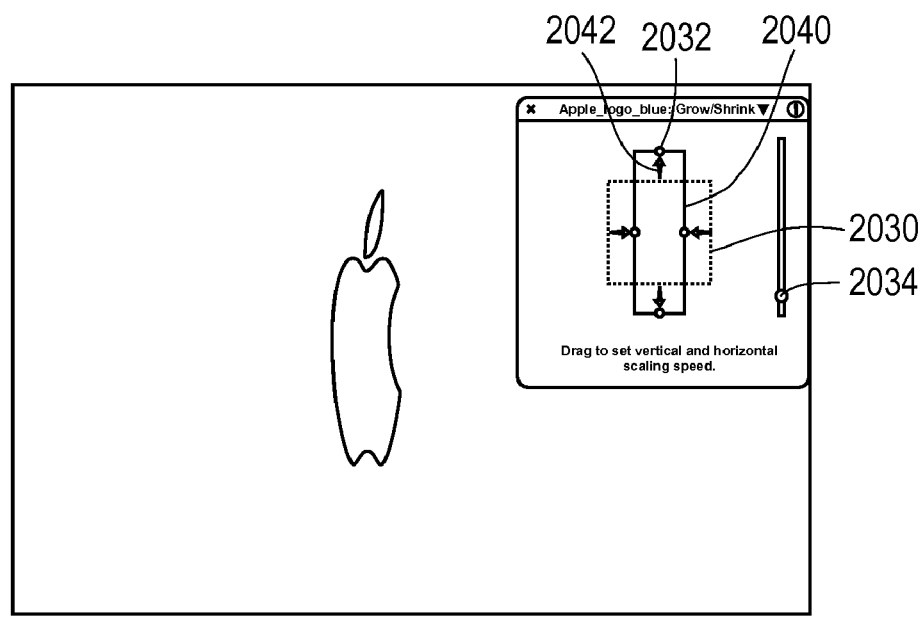

FIG. 207 illustrates one example of a Dashboard for a Grow/Shrink behavior where the special control specifies shrinking in the horizontal direction and simultaneous growing in the vertical direction, according to one embodiment of the invention.

Figure 208:
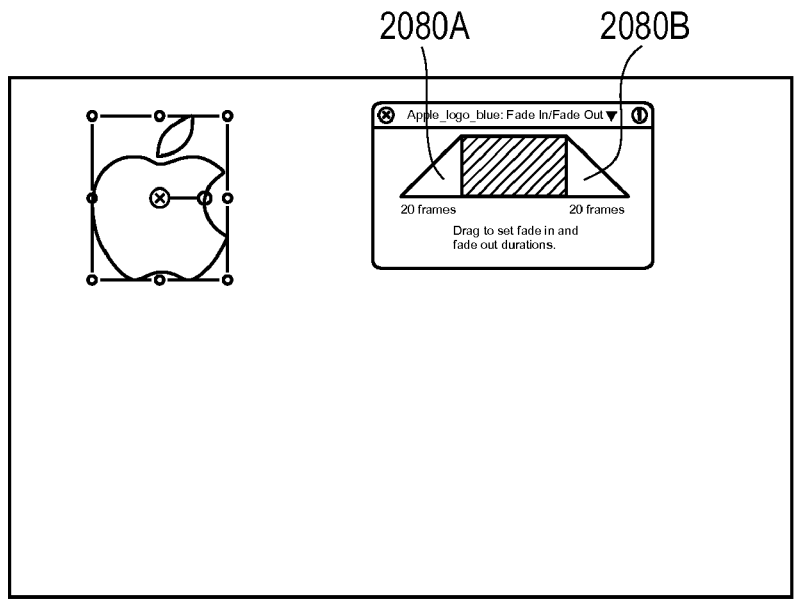

FIG. 208 illustrates one example of a Dashboard for a Fade In/Fade Out behavior where the special control specifies a fade in time and a fade out time of equivalent length, according to one embodiment of the invention.

Figure 209:
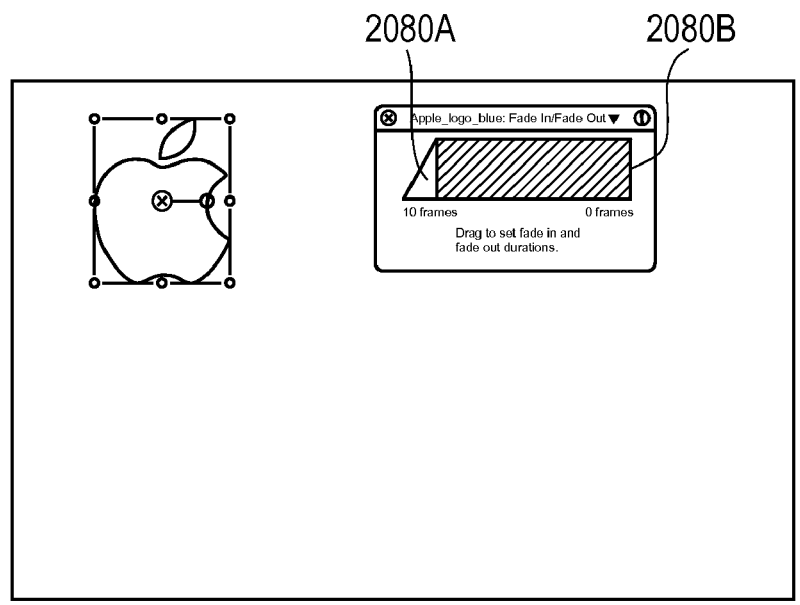

FIG. 209 illustrates one example of a Dashboard for a Fade In/Fade Out behavior where the special control specifies a shorter fade in time than in FIG. 208 and no fade out time (i.e., no fade out at all), according to one embodiment of the invention.

Figure 210:
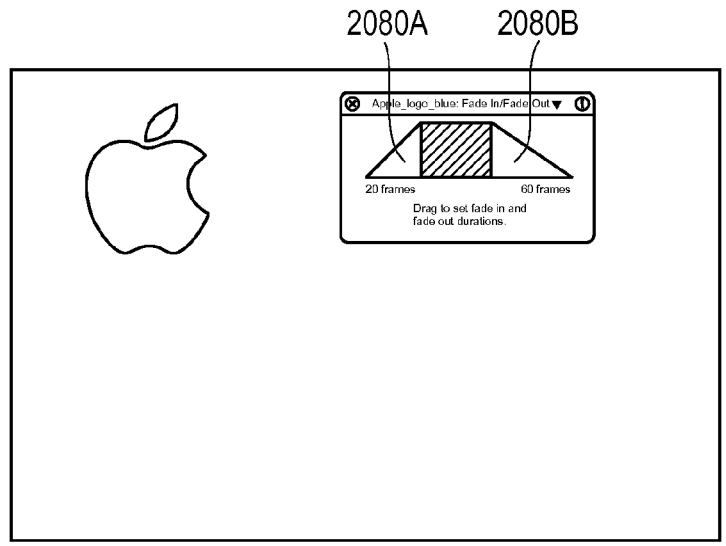

FIG. 210 illustrates one example of a Dashboard for a Fade In/Fade Out behavior where the special control specifies a similar fade in time to that in FIG. 208 and a longer fade out time than in FIG. 208, according to one embodiment of the invention.

Figure 211:
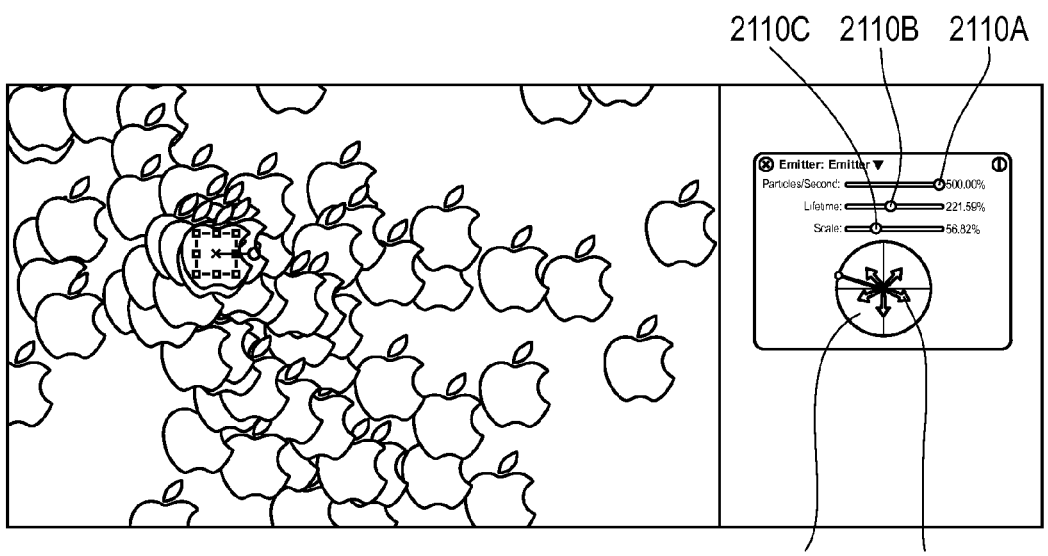

FIG. 211 illustrates one example of a Dashboard for a particle emitter where the special control specifies that particles should be emitted in all directions (i.e., there is no specified range) at a medium/high speed, according to one embodiment of the invention.

Figure 212:
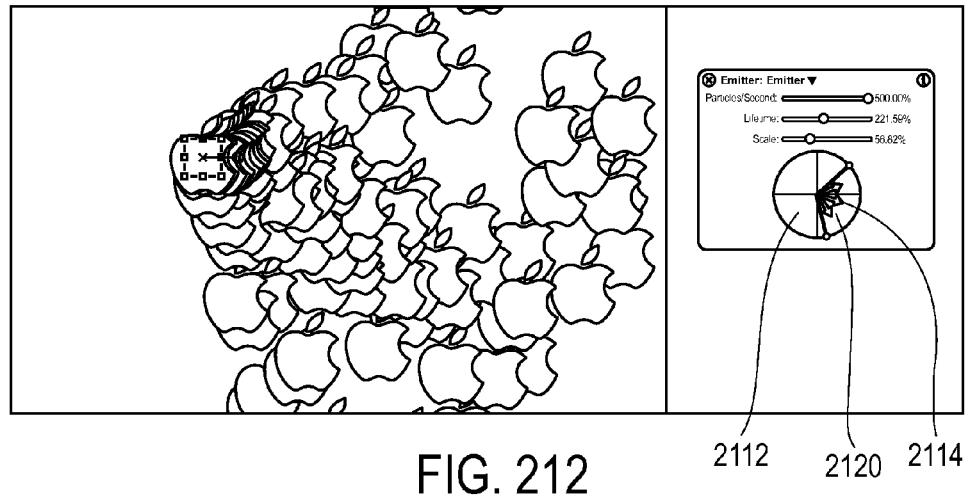

FIG. 212 illustrates one example of a Dashboard for a particle emitter where the special control specifies that particles should be emitted in only certain directions (i.e., there is a specified range) and at a medium speed, according to one embodiment of the invention.

Figure 213:
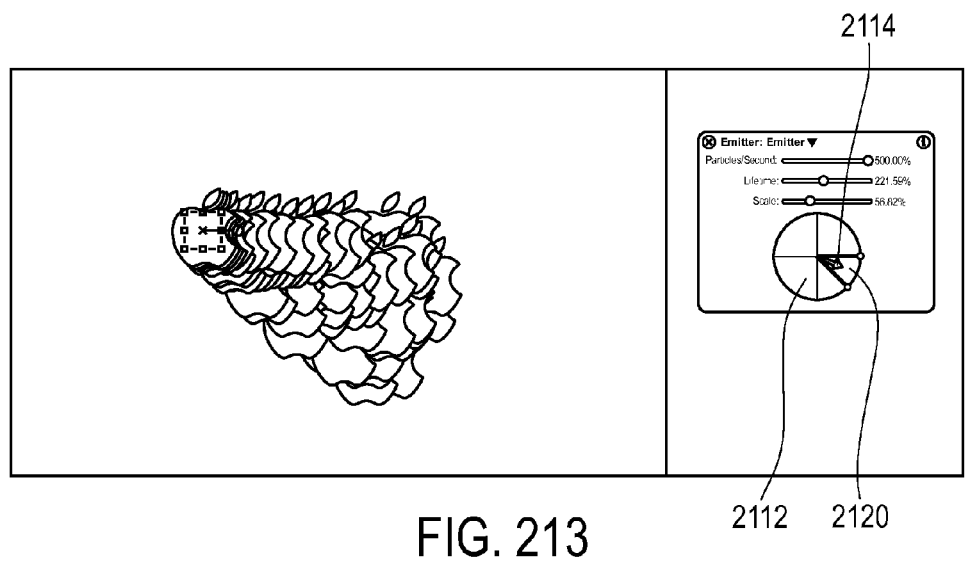

FIG. 213 illustrates one example of a Dashboard for a particle emitter where the special control specifies that particles should be emitted in only certain directions (i.e., there is a specified range, and the range is narrower than the range in FIG. 211) and at a low speed, according to one embodiment of the invention.

Figure 214:
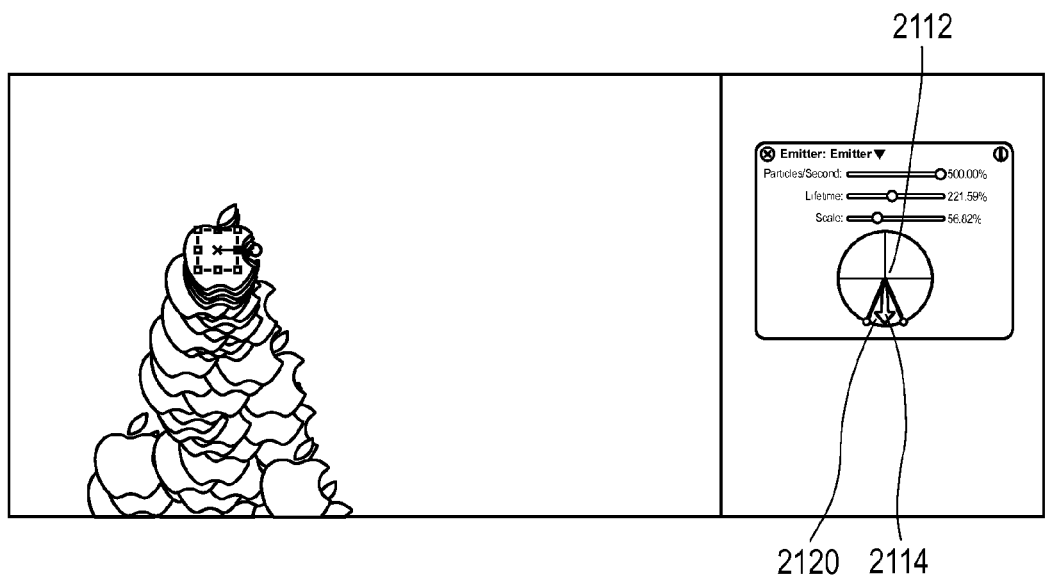

FIG. 214 illustrates one example of a Dashboard for a particle emitter where the special control specifies that particles should be emitted in only certain directions (i.e., there is a specified range, and the range is narrower than the range in FIG. 212) and at a high speed, according to one embodiment of the invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

In one embodiment, the visual representation of an object may be specified by two pieces of information, a source image and a collection of parameters that modify the source image. In one embodiment, by modifying the values of these parameters over time, an object can be animated. In another embodiment, for example, by modifying the size of an image and the opacity of an image over time, an object can appear to grow or shrink or fade in or fade out, respectively. In one embodiment, the visual representation of an object can also be assigned a position parameter. In another embodiment, by modifying the value of this position parameter over time, an object can appear to move.

In one embodiment, a behavior is an animation abstraction that, when applied to an object, causes the object to be animated in a particular way. In another embodiment, specifically, a behavior changes the value of a parameter of an object over time, thereby animating the object with respect to that parameter. In yet another embodiment, for example, a "shrink" behavior may cause an object to decrease in size by decreasing the values of the object's length and height parameters. In one embodiment, as another example, a "throw" behavior may cause an object to move in a specific direction with a specific speed by modifying the object's location on the screen over time.

In one embodiment, a behavior changes the value of only one parameter of an object over time. In another embodiment, for example, a "stretch" behavior may stretch an object by increasing the value of the object's length parameter while not modifying the value of the object's height parameter. In yet another embodiment, a behavior changes the value of more than one parameter of an object over time. In one embodiment, for example, the "shrink" behavior mentioned above decreases the values of the object's length and height parameters.

Recall that, in one embodiment, a behavior changes the value of a parameter of an object over time. In one embodiment, while a behavior specifies how it affects a parameter, a behavior may or may not specify which parameter it affects. In another embodiment, when a behavior specifies a particular parameter, the behavior is applied to an object and affects that particular parameter of the object. In yet another embodiment, when a behavior does not specify a particular parameter, the behavior is applied to a parameter of an object (any parameter) and affects that parameter in a particular way. In one embodiment, thus far, only two ways have been discussed in which a behavior may affect the value of a parameter of an object—increasing and decreasing. In another embodiment, however, many more such ways exist. In yet another embodiment, these ways include oscillating, randomizing, and reversing. In one embodiment, for example, an "oscillate rotation" behavior might be called "rock." In another embodiment, thus, a behavior that specifies a particular parameter is applied to an object, while a behavior that does not specify a particular parameter is applied to a parameter of an object.

In one embodiment, one way to refer to a behavior that specifies a parameter is to indicate which parameters the behavior affects and in what way. In one embodiment, for example, a behavior that decreases the brightness of an object may be known as the "decrease brightness" behavior. In another embodiment, sometimes, though, it is more useful to name a behavior based on the animation that it causes. In yet another embodiment, for example, the "decrease brightness" behavior may be called the "darken" behavior. In one embodiment, similarly, an "increase length, increase height" behavior may be called the "grow" behavior. In another embodiment, descriptive titles, such as "darken" and "grow," help the user understand how a behavior will animate an object.

In one embodiment, in order to apply a behavior to an object, where the behavior specifies the parameter to be animated, a user selects a behavior and selects an object to which the behavior should be applied. In one embodiment, note that these two steps may occur in any order. In another embodiment, a user selects a behavior or an object by choosing it from a menu. In yet another embodiment, a user selects a behavior or an object by clicking on a visual representation of the behavior or object, such as an icon (for a behavior or an object) or the object itself (for an object). In one embodiment, a user applies a behavior to an object by clicking on the behavior and dragging it onto the target object.

In one embodiment, in order to apply a behavior to a parameter of an object, where the behavior does not specify the parameter to be animated, a user selects a behavior and selects a parameter of an object to which the behavior should be applied. In one embodiment, note that these two steps may occur in any order. In another embodiment, a user selects a behavior by choosing it from a menu or by clicking on a visual representation of the behavior, as described above. In yet another embodiment, a user selects a parameter of an object by first selecting an object and then selecting a parameter of the object. In one embodiment, a user may select an object by choosing it from a menu or by clicking on a visual representation of the object, as described above. In another embodiment, once an object has been selected, a user may display a list of the object's parameters and select a parameter by clicking on it. In yet another embodiment, a user applies a behavior to a parameter of an object by clicking on the behavior and dragging it onto the target parameter. In one embodiment, an object parameter to which a behavior has been applied is identified in the list of parameters of the object. In another embodiment, an icon appears near the object parameter to which a behavior has been applied.

In one embodiment, a behavior may be simultaneously applied to multiple objects or to multiple parameters of an object. In one embodiment, instead of selecting one object or one parameter of an object to which the behavior should be applied, the user selects multiple objects to multiple parameters of an object to which the behavior should be applied.

In one embodiment, once a behavior has been applied to an object or to an object parameter, it may be removed by deleting it. In one embodiment, a behavior's target object or target object parameter may be changed without having to delete the behavior and create a new behavior.

In one embodiment, the animation caused by a behavior may be customized by specifying a value for one or more parameters associated with the behavior. In one embodiment, for example, the "stretch" behavior may have a parameter that indicates how fast the object will stretch (i.e., at what rate the object's length parameter will increase). In another embodiment, as another example, the "throw" behavior may have a parameter that indicates in which direction the object should move (i.e., how the object's location on the screen should be changed). In yet another embodiment, initially, when a behavior is applied, these parameters have default values. In one embodiment, methods of specifying other values for these parameters will be further discussed below.

In one embodiment, behaviors exist independently of the objects to which they are applied. In one embodiment, this means that behaviors are reusable—the same behavior can be applied to two different objects to animate the objects in a similar way. In another embodiment, the user may select a behavior from a group of pre-defined behaviors (a "behavior library"). In yet another embodiment, these behaviors may be, for example, the most useful behaviors or the most difficult behaviors to implement. In one embodiment, a behavior in the library is saved and may be re-used in the future.

In one embodiment, the user creates behaviors to add to this library. In one embodiment, these behaviors may be created by assigning values to a behavior's parameters or by specifying a particular parameter of an object to be affected (e.g., where the behavior previously did not specify an object parameter). In another embodiment, a user creates a behavior from scratch or combines multiple behaviors into one behavior.

In one embodiment, as mentioned above, two behaviors can be combined to form one new behavior. In one embodiment, alternatively, two behaviors may be applied to the same object but still retain their independent nature. In another embodiment, in fact, any number of behaviors may be applied to one object at the same time. In yet another embodiment, in this situation, each behavior would affect the object at the same time. In one embodiment, sometimes, when multiple behaviors are applied to the same object, the object may be animated in a different way depending on the order in which the behaviors were applied.

Behaviors Contrasted with Keyframes

In one embodiment, a keyframe is a visual representation of an object at a particular point in time. In one embodiment, by defining several keyframes, a user can specify how the visual representation of an object changes over time. In another embodiment, since the representation of an object may change drastically between keyframes, simply showing a number of keyframes in succession would result in jerky transitions. In yet another embodiment, in order to obtain a smooth animation, new visual representations must be calculated that fall between keyframes in time and that are similar to surrounding keyframes. In one embodiment, this is known as "inbetweening."

In one embodiment, applying a behavior to an object does not add keyframes to an object or to its parameters. In one embodiment, instead, a behavior generates a range of values for a parameter of an object and then sets the parameter to these values over time, thereby animating the object. In another embodiment, the range of values applied to an object's parameters is controlled by the behavior's parameters.

In one embodiment, keyframes apply specific values to an object's parameters. In one embodiment, when multiple keyframes are created that specify different values for the same parameter of an object, that parameter is animated from the value in the first keyframe to the value in the last keyframe. In another embodiment, if the value specified by one keyframe is changed, the other keyframes (and thus, the values that they specify) are not modified.

Behaviors and keyframes will be further discussed below.

Working with Behaviors

In one embodiment, a user can use Behaviors to animate objects using simple, graphical controls. In one embodiment, with Behaviors, a user can create simple motion effects or complex simulated interactions between multiple objects quickly and easily.

In one embodiment, a user can add behaviors to objects or properties in a project to create animated effects without needing to create or adjust keyframes. In one embodiment, drag a behavior onto an object and the object is automatically animated based on the type of behavior applied. In another embodiment, a user can customize a Behavior's parameters in the Dashboard, or in the Behaviors tab of the Inspector, to change its effect.

In one embodiment, behaviors are designed to be flexible, and can be combined with one another to create all kinds of effects. In one embodiment, using behaviors, motion graphics design becomes interactive, allowing a user to create complex motion effects and simulated object interactions very quickly.

In one embodiment, behaviors can also be used to animate nearly any individual object, particle system emitter, filter, and generator parameter. In one embodiment, this allows a user to quickly create animated backgrounds, dynamic filter effects, and incredibly complex particle systems, all using a few simple controls.

In one embodiment, there are five different kinds of behaviors available for a user to use.

Basic Motion behaviors—In one embodiment, basic motion behaviors are among the simplest behaviors. In one embodiment, basic motion behaviors animate specific parameters of the object to which they are applied. In another embodiment, some basic motion behaviors affect position, while others affect scale or rotation. In yet another embodiment, examples include Fade In/Fade Out, Spin, and Throw.

Parameter behaviors—In one embodiment, parameter behaviors can be applied to any object parameter, and their effects are limited to just that parameter. In one embodiment, the same parameter behavior can be added to different parameters, resulting in completely different effects. In another embodiment, for example, a user can apply the oscillate behavior to the opacity of an object to make it fade in and out, or a user can apply it to the rotation of an object to make it rock back and forth. In yet another embodiment, a user can also apply parameter behaviors to filter parameters, Generator parameters, the parameters of particle systems, or even the parameters of other behaviors. In one embodiment, examples include Oscillate, Randomize, and Reverse.

Simulation behaviors—In one embodiment, simulation behaviors perform one of two tasks. In one embodiment, some simulation behaviors, such as Gravity, animate the parameters of an object in a way that simulates a real-world phenomenon. In another embodiment, other simulation behaviors, such as Attractor and Repel, affect the parameters of one or more objects surrounding the object to which they're applied. In yet another embodiment, simulation behaviors allow a user to create some very sophisticated interactions among multiple objects in a project with a minimum of adjustments. In one embodiment, like the basic motion behaviors, simulation behaviors also affect specific object parameters. In another embodiment, examples include Attractor, Gravity, and Repel.

Particles behaviors—In one embodiment, particles behaviors are specifically designed to be applied to cells within particle systems. In one embodiment, these behaviors affect how individual particles are animated over the duration of their life.

Text behaviors—In one embodiment, text behaviors animate the parameters of text objects to create various animated effects. In one embodiment, examples include Scroll Up, which causes text to move vertically to create scrolling titles or credits, and Type On, which reveals a text object letter by letter.

Behaviors vs. Keyframes—In one embodiment, it's important to understand that behaviors do not add keyframes to the objects or parameters to which they're applied. In one embodiment, instead, behaviors automatically generate a range of values that are then applied to an object's parameters, animating it over the duration of that behavior. In another embodiment, changing the parameters of a behavior alters the range of values that behavior generates.

In one embodiment, keyframes, on the other hand, apply specific values directly to a parameter. In one embodiment, when a user creates two or more keyframes with different values in a Parameter in the Keyframe Editor, a user animates that parameter from the first keyframed value to the last. In another embodiment, if a user changes the value of a single keyframe, it has no effect on any other keyframes applied to the same parameter.

In one embodiment, by design, behaviors are most useful for creating generalized, ongoing motion effects. In one embodiment, behaviors are also extremely useful for creating animated effects that might be too complex or time-consuming to keyframe manually. In another embodiment, keyframing, in turn, may be more useful for creating specific animated effects where the parameter a user is adjusting is required to hit a specific value at a specific time.

A. Browsing for Behaviors

In one embodiment, available behaviors appear in the Library tab. In one embodiment, selecting the Behaviors category in the category pane reveals the four behavior subcategories. In another embodiment, selecting a subcategory reveals behaviors of that type in the Library Stack pane. In yet another embodiment, when a user selects a behavior in the Library Stack, a short description of it appears to the right of the Preview window.

B. Applying and Removing Behaviors

In one embodiment, how a user applies a behavior depends on what kind of behavior it is. In one embodiment, some behaviors are applied directly to objects in the Canvas, while others must be applied specifically to individual object parameters in the Inspector.

i. Applying and Removing Motion, Simulation, and Text Behaviors

In one embodiment, a user applies these behaviors directly to objects in the Canvas, Layers tab, or Timeline. In one embodiment, these behaviors automatically animate specific parameters of the object to which they're applied. In another embodiment, for example, the Throw behavior only affects an object's Position parameter, and the Grow/Shrink behavior only affects an object's Scale parameter.

In one embodiment, if the Create Objects At preference in the Project Preferences window is set to Current Frame, newly applied behaviors will be added at the position of the Playhead in the Timeline. In one embodiment, behavior animation begins at the first frame a behavior appears, so a behavior's position in the Timeline is important.

In one embodiment, to apply a behavior to an object in a project, do one of the following:

In one embodiment, drag a Basic Motion, Simulation, or Text behavior onto an object in the Canvas, Layers tab, or Timeline.

In one embodiment, select an object in the Canvas, Layers tab, or Timeline, and choose a behavior from the Behaviors menu (in the menu bar or toolbar).

In one embodiment, select an object in the Canvas, Layers tab, or Timeline, then select a behavior from the Library stack of the Library and click Apply in the Preview pane.

In one embodiment, to apply a behavior to multiple objects:

In one embodiment, select all of the objects to which to apply the behavior. In one embodiment, in either the Layers tab or Timeline, Shift-click to select a contiguous set of objects, or Command-click to select individual, non-contiguous objects.

In one embodiment, do one of the following:
In one embodiment, choose a behavior from the Behaviors menu (in the menu bar or Toolbar).
In one embodiment, select a behavior in the Library and click Apply in the Preview pane.

In one embodiment, to see the animated effect in action, play the project.

In one embodiment, a user can also apply behaviors directly to Layers in the Layers tab or Timeline. In one embodiment, behaviors applied to a Layer affect all objects nested within that layer as if they were a single object.

In one embodiment, when a behavior is applied to an object, the object parameters affected by that behavior are automatically animated based on the behavior's default settings. In one embodiment, for example, if a user applies the Gravity behavior to an object in the Canvas and then plays the project, that object's position is animated and it moves down, according to the Gravity behavior's default setting.

a. Where Behaviors Appear

In one embodiment, when a user applies a behavior 10 to an object 12, it appears nested underneath that object in the Layers tab 14 and the Timeline 16. In one embodiment, behaviors are listed in the order in which they were applied in the Behaviors tab 18 of the Inspector 19. The patent or application file contains at least one drawing executed in color. Copies of this patent or patent application publication with color drawings will be provided by the U.S. Patent and Trademark Office upon request and payment of the necessary fee.

Figure 1:
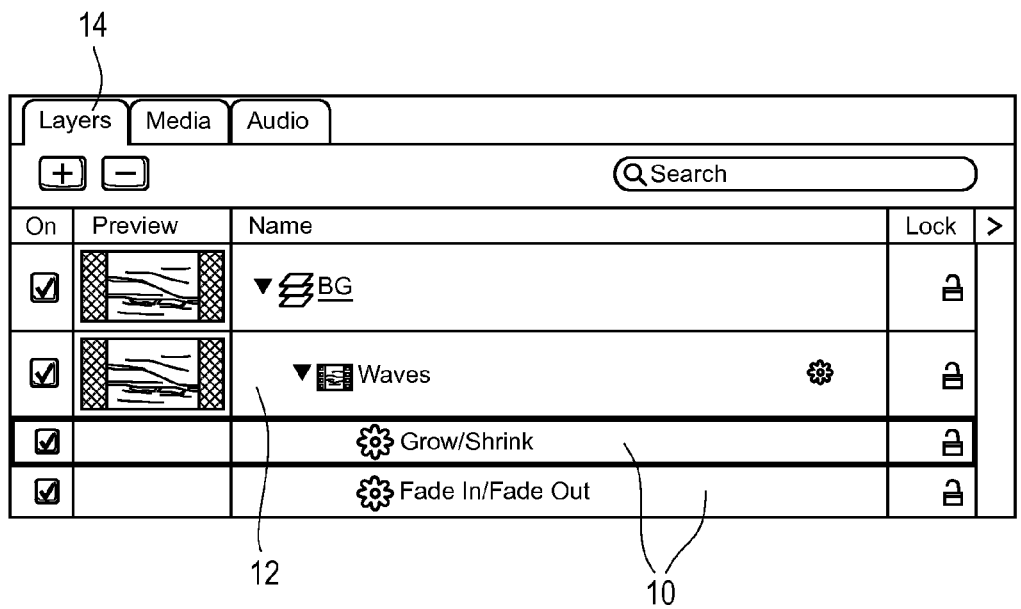
FIG. 1 illustrates a behavior in the Layers tab, according to one embodiment of the invention.
Figure 2:
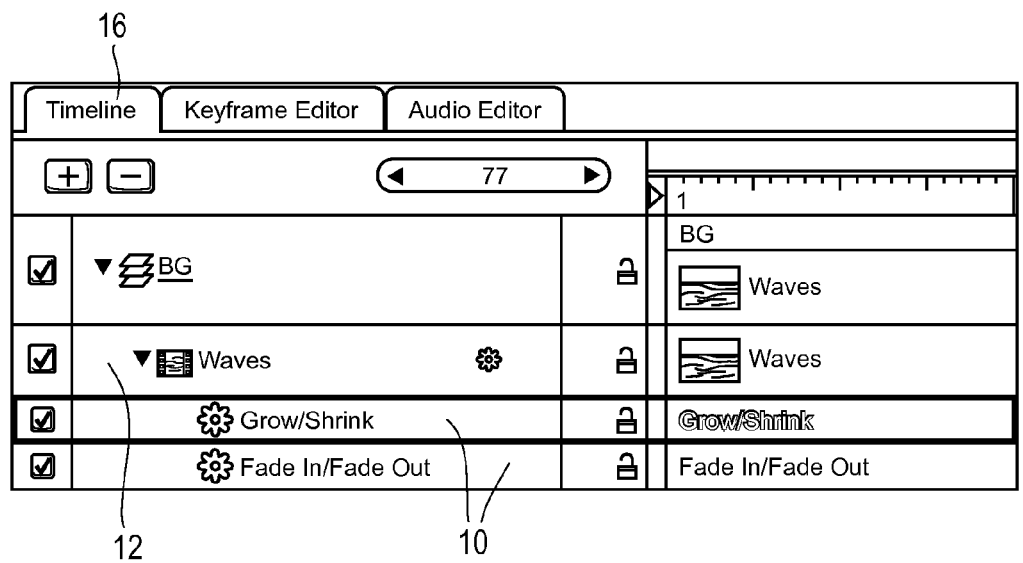
FIG. 2 illustrates a behavior in the Timeline, according to one embodiment of the invention.
Figure 3:
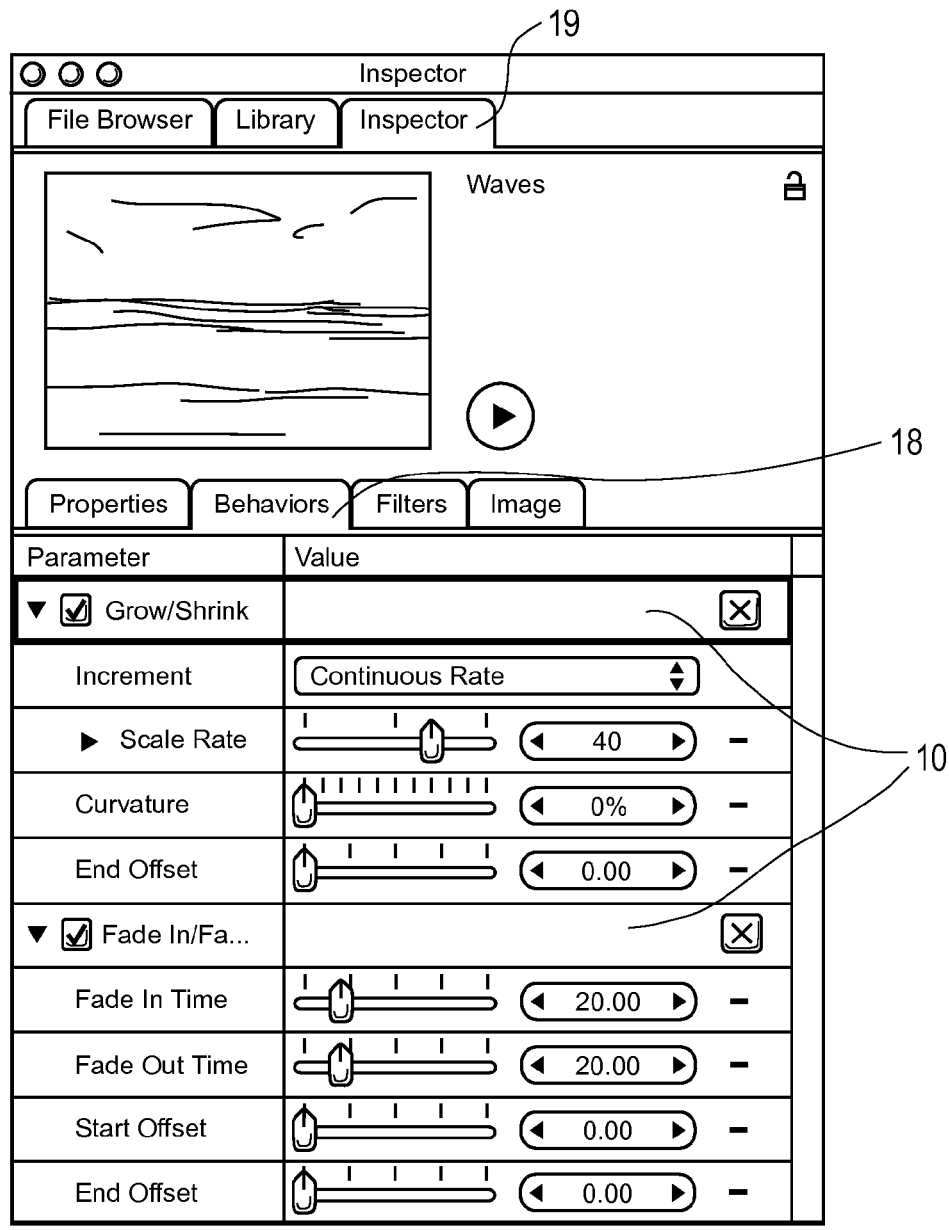
FIG. 3 illustrates a behavior in the Behaviors tab of the Inspector, according to one embodiment of the invention.

FIG. 1 illustrates a behavior in the Layers tab, according to one embodiment of the invention. FIG. 2 illustrates a behavior in the Timeline, according to one embodiment of the invention. FIG. 3 illustrates a behavior in the Behaviors tab of the Inspector, according to one embodiment of the invention.

Figure 4:
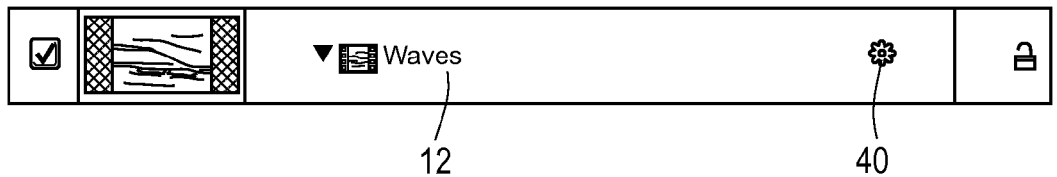
FIG. 4 illustrates a gear icon, according to one embodiment of the invention.

In one embodiment, a gear icon 40 also appears to the right of the layer or object name in the Layers tab or Timeline. In one embodiment, clicking this icon enables and disables all behaviors that have been applied to that layer or object. FIG. 4 illustrates a gear icon, according to one embodiment of the invention.

b. Behavior Effects in the Keyframe Editor

In one embodiment, if a user opens the Keyframe Editor and looks at a parameter that's affected by one or more behaviors, he'll see a background curve that represents the behavior's effect in addition to that parameter's keyframe curve. In one embodiment, this curve is uneditable, and is there to display the behavior's effect on that parameter.

c. Removing Behaviors

In one embodiment, since behaviors don't add keyframes, removing a behavior instantly eliminates its animated effect. In one embodiment, all types of behaviors are removed in the same way.

In one embodiment, to remove a behavior from an object:
In one embodiment, select a behavior in the Layers tab, Timeline, or Behaviors tab.
In one embodiment, do one of the following:
In one embodiment, press the Delete key.
In one embodiment, choose Edit>Delete.
In one embodiment, right-click the behavior in the Timeline, and choose Delete from the shortcut menu.

ii. Applying Parameter Behaviors

In one embodiment, parameter behaviors are applied differently than the other types of behaviors. In one embodiment, while all other behaviors affect specific object parameters, parameter behaviors can be applied to any of an object's parameters. In another embodiment, this also includes the parameters of filters, emitters and cells in particle systems, and other behaviors that have been applied to an object.

In one embodiment, a parameter behavior's effect on an object depends on the parameter to which it is applied. In one embodiment, for example, if a user applies the Randomize parameter behavior to an object's Position parameter, that object drifts around the screen when the project is played. In another embodiment, applying the Randomize Parameter behavior to an object's Scale parameter, instead, makes the object randomly grow and shrink.

In one embodiment, to apply a parameter behavior to an object's specific parameter:

In one embodiment, select an object to which to apply the parameter behavior.

In one embodiment, open the Inspector.

In one embodiment, do one of the following:

In one embodiment, right-click a parameter in the Inspector, and choose a parameter behavior to add from the shortcut menu.

In one embodiment, select a parameter, click the Behaviors button in the Toolbar, and choose a Parameter behavior from the pop-up list.

In one embodiment, if a user saves a parameter behavior as a favorite, the parameter to which it was applied is saved along with the rest of that behavior's settings. In one embodiment, as a result, it can be applied like any other behavior and that parameter is automatically affected.

a. Where Parameter Behaviors Appear

Figure 5:
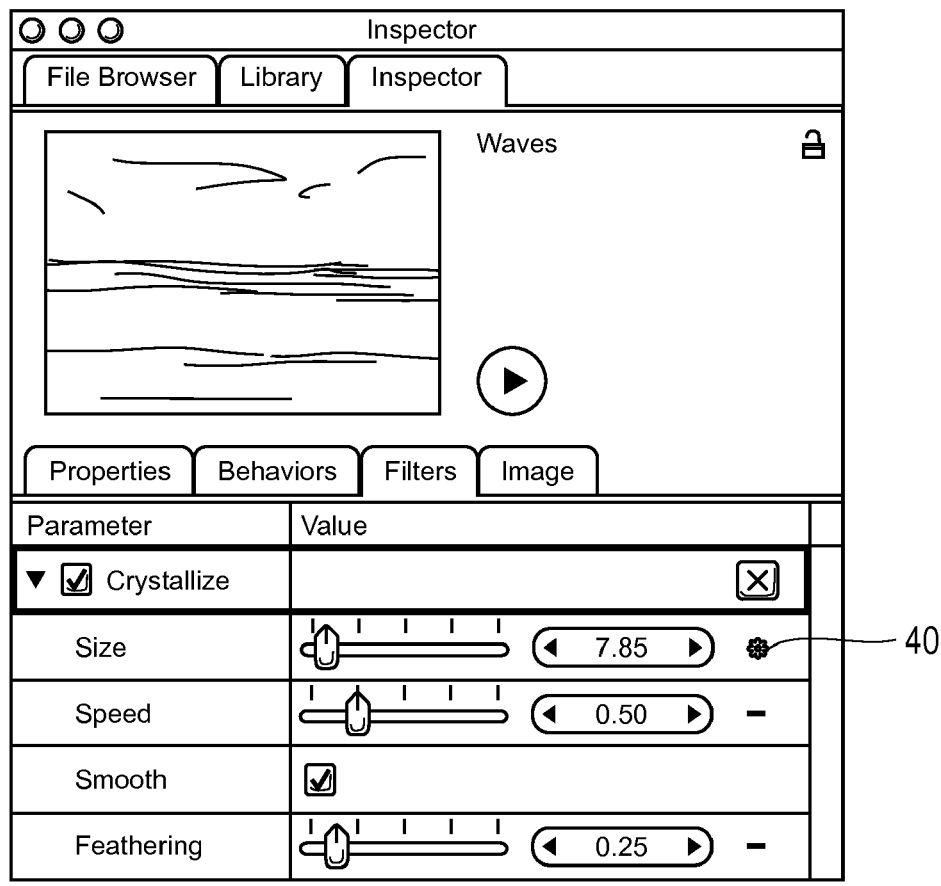
FIG. 5 illustrates a gear icon in the filters tab of the Inspector, according to one embodiment of the invention.
Figure 6:
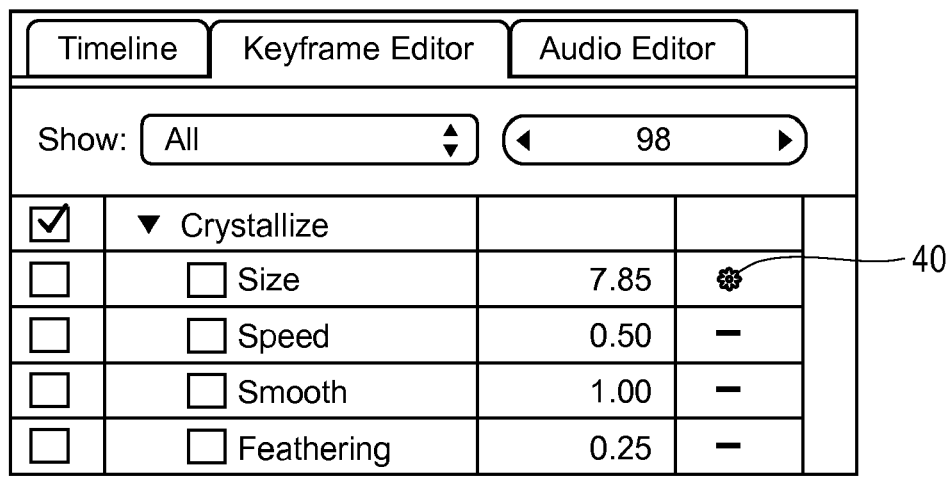
FIG. 6 illustrates a gear icon in the Keyframe Editor, according to one embodiment of the invention.

In one embodiment, when a Parameter behavior has been applied to an object in a project, a gear icon 40 appears in the keyframe menu to the right of the affected parameter in the Properties, Behaviors, or Filters tab where it's applied. In one embodiment, this shows a user that a parameter behavior is influencing that parameter. In another embodiment, a gear icon also appears in the keyframe menu of each affected parameter in the Keyframe Editor. FIG. 5 illustrates a gear icon in the filters tab of the Inspector, according to one embodiment of the invention. FIG. 6 illustrates a gear icon in the Keyframe Editor, according to one embodiment of the invention.

Figures 7, 8:
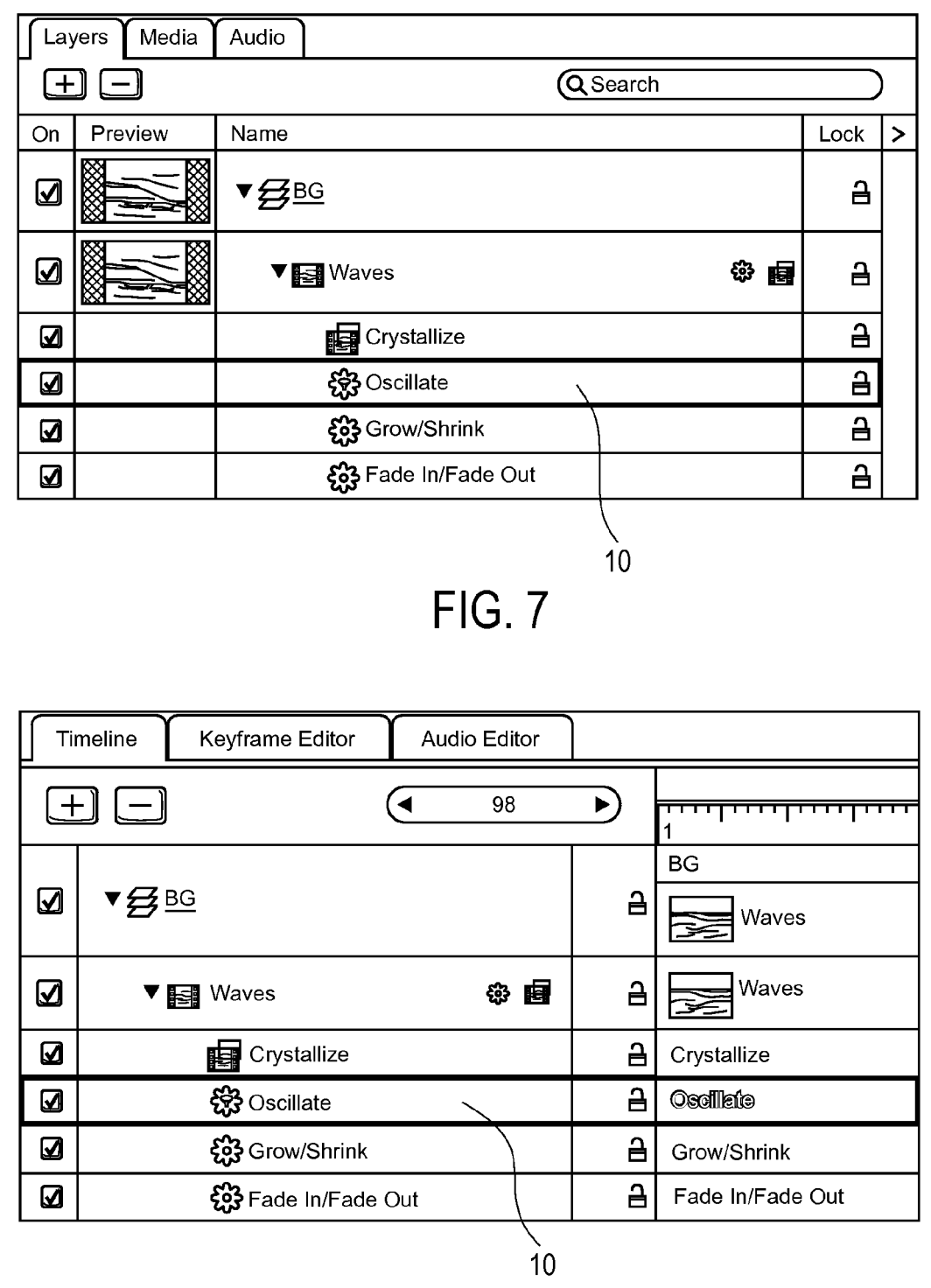

In one embodiment, like other behaviors, parameter behaviors 10 appear nested underneath the objects to which they're applied in the Layers tab and the Timeline, along with any other behaviors that have been applied to that object. FIG. 7 illustrates a parameter behavior in the Layers tab, according to one embodiment of the invention. FIG. 8 illustrates a parameter behavior in the Timeline, according to one embodiment of the invention.

Figure 9:
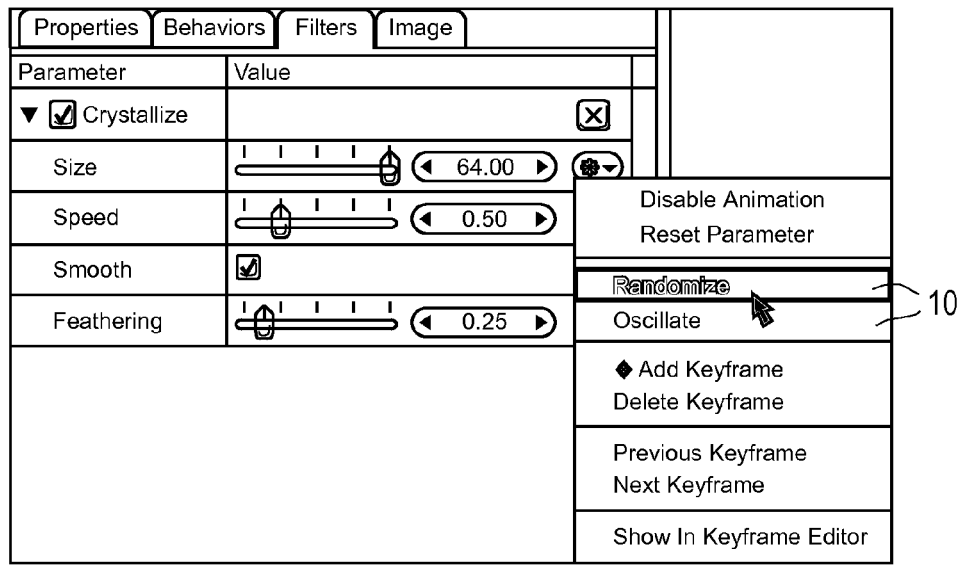
FIG. 9 illustrates a parameter's pop-up menu, according to one embodiment of the invention.

In one embodiment, opening a parameter's keyframe menu reveals the names of all the Parameter behaviors 10 currently applied to that parameter. In one embodiment, choosing one automatically opens that object's Behaviors tab. FIG. 9 illustrates a parameter's pop-up menu, according to one embodiment of the invention.

b. Reassigning a Parameter Behavior to Another Parameter

In one embodiment, once a user applies a parameter behavior, it remains assigned to that parameter unless the user reassigns it. In one embodiment, this is possible using the parameter assignment pop-up, located at the bottom of each parameter behavior in the Behaviors tab. In another embodiment, the parameter assignment popup displays all of the Properties available for the object that behavior has been applied to. In yet another embodiment, if an object has other behaviors or filters applied to it, those parameters also appear within submenus of the Apply To pop-up menu.

In one embodiment, to reassign a parameter behavior to another parameter:

In one embodiment, select the object with the parameter behavior to reassign.

In one embodiment, open the Behaviors tab in the Inspector.

Figure 10:
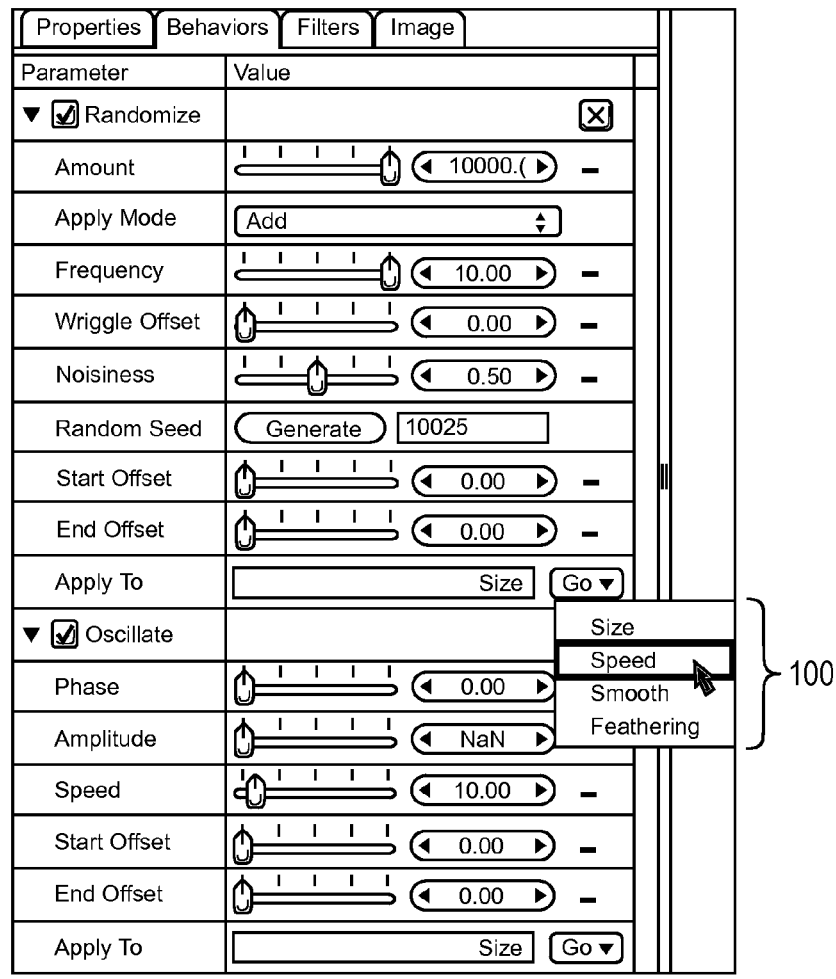
FIG. 10 illustrates an Apply To pop-up menu, according to one embodiment of the invention.

In one embodiment, choose a new parameter from the Apply To pop-up menu 100. FIG. 10 illustrates an Apply To pop-up menu, according to one embodiment of the invention.

C. Customizing Behaviors

In one embodiment, each behavior has a subset of parameters that appear in the Dashboard. In one embodiment, in addition, all controls for behaviors appear in the Behaviors tab of the Inspector. In another embodiment, both the Dashboard and the Behaviors tab reference the same parameters, so changing a parameter in one automatically changes the same parameter in the other.

i. Customizing Parameters in the Dashboard

Figures 11, 12:
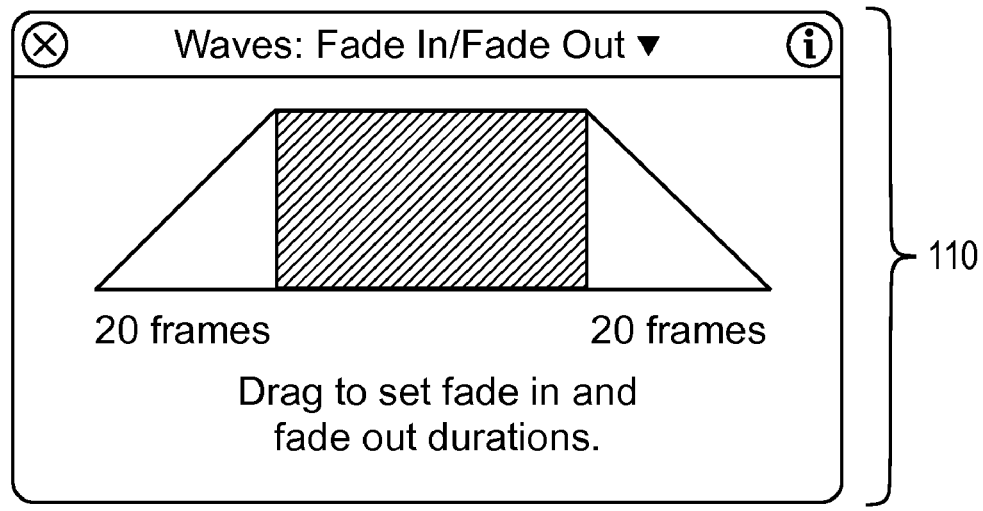
FIG. 11 illustrates the controls for the Fade In/Fade Out behavior in the Dashboard, according to one embodiment of the invention.
FIG. 12 illustrates the controls for the Fade In/Fade Out behavior in the Behaviors tab, according to one embodiment of the invention.

In one embodiment, in general, the parameters that appear in the Dashboard 110 are the most essential ones for modifying that behavior's effect. In one embodiment, frequently, the controls available in a behavior's Dashboard are also more descriptive and easier to use than those in the Behaviors tab 18, although the Behaviors tab may contain more controls. In another embodiment, for example, compare the controls for the Fade In/Fade Out behavior in the Behaviors tab 18 to those available in the Dashboard 110. FIG. 11 illustrates the controls for the Fade In/Fade Out behavior in the Dashboard, according to one embodiment of the invention. FIG. 12 illustrates the controls for the Fade In/Fade Out behavior in the Behaviors tab, according to one embodiment of the invention.

In one embodiment, the controls in the Dashboard consolidate all of the parameters available in the Behaviors tab into a single, graphical control. In one embodiment, there are times, however, when it may be more desirable to use a behavior's individual parameters to finesse the effect a user is trying to achieve with greater detail.

In one embodiment, to display the Dashboard of a behavior:

In one embodiment, select an object with a behavior applied to it.

In one embodiment, do one of the following:

In one embodiment, select the behavior to modify in the Layers tab, Timeline, or Behaviors tab.

In one embodiment, control-click an object in the Canvas, and choose a behavior from the Behavior submenu in the shortcut menu.

In one embodiment, make adjustments to the behavior using the controls in the Dashboard. In one embodiment, if the Dashboard doesn't appear, the user may need to choose Window>Show Dashboard (or press F7).

In one embodiment, to switch among all behaviors applied to an object in the Dashboard, click the disclosure triangle next to the name at the top of the Dashboard to open a pop-up menu that displays all of the behaviors, filters, and masks that are applied to that object. In one embodiment, choose a behavior from this list to display its parameters in the Dashboard.

ii. Customizing Parameters in the Behaviors Tab of the Inspector

In one embodiment, the Behaviors tab displays every behavior that's applied to the selected object. In one embodiment, a disclosure triangle to the left of each behavior's name reveals all of that behavior's parameters underneath. In another embodiment, unlike the Dashboard, the Behaviors tab displays every parameter a behavior has.

In one embodiment, to display the Behaviors tab:

In one embodiment, select an object with a behavior applied to it.

In one embodiment, open the Inspector, then click the Behaviors tab. In one embodiment, all of the behaviors applied to that object appear within.

D. Working with Behaviors

In one embodiment, this section describes how to enable, rename, lock, duplicate, move, and reorganize behaviors in a project. In one embodiment, these procedures apply to every type of behavior.

i. Controls for Enabling, Renaming, and Locking Behaviors

Figure 13:
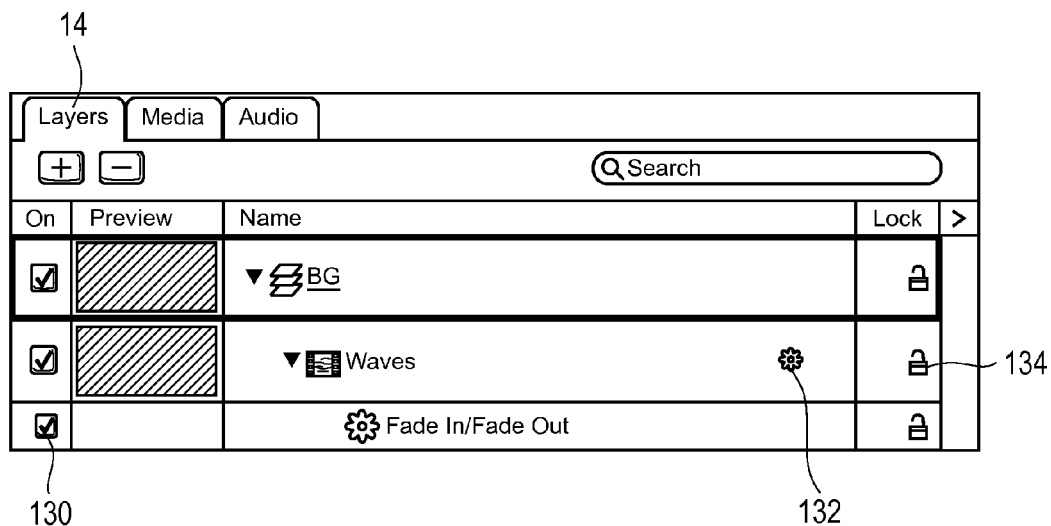
FIG. 13 illustrates the Activate control, the Enable/Disable control, and the Lock control in the Layers tab, according to one embodiment of the invention.
Figure 14:
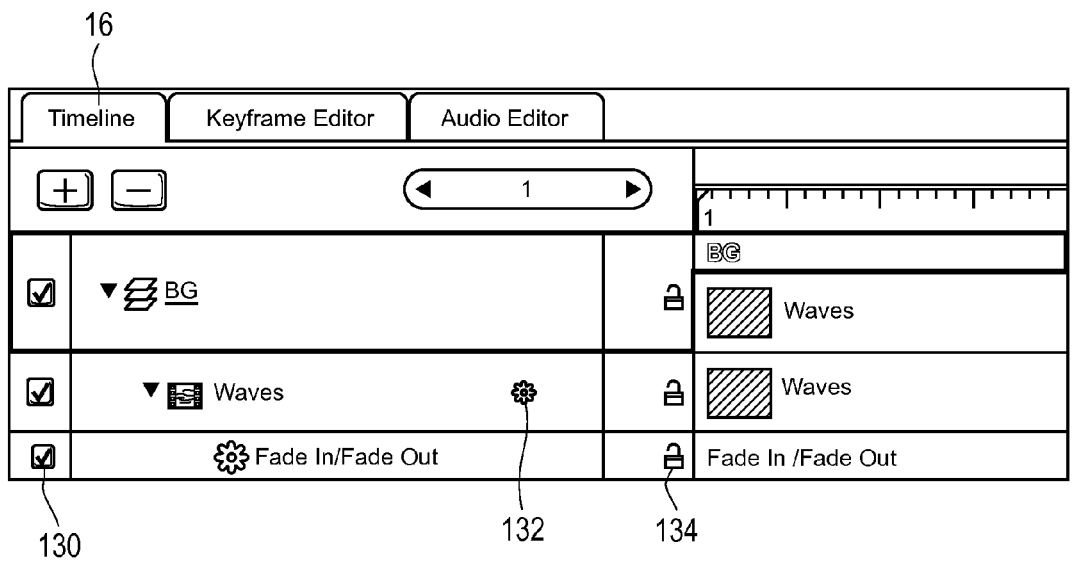
FIG. 14 illustrates the Activate control, the Enable/Disable control, and the Lock control in the Timeline, according to one embodiment of the invention.

In one embodiment, when a user applies a behavior to an object, the behavior appears in three different places—the Layers tab 14, the Timeline 16, and the Behaviors tab 18 of the Inspector. In one embodiment, while the Behaviors tab in the Inspector contains all of the editable parameters for a behavior that's been applied to an object, the Layers tab and Timeline have three basic controls for each behavior: Activate 130, Enable/Disable 132, and Lock 134. FIG. 13 illustrates the Activate control, the Enable/Disable control, and the Lock control in the Layers tab, according to one embodiment of the invention. FIG. 14 illustrates the Activate control, the Enable/Disable control, and the Lock control in the Timeline, according to one embodiment of the invention.

Activate control—In one embodiment, the Activate control is a checkbox that turns each individual behavior on or off. In one embodiment, behaviors that are turned off are not rendered.

Name—In one embodiment, a user can double-click in the Name field to rename the behavior.

Lock—In one embodiment, click the lock control to lock or unlock a behavior. In one embodiment, a user cannot modify the parameters of a locked behavior.

Figures 15, 16, 17:
FIG. 15 illustrates an enable/disable behaviors control that has been toggled to disabled, according to one embodiment of the invention.
FIG. 16 illustrates a show behaviors control that has been toggled to show, according to one embodiment of the invention.
FIG. 17 illustrates a behavior that has been selected in the Layers tab, according to one embodiment of the invention.

Enable/Disable Behaviors control—In one embodiment, the enable/disable behaviors control 150 is a gear icon that appears to the right of the name of each object with one or more behaviors applied to it. In one embodiment, clicking this icon toggles all behaviors applied to that object on and off. FIG. 15 illustrates an enable/disable behaviors control that has been toggled to disabled, according to one embodiment of the invention.

Show Behaviors control—In one embodiment, the show behaviors control 160 is a button at the bottom of the Layers tab and Timeline that lets a user show or hide all behaviors. This button neither enables or disables behaviors that have been applied to objects in a project, it only controls their visibility. FIG. 16 illustrates a show behaviors control that has been toggled to show, according to one embodiment of the invention.

ii. Copying, Pasting, and Moving Behaviors

In one embodiment, after a user has added behaviors to an object, there are a number of ways he can copy and move them among the other objects in the Timeline or Layers tab. In one embodiment, behaviors can be cut, copied, and pasted like any other object. In another embodiment, when a user cuts or copies a behavior in the Timeline or Layers tab, he also copies the current state of all that behavior's parameters.

In one embodiment, to cut or copy a behavior:

In one embodiment, select a behavior.

In one embodiment, do one of the following:

In one embodiment, choose Edit>Cut (or press Command+X) to remove the behavior to the Clipboard.

In one embodiment, choose Edit>Copy (or press Command+C) to leave the behavior there, and copy the behavior to the Clipboard.

In one embodiment, to paste a behavior:

In one embodiment, select an object into which to paste the behavior.

In one embodiment, choose Edit>Paste (or press Command+V).

In one embodiment, the cut or copied behavior is applied to the selected object, with all its parameter settings intact.

In one embodiment, a user can also move a behavior 10 from one object 12 to another in the Timeline or Layers tab simply by dragging it. In one embodiment, to move a behavior from one object to another, in the Timeline or Layers tab, drag a parameter behavior from one object and drop it on top of another. In another embodiment, if a user moves a parameter behavior 10 to another object 12, it is applied to whichever parameter it affected in the previous object. FIG. 17 illustrates a behavior that has been selected in the Layers tab, according to one embodiment of the invention. FIG. 18 illustrates a behavior that is being dragged to another object in the Layers tab, according to one embodiment of the invention.

In one embodiment, a user can also duplicate a behavior in place. In one embodiment, to duplicate a behavior:

In one embodiment, select the behavior to duplicate.

In one embodiment, do one of the following:

In one embodiment, choose Edit>Duplicate (or press Command+D)

In one embodiment, right-click on the behavior to duplicate, and choose Duplicate from the shortcut menu In one embodiment, a user can also duplicate a behavior and apply the duplicate to another object in the Timeline or Layers tab. In one embodiment, to drag a duplicate of a behavior to another object:

In one embodiment, press and hold the Option key, and click on the behavior to duplicate.

In one embodiment, holding the mouse button down, drag the behavior to the object to apply its duplicate to.

In one embodiment, release the mouse button.

In one embodiment, the duplicated behavior is applied to the second object.

In one embodiment, when a user duplicates an object, he also duplicates all behaviors that have been applied to the object. In one embodiment, this way, if the user is creating a project with a number of objects that all need to use the same behavior, the user can simply apply that behavior to the first instance of that object, and then duplicate that object as many times as necessary.

iii. Applying Multiple Behaviors to an Object

In one embodiment, there is no limit to the number of behaviors 10 a user can add to an object 12. In one embodiment, when multiple behaviors 10 are applied to a single object 12, they all work together to create a final animated effect. FIG. 19 illustrates an object with multiple behaviors in the Timeline, according to one embodiment of the invention. FIG. 20 illustrates an object with multiple behaviors in the Layers tab, according to one embodiment of the invention.

In one embodiment, since each behavior applies a value to a specific parameter, the values generated by all behaviors that affect the same parameters are added together to create the end result. In one embodiment, for example, applying the Throw, Spin, and Gravity behaviors to a single object results in the combined result of the Throw and Gravity behaviors affecting the position of the object, and the Spin behavior affecting its rotation.

a. Reordering Behaviors

In one embodiment, when a user applies a number of behaviors to a single object, they all appear nested beneath that object in the Timeline and Layers tab. In one embodiment, a user can change the order in which the behaviors are applied. In another embodiment, while the effects of most behaviors on a parameter are additive, this is useful more as an organizational tool than as a way to change the animated effect created by the behaviors a user has added to an object. In yet another embodiment, one notable exception to this is the Stop behavior, which suspends the activity of all behaviors appearing beneath it, while ignoring any behaviors above it.

In one embodiment, to reorder a behavior:

In one embodiment, in the Timeline or Layers tab, select the behavior to reorder.

Figure 21:
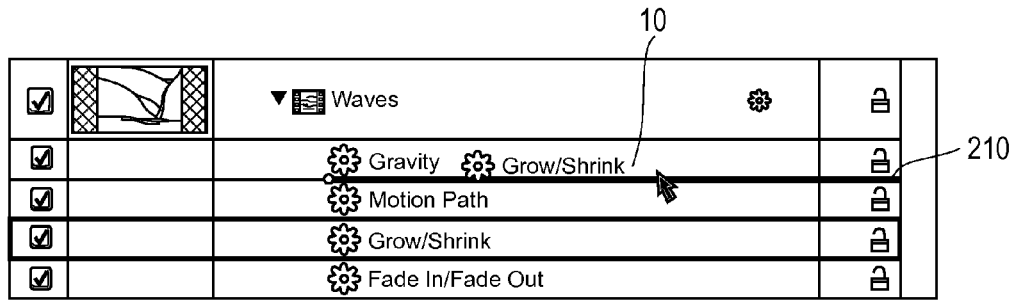
FIG. 21 illustrates a behavior being dragged and a position indicator, according to one embodiment of the invention.

In one embodiment, drag the behavior 10 up or down the list of nested behaviors applied to the same object 12. In one embodiment, a position indicator 210 shows where the behavior 10 appears when the user releases the mouse button. FIG. 21 illustrates a behavior being dragged and a position indicator, according to one embodiment of the invention.

In one embodiment, when the position indicator is in the correct position, release the mouse button

E. Changing Timing of Behaviors

In one embodiment, a user can change a behavior's timing to control when it starts, how long it lasts, and when it stops. In one embodiment, there are several ways of accomplishing this. In another embodiment, the user can use the Stop parameter behavior to suspend one or more behaviors effects on a single parameter. In yet another embodiment, a user can also trim each behavior in the Timeline. In one embodiment, finally, a user can change a parameter behavior's Start Offset parameter to delay its beginning, and its End Offset parameter to end the behavior prior to the end of the object to which it is applied.

i. Using the Stop Behavior

In one embodiment, the easiest way of controlling behavior timing is to use the Stop parameter behavior. In one embodiment, the Stop behavior halts the animation occurring in any parameter, whether the animation is due to keyframes in the Keyframe Editor, or behaviors that have been applied to that object.

In one embodiment, to stop a parameter from animating with the Stop parameter:

In one embodiment, select an object, and open the Properties tab in the Inspector.

In one embodiment, if the Create Objects At preference is set to Current Frame, move the Playhead to the time the animation should stop.

In one embodiment, command-click the parameter to stop, and choose Stop from the shortcut menu.

In one embodiment, when a user applies a Stop behavior to an object, its position in the Layers tab and Timeline affects which of the other behaviors that are applied to the same object are stopped. In one embodiment, animation caused by all behaviors appearing underneath the Stop behavior that affects the same parameter is suspended. In another embodiment, behaviors appearing above the Stop behavior are not affected.

ii. Trimming Behaviors

Figure 22:
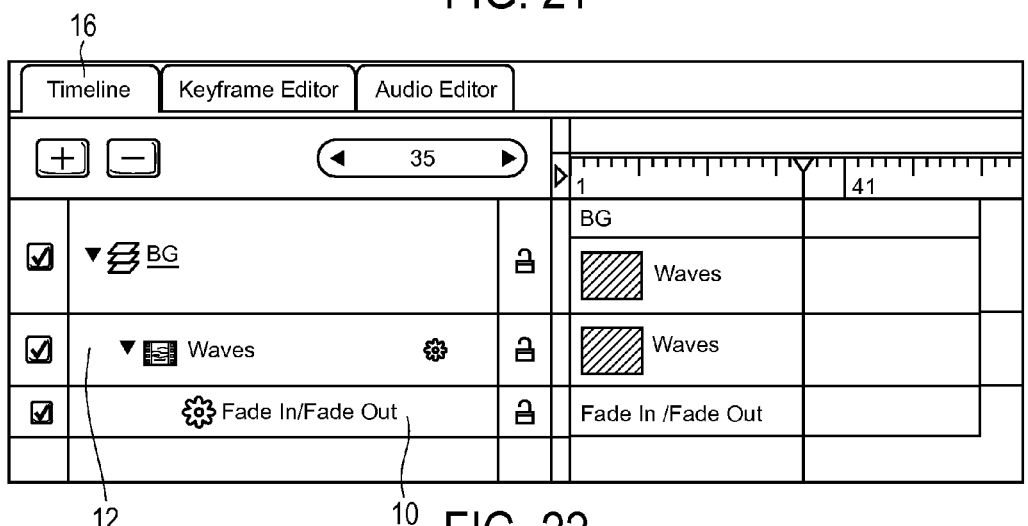
FIG. 22 illustrates an object with a behavior in the Timeline, according to one embodiment of the invention.

In one embodiment, when a user applies a behavior 10 to an object 12, the duration of the behavior 10 in the Timeline 16 defaults to the duration of the object 12 to which the behavior 10 has been applied. FIG. 22 illustrates an object with a behavior in the Timeline, according to one embodiment of the invention.

In one embodiment, a behavior's duration can be modified to limit the duration of its effect. In one embodiment, for example, if a user applies the Spin behavior to an object, by default that object spins around for its duration. In another embodiment, if a user trims the out point of the Spin behavior, the spinning stops at the new position of the out point.

In one embodiment, to alter the duration of a behavior 10 applied to an object 12 in the Timeline 16:

In one embodiment, move the cursor to the in or out point of any behavior in the Timeline.

In one embodiment, when the cursor changes to the Trim cursor 230, do one of the following:

In one embodiment, drag the in point to delay the beginning of the behavior's effect.

In one embodiment, drag the out point to end the behavior's effect prior to the end of the object.

Figure 23:
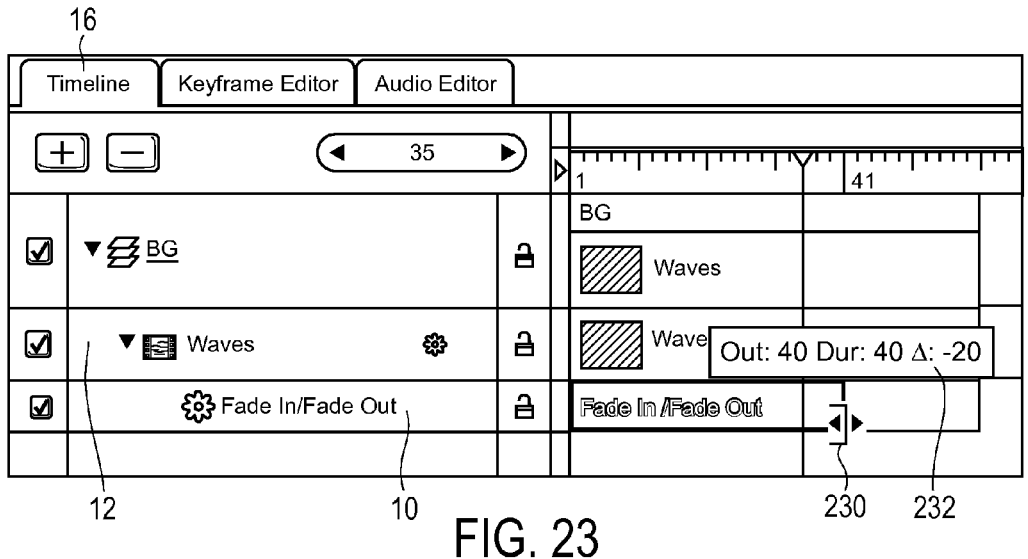
FIG. 23 illustrates a behavior being trimmed in the Timeline and a tooltip, according to one embodiment of the invention.

In one embodiment, when a user drags the In or Out point of a behavior, a tooltip 232 appears that displays the new location and duration of the behavior's edit point. FIG. 23 illustrates a behavior being trimmed in the Timeline and a tooltip, according to one embodiment of the invention.

In one embodiment, since behaviors don't add keyframes to the objects to which they're applied, trimming the out point of a behavior usually resets the object to its original state. In one embodiment, for many behaviors, using the Stop behavior to pause the object's animation is a better method to use then trimming its out point. In another embodiment, another way to stop a behavior's effect and leave the affected object in the transformed state is to adjust a behavior's Start and End Offset parameters.

Note: In one embodiment, the Spin and Throw behaviors leave the object at the transformed state after the last frame of the trimmed behavior for the object's remaining duration.

a. Slipping Behaviors in Time

In one embodiment, in addition to changing a behavior's 10 duration, a user can also slip its position in the Timeline 16 relative to the object 12 it is nested under. In one embodiment, this lets the user set the frame at which that behavior 10 begins to take effect.

In one embodiment, to slip a behavior in the Timeline:

In one embodiment, click anywhere within the middle of a behavior 10 in the Timeline.

Figure 24:
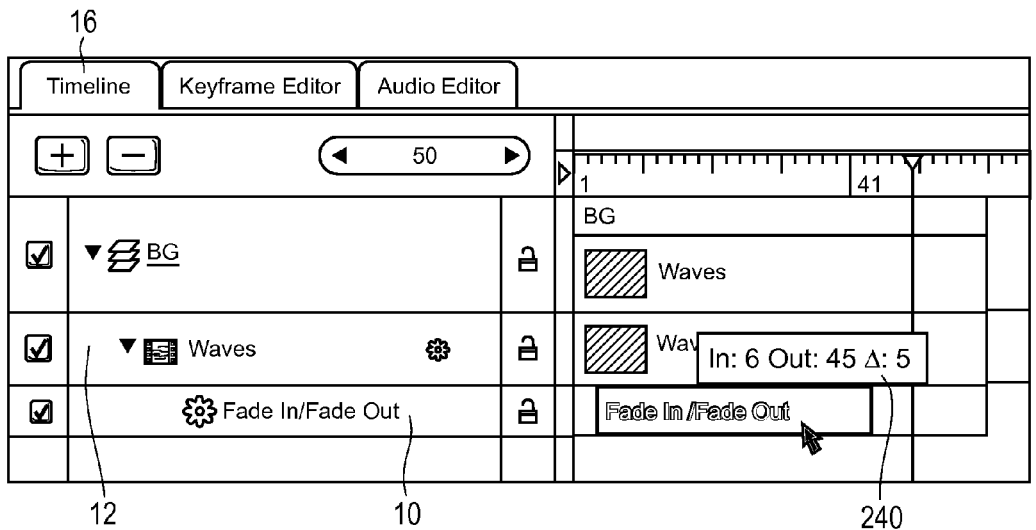
FIG. 24 illustrates a behavior being moved in the Timeline and a tooltip, according to one embodiment of the invention.

In one embodiment, drag the behavior 10 to the left or right to move it to another position in the Timeline 16. In one embodiment, while the user moves the behavior, a tooltip 240 appears which displays the new In and Out points for the behavior. FIG. 24 illustrates a behavior being moved in the Timeline and a tooltip, according to one embodiment of the invention.

Figure 25:
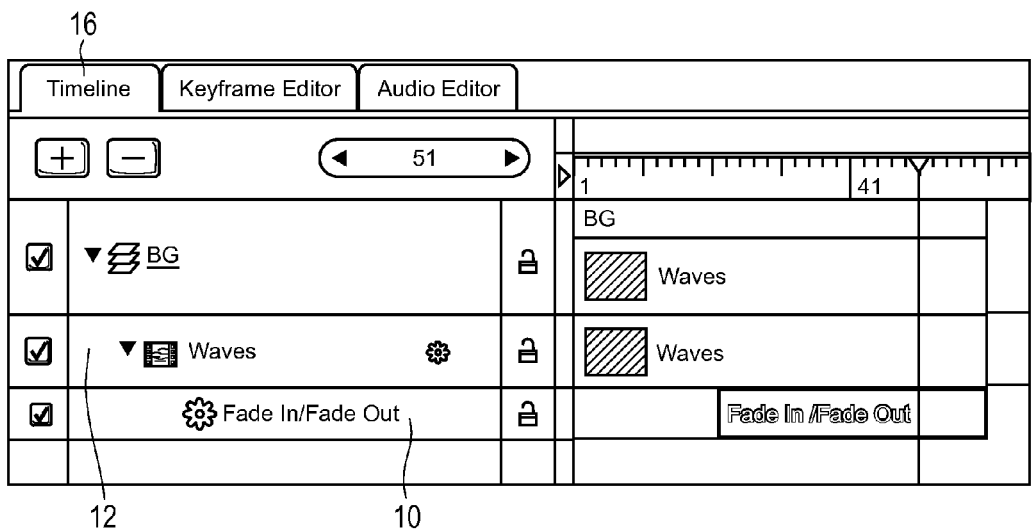
FIG. 25 illustrates a behavior after it has been moved in the Timeline, according to one embodiment of the invention.

FIG. 25 illustrates a behavior after it has been moved in the Timeline, according to one embodiment of the invention.

iii. Changing the Offset of Parameter Behaviors

In one embodiment, parameter behaviors have two additional parameters, Start Offset and End Offset. In one embodiment, these parameters are used to change the frame where a parameter behavior's effect begins and ends. In one embodiment, the Start Offset parameter has a slider that lets a user delay the beginning of the behavior's effect, relative to the first frame of its position in the Timeline. In another embodiment, a user can adjust this parameter to make the parameter behavior start later. In yet another embodiment, the End Offset, in turn, lets a user offset the end of the behavior's effect relative to the last frame of its position in the Timeline. In one embodiment, using this slider to stop the effect, instead of trimming the end of the behavior in the Timeline, has the result of freezing the behavior's effect on the object for its remaining duration.

iv. Combining Behaviors with Keyframes

In one embodiment, any object can have both behaviors and keyframes applied to it simultaneously. In one embodiment, when this happens, the values generated by the behavior and the keyframed values that are applied to the parameter itself are added together to yield the final value for that parameter. In another embodiment, this lets a user combine the automatic convenience of behaviors with the direct control of keyframing to achieve his final result.

Figure 26:
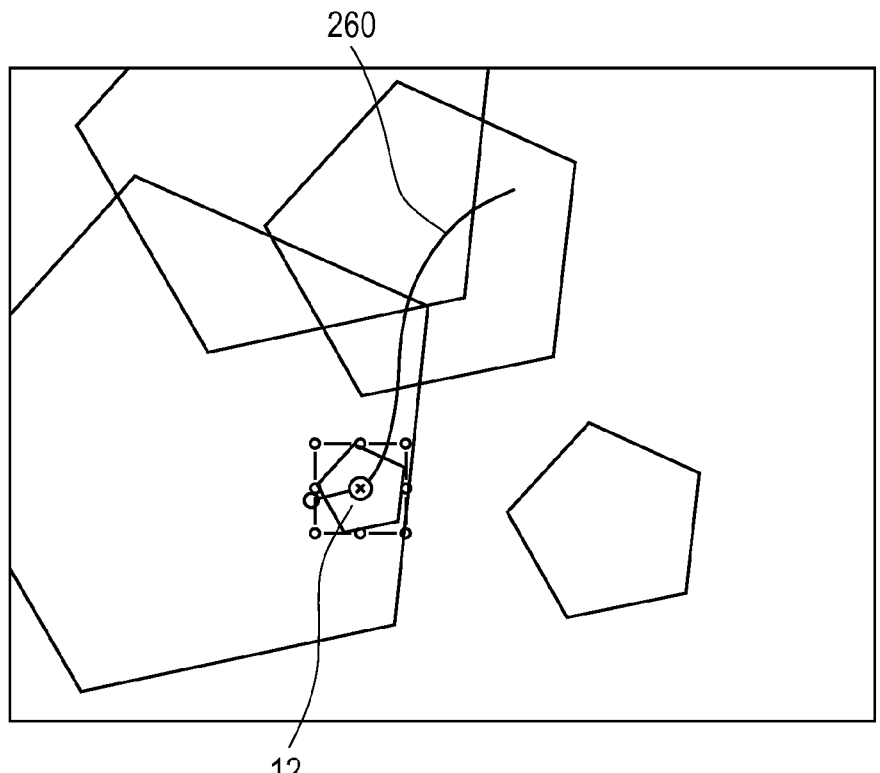
FIG. 26 illustrates a behavior-driven motion path in the Canvas, according to one embodiment of the invention.
Figure 27:
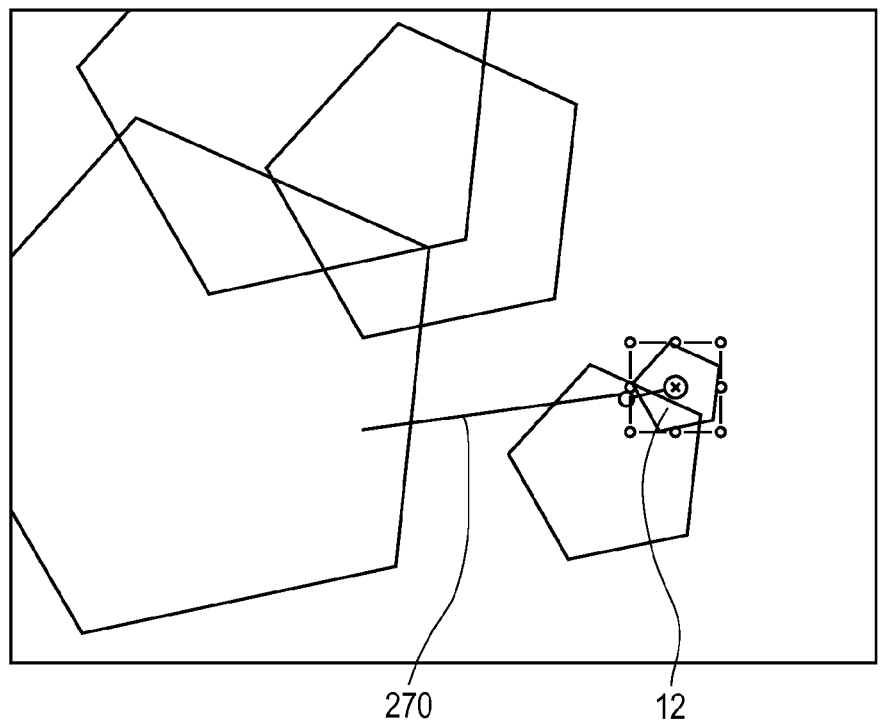
FIG. 27 illustrates a keyframed motion path in the Canvas, according to one embodiment of the invention.
Figure 28:
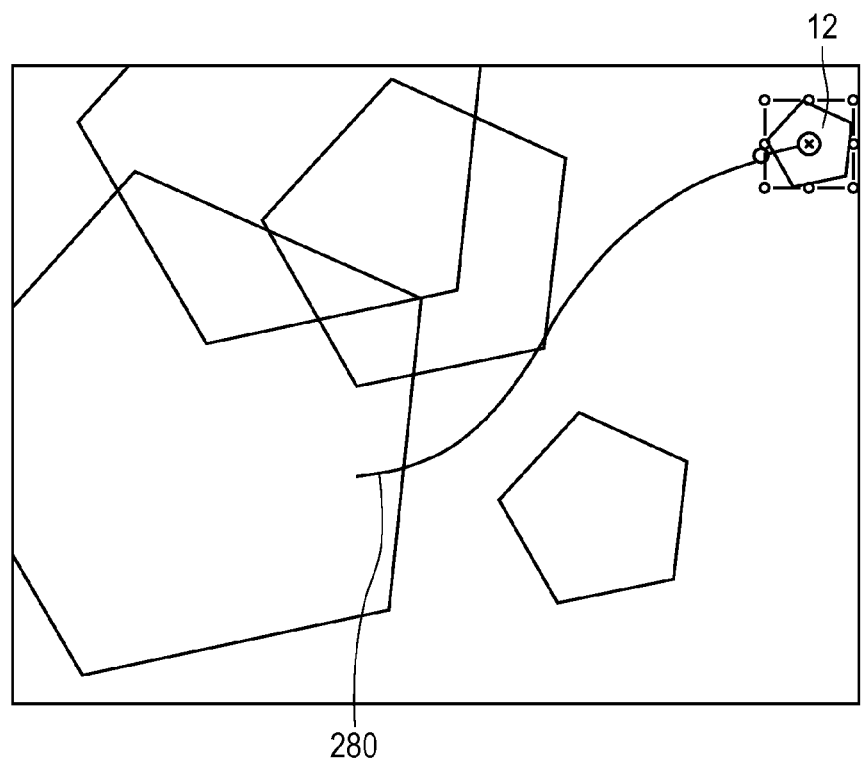
FIG. 28 illustrates a behavior-driven and keyframed motion path in the Canvas, according to one embodiment of the invention.

In one embodiment, for example, if the user applies the Random Motion behavior to an object 12, that object 12 might weave around onscreen with a completely random motion path 260 similar to the following. FIG. 26 illustrates a behavior-driven motion path in the Canvas, according to one embodiment of the invention. In one embodiment, if the user turns off the Random Motion behavior temporarily and adds keyframes to the Motion parameter of the same object 12, he can create a completely predictable and smooth motion path 270. FIG. 27 illustrates a keyframed motion path in the Canvas, according to one embodiment of the invention. In another embodiment, a user can combine the two by turning the Random Motion behavior back on, with the end result being a motion path 280 that follows the general direction he wants, but that has enough random variation in it to make it interesting. FIG. 28 illustrates a behavior-driven and keyframed motion path in the Canvas, according to one embodiment of the invention.

In one embodiment, while this example shows how a user can combine behaviors and keyframes to create motion paths, a user can combine behaviors and keyframes for any parameter.

a. Combining Behaviors and Keyframes in the Keyframe Editor

Figure 29:
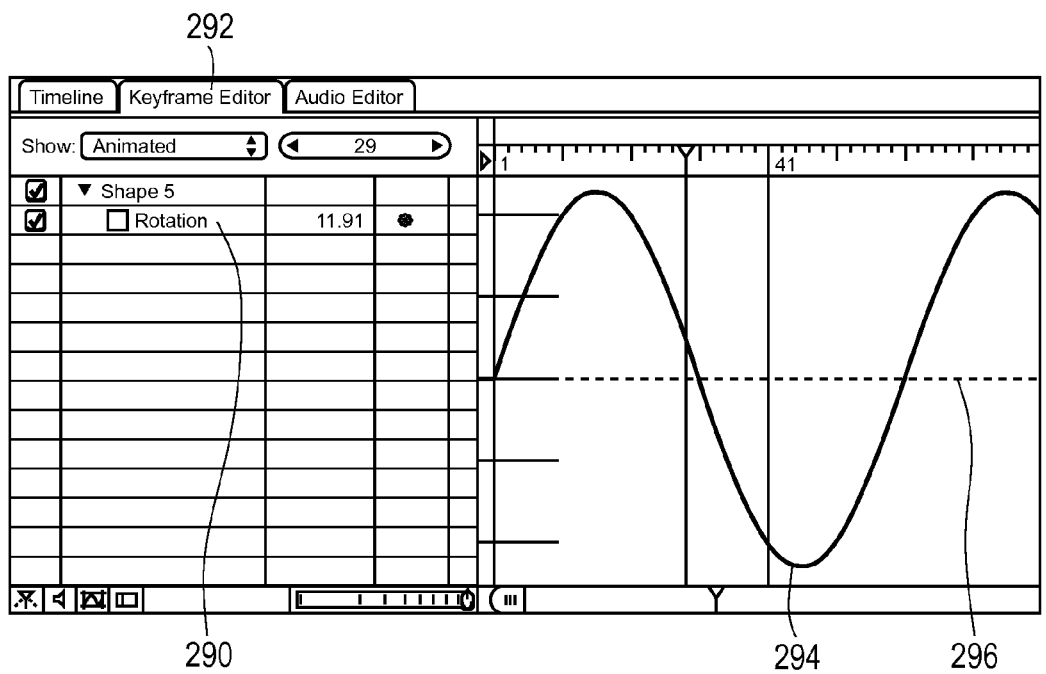
FIG. 29 illustrates a parameter with an oscillate behavior applied to it in the Keyframe Editor, according to one embodiment of the invention.

In one embodiment, when a user displays a parameter 290 that is affected by a behavior 10 in the Keyframe Editor 292, two curves appear for that parameter 290. In one embodiment, an uneditable curve 294 in the background displays the parameter 290 as it is affected by the behavior 10. In another embodiment, there are no keyframes over this first curve. In yet another embodiment, superimposed over the first curve 294 is the parameter's editable curve 296. FIG. 29 illustrates a parameter with an oscillate behavior applied to it in the Keyframe Editor, according to one embodiment of the invention.

Figure 30:
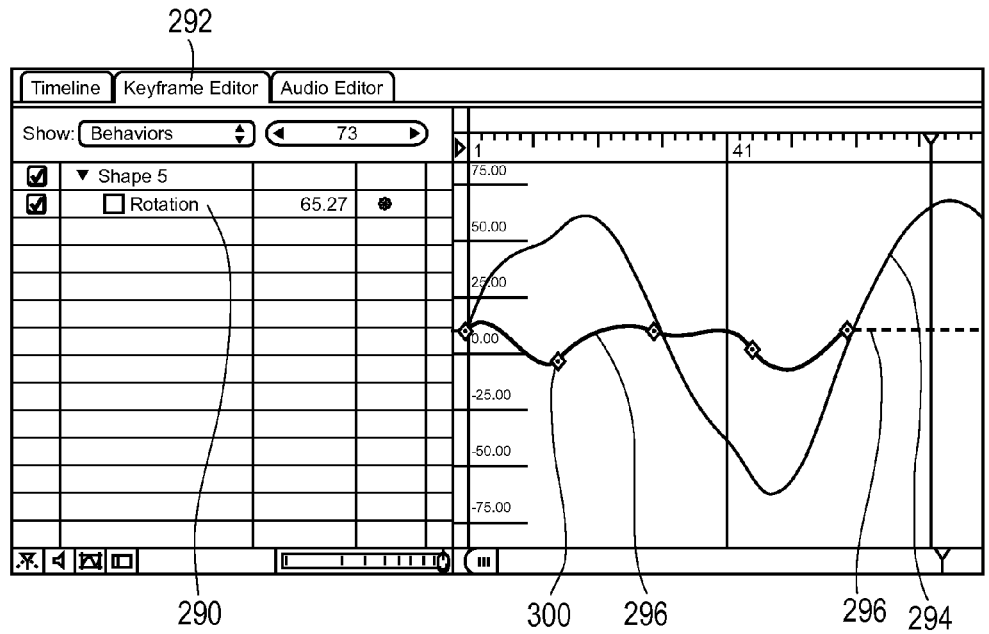
FIG. 30 illustrates a parameter with an oscillate behavior and keyframes applied to it in the Keyframe Editor, according to one embodiment of the invention.

In one embodiment, a user can keyframe 300 a parameter 290 either before or after applying a behavior 10 to the object 12 that affects that parameter 290. In one embodiment, when a user keyframes 300 a parameter that's affected by a behavior, the value of the keyframed curve 296 is added to the value generated by the behavior at each frame. In another embodiment, this has the result of either raising or lowering the resulting value displayed by the background curve 294. In yet another embodiment, the background curve 294 doesn't just display the behavior's animated values, it displays the sum of all values affecting that parameter 290. FIG. 30 illustrates a parameter with an oscillate behavior and keyframes applied to it in the Keyframe Editor, according to one embodiment of the invention.

Figure 31:
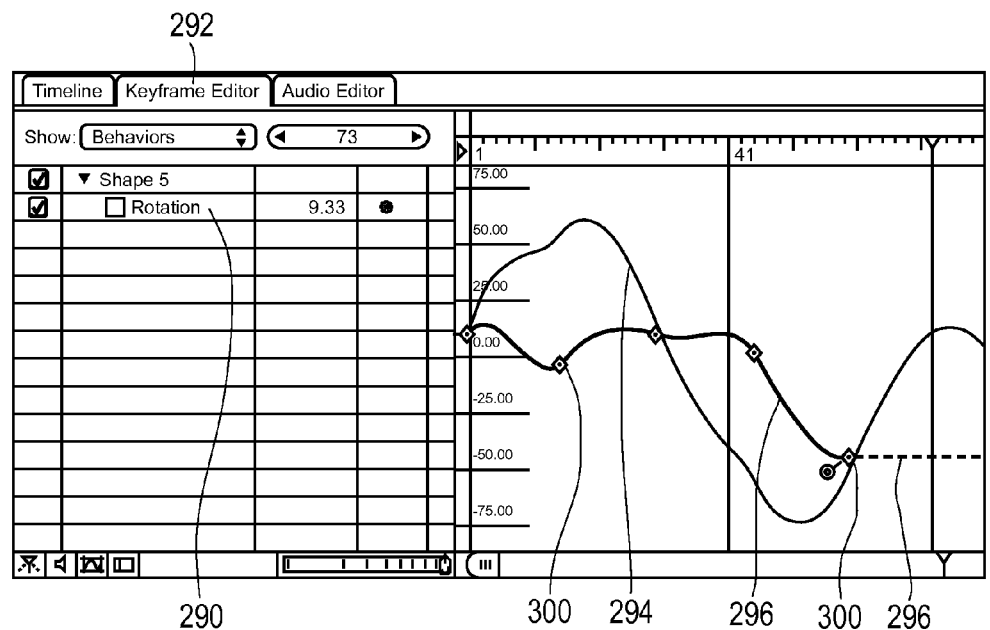
FIG. 31 illustrates the parameter of FIG. 30 but with one keyframe lowered, according to one embodiment of the invention.

In one embodiment, raising or lowering a keyframe 300 in the Keyframe Editor 292 also raises or lowers the background curve 294, since it's adding to or subtracting from the values generated by the behavior 10. FIG. 31 illustrates the parameter of FIG. 30 but with one keyframe lowered, according to one embodiment of the invention.

Figure 32:
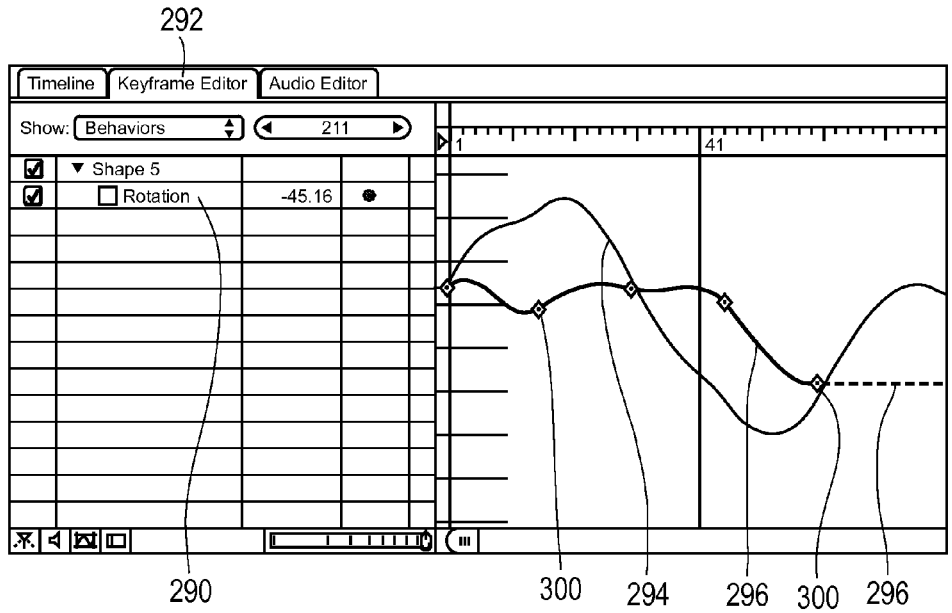
FIG. 32 illustrates a parameter with a behavior curve and a keyframed curve in the Keyframe Editor, according to one embodiment of the invention.
Figure 33:
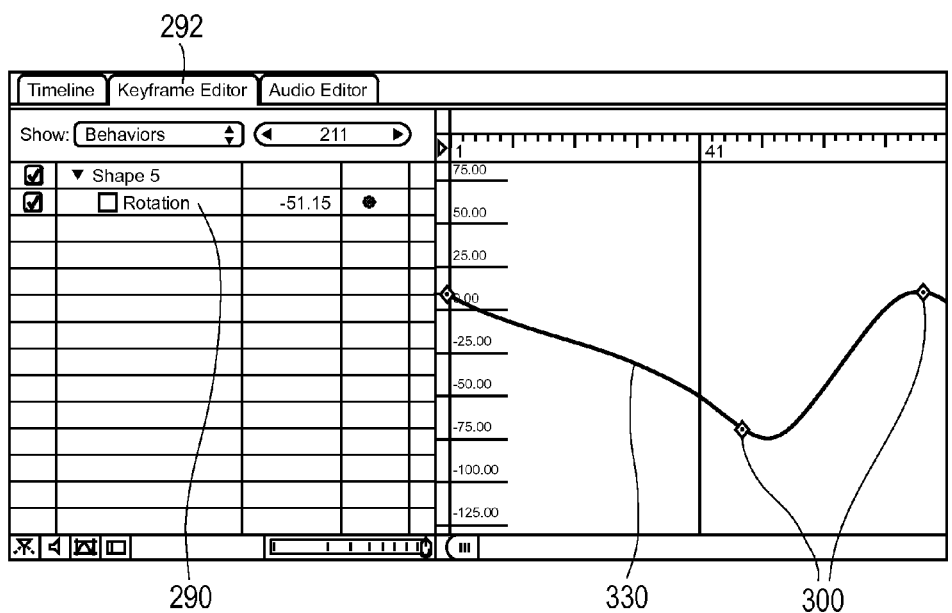
FIG. 33 illustrates a parameter with a "final animation curve" in the Keyframe Editor, according to one embodiment of the invention.

Note: In one embodiment, when a user combines keyframes 300 with multiple behaviors 10, the results can appear to be unpredictable, depending on the combination of behaviors that are applied. In one embodiment, the user has the option of converting the behaviors 10 that are applied to any parameter 290 into keyframes 300. In another embodiment, converting behaviors 10 that have already been combined with keyframes 300 turns the sum of all behaviors 10 and keyframes 300 affecting that parameter 290 into a thinned series of keyframes 300. In yet another embodiment, this results in a final animation curve 330 that closely replicates the shape of the background curve 294 that appeared in the Keyframe Editor 292. In one embodiment, these keyframes 300 can then be edited directly in the Keyframe Editor 292. FIG. 32 illustrates a parameter with a behavior curve and a keyframed curve in the Keyframe Editor, according to one embodiment of the invention. FIG. 33 illustrates a parameter with a "final animation curve" in the Keyframe Editor, according to one embodiment of the invention.

F. Animating Behavior Parameters

In one embodiment, a user can animate any behavior's parameters in order to change the parameter's effect over time. In one embodiment, a user can animate behavior parameters using parameter behaviors, or by keyframing the parameters in the Keyframe Editor.

i. Applying Parameter Behaviors to a Behavior

Figure 34:
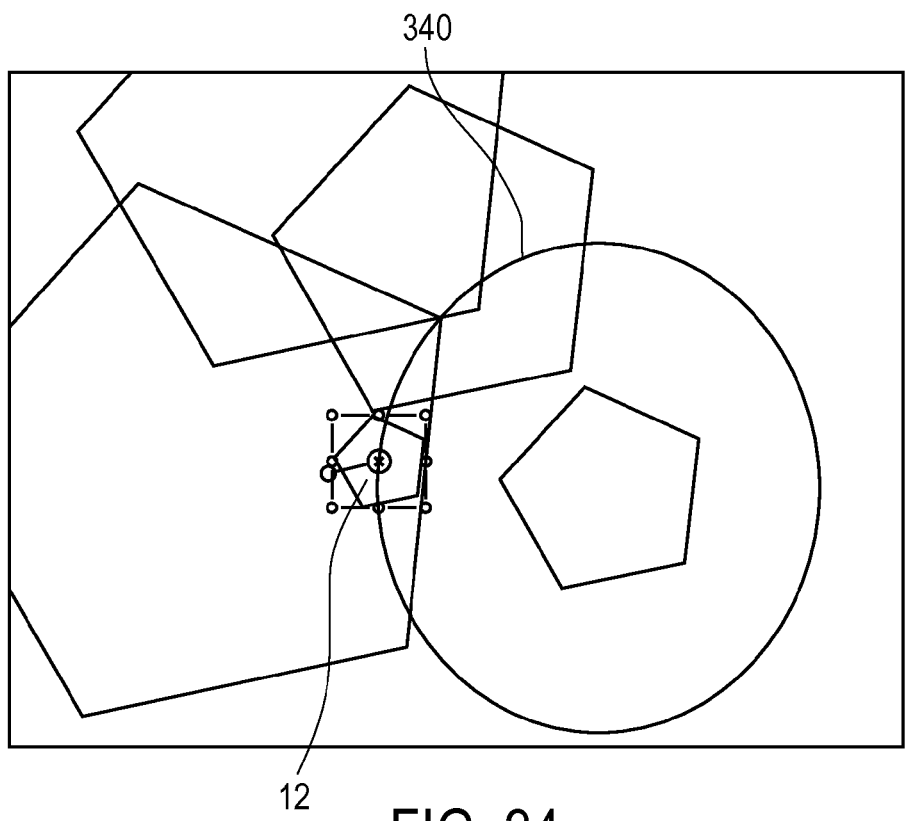
FIG. 34 illustrates an object with an Orbit Around behavior applied, creating a regular orbit (a circular motion path 340), according to one embodiment of the invention.
Figure 35:
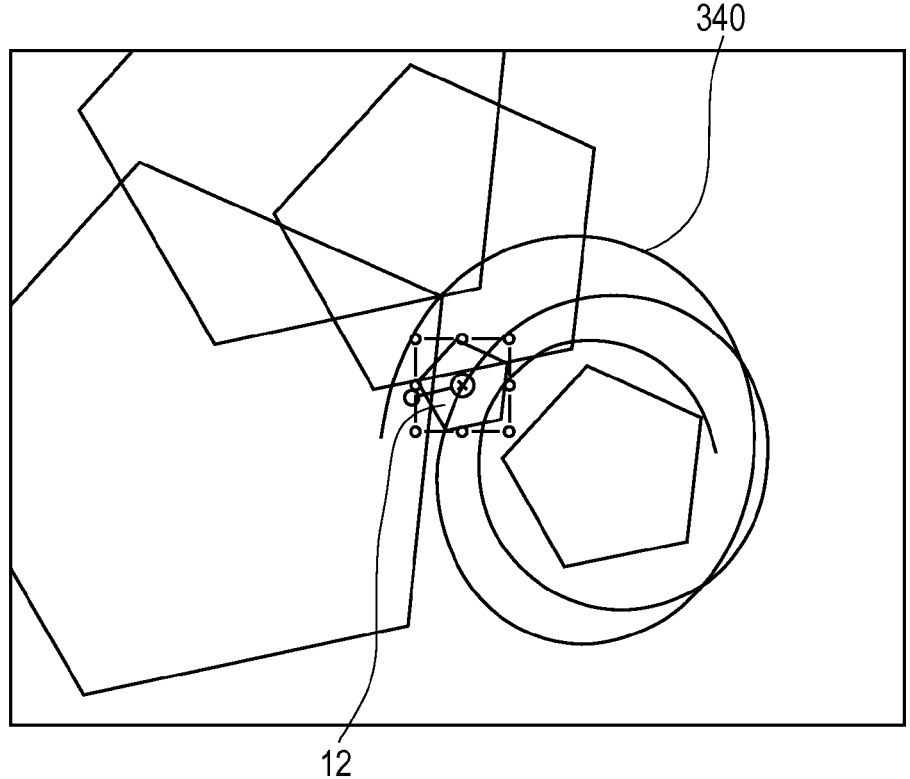
FIG. 35 illustrates the same object as in FIG. 34, but with a Ramp behavior applied to the Orbit Around behavior's Drag parameter as described above, creating a spiral motion path 340, according to one embodiment of the invention.

In one embodiment, a user can animate a behavior's 10 parameter by applying a parameter behavior 10. In one embodiment, for example, a user could apply the Ramp behavior 10 to an Orbit Around behavior's 10 Drag parameter and adjust the Start and End values to increase from 0 to 8 over time. In another embodiment, this results in the orbit of the object 12 slowly decaying, causing the object 12 to fall towards the center of the orbit. FIG. 34 illustrates an object with an Orbit Around behavior applied, creating a regular orbit (a circular motion path 340), according to one embodiment of the invention. FIG. 35 illustrates the same object as in FIG. 34, but with a Ramp behavior applied to the Orbit Around behavior's Drag parameter as described above, creating a spiral motion path 340, according to one embodiment of the invention.

ii. Keyframing Behaviors

Figure 36:
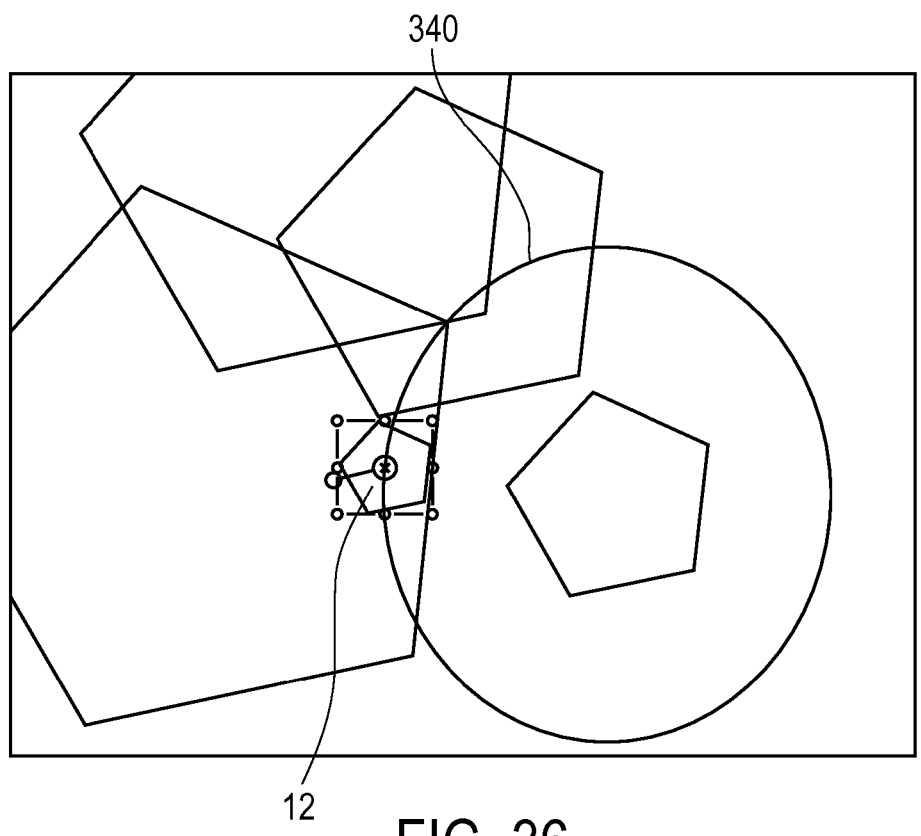
FIG. 36 illustrates an object with an Orbit Around behavior applied, creating a regular orbit (a circular motion path), according to one embodiment of the invention.
Figure 37:
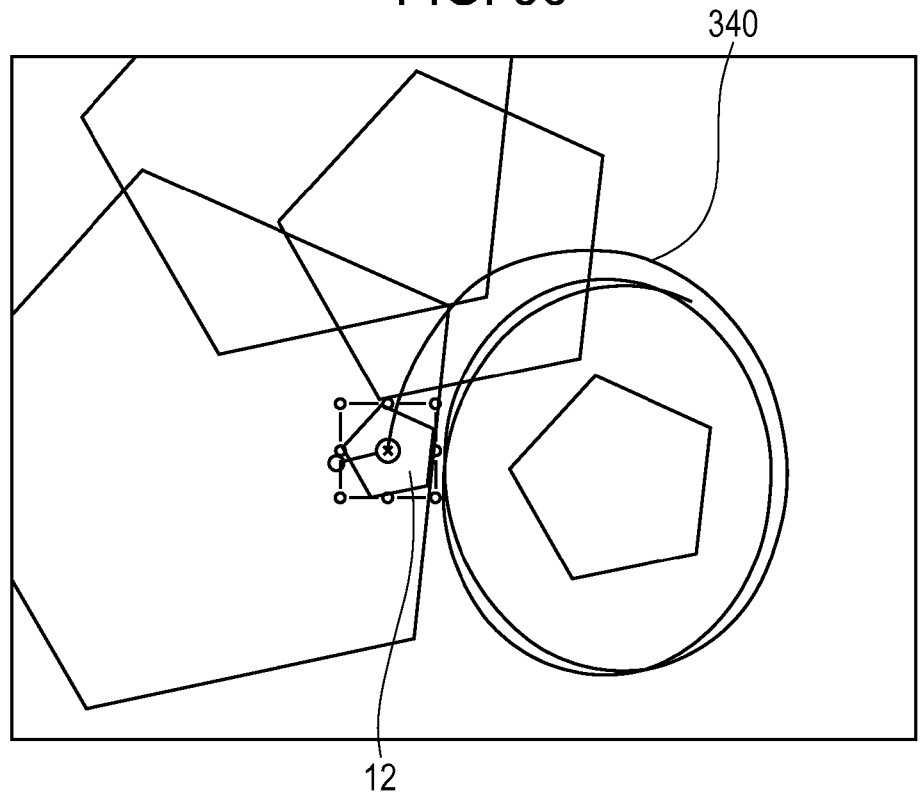
FIG. 37 illustrates the same object as in FIG. 36, but with keyframes applied to the Orbit Around behavior's Drag parameter as described above, creating a different motion path, according to one embodiment of the invention.

In one embodiment, if a user needs more detailed control when animating a behavior's 10 parameters, he can use keyframes 300. In one embodiment, for example, by keyframing the Drag parameter of the Orbit Around behavior 10, a user can grow and shrink the object's orbit many times, creating a much more complex motion path 340. In another embodiment, keyframing this motion path 340 manually would be incredibly difficult, but by keyframing a single parameter within a single behavior 10, a user can create this effect with ease. FIG. 36 illustrates an object with an Orbit Around behavior applied, creating a regular orbit (a circular motion path), according to one embodiment of the invention. FIG. 37 illustrates the same object as in FIG. 36, but with keyframes applied to the Orbit Around behavior's Drag parameter as described above, creating a different motion path, according to one embodiment of the invention.

iii. Converting Behaviors to Keyframes

In one embodiment, if necessary, a user can "bake" all the behaviors that have been applied to an object into keyframes using the Convert to Keyframes command, in the Object menu. In one embodiment, when a user uses the Convert to Keyframes command on an object in a project, all behaviors that are applied to that object are converted to keyframes, which are applied to the individual parameters the behaviors originally affected.

In one embodiment, to convert behaviors to keyframes:

In one embodiment, select an object that has behaviors to convert.

In one embodiment, choose Object>Convert to Keyframes. In one embodiment, all behaviors are converted into keyframes, which appear in the Keyframes Editor.

Note: In one embodiment, a user cannot selectively convert individual behaviors. In one embodiment, the Convert to Keyframes command converts all behaviors that are applied to an object at once.

G. Saving and Sharing Custom Behaviors

In one embodiment, if a user customizes a behavior, and he'd like to save it for future use, he can drag it to the Favorites folder of the Library for future use. In one embodiment, once a Behavior has been placed into the Library, it can be applied to objects like any other behavior in the Library.

In one embodiment, to save a behavior to the library:

In one embodiment, open the Library and select either the Favorites or Favorites Menu categories.

In one embodiment, drag the emitter object to save into the stack at the bottom of the Library.

In one embodiment, for organizational purposes, a user may find it useful to create a new folder of his own in the Favorites or Favorites Menu categories to put his customized behaviors. In one embodiment, when a user saves a customized behavior, the behavior is saved in the User/Library/Application Support folder.

i. Importing and Exporting Behaviors

In one embodiment, each customized behavior a user drags into the Library is saved as a separate file. In one embodiment, if a user has created one or more custom behaviors that he relies upon, he may want to move them to other computers he uses.

In one embodiment, to copy a project preset to another computer, copy custom preset files to that computer's User/Library/Application Support folder.

H. Examples of Behaviors

In one embodiment, this section explains the options that are available for each behavior, presented by category. In one embodiment, in each description, the Target Object is the object to which the behavior is applied.

i. Basic Motion Behaviors

In one embodiment, basic Motion behaviors animate specific parameters of the object to which they are applied. In one embodiment, some basic motion behaviors affect position, while others affect scale or rotation.

a. Fade In/Fade Out

In one embodiment, the Fade In/Fade Out behavior affects an object's Opacity parameter. In one embodiment, the Fade In/Fade Out behavior lets a user dissolve into and out of any object. In one embodiment, the Fade In/Fade Out behavior affects the opacity of the object to which it is applied, fading from 0 percent opacity to 100 percent opacity at the beginning of the clip, and then back to 0 percent opacity at the end. In one embodiment, a user can eliminate the fade in or out by setting the duration of either the fade in or fade out to 0 frames.

In one embodiment, this behavior is useful for introducing and removing images being animated in the middle of a project. In one embodiment, for example, a user could apply the Fade In/Fade Out behavior to text objects moving slowly across the screen to make them fade into existence, and then fade away at the end of their duration.

Figure 38:
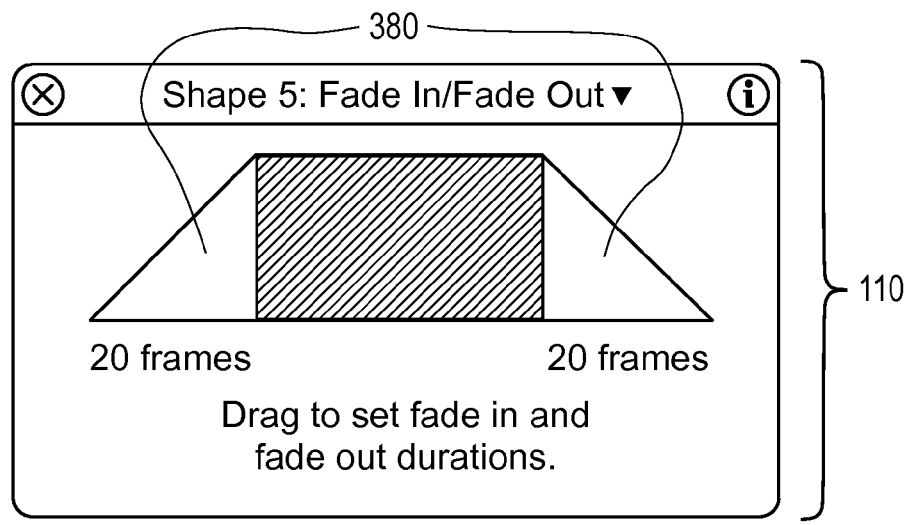
FIG. 38 illustrates a Dashboard for a Fade In/Fade Out behavior, according to one embodiment of the invention.

Dashboard Control—In one embodiment, the Dashboard 110 lets a user control the Fade In and Fade Out durations, equivalent to the Fade In Time and Fade Out Time parameters. In one embodiment, drag anywhere within the shaded area of the Fade In or the Fade Out ramps 380 to adjust their durations. In another embodiment, the user can extend the durations of the Fade In or Fade Out past the limits of the graphical dashboard control. FIG. 38 illustrates a Dashboard for a Fade In/Fade Out behavior, according to one embodiment of the invention.

Parameters in the Inspector—In one embodiment, the following parameters for the Fade In/Fade Out behavior are available in the Inspector:

Fade In Time—In one embodiment, the Fade In Time parameter is set by slider defining the duration, in frames, that the object will fade in, from 0 to 100 percent opacity, from the first frame of the object. In one embodiment, a duration of 0 frames results in a straight cut into the object, making it appear instantly.

Fade Out Time—In one embodiment, the Fade Out Time parameter is set by a slider defining the duration, in frames, that the object will fade out, from 100 to 0 percent opacity, from the last frame of the object. In one embodiment, a duration of 0 frames results in a straight cut away from the object, making it disappear instantly.

Start Offset—In one embodiment, the Start Offset parameter is set by a slider that lets a user delay the beginning of the behavior's effect relative to the first frame of its position in the Timeline. In one embodiment, adjust this parameter to make the behavior start later. In another embodiment, this parameter is in frames.

End Offset—In one embodiment, the End Offset parameter is set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the end of the fade out for the remaining duration of the object. In yet another embodiment, trimming the end of the behavior resets the object to its original opacity.

b. Grow/Shrink

In one embodiment

In one embodiment, the Grow/Shrink behavior affects an object's Scale parameter. In one embodiment, use the Grow/Shrink behavior to animate the scale of an object, enlarging or reducing the object's size over time at a speed defined by the Scale Rate. In another embodiment, the Grow/Shrink effect always begins at the object's original size at the first frame of the behavior.

In one embodiment, the Grow/Shrink behavior is a good behavior to use with high-resolution graphics to zoom into an image, such as a map or photograph. In one embodiment, a user can also combine this behavior with the Throw or Wind behavior to pan across the image while zooming into it. In another embodiment, the Grow/Shrink behavior can also be used to emphasize or de-emphasize images in a project. In yet another embodiment, a user can enlarge objects to make them the center of attention, or shrink an object while introducing another object to move the viewer's eye to the new element.

Figure 39:
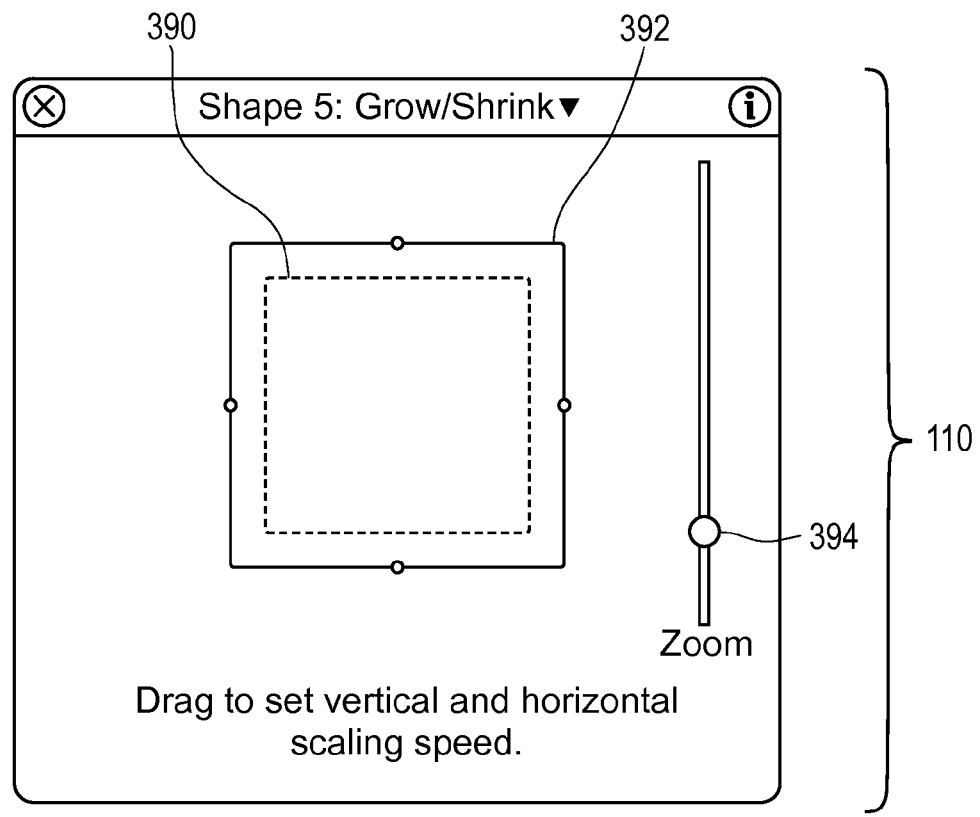
FIG. 39 illustrates a Dashboard for a Grow/Shrink behavior, according to one embodiment of the invention.

Dashboard Control—In one embodiment, the Grow/Shrink Dashboard 110 consists of two rectangular regions. In one embodiment, the first 390 is a rectangle with a dotted line that represents the original size of the object. In another embodiment, the second 392 is a solid rectangle that represents the target size, and can be resized by dragging any of the borders. In yet another embodiment, enlarge the box to grow the target object, or reduce the box to shrink it. In one embodiment, a slider 394 to the right lets a user adjust the scale of the Dashboard controls, increasing or decreasing the effect the controls have over the object. FIG. 39 illustrates a Dashboard for a Grow/Shrink behavior, according to one embodiment of the invention.

Parameters in the Inspector—In one embodiment, the following parameters for the Grow/Shrink behavior are available in the Inspector:

Increment—In one embodiment, the Increment parameter is set by a pop-up menu that lets the user choose how the behavior's effect progresses over its duration in the Timeline. In one embodiment, there are two options:

Continuous Rate—In one embodiment, this option uses the Scale Rate parameter to grow or shrink the object by a steady number of pixels per second.

Ramp to Final Value—In one embodiment, this option grows or shrinks the object from its original size to the specified percentage in the Scale To parameter.

Scale Rate/Scale To—In one embodiment, depending on the option selected in the Increment pop-up menu, the Scale Rate or Scale To parameter defines the speed and magnitude of the effect. In one embodiment, this parameter can be opened into X and Y sub-parameters by clicking the disclosure triangle to the left. In another embodiment, this lets the user adjust the horizontal or vertical scale independently.

Curvature—In one embodiment, the Curvature parameter lets a user adjust the acceleration with which this behavior transitions from the original to the final size. In one embodiment, higher Curvature values result in an easing into the effect, where the object slowly starts to change size, and this change gradually speeds up as the behavior continues. In another embodiment, curvature does not affect the overall duration of the effect, since the duration is defined by the length of the behavior in the Timeline, minus the End Offset.

End Offset—In one embodiment, the End Offset parameter is set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the end of the Grow/Shrink effect for the remaining duration of the object. In yet another embodiment, trimming the end of the behavior resets the object to its original scale.

c. Motion Path

Figure 40:
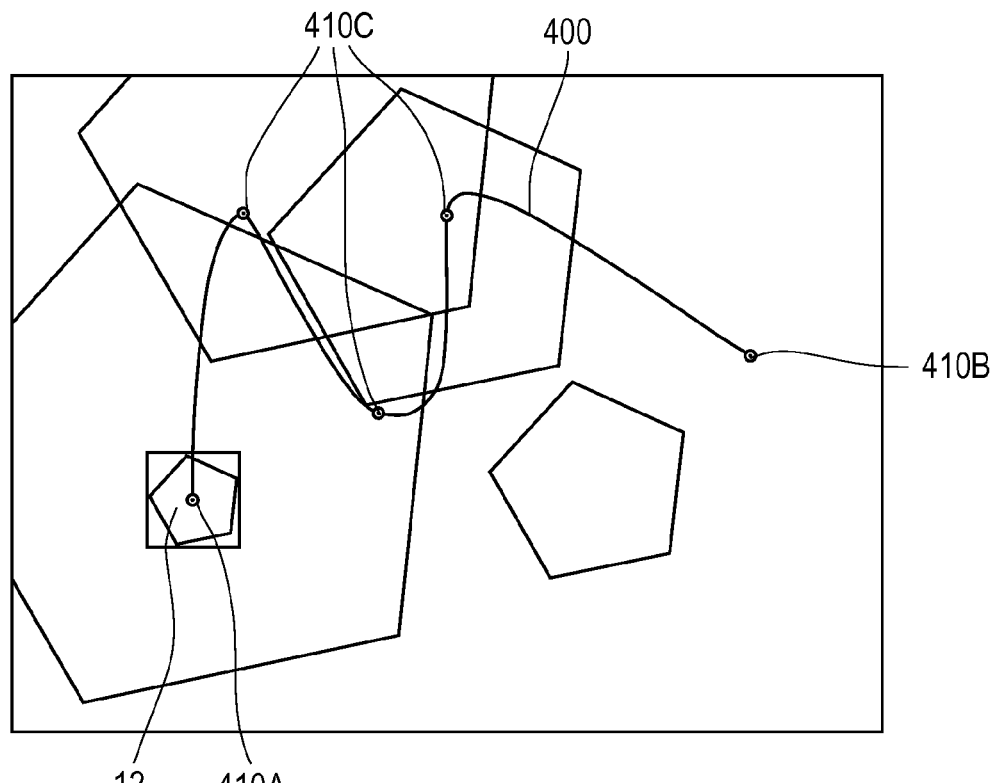
FIG. 40 illustrates a Motion Path behavior, including curves, applied to an object, according to one embodiment of the invention.

In one embodiment, the Motion Path behavior 10 affects an object's 12 position parameter. In one embodiment, the Motion Path behavior lets a user create a motion path 400 for an object 12 to follow. In another embodiment, when a user first applies the Motion Path behavior to an object 12, it defaults to a straight path 400 defined by two points at the beginning 410A and end 410B of the motion path 400. In yet another embodiment, the first point 410A on the path is the position of the object 12 in the Canvas at the first frame of the behavior. In one embodiment, a user can double-click or Option-click anywhere on the path to add bezier points 410C to the path, which allow the user to reshape the motion path by creating curves. FIG. 40 illustrates a Motion Path behavior, including curves, applied to an object, according to one embodiment of the invention.

In one embodiment, upon playback, the object moves along the assigned path. In one embodiment, the speed at which the target object travels is defined by the duration of the behavior, minus the End Offset parameter. In another embodiment, the Speed parameter lets a user create acceleration and deceleration at the beginning and end of the behavior. In yet another embodiment, the Motion Path behavior is an easy way to create predictable motion without having to make keyframes for it in the Keyframe Editor.

Dashboard Control—In one embodiment, the Motion Path Dashboard lets a user set the Speed parameter using a pop-up menu, with options for Linear, Ease In, Ease Out, or Both.

Additional Canvas Controls—In one embodiment, the motion path a user creates in the Canvas can be adjusted by adding points to the default motion path, and using the tangent controls attached to each point to adjust each curve.

Parameters in the Inspector—In one embodiment, the following parameters for the Motion Path behavior are available in the Inspector:

Speed—In one embodiment, the Speed parameter lets a user set how the object will accelerate from the first to the last point in the motion path. In one embodiment, there are four options:

Linear—In one embodiment, the object moves at a steady speed from the first to the last point on the motion path.

Ease In—In one embodiment, the object starts at a steady speed, and then slows down as it gradually decelerates to a stop at the last point of the motion path.

Ease Out—In one embodiment, the object slowly accelerates from the first point on the motion path, reaching and maintaining a steady speed through the last point on the motion path.

Ease Both—In one embodiment, the object slowly accelerates from the first point on the motion path, and then slows down as it gradually decelerates to a stop at the last point of the motion path.

End Offset—In one embodiment, the End Offset parameter is set by a slider that lets a user offset the end of the behavior's effect relative to the last frame its position in the Timeline, in frames. In one embodiment, adjust this parameter to make the object reach the end of the motion curve before the actual end of the behavior in the Timeline. In another embodiment, using this slider to stop the effect, instead of trimming the end of the behavior in the Timeline, freezes the object at the end of the motion path for the remaining duration of the object. In yet another embodiment, trimming the end of the behavior resets the object to its original position.

Related Behaviors—In one embodiment, behaviors related to Motion Path include Gravity, Random Motion, Throw, and Wind.

d. Snap Alignment to Motion

Figure 41:
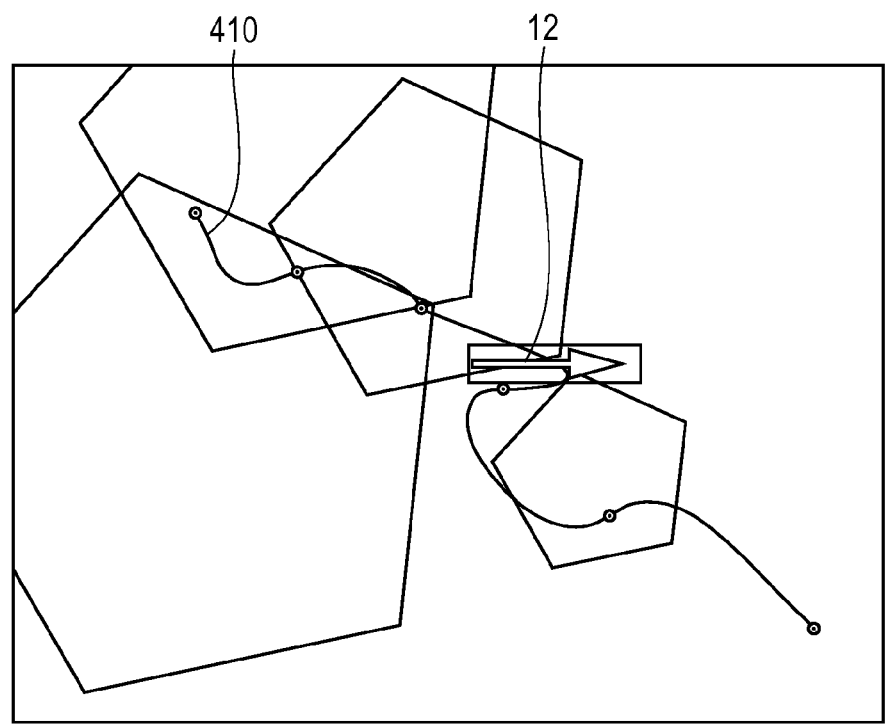
FIG. 41 illustrates an object moving along a motion path, according to one embodiment of the invention.
Figure 42:
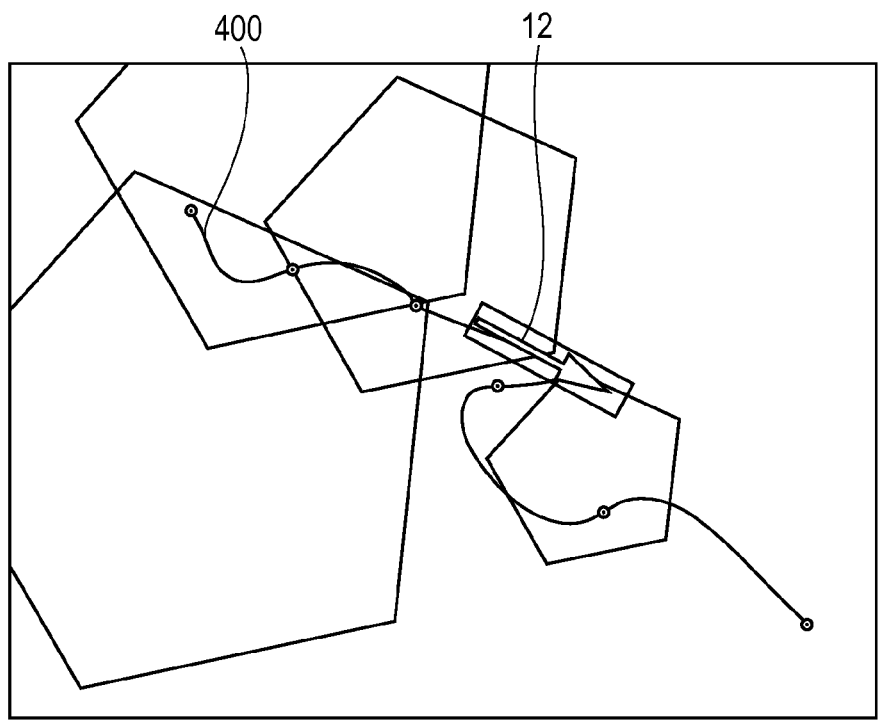
FIG. 42 illustrates the same object as in FIG. 41, but also with a Snap Alignment to Motion behavior applied to the object, according to one embodiment of the invention.

In one embodiment, the Snap Alignment to Motion behavior affects an object's 12 Rotation parameter. In one embodiment, the Snap Alignment to Motion behavior aligns the rotation of an object 12 to match all changes made to its position along a motion path 400. In one embodiment, this behavior is meant to be combined with behaviors that animate the position of an object 12, or with a keyframed motion path 400 a user creates himself. FIG. 41 illustrates an object moving along a motion path, according to one embodiment of the invention. FIG. 42 illustrates the same object as in FIG. 41, but also with a Snap Alignment to Motion behavior applied to the object, according to one embodiment of the invention.

Dashboard Control—In one embodiment, the Snap Alignment to Motion Dashboard has a pop-up menu to control the Axis used to adjust the object's alignment and a checkbox to let the user invert the Axis.

Parameters in the Inspector—In one embodiment, the following parameters are available for the Snap Alignment to Motion behavior in the Inspector:

Axis—In one embodiment, the Axis parameter is set by a pop-up menu that lets a user specify whether the object aligns itself on its Horizontal or Vertical axis.

Invert Axis—In one embodiment, if the object is aligning on the correct axis, but appears backwards, the Invert Axis checkbox flips the object so that it is facing the proper direction.

Related Behaviors—In one embodiment, behaviors related to Snap Alignment to Motion include Align to Motion.

e. Spin

In one embodiment, the Spin behavior affects an object's Rotation parameter. In one embodiment, apply the Spin behavior to animate the rotation of an object, spinning it either clockwise or counter-clockwise. In another embodiment, if a user trims the end of the Spin behavior to be shorter than the duration of the object to which it is applied, the object remains at the angle of the last frame of the behavior.

In one embodiment, uses for spin are fairly obvious, but another way to use the Spin behavior is with objects that have an off-center anchor point. In one embodiment, since objects rotate about the anchor point, if a user changes an object's anchor point before he applies a spin behavior to it, he can quickly change the look of the motion he creates.

Figure 43:
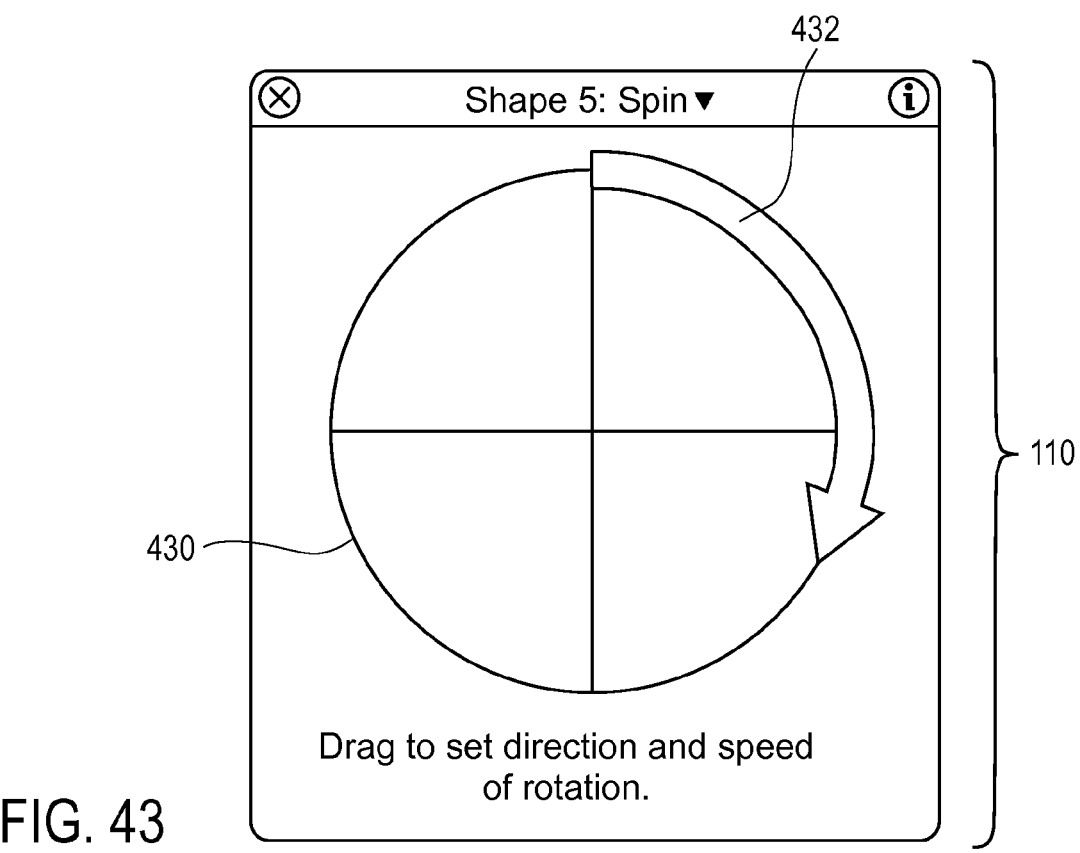
FIG. 43 illustrates a Dashboard for a Spin behavior, according to one embodiment of the invention.

Dashboard Control—In one embodiment, the Spin behavior's Dashboard 110 control is a ring 430. In one embodiment, drag anywhere within the ring to manipulate an arrow 432 that indicates the direction the object spins. In another embodiment, adjust the length of the arrow 432 to change the speed at which the spinning will occur. FIG. 43 illustrates a Dashboard for a Spin behavior, according to one embodiment of the invention.

Parameters in the Inspector—In one embodiment, the following parameters are available for the Spin behavior in the Inspector:

Increment—In one embodiment, the Increment parameter is set by a pop-up menu that lets a user choose how the behavior's effect progresses over its duration in the Timeline. In one embodiment, there are two options:

Continuous Rate—In one embodiment, this option uses the Spin Rate parameter to spin the object by a steady number of degrees per second.

Ramp to Final Value—In one embodiment, this option spins the object for the number of degrees specified in the Spin To parameter over the duration of the behavior in the Timeline.

Spin Rate/Spin To—In one embodiment, the Spin Rate/Spin To parameter is set by a dial that controls the speed at which the object spins. In one embodiment, the Spin Rate defines a continuous rate of spin in degrees per second. In another embodiment, Spin To defines a number of degrees to spin over that object's duration. In yet another embodiment, negative values result in clockwise motion, while positive values result in counter-clockwise motion.

f. Throw

In one embodiment, the Throw behavior affects an object's position parameter and is the simplest way of setting an object in motion. In one embodiment, the Throw behavior controls let a user adjust the speed and direction of a single force that is exerted on the object at the first frame of the behavior. In another embodiment, after this initial force is applied, the object continues drifting in a straight line, and at the same speed, for the duration of the Throw behavior.

In one embodiment, a simple example of the Throw behavior in use is to send a series of offscreen text objects moving across the screen. In one embodiment, when used in conjunction other behaviors such as Grow/Shrink and Fade In/Fade Out, a user can create sophisticated moving titles without keyframing a single parameter. In another embodiment, the Throw behavior does not apply a continuous force, nor can a user create gradual changes in direction or speed using this behavior alone. In yet another embodiment, keyframed changes to the Throw behavior are instantly applied at the frame they appear, resulting in abrupt motion.

In one embodiment, the Throw behavior is useful when the user is moving an object through a simulation, for example, a project in which he has arranged a number of other objects with attract or repel behaviors applied to them. In one embodiment, since the Throw behavior only applies a single force to move the target object at the initial frame of the behavior, any other behaviors that interact with the target object will have greater influence over its motion. In another embodiment, if a user wants to apply a continuous force to an object, use the Wind behavior. In yet another embodiment, if a user needs a more complex motion path, use the Motion path behavior.

Figure 44:
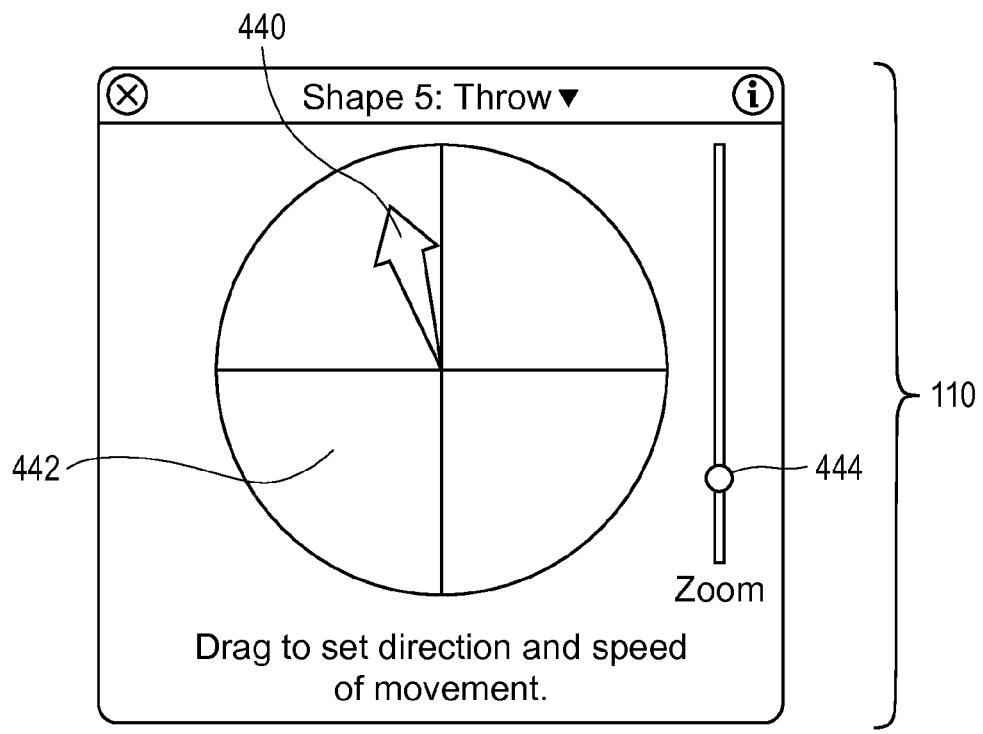
FIG. 44 illustrates a Dashboard for a Throw behavior, according to one embodiment of the invention.

Dashboard Control—In one embodiment, the Throw behavior's Dashboard 110 lets a user specify the direction and speed of the throw behavior by dragging an arrow 440 within a circular region 442. In one embodiment, the direction of the arrow 440 defines the direction of movement, and the length of the arrow 440 defines speed. In another embodiment, a slider 444 to the right lets the user adjust the scale of the Dashboard control, increasing or decreasing the effect the control has over the object 12. In yet another embodiment, the maximum speed a user can define with the Dashboard is not the maximum possible speed. In one embodiment, higher values can be entered into the Rate or Final Value parameter in the Behaviors tab of the Inspector. FIG. 44 illustrates a Dashboard for a Throw behavior, according to one embodiment of the invention.

Parameters in the Inspector—In one embodiment, the following parameters are available for the Throw behavior in the Inspector:

Increment—In one embodiment, the Increment parameter is set by a pop-up menu that lets the user choose how the behavior's effect progresses over its duration in the Timeline. In one embodiment, there are two options:

Rate—In one embodiment, this option sets the speed of the object at a steady number of pixels per second, specified in the Throw Velocity parameter.

Final Value—In one embodiment, this option moves the object from its original position to the specified distance (in pixels) in the Throw distance parameter.

Throw Velocity/Throw Distance—In one embodiment, when the Increment pop-up menu is set to Rate, the Throw Velocity parameter appears which lets a user set a continuous speed for the object to move. In one embodiment, when the Increment pop-up menu is set to Final Value, the Throw Distance parameter appears, which sets a total distance (in pixels) for the object to travel over its duration.

Related Behaviors—In one embodiment, behaviors related to Throw include Motion Path, Gravity, Random Motion, and Wind.

ii. Parameter Behaviors

In one embodiment, parameter behaviors can be applied to any object parameter, and their effects are limited to just that parameter. In one embodiment, the same parameter behavior can be added to different parameters, resulting in completely different effects. In another embodiment, for example, a user can apply the oscillate behavior to the opacity of an object to make the object fade in and out, or he can apply it to the rotation of an object to make the object rock back and forth. In yet another embodiment, a user can also apply parameter behaviors to filter parameters, Generator parameters, the parameters of particle systems, or even the parameters of other behaviors. In one embodiment, examples of parameter behaviors include Oscillate, Randomize, and Reverse.

a. Average

In one embodiment, the Average behavior smooths the transition from one value to another caused by keyframes and behaviors that are applied to a parameter. In one embodiment, use the Average behavior to smooth out animated effects. In another embodiment, averaged motion moves more fluidly, while averaged changes to parameters such as Opacity and to filter parameters appear to happen more gradually. In yet another embodiment, use the Window Size parameter to adjust the amount by which to smooth the affected parameter. In one embodiment, the Average behavior can be used to smooth out the sequence of values generated by a Randomize behavior.

Dashboard Control—In one embodiment, the Average behavior's Dashboard lets the user adjust the Window Size parameter.

Parameters in the Inspector—In one embodiment, the following parameters are available for the Average behavior in the Inspector:

Window Size—In one embodiment, the Window Size parameter is set by a slider that lets a user adjust the amount of smoothing to apply to the affected parameter by specifying the number of adjacent keyframes to average together. In one embodiment, higher values apply more smoothing by averaging a wider range of values, resulting in more fluid animation. In another embodiment, lower values average a narrower range of values, and apply less smoothing with values that are closer to the original.

Apply To—In one embodiment, the Apply To pop-up menu shows the parameter being affected, and can be used to reassign the behavior to another parameter.

Related Behaviors—In one embodiment, behaviors related to Average include Negate and Reverse.

b. Custom

In one embodiment, the Custom behavior allows a user to create his own custom behaviors.

c. Negate

Figure 45:
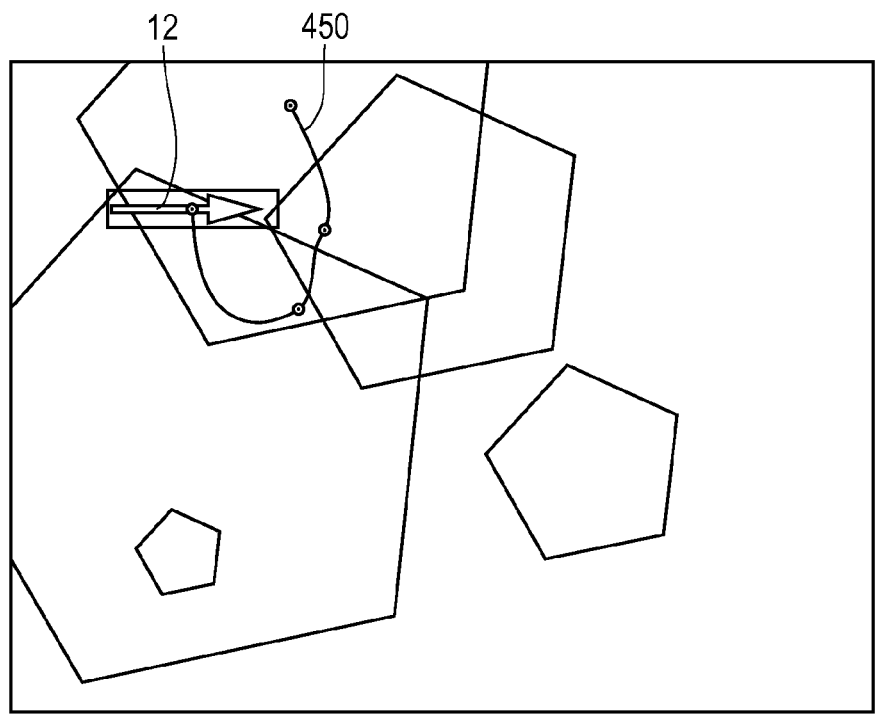
FIG. 45 illustrates a motion path behavior applied to an object, according to one embodiment of the invention.
Figure 46:
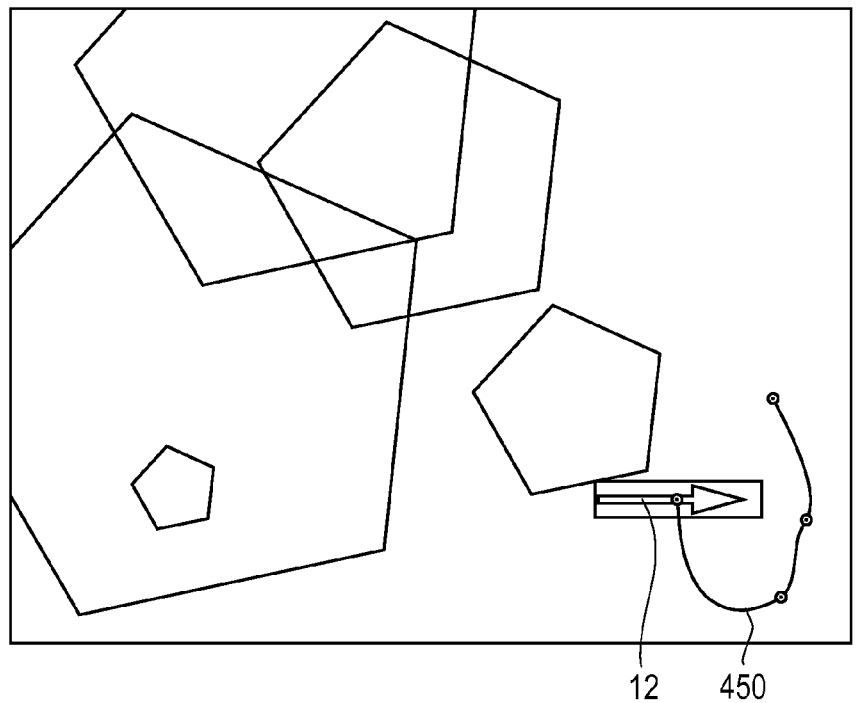
FIG. 46 illustrates a motion path behavior applied to an object, and a Negate behavior applied to the object's Position parameter, according to one embodiment of the invention.

In one embodiment, the Negate behavior 10 inverts the value of each keyframe 300 and behavior effect in the parameter to which it is applied. In one embodiment, the Negate behavior basically flips each parameter value to its opposite. In another embodiment, motion paths 450 are flipped, rotation is reversed, and any effect's parameter will be changed to its opposite. In yet another embodiment, for example, applying the Negate behavior to the Position parameter of an object 12 with a Motion Path behavior applied results in the motion path 450 being flipped. FIG. 45 illustrates a motion path behavior applied to an object, according to one embodiment of the invention. FIG. 46 illustrates a motion path behavior applied to an object, and a Negate behavior applied to the object's Position parameter, according to one embodiment of the invention.

Dashboard Control—In one embodiment, there are no Dashboard controls for the Negate behavior.

Parameters in the Inspector—In one embodiment, the following parameters are available for the Negate behavior in the Inspector:

Apply To—In one embodiment, the Apply To pop-up menu shows the parameter being affected, and can be used to reassign the behavior to another parameter.

Related Behaviors—In one embodiment, behaviors related to Negate include Average and Reverse.

d. Oscillate

In one embodiment, the Oscillate behavior animates a parameter by cycling the parameter between two different values. In one embodiment, a user can customize how widely apart the high and low values are, as well as the number of oscillations per second.

In one embodiment, the Oscillate behavior can create all kinds of cyclical effects. In one embodiment, for example, if a user applies the Oscillate behavior to the rotation property of an object, the object will begin to rock back and forth. In another embodiment, this happens because the rotation property cycles back and forth between the initial rotation value plus and minus the Amplitude value that is set in the Oscillate behavior. In yet another embodiment, applying the Oscillate behavior to the X value of the scale parameter instead causes the width of the object to cycle, and it repeatedly stretches and compresses for the duration of the behavior.

Figure 47:
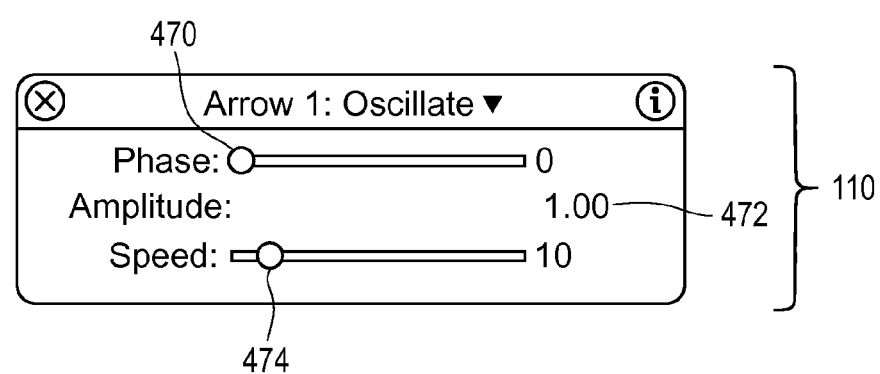
FIG. 47 illustrates a Dashboard for an Oscillate behavior, according to one embodiment of the invention.

Dashboard Control—In one embodiment, the Oscillate Dashboard 110 lets a user adjust the Phase 470, Amplitude 472, and Speed 474 of the Oscillate behavior. FIG. 47 illustrates a Dashboard for an Oscillate behavior, according to one embodiment of the invention.

Parameters in the Inspector—In one embodiment, the following parameters are available for the Oscillate behavior in the Inspector:

Phase—In one embodiment, the Phase parameter can be set by a slider that lets a user adjust the point of the specified oscillation the behavior starts at. In one embodiment, this parameter allows the user to put multiple objects with identical Oscillation behaviors out of phase with one another so that they don't all look the same.

Amplitude—In one embodiment, the Amplitude parameter can be set by a slider that lets a user adjust the maximum value, which defines the beginning and end of each oscillation. In one embodiment, higher values result in more extreme swings from the beginning to the ending of each oscillation.

Speed—In one embodiment, the Speed parameter can be set by a slider that lets a user adjust the speed at which the oscillation occurs, in oscillations per second. In one embodiment, higher values result in faster oscillations.

Start Offset—In one embodiment, the Start Offset parameter can be set by a slider that lets a user delay the beginning of the behavior's effect relative to the first frame of its position in the Timeline. In one embodiment, adjust this parameter to make the behavior start later. In another embodiment, this parameter is in frames.

End Offset—In one embodiment, the End Offset parameter can be set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the end of the effect for the remaining duration of the object. In yet another embodiment, trimming the end of the behavior resets the object to its original parameters.

Apply To—In one embodiment, the Apply To pop-up menu shows the parameter being affected, and can be used to reassign the behavior to another parameter.

Related Behaviors—In one embodiment, behaviors related to Oscillate include Ramp and Rate.

e. Ramp

In one embodiment, the Ramp behavior lets a user create a gradual transition, in any parameter, from the Start Value to the End Value. In one embodiment, the speed of the transition is defined by the length of the Ramp behavior in the Timeline. In another embodiment, additional parameters allow a user to define how the transition occurs, whether it is at a single continuous speed, or whether it accelerates over time. In yet another embodiment, ramp is a versatile behavior. In one embodiment, if a user applies the Ramp behavior to the Scale property, it works like the Grow/Shrink behavior. In another embodiment, if a user applies it to the opacity property, he can fade an object in or out in different ways. In yet another embodiment, although a user can use the Ramp behavior to mimic other behaviors, it can be applied to any parameter he wants.

In one embodiment, for example, suppose a user is animating different segments of a bar graph, and each segment needs to grow until it reaches a specific height. Once the user has arranged the different bars in the graph in the Canvas, he can apply Ramp behaviors to the Y values of the Four Corner Top Right and Top Left parameters of each bar, and set the End Value parameters of each object's pair of Ramp behaviors to the height he wants each bar to reach.

Dashboard Control—In one embodiment, the Ramp Dashboard lets a user adjust the Ramp's Start Value, End Value, and Curvature.

Parameters in the Inspector—In one embodiment, the following parameters are available for the Ramp behavior in the Inspector:

Start Value—In one embodiment, the Start Value is the value that's applied at the first frame of the Ramp behavior.

End Value—In one embodiment, the End Value is the value the Ramp behavior reaches at the last frame of the behavior. In one embodiment, over the life of the behavior, the parameter the Ramp behavior is applied to makes a transition from the Start Value to the End Value.

Curvature—In one embodiment, the Curvature parameter lets a user ease the acceleration with which the Ramp behavior transitions from the Start Value to the End Value. In one embodiment, higher Curvature values result in an Ease In effect, where the value slowly begins the transition, and gradually speeds up as the behavior continues. In another embodiment, curvature does not affect the overall duration of the effect, since that is defined by the length of the behavior in the Timeline.

Start Offset—In one embodiment, the Start Offset parameter is set by a slider that lets a user delay the beginning of the behavior's effect relative to the first frame of its position in the Timeline. In one embodiment, adjust this parameter to make the behavior start later. In another embodiment, this parameter is in frames.

End Offset—In one embodiment, the End Offset parameter is set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the end of the effect for the remaining duration of the object. In yet another embodiment, trimming the end of the behavior resets the object to its original parameter.

Apply To—In one embodiment, the Apply To pop-up menu shows the parameter being affected, and can be used to reassign the behavior to another parameter.

Related Behaviors—In one embodiment, behaviors related to Ramp include Oscillate and Rate.

f. Randomize

In one embodiment, the Randomize behavior creates a continuous sequence of randomly increasing and decreasing values, based on the parameters defining the range and type of values that are generated. In one embodiment, although the values created with this behavior are random, they're actually predetermined by the parameter settings chosen by the user. In another embodiment, as long as the user doesn't change the parameters, the frame-by-frame values created by this behavior remain the same. In yet another embodiment, if a user doesn't like the values that were randomly generated, click the Generate button in the Behavior tab in the Inspector to pick a new random seed number. In one embodiment, this number is used to generate a new sequence of values.

In one embodiment, the Apply Mode parameter determines how values generated by this behavior are combined with other behaviors and keyframes that affect the same parameter. In one embodiment, this provides a user with different ways of using a Randomize behavior to modify a parameter's pre-existing values. In another embodiment, the Randomize behavior is useful for creating jittery effects, such as twitchy rotation, flickering opacity, and other effects requiring rapid and varied changes over time that would be time-consuming to keyframe. In yet another embodiment, the Randomize behavior can be modified with other behaviors, such as Average and Negate, to exercise further control over the values being generated.

Dashboard Control—In one embodiment, the Randomize Dashboard has controls for Amount, Frequency, Wriggle Offset, Noisiness, Link, Start Offset, and End Offset.

Parameters in the Inspector—In one embodiment, the following parameters are available for the Randomize behavior in the Inspector:

Amount/Multiplier—In one embodiment, the Amount/Multiplier parameter is set to Amount when the Apply Mode is set to Add or Subtract, and Multiplier when the Apply Mode is set to Multiply. In one embodiment, this parameter defines the maximum value the Randomize behavior will generate.

Apply Mode—In one embodiment, the Apply Mode pop-up menu determines how values generated by this behavior are combined with other behaviors and keyframes that affect the same parameter. In one embodiment, this provides a user with different ways of using a Randomize behavior to modify a parameter's preexisting values. In another embodiment, the options are Add, Subtract, or Multiply.

Frequency—In one embodiment, the Frequency parameter is set by a slider that lets a user adjust the amount of random variation per second. In one embodiment, higher values will generate faster variations, whereas lower values will generate slower variations.

Wriggle Offset—In one embodiment, the Wriggle Offset parameter allows a user to offset the sequence of random values when he wants to apply the same randomize behavior to multiple objects. In one embodiment, by offsetting each object's version of the Randomize behavior, a user can prevent them from moving in sync.

Noisiness—In one embodiment, the Noisiness parameter adds an additional overlay of random variance to the Frequency the user has set. In one embodiment, higher Noisiness values results in more erratic variations in the affected parameter.

Link—In one embodiment, the Link parameter appears when the user applies this behavior to a two-dimensional parameter, such as Position or Scale, that consists of X and Y values. In one embodiment, turn this checkbox on to keep the behavior's effect on each value proportional.

Random Seed—In one embodiment, a button lets a user pick a new random seed number. In one embodiment, this number is used to randomly generate new sequences of values, based on the other parameters of this behavior.

Start Offset—In one embodiment, a slider lets a user delay the beginning of the behavior's effect relative to the first frame of its position in the Timeline. In one embodiment, adjust this parameter to make the behavior start later. In one embodiment, this parameter is in frames.

End Offset—In one embodiment, the End Offset parameter is set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the last random value generated by this behavior for the remaining duration of the object. In yet another embodiment, trimming the end of the behavior resets the parameter to its original value.

Related Behaviors—In one embodiment, behaviors related to Randomize include Random Motion and Wriggle.

g. Rate

In one embodiment, the Rate behavior increases a parameter's value over time, with the rate of increase determined by the Rate slider. In one embodiment, to use the Rate parameter to decrease a parameter over time, apply the Negate behavior after it.

Dashboard Control—In one embodiment, the Rate Dashboard has controls for Rate and Curvature.

Parameters in the Inspector—In one embodiment, the following parameters are available for the Rate behavior in the Inspector:

Rate—In one embodiment, the Rate parameter is set by a slider that lets a user set a rate of increase over time for the affected parameter. In one embodiment, the Rate parameter is measured in percentage increase per second.

Curvature—In one embodiment, the Curvature parameter lets a user adjust the acceleration with which the Rate behavior gets up to speed. In one embodiment, higher Curvature values result in an Ease In effect, where the value begins slowly, gradually reaching the target speed as the behavior continues. In another embodiment, curvature does not affect the overall duration of the effect, since that is defined by the length of the behavior in the Timeline.

Apply To—In one embodiment, the Apply To pop-up menu shows the parameter being affected, and can be used to reassign the behavior to another parameter.

Related Behaviors—In one embodiment, behaviors related to Rate include Oscillate and Ramp.

h. Reverse

In one embodiment, the Reverse behavior reverses the direction of any animation affecting a parameter, whether the animation is caused by behaviors or keyframes. In one embodiment, in some instances, the Reverse and Negate behaviors have the same effect. In another embodiment, in other instances, their effects are very different. In yet another embodiment, for example, applying the Negate parameter flips an object's motion path, while applying the Reverse behavior leaves the motion path alone, reversing the object's motion, instead.

Dashboard Control—In one embodiment, there are no Dashboard controls for the Reverse behavior.

Parameters in the Inspector—In one embodiment, several parameters are available for the Reverse behavior in the Inspector.

Related Behaviors—In one embodiment, behaviors related to Reverse include Average and Negate.

i. Stop

In embodiment, the Stop behavior suspends the animation of all behaviors that:

are below it in the Layers tab also affect the parameter to which Stop is applied begin prior to Stop's in point in the Timeline In one embodiment, each behavior's effect on the object is frozen at the parameters at the first frame of the Stop behavior in the Timeline. In another embodiment, keyframes that are applied to that parameter are disabled for the duration of the stop behavior in the Timeline. In yet another embodiment, if the Stop behavior is shorter then the object to which it is applied, all keyframes and behaviors affecting that channel immediately take effect after the last frame of the Stop behavior.

Dashboard Control—In one embodiment, there is no Dashboard control for the Stop behavior.

Parameters in the Inspector—In one embodiment, the following parameters are available for the Stop behavior in the Inspector:

Apply To—In one embodiment, the Apply To pop-up menu shows the parameter being stopped, and can be used to reassign the stop behavior to another parameter.

j. Wriggle

In one embodiment, this behavior works similarly to the Randomize behavior, but with a slower effect.

Dashboard Control—In one embodiment, the Wriggle Dashboard has controls for Amount, Frequency, Wriggle Offset, Noisiness, Link, Start Offset, and End Offset.

Parameters in the Inspector—In one embodiment, the following parameters are available for the Wriggle behavior in the Inspector:

Amount/Multiplier—In one embodiment, the Amount/Multiplier parameter is set to Amount when the Apply Mode is set to Add or Subtract, and Multiplier when the Apply Mode is set to Multiply. In one embodiment, this parameter defines the maximum value the Randomize behavior will generate.

Apply Mode—In one embodiment, the Apply Mode parameter is set by a pop-up menu that determines how values generated by this behavior are combined with other behaviors and keyframes that affect the same parameter. In one embodiment, this provides a user with different ways of using a Randomize behavior to modify a parameter's preexisting values. In one embodiment, the options are Add, Subtract, or Multiply.

Frequency—In one embodiment, the Frequency parameter is set by a slider that lets a user adjust the amount of random variation per second. In one embodiment, higher values will generate faster variations, whereas lower values will generate slower variations.

Wriggle Offset—In one embodiment, the Wriggle Offset parameter is set by a slider that allows a user to offset the sequence of random values when he wants to apply the same randomize behavior to multiple objects. In one embodiment, by offsetting each object's version of the Wriggle behavior, a user can prevent them from moving in sync.

Noisiness—In one embodiment, the Noisiness parameter is set by a slider that adds an additional overlay of random variance to the Frequency the user has set. In one embodiment, higher Noisiness values result in more erratic variations in the affected parameter.

Link—In one embodiment, the Link parameter appears when a user applies this behavior to a two-dimensional parameter, such as Position or Scale, that consists of X and Y values. In one embodiment, turn this checkbox on to keep the behavior's effect on each value proportional.

Random Seed—In one embodiment, the Random Seed parameter is set by a button that lets a user pick a new random seed number. In one embodiment, this number is used to randomly generate new sequences of values, based on the other parameters of this behavior.

Start Offset—In one embodiment, the Start Offset parameter is set by a slider that lets a user delay the beginning of the behavior's effect relative to the first frame of its position in the Timeline. In one embodiment, adjust this parameter to make the behavior start later. In another embodiment, this parameter is in frames.

End Offset—In one embodiment, the End Offset parameter is set by a slider that lets a user offset the end of the behavior's effect relative to the last frame of its position in the Timeline, in frames. In one embodiment, adjust this parameter to make the behavior stop before the actual end of the behavior in the Timeline. In another embodiment, using this slider to stop the effect, instead of trimming the end of the behavior in the Timeline, freezes the last random value generated by this behavior for the remaining duration of the object. In yet another embodiment, trimming the end of the behavior resets the parameter to its original value.

Related Behaviors—In one embodiment, behaviors related to Wriggle include Random Motion and Randomize.

iii. Simulation Behaviors

In one embodiment, simulation behaviors perform one of two tasks. In one embodiment, some simulation behaviors, such as Gravity, animate the parameters of an object in a way that simulates a real-world phenomenon. In another embodiment, other simulation behaviors, such as Attractor and Repel, affect the parameters of one or more objects surrounding the object to which they're applied. In yet another embodiment, these behaviors allow a user to create some very sophisticated interactions among multiple objects in a project with a minimum of adjustments. In one embodiment, like the basic motion behaviors, simulation behaviors also affect specific object parameters. In another embodiment, examples of simulation behaviors include Attractor, Gravity, and Repel.

a. Align To Motion

In one embodiment, the Align To Motion behavior affects an object's Rotation parameter. In one embodiment, the Align To Motion behavior changes the rotation of an object to match changes made to the object's direction along a motion path. In one embodiment, this behavior is meant to be combined with behaviors that animate the position of an object, or with a keyframed motion path created by a user.

In one embodiment, unlike the Snap Alignment to Motion behavior, which produces absolute changes in rotation that precisely match changes in direction, Align to Motion has a springy effect, and creates a more lively effect. In one embodiment, for example, if a user has a graphic of a rocket to which he has applied a Motion Path behavior, he can add the Align To behavior to make the rocket point in the direction it is moving. In another embodiment, by adjusting the Drag parameter, he can make it careen wildly about its anchor point as it goes around turns in the motion path.

Dashboard Control—In one embodiment, the Align to Motion Dashboard has controls for Axis, Invert Axis, Spring Tension, and Drag.

Parameters in the Inspector—In one embodiment, the following parameters are available for the Align to Motion behavior in the Inspector:

Axis—In one embodiment, the Axis parameter is set by a pop-up menu that lets a user align the target object's rotation to the X or Y value of its position.

Invert Axis—In one embodiment, the Invert Axis parameter is set by a checkbox that flips the orientation with which the object aligns itself to the motion.

Spring Tension—In one embodiment, the Spring Tension parameter is set by a slider that adjusts how quickly the object's rotation changes to match a change in the object's direction. In one embodiment, lower values create a delay between a change to an object's position and its subsequent change in rotation. In another embodiment, higher values create more responsive changes in rotation.

Drag—In one embodiment, the Drag parameter is set by a slider that adjusts whether or not the change in rotation made by this behavior overshoots the new direction of the object. In one embodiment, low drag values result in springy changes in rotation, where the object rotates back and forth as it overshoots changes in direction. In another embodiment, high drag values dampen this effect, making the object's rotation stick more closely to the changes made in direction.

Related Behaviors—In one embodiment, behaviors related to Align To Motion include Snap Alignment to Motion.

b. Attracted To

In one embodiment, the Attracted To behavior is part of a group of simulation behaviors that let a user create complex animated relationships between two or more objects. In one embodiment, these behaviors are extremely powerful, and allow complicated effects to be created with a minimum of steps.

Figure 48:
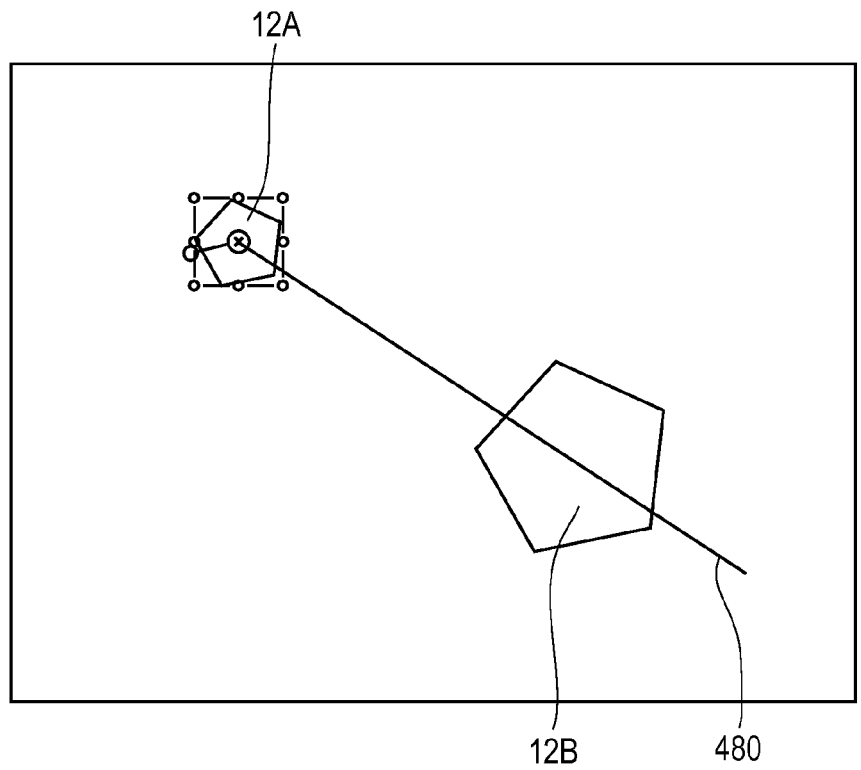
FIG. 48 illustrates two objects (an attracting object and an attracted object) and a motion path 480 of the latter object, according to one embodiment of the invention.

In one embodiment, the Attracted To behavior affects an object's Position parameter. In one embodiment, an object with the Attracted To behavior (the "attracted object" 12A) moves towards a single specified object, the object of attraction (the "attracting object" 12B). In one embodiment, additional parameters allow a user to adjust the area of influence that defines how close an object 12A needs to be to move towards the object of attraction 12B, and how strongly it is attracted. FIG. 48 illustrates two objects (an attracting object and an attracted object) and a motion path 480 of the latter object, according to one embodiment of the invention.

In one embodiment, the Drag parameter lets a user define whether attracted objects overshoot and bounce around the attracting object, or whether they eventually slow down and stop at the position of the attracting object. In one embodiment, a user can apply two or more Attracted To behaviors to a single object, each with a different object of attraction, to create tug-of-war situations where the object bounces among all the objects it is attracted to.

Dashboard Control—In one embodiment, the Attracted To Dashboard has an image well that the user can use to assign an object of attraction, as well as controls for Strength, Falloff Type, Falloff Rate, Influence, and Drag.

Parameters in the Inspector—In one embodiment, the following parameters are available for the Align to Motion behavior in the Inspector:

Object—In one embodiment, the Object parameter is set by an image well that defines the object of attraction.

Strength—In one embodiment, the Strength parameter is set by a slider that defines the speed at which the attracted object moves towards the object of attraction. In one embodiment, with a value of 0, the object doesn't move at all. In another embodiment, the higher the value, the faster the object will move.

Falloff Type—In one embodiment, the Falloff Type parameter is set by a pop-up menu that determines whether the distance defined by the Influence parameter falls off linearly or exponentially.

Linear—In one embodiment, all objects that are within the area of influence are attracted equally.

Exponential—In one embodiment, the closer an object is within the area of influence, the stronger it is attracted, and the faster it will move towards the object of attraction.

Falloff Rate—In one embodiment, the Falloff Rate parameter is set by a slider that defines the rate of acceleration with which objects move towards the object of attraction. In one embodiment, a low Falloff Rate value results in objects quickly getting up to speed as they move towards the object of attraction. In another embodiment, a high Falloff Rate causes objects to accelerate much more slowly.

Influence—In one embodiment, the Influence parameter is set by a slider that defines the area of influence, in pixels. In one embodiment, objects that fall within the area of influence move towards the object of attraction. In another embodiment, objects that are outside of the area of influence remain where they are.

Drag—In one embodiment, the Drag parameter is set by a slider that can be used to reduce the distance attracted objects overshoot the object of attraction. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner.

Related Behaviors—In one embodiment, behaviors related to Attracted To include Attractor, Drift Attracted To, Drift Attractor, Orbit Around, Spring, and Vortex.

c. Attractor

In one embodiment, the Attractor behavior affects other objects' Position parameters. In one embodiment, the Attractor behavior is the opposite of the Attracted To behavior. In one embodiment, if a user applies an Attractor behavior to an object, other objects that lie within the area of influence move toward it. In another embodiment, a user can manipulate the strength with which other objects are attracted, as well as the distance required for attraction to begin.

In one embodiment, by default, objects overshoot the object of attraction and bounce around, never coming to rest. In one embodiment, the Drag parameter lets a user adjust this behavior, changing whether attracted objects overshoot and bounce around, or whether they eventually slow down and stop at the position of the target object. In another embodiment, the Attractor behavior can affect all objects in the Canvas that fall within the area of attraction, or a user can limit the Attractor behavior's effect to a specific group of objects, using the Affect parameter. In yet another embodiment, the Attractor behavior can also be applied to objects in motion. In one embodiment, if a user animates the position of the Target object to which he has applied the Attractor behavior, all other objects in the Canvas continue to be attracted to the Target object's new position.

Dashboard Control—In one embodiment, the Attractor Dashboard has controls for Affect, Strength, Falloff Type, Falloff Rate, Influence, and Drag.

Parameters in the Inspector—In one embodiment, the following parameters are available for the Attractor behavior in the Inspector:

Affect—In one embodiment, the Affect parameter is set by a pop-up menu that limits which objects in a project are affected by the Attractor behavior. In one embodiment, there are three options:

All Objects—In one embodiment, all objects in the Canvas are affected by the Attractor behavior. In one embodiment, this is the default behavior.

Related Objects—In one embodiment, only other objects that are within the same layer as the object of attraction are affected.

Specific Objects—In one embodiment, only objects appearing in the Affected Objects list are affected by the Attractor behavior. In one embodiment, the Affected Objects list appears when Specific Objects is selected in the Affect pop-up menu. In another embodiment, drag objects from the Layers tab into this list to be affected by the Attractor behavior when the Related Objects option is selected in the Influence pop-up. In one embodiment, drag the layer icon of objects in a project from the Layers tab to add them to this list.

Strength—In one embodiment, the Strength parameter is set by a slider that defines the speed with which attracted objects move towards the target object. In one embodiment, with a value of 0, attracted objects don't move at all. In another embodiment, the higher the value, the faster attracted objects will move.

Falloff Type—In one embodiment, the Falloff Type parameter is set by a pop-up menu that determines whether the distance defined by the Influence parameter falls off linearly or exponentially.

Linear—In one embodiment, all objects that are within the area of influence are attracted equally.

Exponential—In one embodiment, the closer an object is within the area of influence, the stronger it is attracted, and the faster it will move towards the object of attraction.

Falloff Rate—In one embodiment, the Falloff Rate parameter is set by a slider that defines the rate of acceleration with which objects move towards the object of attraction. In one embodiment, a low Falloff Rate value results in objects quickly getting up to speed as they move towards the object of attraction. In another embodiment, a high Falloff Rate causes objects to accelerate much more slowly.

Influence—In one embodiment, the Influence parameter is set by a slider that defines the area of influence, in pixels. In one embodiment, objects that fall within the area of influence move towards the object of attraction. In another embodiment, objects that are outside of the area of influence remain where they are.

Drag—In one embodiment, the Drag parameter is set by a slider that can be used to reduce the distance attracted objects overshoot the object of attraction. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner.

Related Behaviors—In one embodiment, behaviors related to Attractor include Attracted To, Drift Attracted To, Drift Attractor, Orbit Around, Spring, and Vortex.

d. Drag

In one embodiment, the Drag behavior affects an object's Position parameter. In one embodiment, the Drag behavior lets a user simulate the force of friction on a moving object, slowing it down over time until it eventually comes to a stop. In another embodiment, applying the Drag behavior is an easy way to decelerate objects with multiple behaviors that create complex motion.

Dashboard Control—In one embodiment, the Drag Dashboard lets a user adjust the Amount of drag.

Parameters in the Inspector—In one embodiment, the following parameters are available for the Drag behavior in the Inspector:

Amount—In one embodiment, the Amount parameter is set by a slider that can be used to slow down an object over time, causing it to eventually come to a stop. In one embodiment, higher Drag values result in the object coming to rest sooner. In another embodiment, a user can adjust the drag applied to the X and Y values separately. In yet another embodiment, one example of this would be to create a situation where an object's vertical speed slows down faster than its horizontal speed.

Related Behaviors—In one embodiment, behaviors related to Drag include Rotational Drag.

e. Drift Attracted To

In one embodiment, the Draft Attracted To behavior affects an object's Position parameter. In one embodiment, the Draft Attracted To behavior is similar to the Attracted To behavior, but by default an object moves towards the object of attraction and comes to rest, rather then overshooting the object of attraction and bouncing around.

Dashboard Control—In one embodiment, the Drift Attracted To Dashboard has an image well that the user can use to assign an object of attraction, as well as sliders for Strength and Drag.

Parameters in the Inspector—In one embodiment, the following parameters are available for the Drift Attracted To behavior in the Inspector:

Object—In one embodiment, the Object parameter is set by an image well that defines the object of attraction.

Strength—In one embodiment, the Strength parameter is set by a slider that defines the speed at which the object moves towards the object of attraction. In one embodiment, with a value of 0, the object doesn't move at all. In another embodiment, the higher the value, the faster the object will move.

Falloff Type—In one embodiment, the Falloff Type parameter is set by a pop-up menu that determines whether the distance defined by the Influence parameter falls off linearly or exponentially.

Linear—In one embodiment, all objects that are within the area of influence are attracted equally.

Exponential—In one embodiment, the closer an object is within the area of influence, the stronger it is attracted, and the faster it will move towards the object of attraction.

Falloff Rate—In one embodiment, the Falloff Rate parameter is set by a slider that defines the rate of acceleration with which objects move towards the object of attraction. In one embodiment, a low Falloff Rate value results in objects quickly getting up to speed as they move towards the object of attraction. In another embodiment, a high Falloff Rate causes objects to accelerate much more slowly.

Influence—In one embodiment, the Influence parameter is set by a slider that defines the area of influence, in pixels. In one embodiment, objects that fall within the area of influence move towards the object of attraction. In another embodiment, objects that are outside of the area of influence remain where they are.

Drag—In one embodiment, the Drag parameter is set by a slider that can be used to reduce the distance attracted objects overshoot the object of attraction. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner.

Related Behaviors—In one embodiment, behaviors related to Drift Attracted To include Attracted To, Attractor, Drift Attractor, Orbit Around, Spring, and Vortex.

f. Drift Attractor

In one embodiment, the Drift Attractor behavior affects other objects' Position parameters. In one embodiment, the Draft Attractor behavior is similar to the Attractor behavior, but by default objects within the area of influence move towards the object of attraction and come to rest, rather then overshooting the object of attraction and bouncing around.

Dashboard Control—In one embodiment, the Drift Attractor Dashboard has controls for Affect, Strength, and Drag.

Parameters in the Inspector—In one embodiment, the following parameters are available for the Drift Attractor behavior in the Inspector:

Affect—In one embodiment, the Affect parameter is set by a pop-up menu that limits which objects in a project are affected by the Attractor behavior. In one embodiment, there are three options:

All Objects—In one embodiment, all objects in the Canvas are affected by the Attractor behavior. In one embodiment, this is the default behavior.

Related Objects—In one embodiment, only other objects that are within the same layer as the object of attraction are affected.

Specific Objects—In one embodiment, only objects appearing in the Affected Objects list are affected by the Attractor behavior. In one embodiment, the Affected Objects list appears when Specific Objects is selected in the Affect pop-up menu. In another embodiment, drag objects from the Layers tab into this list to be affected by the Attractor behavior when the Related Objects option is selected in the Influence pop-up. In yet another embodiment, drag the layer icon of objects in a project from the Layers tab to add them to this list.

Strength—In one embodiment, the Strength parameter is set by a slider that defines the speed with which attracted objects move towards the target object. In one embodiment, with a value of 0, attracted objects don't move at all. In another embodiment, the higher the value, the faster attracted objects will move.

Falloff Type—In one embodiment, the Falloff parameter is set by a pop-up menu that determines whether the distance defined by the Influence parameter falls off linearly or exponentially.

Linear—In one embodiment, all objects that are within the area of influence are attracted equally.

Exponential—In one embodiment, the closer an object is within the area of influence, the stronger it is attracted, and the faster it will move towards the object of attraction.

Falloff Rate—In one embodiment, the Falloff Rate parameter is set by a slider that defines the rate of acceleration with which objects move towards the object of attraction. In one embodiment, a low Falloff Rate value results in objects quickly getting up to speed as they move towards the object of attraction. In another embodiment, a high Falloff Rate causes objects to accelerate much more slowly.

Influence—In one embodiment, the Influence parameter is set by a slider that defines the area of influence, in pixels. In one embodiment, objects that fall within the area of influence move towards the object of attraction. In another embodiment, objects that are outside of the area of influence remain where they are.

Drag—In one embodiment, the Drag parameter is set by a slider that can be used to reduce the distance attracted objects overshoot the object of attraction. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner.

Related Behaviors—In one embodiment, behaviors related to Drift Attractor include Attracted To, Attractor, Drift Attracted To, Orbit Around, Spring, and Vortex.

g. Edge Collision

Figure 49:
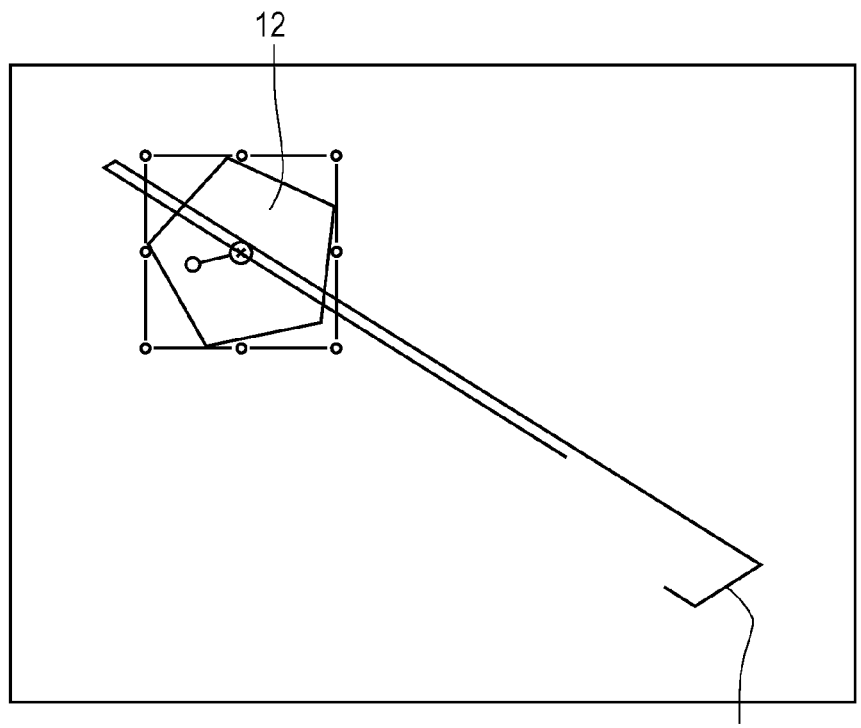
FIG. 49 illustrates one object and an edge collision motion path 490, according to one embodiment of the invention.

In one embodiment, the Edge Collision behavior affects an object's 12 Position parameter. In one embodiment, the Edge Collision behavior is a good behavior to use to set up complex motion simulations where objects 12 should not exit the Canvas. In another embodiment, objects 12 with the edge collision behavior applied either come to a stop, or bounce off after colliding with the edge of the Canvas frame. In yet another embodiment, for example, if a user applied the Throw behavior to an object 12 and set the velocity to send the object towards the edge of the frame, then applied Edge Collision, the object 12 would hit the edge of the frame, then bounce off according to the Bounce Strength parameter. FIG. 49 illustrates one object and an edge collision motion path 490, according to one embodiment of the invention. In one embodiment, the angle in which the object bounces depends on the angle with which it hit the edge of the frame, while the speed it travels after bouncing is set by the Bounce Strength parameter.

In one embodiment, the Edge Collision behavior uses only the rectangular edges of the object's bounding box to determine how the object collides with the Canvas edge. In one embodiment, if a user is using this behavior with an object that has an alpha channel that is smaller than its bounding box, adjust the Crop parameter in the object's Properties tab to fit the bounding box as closely as possible to the edge of the image.

Dashboard Control—In one embodiment, the Edge Collision Dashboard has controls for Affect, Bounce Strength, and Active Edges.

Parameters in the Inspector—In one embodiment, the following parameters are available for the Edge Collision behavior in the Inspector:

Affect—In one embodiment, the Affect parameter is set by a pop-up menu that determines which objects in a project are affected by the Edge Collision behavior. In one embodiment, there are three options:

All Objects—In one embodiment, all objects in the Canvas bounce off the edge of the frame. In one embodiment, this is the default behavior.

Related Objects—In one embodiment, only other objects that are within the same layer as the object of attraction bounce off the edge of the frame.

Specific Objects—In one embodiment, only objects appearing in the Affected Objects list bounce off the edge of the frame. In one embodiment, the Affected Objects list appears when Specific Objects is selected in the Affect pop-up menu. In another embodiment, drag objects from the Layers tab into this list to be affected by the Edge Collision behavior when the Related Objects option is selected in the Influence pop-up. In yet another embodiment, drag the layer icon of objects in a project from the Layers tab to add them to this list.

Bounce Strength—In one embodiment, the Bounce Strength parameter is the speed at which objects travel after colliding with an edge. In one embodiment, a value of 0 causes objects to come to a complete stop when colliding with an edge. In another embodiment, higher values cause an object to move faster after bouncing.

Active Edges—In one embodiment, the Active Edges parameter is set by four checkboxes that define which Canvas edges are detected by the Edge Collision behavior. In one embodiment, a user can turn on and off edges in any combination.

h. Gravity

Figure 50:
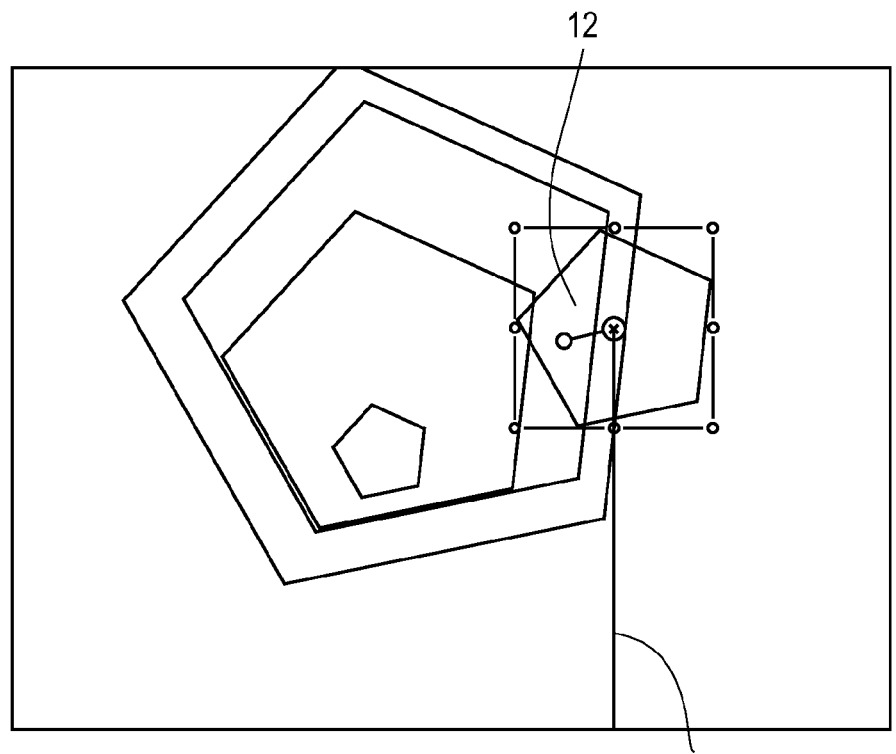
FIG. 50 illustrates an object and a gravity motion path 500, according to one embodiment of the invention.

In one embodiment, the Gravity behavior affects an object's 12 Position parameter. In one embodiment, the Gravity behavior causes an object 12 to fall over time. In another embodiment, the gravitational acceleration can be increased or decreased, resulting in a change to the rate of fall. In yet another embodiment, objects 12 affected by the Gravity behavior continue to fall past the bottom edge of the Canvas (unless the Edge Collision behavior has been applied). FIG. 50 illustrates an object and a gravity motion path 500, according to one embodiment of the invention.

In one embodiment, the Gravity behavior can be used in conjunction with other behaviors that animate the position of objects to create natural-looking arcs and motion paths that simulate thrown objects falling to the ground. In one embodiment, for example, apply the throw behavior to an object to send it flying through the air, and then apply the Gravity object to it to make the object arc up and then fall down past the bottom of the Canvas. In one embodiment, a user can also set the Acceleration parameter to a negative value, effectively applying "anti-gravity" to the object and making it fly up.

Dashboard Control—In one embodiment, the Gravity Dashboard lets a user adjust the Acceleration parameter.

Parameters in the Inspector—In one embodiment, the following parameters are available for the Gravity behavior in the Inspector:

Acceleration—In one embodiment, the Acceleration parameter is set by a slider that defines the strength of gravity affecting the target object. In one embodiment, the higher this value, the faster the target object will fall.

Related Behaviors—In one embodiment, behaviors related to Gravity include Motion Path, Random Motion, Throw, and Wind.

i. Orbit Around

Figure 51:
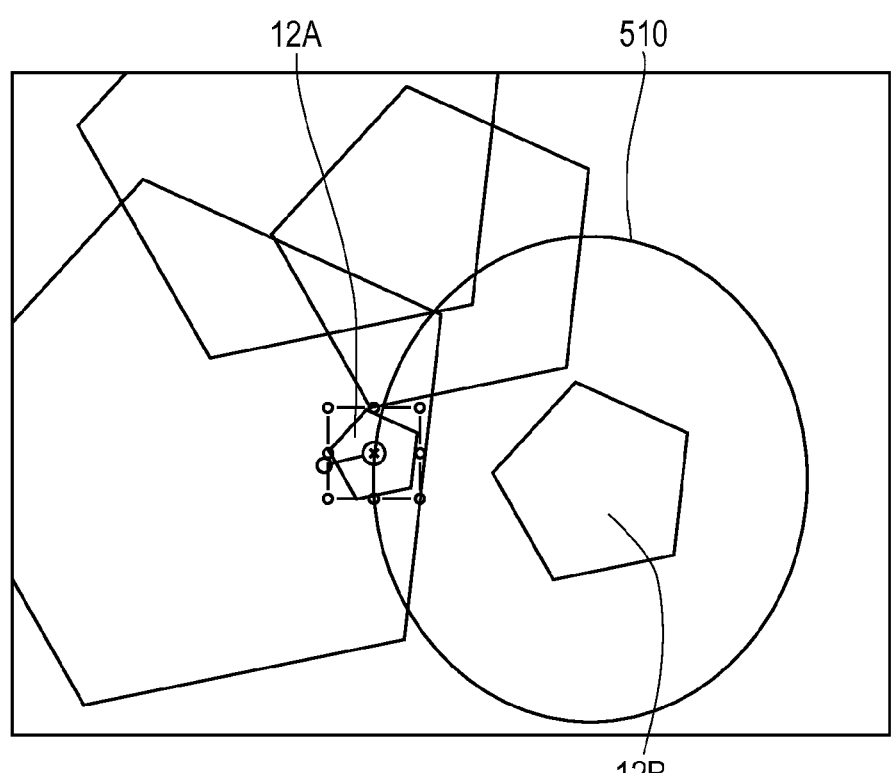
FIG. 51 illustrates a first object orbiting around a second object and an orbit motion path 510 of the first object, according to one embodiment of the invention.

In one embodiment, the Orbit Around behavior affects an object's 12A Position parameter. In one embodiment, similar to the Attracted To behavior, the Orbit Around behavior's default parameter settings cause an object 12A to orbit around another object 12B in a perfect circle. FIG. 51 illustrates a first object orbiting around a second object and an orbit motion path 510 of the first object, according to one embodiment of the invention.

Figure 52:
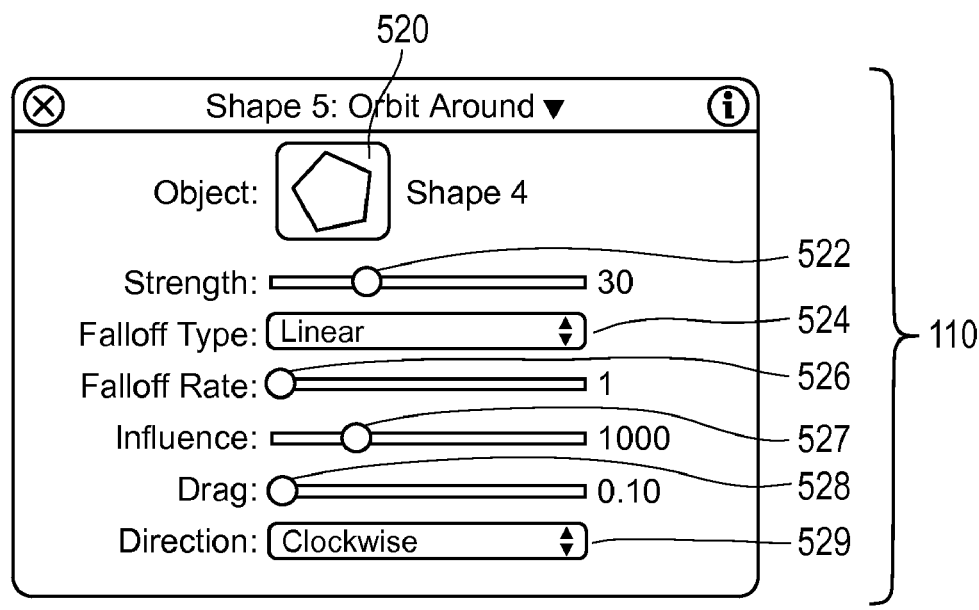
FIG. 52 illustrates a Dashboard of an Orbit Around behavior, according to one embodiment of the invention.

Dashboard Control—In one embodiment, the Orbit Around Dashboard 110 has an image well 520 that a user can use to assign an object 12 of attraction, as well as controls for Strength 522, Falloff Type 524, Falloff Rate 526, Influence 527, Drag 528, and Direction 529. FIG. 52 illustrates a Dashboard of an Orbit Around behavior, according to one embodiment of the invention.

Parameters in the Inspector—In one embodiment, the following parameters are available for the Orbit Around behavior in the Inspector:

Object—In one embodiment, the Object Parameter is set by an image well that defines the object to orbit around.

Strength—In one embodiment, the Strength parameter is set by a slider that defines the speed at which the object moves.

Falloff Type—In one embodiment, the Falloff Type parameter is set by a pop-up menu that determines whether the distance defined by the Influence parameter falls off linearly or exponentially. In one embodiment, the default is Linearly.

Linear—In one embodiment, all objects that are within the area of influence are attracted equally.

Exponential—In one embodiment, the closer an object is within the area of influence, the stronger it is attracted, and the faster it will move around the object of attraction.

Falloff Rate—In one embodiment, the Falloff Rate parameter is set by a slider that defines the rate of acceleration with which objects move around the object of attraction. In one embodiment, for orbit, the default value is 1, keeping the object in a stable orbit around the target object. In another embodiment, a low Falloff Rate value results in objects quickly getting up to speed as they move around the object of attraction. In yet another embodiment, a high Falloff Rate causes objects to accelerate much more slowly.

Influence—In one embodiment, the Influence parameter is set by a slider that defines the area of influence, in pixels. In one embodiment, objects that fall within the area of influence move around the object of attraction. In another embodiment, objects that are outside of the area of influence remain as they are.

Drag—In one embodiment, the Drag parameter is set by a slider that can be used to reduce the distance attracted objects overshoot the object of attraction if they're set to fall. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner. In one embodiment, the default value for the Drag parameter is 0.

Direction—In one embodiment, the Direction parameter reverses the direction of this behavior.

Related Behaviors—In one embodiment, behaviors related to Orbit Around include Attracted To, Attractor, Drift Attracted To, Drift Attractor, Spring, and Vortex.

j. Random Motion

Figure 53:
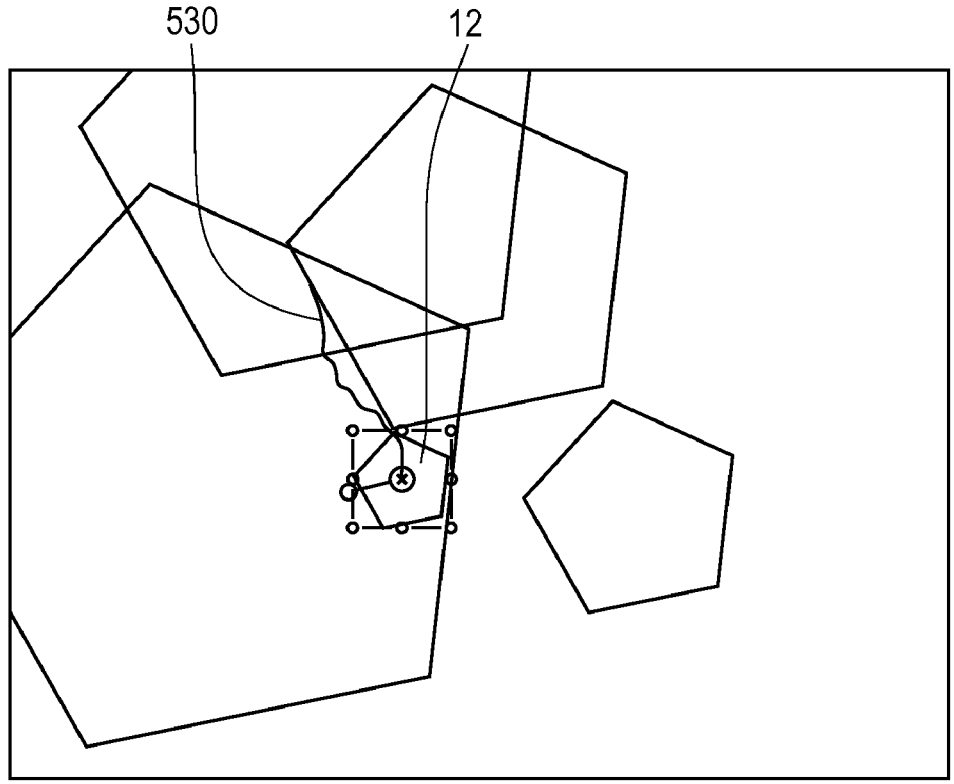
FIG. 53 illustrates an object and a Random Motion path, according to one embodiment of the invention.

In one embodiment, the Random Motion behavior affects an object's 12 Position parameter. In one embodiment, if a user applies the Random Motion behavior to an object 12, the behavior animates the position of the object, and makes the object move around the Canvas along a random path 530. FIG. 53 illustrates an object and a Random Motion path, according to one embodiment of the invention.

In one embodiment, although the motion created with this behavior is random, the motion is actually predetermined by the particular group of parameters a user has chosen. In one embodiment, as long as the user doesn't change the parameters, the motion path created by this behavior will remain the same. In another embodiment, if the user doesn't like the path that was randomly generated, click the Generate button in either the Dashboard or the Behavior tab in the Inspector to pick a new random seed number. In yet another embodiment, this number is used to generate a new path.

Figure 54:
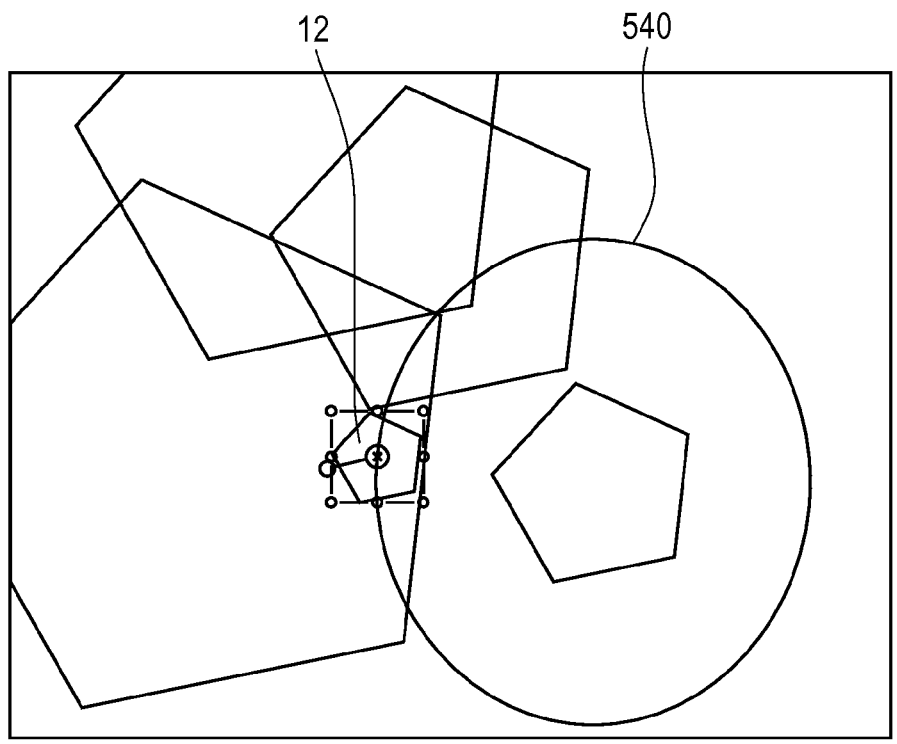
FIG. 54 illustrates an Orbit Around behavior applied to an object and the object's motion path, according to one embodiment of the invention.
Figure 55:
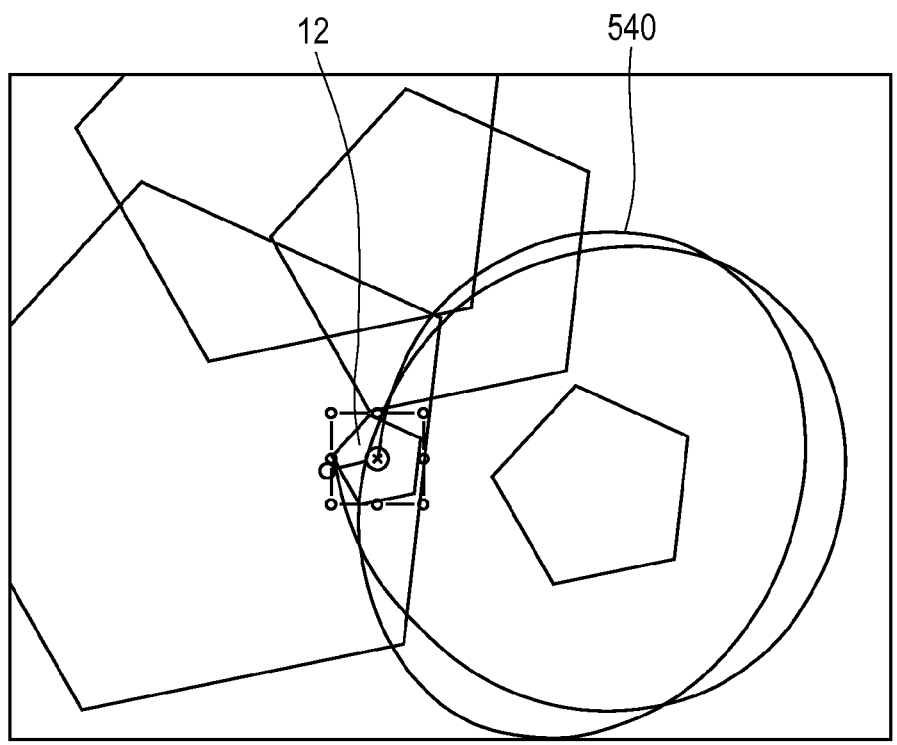
FIG. 55 illustrates both an Orbit Around behavior and a Random Motion behavior applied to an object and the object's motion path, according to one embodiment of the invention.

In one embodiment, the Random Motion behavior is useful for quickly creating varied motion paths for large numbers of objects that a user wants to move at the same time. In one embodiment, for example, a user can create an arrangement of ten objects in the canvas and apply the Random Motion behavior to all of them. In another embodiment, a user can also use the random motion behavior to add variation to the motion paths 540 created by other behaviors affecting an object's 12 position. In yet another embodiment, for example, adding Random Motion to an object 12 with the Orbit Around behavior results in a more erratic motion path 540, although the object 12 still orbits as before. FIG. 54 illustrates an Orbit Around behavior applied to an object and the object's motion path, according to one embodiment of the invention. FIG. 55 illustrates both an Orbit Around behavior and a Random Motion behavior applied to an object and the object's motion path, according to one embodiment of the invention.

Figure 56:
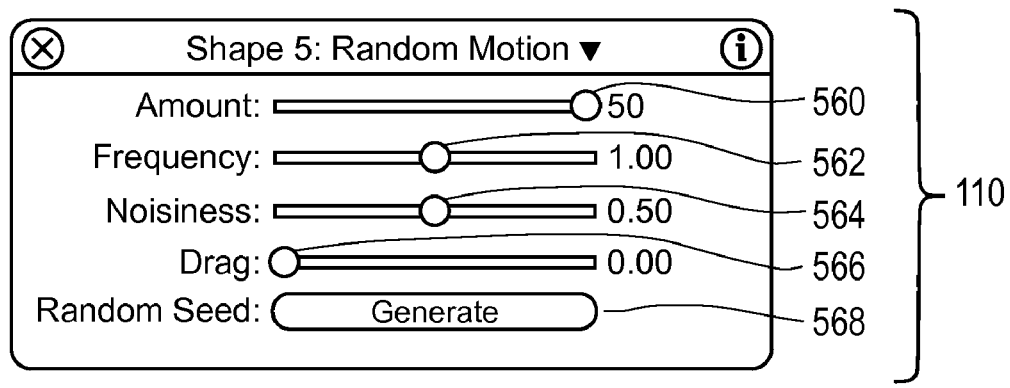
FIG. 56 illustrates a Dashboard for a Random Motion behavior, according to one embodiment of the invention.

Dashboard Control—In one embodiment, the Random Motion Dashboard 110 has controls for the Amount 560, Frequency 562, Noisiness 564, Drag 566, and Random Seed 568 parameters. FIG. 56 illustrates a Dashboard for a Random Motion behavior, according to one embodiment of the invention.

Parameters in the Inspector—In one embodiment, the following parameters are available for the Random Motion behavior in the Inspector:

Amount—In one embodiment, the Amount parameter is set by a slider that determines the speed the object moves by changing the length of the motion path. In one embodiment, higher values result in faster motion and longer motion paths.

Frequency—In one embodiment, the Frequency parameter is set by a slider that determines the number of twists and turns in the motion path, which can be seen by the crookedness of the resulting motion path. In one embodiment, higher values create more turns in the motion path. In another embodiment, lower values result in straighter motion paths.

Noisiness—In one embodiment, the Noisiness parameter is set by a slider that determines an additional level of jaggedness along the motion path shape defined by the Amount parameter. In one embodiment, higher values result in a more jagged looking motion path.

Drag—In one embodiment, the Drag parameter is set by a slider that controls the speed the object moves along the motion path, without changing the shape of the motion path itself. In one embodiment, while the Amount parameter controls the length of the motion path, the Drag parameter shrinks or enlarges the motion path as a whole.

Random Seed—In one embodiment, the Random Seed parameter is set by a button that lets a user pick a new random seed number. In one embodiment, this number is used to randomly generate new motion paths, based on the values the user has picked in the other parameters of this behavior.

Related Behaviors—In one embodiment, behaviors related to Random Motion include Motion Path, Gravity, Throw, and Wind.

k. Repel

Figure 57:
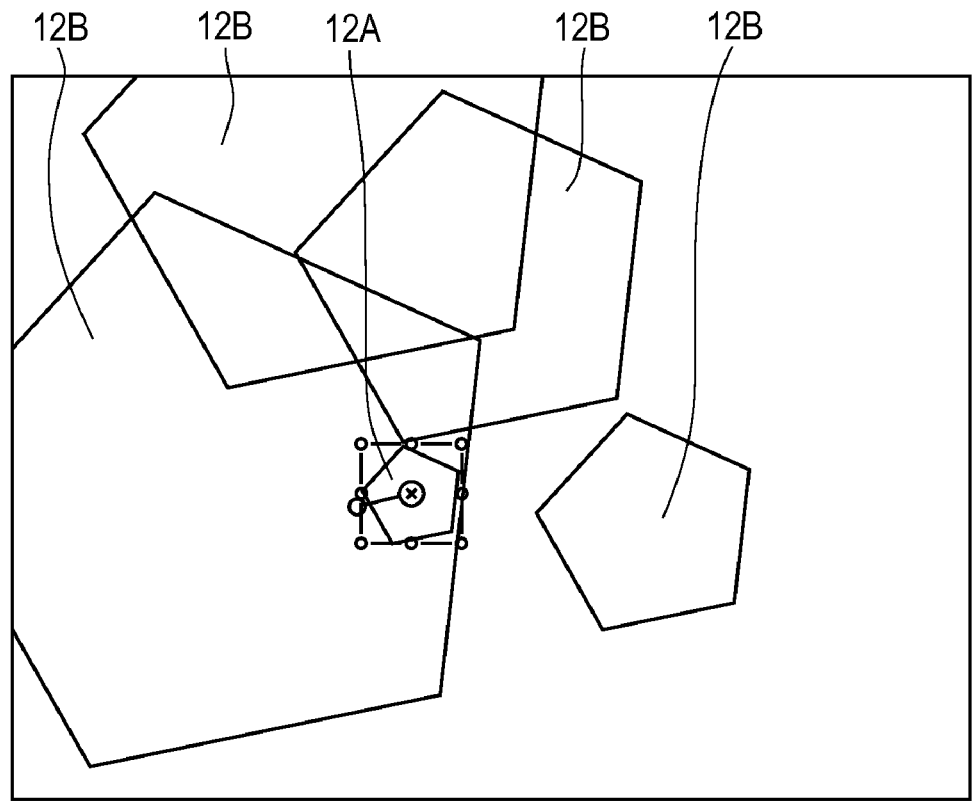
FIG. 57 illustrates several objects, according to one embodiment of the invention.
Figure 58:
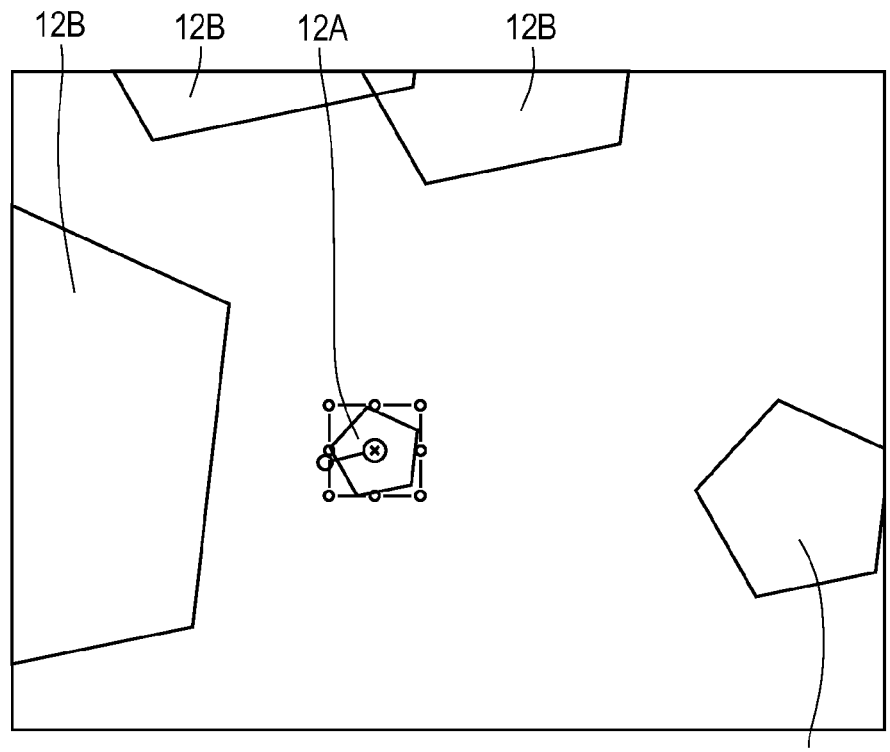
FIG. 58 illustrates the same objects as in FIG. 57 after the Repel behavior has been applied to the central object, according to one embodiment of the invention.

In one embodiment, the Repel behavior affects other objects' Position parameters. In one embodiment, the Repel behavior is the opposite of the Attractor behavior, and is part of a group of simulation behaviors that create complex animated relationships between two or more objects. In another embodiment, if a user applies the Repel behavior to an object 12A, the behavior pushes away all objects 12B within the area of influence in the Canvas. In yet another embodiment, the strength with which objects 12B are pushed away can be increased or decreased, as can the distance repelled objects 12B travel. FIG. 57 illustrates several objects, according to one embodiment of the invention. FIG. 58 illustrates the same objects as in FIG. 57 after the Repel behavior has been applied to the central object, according to one embodiment of the invention.

Dashboard Control—In one embodiment, the Repel Dashboard has controls for Strength, Falloff Type, Falloff Rate, Influence, and Drag.

Parameters in the Inspector—In one embodiment, the following parameters are available for the Repel behavior in the Inspector:

Affect—In one embodiment, the Affect parameter is set by a pop-up menu that limits which objects in a project are affected by the Repel behavior. In one embodiment, there are three options:

All Objects—In one embodiment, all objects in the Canvas are affected by the Repel behavior. In one embodiment, this is the default behavior.

Related Objects—In one embodiment, only other objects that are within the same layer as the repelling object are affected.

Specific Objects—In one embodiment, only objects appearing in the Affected Objects list are affected by the Repel behavior. In one embodiment, the Affected Objects list appears when Specific Objects is selected in the Affect pop-up menu. In another embodiment, drag objects from the Layers tab into this list to be affected by the Attractor behavior when the Related Objects option is selected in the Influence pop-up. In yet another embodiment, drag the layer icon of objects in a project from the Layers tab to add them to this list.

Strength—In one embodiment, the Strength parameter is set by a slider that defines the speed with which repelled objects move away from the object. In one embodiment, with a value of 0, repelled objects don't move at all. In another embodiment, the higher the value, the faster repelled objects move.

Falloff Type—In one embodiment, the Falloff Type parameter is set by a pop-up menu that determines whether the distance defined by the Influence parameter falls off linearly or exponentially.

Linear—In one embodiment, all objects that are within the area of influence are repelled equally.

Exponential—In one embodiment, the closer an object is within the area of influence, the more it is repelled, and the faster it moves away from the repelling object.

Falloff Rate—In one embodiment, the Falloff Rate parameter is set by a slider that defines the rate of acceleration with which objects move away from the repelling object. In one embodiment, a low Falloff Rate value results in objects quickly getting up to speed as they move away. In another embodiment, a high Falloff Rate causes objects to accelerate more slowly.

Influence—In one embodiment, the Influence parameter is set by a slider that defines the area of influence, in pixels. In one embodiment, objects that fall within the area of influence move away from the repelling object. In another embodiment, objects that are outside of the area of influence remain where they are.

Drag—In one embodiment, the Drag parameter is set by a slider that can be used to reduce the distance repelled objects travel away from the repelling object.

Related Behaviors—In one embodiment, behaviors related to Repel include Repel From.

l. Repel From

In one embodiment, the Repel From behavior affects an object's Position parameter. In one embodiment, while the Repel behavior pushes other objects away, the Repel From behavior has the opposite effect, making the object it is applied to move away from a selected object in the Canvas.

Dashboard Control—In one embodiment, the Repel From Dashboard has an image well that the user can use to assign an object to move away from, as well as controls for Strength, Falloff Type, Falloff Rate, Influence, and Drag.

Parameters in the Inspector—In one embodiment, the following parameters are available for the Repel From behavior in the Inspector:

Object—In one embodiment, the Object parameter is set by an image well that defines the object to be repelled from.

Strength—In one embodiment, the Strength parameter is set by a slider that defines the speed at which the object is repelled. In one embodiment, with a value of 0, the object is not repelled at all. In another embodiment, the higher the value, the faster the object is repelled.

Falloff Type—In one embodiment, the Falloff Type parameter is set by a pop-up menu that determines whether the distance defined by the Influence parameter falls off linearly or exponentially.

Linear—In one embodiment, the object is repelled equally regardless of its distance from the repelling object.

Exponential—In one embodiment, the closer an object is within the area of influence, the more it is repelled, and the faster it moves away from the repelling object.

Falloff Rate—In one embodiment, the Falloff Rate is set by a slider that defines the rate of acceleration at which the object moves away from the repelling object. In one embodiment, a low Falloff Rate value results in the object quickly getting up to speed as it moves away. In another embodiment, a high Falloff Rate causes the object to accelerate more slowly.

Influence—In one embodiment, the Influence parameter is set by a slider that defines the area of influence, in pixels. In one embodiment, if the object falls within the area of influence, it is repelled. In another embodiment, if the object is outside of the area of influence, it remains unaffected.

Drag—In one embodiment, the Drag parameter is set by a slider that can be used to reduce the distance the object travels away from the repelling object.

Related Behaviors—In one embodiment, behaviors related to Repel From include Repel.

m. Rotational Drag

In one embodiment, the Rotational Drag behavior affects an object's Rotation parameter. In one embodiment, the Rotational Drag behavior is similar to the Drag behavior, except that it affects Rotation instead of Position. In another embodiment, rotational drag simulates friction affecting objects that are spinning due to keyframed or behavior-driven changes to the Rotation parameter. In yet another embodiment, by setting higher drag values, a user can slow rotational changes to an eventual stop.

Dashboard Control—In one embodiment, the Rotational Drag Dashboard lets a user control the Amount of drag.

Parameters in the Inspector—In one embodiment, the following parameters are available for the Rotational Drag behavior in the Inspector:

Amount—In one embodiment, the Amount parameter can be set by a slider that can be used to slow down an object's rotation over time, causing it to eventually come to a stop. In one embodiment, higher Drag values result in the rotation ending sooner.

Related Behaviors—In one embodiment, behaviors related to Rotational Drag include Drag.

n. Spring

In one embodiment, the Spring behavior affects an object's Position parameter. In one embodiment, the Spring behavior creates a relationship between two objects, so that an object with the Spring behavior applied to it moves back and forth around a second object by a specified distance. In another embodiment, the Attract To parameter defines the object that serves as the target and center of the spring behavior. In yet another embodiment, additional parameters let a user adjust the speed of the behavior (Spring Tension) and the acceleration of the object at each change in direction (Relaxed Length).

In one embodiment, if the Attract To object is at a stop, the resulting motion is fairly simple and the springing object moves back and forth in a straight line. In one embodiment, if the Attract To object is in motion, the springing object's motion will be much more complex, changing direction according to the velocity of the Attract To object.

Dashboard Control—In one embodiment, the Spring Dashboard contains an image well that lets a user set the Attract To object. In one embodiment, the Spring Dashboard contains two sliders that let a user adjust the Spring Tension and Relaxed Length of the Spring effect. In another embodiment, a checkbox lets a user turn on the Repel parameter.

Parameters in the Inspector—In one embodiment, the following parameters are available for the Spring behavior in the Inspector:

Attract To—In one embodiment, the Attract To parameter is set by an image well that defines the object of attraction.

Spring Tension—In one embodiment, the Spring Tension parameter is set by a slider that determines how fast the object is pulled towards the object of attraction Relaxed Length—In one embodiment, the Relaxed Length parameter is set by a slider that determines how far away the object can be pulled from a moving object of attraction.

Repel—In one embodiment, when this checkbox is turned on, when the object gets closer to the object of attraction than the Relaxed Length value, the objects are pushed apart. In one embodiment, when this checkbox is turned off, no repelling force is applied.

Related Behaviors—In one embodiment, behaviors related to Spring include Attracted To, Attractor, Drift Attracted To, Drift Attractor, Orbit Around, and Vortex.

o. Vortex

In one embodiment, the Vortex behavior affects other objects' Position parameters. In one embodiment, the Vortex behavior is the opposite of the Orbit Around behavior. In another embodiment, whereas the Orbit Around behavior causes one object to orbit around another target object, the Vortex behavior exerts a force on all objects surrounding the object to which the Vortex behavior is applied.

Dashboard Control—In one embodiment, the Vortex Dashboard has a pop-up menu that lets a user limit the objects affected by this behavior, as well as controls for Strength, Falloff Type, Falloff Rate, Influence, Drag, and Direction.

Parameters in the Inspector—In one embodiment, the following parameters are available for the Vortex behavior in the Inspector:

Affect—In one embodiment, the Affect parameter is set by a pop-up menu that limits which objects in a project are affected by the Vortex behavior. In one embodiment, there are three options:
  All Objects—In one embodiment, all objects in the Canvas are affected by the Vortex behavior. In one embodiment, this is the default behavior.
  Related Objects—In one embodiment, only other objects that are within the same layer as the object of attraction are affected.
  Specific Objects—In one embodiment, only objects appearing in the Affected Objects list are affected by the Vortex behavior. In one embodiment, the Affected Objects list appears when Specific Objects is selected in the Affect pop-up menu. In another embodiment, drag objects from the Layers tab into this list to be affected by the Vortex behavior when the Related Objects option is selected in the Influence pop-up. In yet another embodiment, drag the layer icon of objects in a project from the Layers tab to add them to this list.

Strength—In one embodiment, the Strength parameter is set by a slider that defines the speed at which the affected objects move about the object of attraction.

Falloff Type—In one embodiment, the Falloff Type parameter is set by a pop-up menu that determines whether the distance defined by the Influence parameter falls off linearly or exponentially. In one embodiment, the default is Linear.
  Linear—In one embodiment, all objects that are within the area of influence are affected equally.
  Exponential—In one embodiment, the closer an object is within the area of influence, the stronger the effect, and the faster it will move.

Falloff Rate—In one embodiment, the Falloff Rate parameter is set by a slider that defines the rate of acceleration with which objects move around the object of attraction. In one embodiment, a low Falloff Rate value results in objects quickly getting up to speed as they move around the object of attraction. In another embodiment, a high Falloff Rate causes objects to accelerate much more slowly.

Influence—In one embodiment, the Influence parameter is set by a slider that defines the area of influence, in pixels. In one embodiment, objects that fall within the area of influence move around the object of attraction. In another embodiment, objects that are outside of the area of influence remain where they are.

Drag—In one embodiment, the Drag parameter is set by a slider that can be used to reduce the distance attracted objects overshoot the object of attraction if they fall towards it at any point. In one embodiment, the effect is of the attracted objects skidding to a stop at the position of the target object. In another embodiment, lower Drag values result in the object overshooting the object of attraction, moving past and then careening back around towards the target object again and again. In yet another embodiment, higher Drag values result in the object coming to rest sooner.

Direction—In one embodiment, the Direction parameter is set by a pop-up menu that lets a user set whether objects move around in a Clockwise or Counter-clockwise direction.

Related Behaviors—In one embodiment, behaviors related to Vortex include Attracted To, Attractor, Drift Attracted To, Drift Attractor, Orbit Around, and Spring.

p. Wind

In one embodiment, the Wind behavior affects an object's Position parameter. In one embodiment, apply the Wind behavior to an object to animate its position and move it in a specified direction. In another embodiment, unlike the Throw behavior, the velocity specified by the Wind behavior is a continuous force, and its parameters can be keyframed to achieve gradual changes in speed and direction.

In one embodiment, the Wind behavior is better than the Throw behavior when a user wants to vary the speed of the object being animated. In one embodiment, a user can either apply another behavior (such as randomize or ramp) or keyframe the Velocity parameter of the Wind behavior to vary the speed and direction at which the object moves. In another embodiment, a user cannot make gradual changes in either speed or direction with the Throw behavior.

Figure 59:
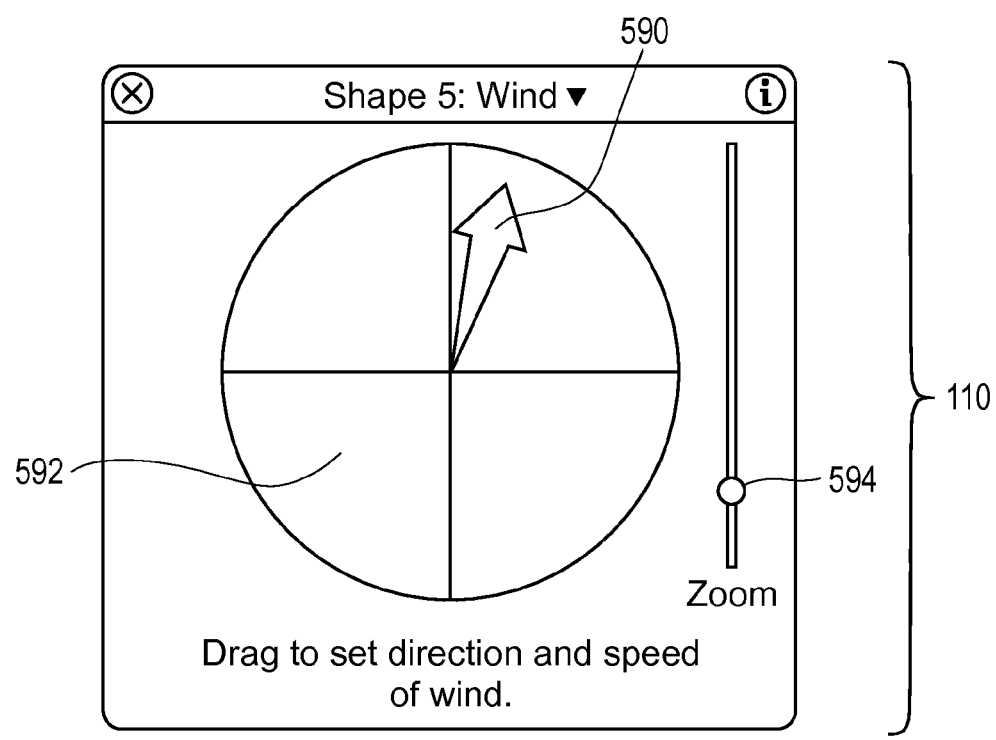
FIG. 59 illustrates a Dashboard of a Wind behavior, according to one embodiment of the invention.

Dashboard Control—In one embodiment, the Wind Dashboard 110 lets a user specify the direction and speed of the Wind behavior by dragging an arrow 590 within a circular region 592. In one embodiment, the direction of the arrow defines the direction of movement, and the length of the arrow defines speed. In another embodiment, a slider 594 to the right lets a user adjust the scale of the Dashboard control, increasing or decreasing the effect the control has over the object. In yet another embodiment, the maximum speed a user can define with the Dashboard 110 is not the maximum speed possible. In one embodiment, higher values can be entered into the Throw Velocity or Throw Distance parameter in the Behaviors tab of the Inspector. FIG. 59 illustrates a Dashboard of a Wind behavior, according to one embodiment of the invention.

Parameters in the Inspector—In one embodiment, the following parameters are available for the Wind behavior in the Inspector:

Air Thickness—In one embodiment, the Air Thickness parameter is set by a slider that adjusts how fast the object accelerates when the speed is changed. In one embodiment, lower values (simulating thinner air) have less effect when pushing the object, so it takes longer to get up to speed. In another embodiment, higher values (thicker air) have more effect, and push the object up to speed more quickly.

Velocity—In one embodiment, the Velocity parameter is set by a slider that adjusts the speed at which the simulated air is blowing the object. In one embodiment, higher values result in faster motion.

Related Behaviors—In one embodiment, behaviors related to Wind include Motion Path, Gravity, Random Motion, and Throw.

I. EXAMPLES

In one embodiment, the following three examples illustrate different ways that groups of behaviors can be combined to create different effects.

i. Example 1

Creating Animated Title

In one embodiment, in this example, multiple behaviors will be used to bring up four text objects to create a title. In one embodiment, the first three text objects fly in from the sides, while the last text object zooms out from the center of the screen. In another embodiment, this example assumes that the Create Objects At preference in the Project Preferences window is set to Start of Project, so that newly applied behaviors are placed from the beginning of each object all the way through the end.

Figure 60:
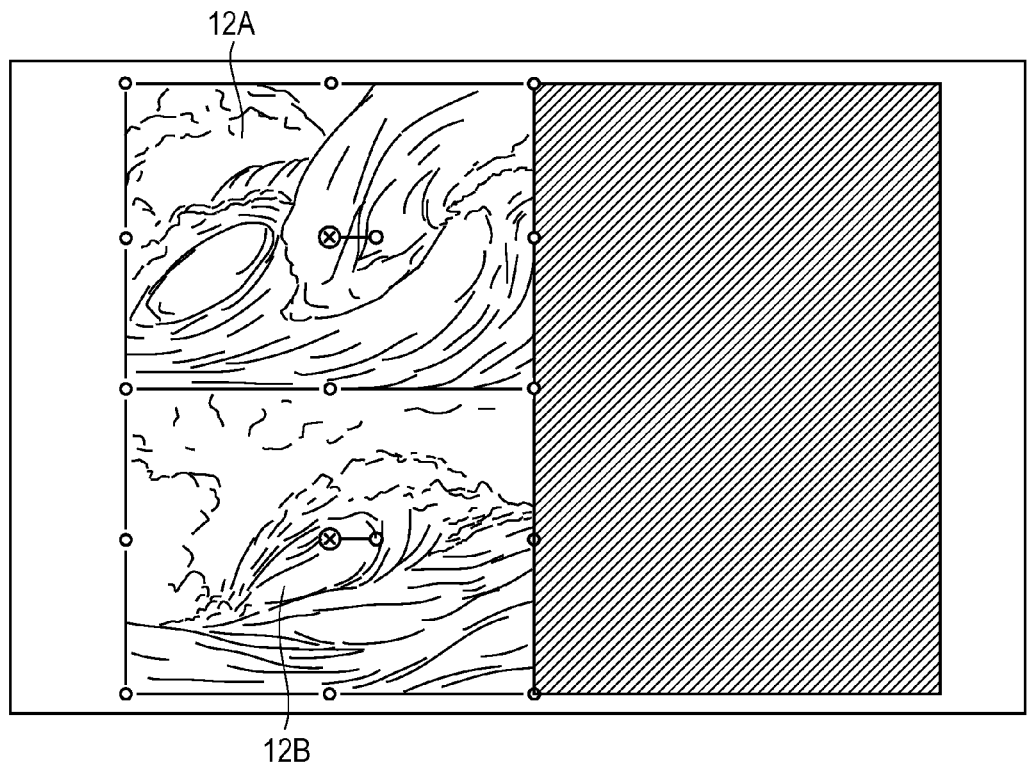
FIG. 60 illustrates two graphic objects, according to one embodiment of the invention.

In one embodiment, to create an animated title sequence:

In one embodiment, arrange the first two graphic objects 12A, 12B to determine their vertical position in the composition. FIG. 60 illustrates two graphic objects, according to one embodiment of the invention.

Figure 61:
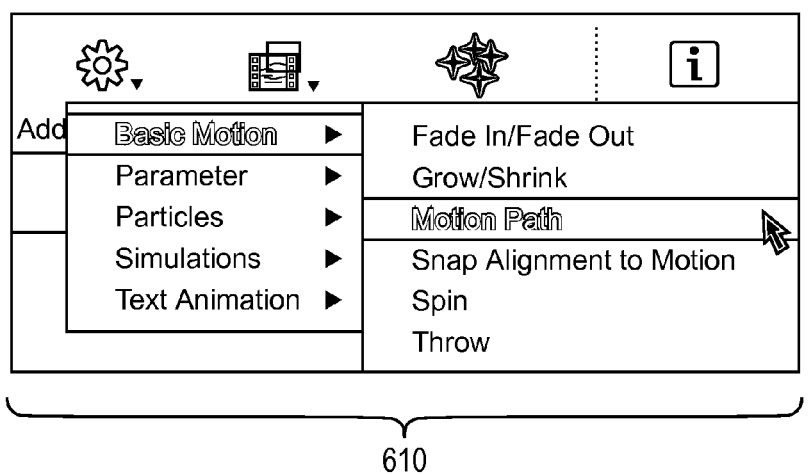
FIG. 61 illustrates a pop-up menu showing Basic Motion>Motion Path, according to one embodiment of the invention.

In one embodiment, select both objects, click the Add Behavior icon in the Toolbar, and choose Basic Motion>Motion Path from the pop-up menu 610 to apply this behavior to both objects at the same time. FIG. 61 illustrates a pop-up menu showing Basic Motion>Motion Path, according to one embodiment of the invention.

Figure 62:
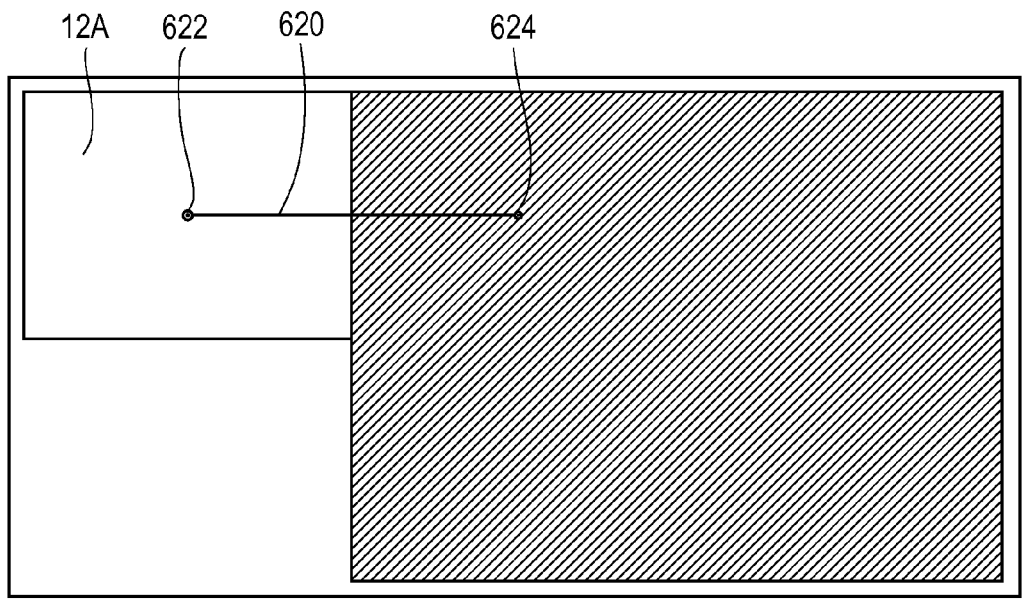
FIG. 62 illustrates the top object's motion path, according to one embodiment of the invention.

In one embodiment, select the top object 12A. In one embodiment, if necessary, choose the Motion Path behavior from the Dashboard pop-up menu to make that object's motion path 620 editable. In another embodiment, move the start point 622 of the motion path 620 to the off-screen position where it will start, and move the end point 624 to the onscreen position where it will stop. FIG. 62 illustrates the top object's motion path, according to one embodiment of the invention.

Figure 63:
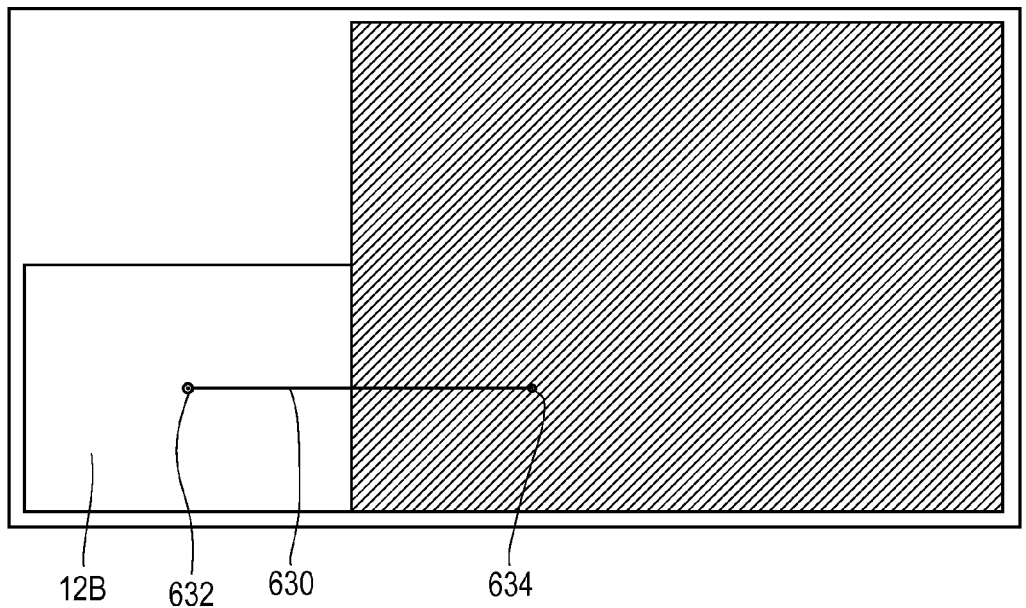
FIG. 63 illustrates the bottom object's motion path, according to one embodiment of the invention.

In one embodiment, next, select the bottom object 12B. In one embodiment, choose the Motion Path behavior from the Dashboard pop-up menu to make its motion path 630 editable. In another embodiment, move the start point 632 of the motion path 630 to the off-screen position where it will start, and move the end point 634 to the onscreen position where it will stop. FIG. 63 illustrates the bottom object's motion path, according to one embodiment of the invention.

In one embodiment, click the Play button or scrub the playhead in the Timeline or Canvas to see both objects moving onscreen. In one embodiment, both objects come to an abrupt stop. In another embodiment, this is probably not the desired effect, so in the next steps the Drag behavior will be used to slow both objects to a gentle stop.

Figure 64:
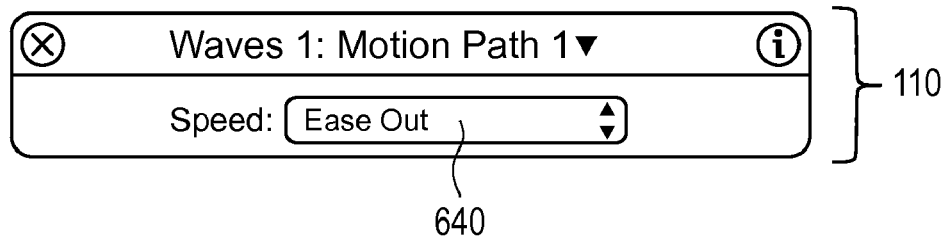
FIG. 64 illustrates a Dashboard for the Motion Path behavior showing the Speed parameter as Ease Out, according to one embodiment of the invention.

In one embodiment, for each object in the Layers tab, choose its Motion Path behavior from the Dashboard 110 pop-up menu, and choose Ease Out 640 from the speed pop-up menu. FIG. 64 illustrates a Dashboard for the Motion Path behavior showing the Speed parameter as Ease Out, according to one embodiment of the invention. In one embodiment, as a result, both objects will slow down before gradually coming to a stop.

Figure 65:
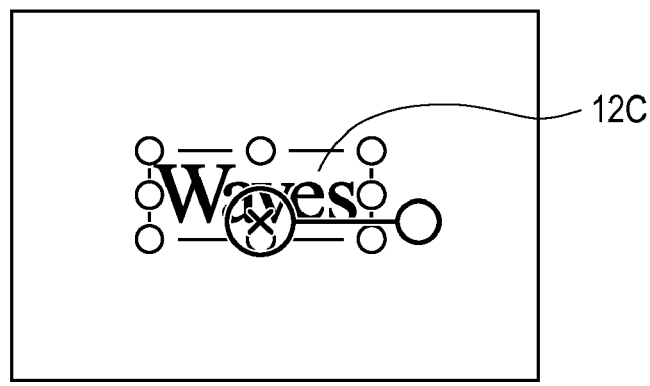
FIG. 65 illustrates a small text object, according to one embodiment of the invention.

In one embodiment, now, create a text object 12C. In one embodiment, this is the object that will fade in and zoom up to fill the screen. In one embodiment, resize this object 12C to the size it will be at the beginning of the sequence. FIG. 65 illustrates a small text object, according to one embodiment of the invention.

Figure 66:
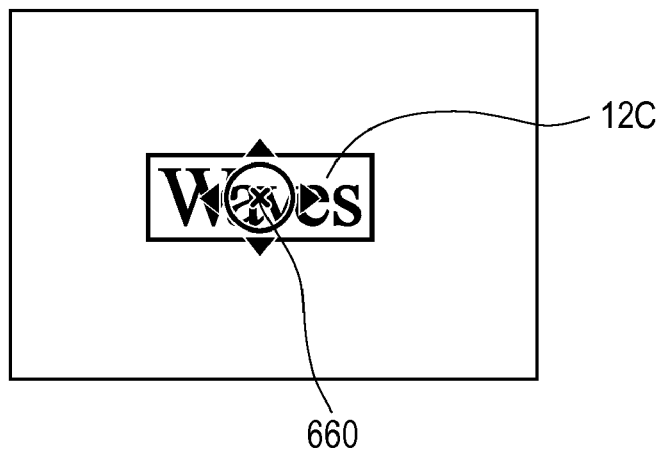
FIG. 66 illustrates the text object of FIG. 65 with a new anchor point location, according to one embodiment of the invention.

In one embodiment, next, choose the Adjust Anchor Point tool and move the anchor point 660 to the center of the object 12C. In one embodiment, this way, when the object is scaled up with the Grow/Shrink behavior, it will zoom from its center. FIG. 66 illustrates the text object of FIG. 65 with a new anchor point location, according to one embodiment of the invention.

In one embodiment, select the text object, then click the Add Behavior icon and choose Basic Motion>Grow/Shrink from the pop-up menu.

Figure 67:
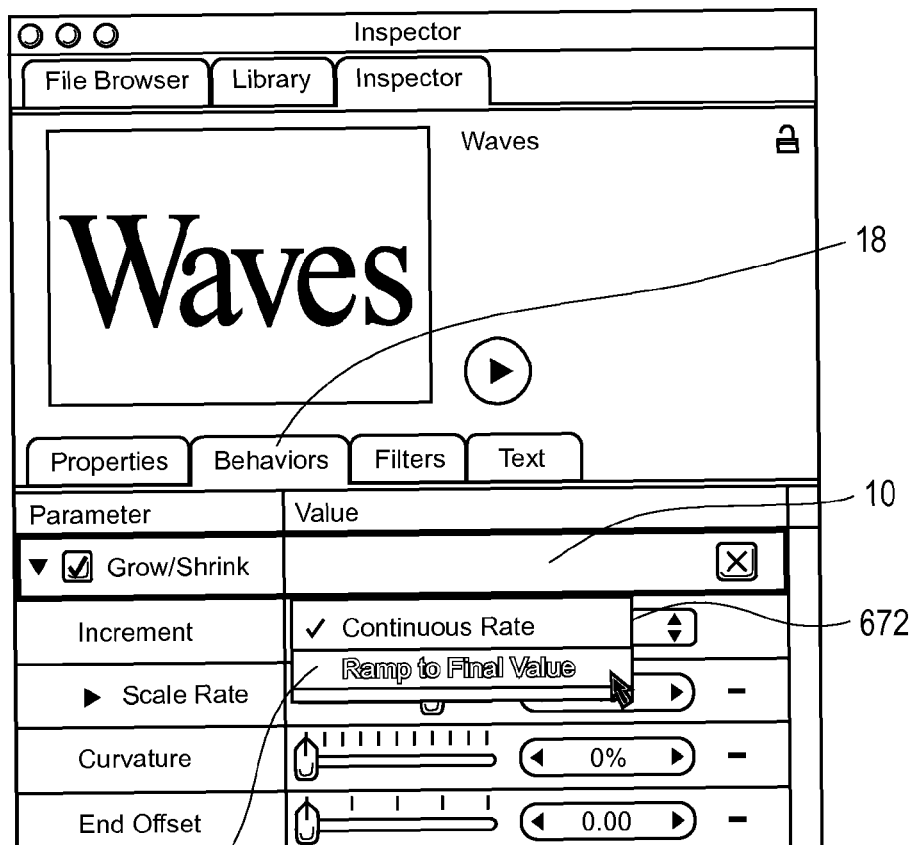
FIG. 67 illustrates the Increment pop-up menu of the Grow/Shrink behavior in the Behaviors tab of the Inspector, according to one embodiment of the invention.

In one embodiment, next, open the Inspector, and click the Behaviors tab 18. In one embodiment, choose Final Value 670 from the Grow/Shrink behavior's 10 Increment pop-up menu 672. In another embodiment, this enables the Grow/Shrink Dashboard 110 control to control the size of the affected object at the last frame of the behavior, so that the object doesn't grow indefinitely. FIG. 67 illustrates the Increment pop-up menu of the Grow/Shrink behavior in the Behaviors tab of the Inspector, according to one embodiment of the invention.

Figure 68:
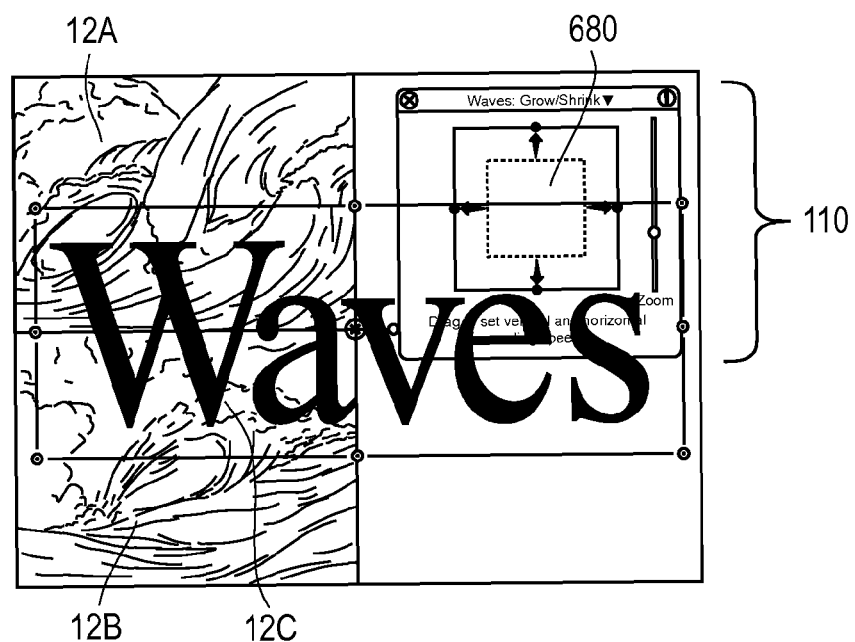
FIG. 68 illustrates the text object and the Grow/Shrink Dashboard, according to one embodiment of the invention.

In one embodiment, reposition the text object 12C at the center of the canvas, move the playhead to the last frame of the animation, and drag the Grow/Shrink control 680 in the Dashboard 110 until the text object 12C reaches its final size. FIG. 68 illustrates the text object and the Grow/Shrink Dashboard, according to one embodiment of the invention.

In one embodiment, back in the Behaviors tab of the Inspector, increase the value of the Curvature parameter. In one embodiment, this causes the increase in scale to gradually slow to a stop, rather than stopping abruptly.

In one embodiment, lastly, the Fade In/Fade Out behavior 10 will be used to fade the text object onscreen. In one embodiment, select the text object 12C, then click the Add Behavior icon, and choose Basic Motion>Fade In/Fade Out from the Behavior pop-up menu in the Toolbar.

Figure 69:
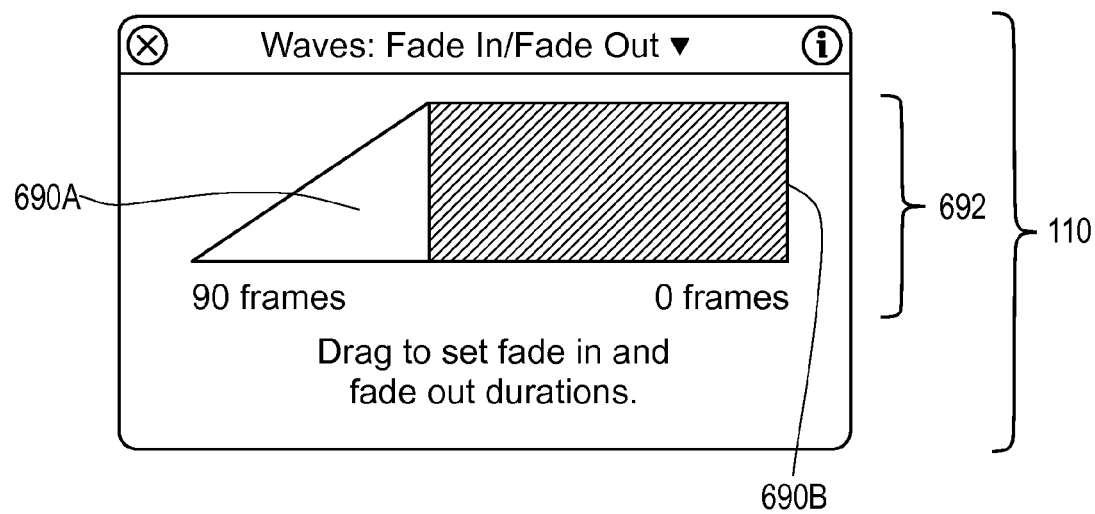
FIG. 69 illustrates the Fade In/Fade Out Dashboard, according to one embodiment of the invention.

In one embodiment, drag the left shaded ramp 690A of the Fade In/Fade Out control 692 in the Dashboard 110 to the right to lengthen the fade in effect. FIG. 69 illustrates the Fade In/Fade Out Dashboard, according to one embodiment of the invention.

In one embodiment, drag the right shaded ramp 690B all the way to the right, until it's a non-shaded, vertical edge. In one embodiment, this eliminates the fade out part of the effect, so that the center text object remains onscreen for the remainder of its duration. In another embodiment, the animation is now complete.

Figure 70:
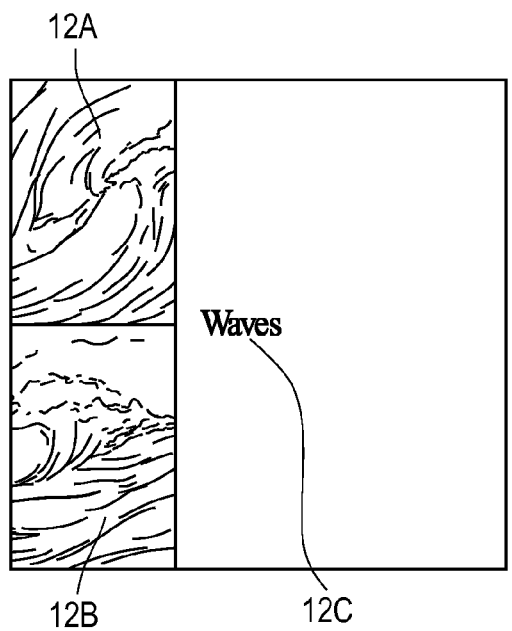
FIG. 70 illustrates the composition at the first frame, according to one embodiment of the invention.
Figure 71:
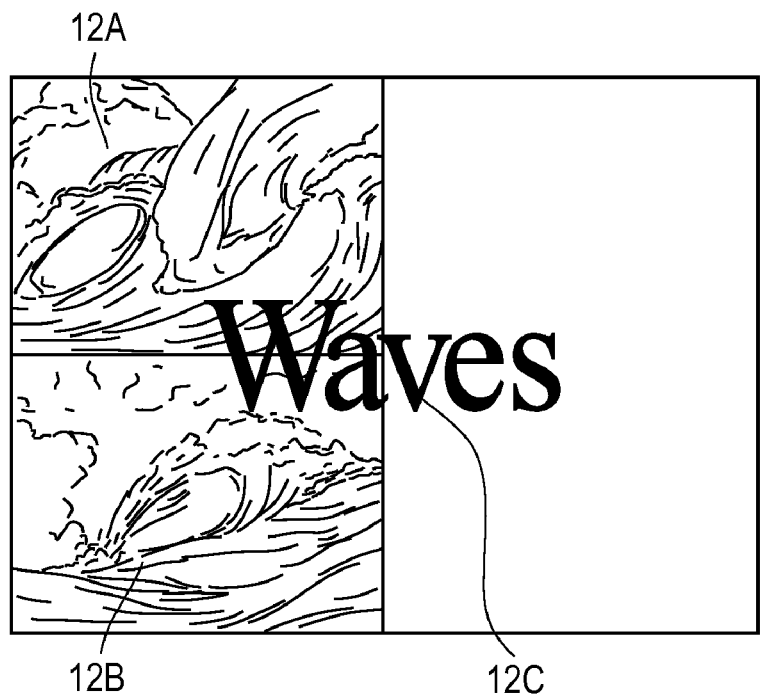
FIG. 71 illustrates the composition at a middle frame, according to one embodiment of the invention.
Figure 72:
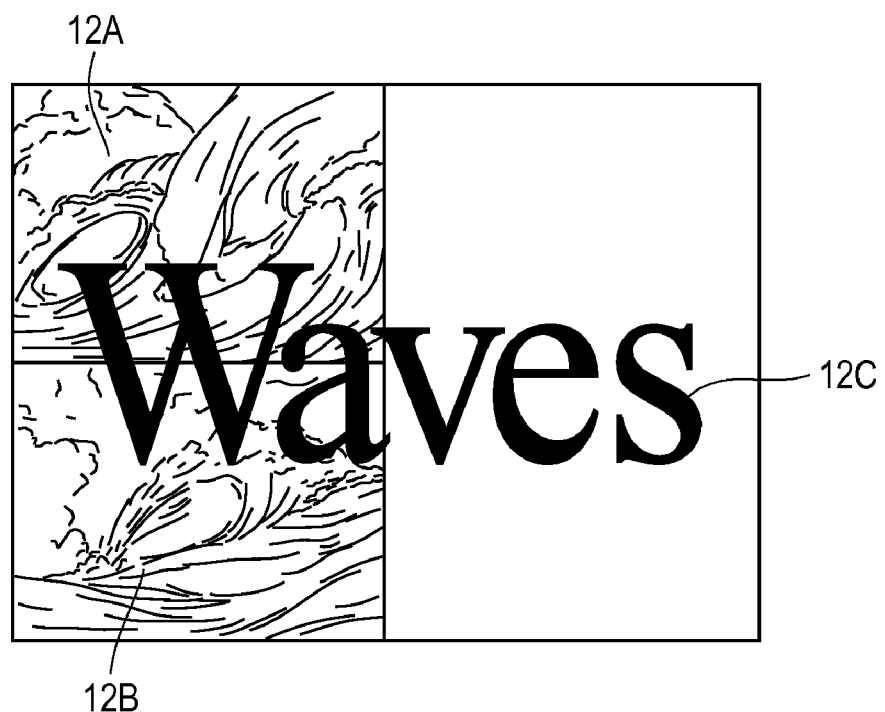
FIG. 72 illustrates the composition at the last frame, according to one embodiment of the invention.

FIG. 70 illustrates the composition at the first frame, according to one embodiment of the invention. FIG. 71 illustrates the composition at a middle frame, according to one embodiment of the invention. FIG. 72 illustrates the composition at the last frame, according to one embodiment of the invention.

ii. Example 2

Creating a Clock Animation

In one embodiment, in this example, two parameter behaviors will be used to create an animated clock. In one embodiment, by arranging the objects and their anchor points properly, each part's motion can be created quickly and easily using the Rate and Oscillate behaviors.

In one embodiment, to create a clock animation:

In one embodiment, place the graphics objects constituting the hands, face, and pendulum into the Canvas, arranging them to create the clock. In one embodiment, the hands are on top, the face in the middle, and the pendulum should be in the back. In another embodiment, by default, the anchor point is located at the center of each object. In yet another embodiment, prior to adding behaviors to animate these objects, move the anchor points so that the objects move the way they're supposed to. In one embodiment, in this example, the hands should spin about the center of the clock face, not the center of the hand itself, and the pendulum should swing from its top.

In one embodiment, choose the Adjust Anchor Point tool, and move the anchor points of both hand objects and the pendulum object to the area that should appear to be attached to the rest of the clock.

In one embodiment, now that the composition is set up to be animated, the only remaining thing to do is to assign behaviors to each of the objects. In one embodiment, select the minute hand object, and open the Properties tab in the Inspector. In another embodiment, control-click the Rotation parameter, and choose Rate from the shortcut menu to apply the Rate parameter behavior.

In one embodiment, now, open the Behaviors tab, and set the Rate parameter to <−49>. In one embodiment, this rotates the minute hand clockwise at a continuous rate.

In one embodiment, next, select the hour hand object, then open the Properties tab in the Inspector. In one embodiment, control-click its Rotation parameter, and choose Rate from the shortcut menu to apply the Rate parameter behavior to this object, as well.

In one embodiment, again, open the Behaviors tab, but this time set the Rate parameter to <−4>. In one embodiment, this also rotates the minute hand clockwise at a continuous rate, but much more slowly than the minute hand, replicating the relative movement of both hands.

In one embodiment, now it's time to make the pendulum swing. In one embodiment, select the pendulum object. In another embodiment, the user should have already adjusted its anchor point to be at the top. In yet another embodiment, this way, the bottom pendulum object will swing properly. In one embodiment, open the Behaviors tab, Control-click the Rotation parameter, but this time choose Oscillate from the shortcut menu to add the Oscillate parameter behavior.

In one embodiment, open the behaviors tab. In one embodiment, reduce the Oscillate behavior's amplitude to 20 so that the pendulum object doesn't swing so widely. In another embodiment, then, increase the speed to 50 in keeping with the overall fast-forward motion of the clock.

Examples of Object Types to Which Behaviors May Be Applied

A. Text

Behaviors can be applied to text, one of the most essential motion graphics elements.

i. About Type

In motion graphics, type has become more than words that provide basic information, such as what time to tune into your favorite television program. Type design has become an art form. A title sequence can set the mood of the film it is introducing, a certain combination of typeface and animation style can provide instant recognition of the identity of a broadcast network, or a clever television interstitial can keep a viewer from flipping channels during a commercial break. For example, the opening title sequence by Friz Freleng for Blake Edwards' "The Pink Panther" went from movie title to movie and television star, with a design and graphics style that hold up even today, nearly 40 years later.

Although trends in type design change, the balanced use of type and graphics will remain the key to achieving the right effect on the subject of commercials, documentaries, titles, broadcast identification, corporate presentations, or personal video projects. No matter what style a project requires, unique text animation tools offer immediate results.

ii. Using Text

In one embodiment, text is added to a project directly in a Canvas. In one embodiment, select a Text tool, click in the Canvas, and start typing. In another embodiment, once a text object has been created, text may be added and edited in the Canvas, or in a Text Editor in a Format pane of a Text Inspector. In yet another embodiment, once a text object has been created, the text may be put on a line or elliptical path that can be animated.

In one embodiment, when text is created, it becomes a text object. In one embodiment, the stacking order of text objects can be changed within a layer, or text objects can be moved to another layer, similar to other types of objects (e.g., video clips, images, paint objects, and shapes). In another embodiment, text objects can be easily duplicated or copied from one layer to another. In yet another embodiment, filters, transfer modes, and shadows can be applied to text objects, similar to other types of objects. In one embodiment, text objects can be moved, rotated, scaled, and easily animated using Basic Motion or Simulation behaviors (such as Throw or Gravity) or by setting keyframes.

In one embodiment, a text object, unlike other object types, has a special group of behaviors called Text Animation behaviors. In one embodiment, text behaviors create text animation by generating a range of values in text parameters specific to titling effects, without setting any keyframes. In another embodiment, for example, the Text Tracking behavior can be dragged onto a text object, and the text characters will gracefully spread out across the Canvas over time.

In one embodiment, using behaviors is an ideal workflow to interactively test different looks and animations. In one embodiment, it is not necessary to explicitly set keyframes, wait for a preview, and play the preview only to discover the need to go back and adjust the keyframes. In another embodiment, the rate of an applied behavior can be quickly adjusted using a behavior's Dashboard, while the animation updates in the canvas. In yet another embodiment, parameters for a behavior may be accessed in an Inspector.

In one embodiment, Text Animation behaviors, like other types of behaviors, can be converted to keyframes in order to fine tune the animation. In one embodiment, using Behaviors is not required to animate text; instead, text can be animated traditional keyframing or a combination of keyframing and behaviors. In another embodiment, although both keyframes and behaviors can be applied to an object, some thought must be given to the desired effect, since this workflow can defeat the purpose of Behaviors, as well as yield unexpected results.

In one embodiment, once a text treatment has been created (e.g., a customized text behavior, a combination of behaviors, or a keyframed animation), the animation can be saved to a Library for use on another text object or a future project.

In one embodiment, text objects have unique attributes, such as face and outline, and the ability to change fonts or edit the text of an existing, animated text object.

ii. Creating Text

In one embodiment, text can be created directly in a canvas using a Text tool. In one embodiment, once text has been added to a project, behaviors and filters can be applied to a text object.

a. Creating Text in a Project

In one embodiment, text can be added to a project in a Canvas. In one embodiment, when text is created, a text object is created at the first frame of a project and exists for the duration of the project. In another embodiment, for example, if a text object is added to a 900-frame project, the duration of the text object is 900 frames. In yet another embodiment, to shorten the duration of a text object, shorten the text object in a Timeline.

In one embodiment, to add text to a project in a Canvas:

In one embodiment, in a Layers list, select the layer to which the text will be added. In one embodiment, if no layer is selected, a new layer is created that contains the text object.

In one embodiment, in a Toolbar, click a Text tool (or press T).

In one embodiment, click in the Canvas. In one embodiment, the cursor flashes in the Canvas. In another embodiment, a "blank" text object is added to a Layers tab and a Timeline before any text has been entered.

In one embodiment, type the text. In one embodiment, a text object appears in the Canvas. In another embodiment, the name of the text object in the Layers tab, Timeline, and Dashboard is based on the entered text. In yet another embodiment, by default, the text Layout is set to Type. In one embodiment, the Type layout option creates no margin, so if a long string of text is entered, it extends on a single line beyond the canvas until a manual line break is created (e.g., by pressing Return). In another embodiment, this mode is useful for working with short text objects and panning text across the canvas.

In one embodiment, when done typing, press Esc or select another tool. In one embodiment, once text has been typed, press Esc or select another tool on the toolbar before using a hot key. In another embodiment, when a Text tool is selected, the mode is text-entry mode, so pressing S will add an "S" to text rather than change to the Select tool. A Dashboard for the new text object is displayed. In one embodiment, if no Dashboard is present, press D to display the text object Dashboard.

Using a Text Dashboard—In one embodiment, a text Dashboard contains some of the most commonly-adjusted text parameters, such as opacity, type family, and color. In one embodiment, text parameters in a text Dashboard include:

Opacity: In one embodiment, by default, the Opacity of a text object is set to 100 percent. In one embodiment, use a slider to change the Opacity value.

Blend Mode: In one embodiment, by default, the Blend Mode of a text object is set to Normal. In one embodiment, click a Blend Mode pop-up menu to choose another mode for the selected text object. In another embodiment, because a text object is similar to other object types, a Properties tab (and Layers tab) also contains controls to change the blend mode of the text object. In yet another embodiment, when the blend mode of a text object is changed in the Text tab of the Inspector, the blend mode is also changed in the Properties tab (and vice-versa).

Family: In one embodiment, by default, a text object's font family is set to Geneva. In one embodiment, to change the font of the selected text object, click an arrow and choose a font from the pop-up menu.

Typeface: In one embodiment, click an arrow to choose the type style, such as Bold, Italic, etc. In one embodiment, the available typefaces are specific to the selected font family.

Color: In one embodiment, a text object's color is white by default. In one embodiment, click a color well to display a Colors window and choose another color for the selected text object.

Size: In one embodiment, a text object is created at 48 points by default. In one embodiment, to change the point size of a text object, drag a Size slider. In another embodiment, to change font size in single-point increments, press Option and drag the slider. In yet another embodiment, text Size sliders (in the Dashboard and in the Inspector) are limited to 288 points. In one embodiment, to set the text to a larger point size, type a number in the Size field in the Text Inspector>Format pane.

Tracking: In one embodiment, tracking is set to 0 by default. In one embodiment, to change the Tracking value of a text object, drag a Tracking slider left (for a negative tracking value) or right (for a positive tracking value). In another embodiment, text Tracking sliders (in the Dashboard and in the Inspector) are limited to 100 points. In yet another embodiment, to set a larger tracking value, type a number in the Tracking field in the Text Inspector>Format pane.

Line Spacing: In one embodiment, when working with multiple lines of text, drag a slider to change the Line Spacing value.

Alignment: In one embodiment, text alignment is set to Left by default. In one embodiment, to change alignment, click an Alignment pop-up menu and choose Right or Center.

More Text Parameters—In one embodiment, text parameters (including those in the Text Dashboard) are located in the Text tab in the Inspector. In one embodiment, to display the Text tab of the Inspector, select the text object and click the "i" button on the Dashboard (or press Command+3). In another embodiment, the Inspector contains text parameters divided into three tabs: Format, Style, and Paragraph.

b. Adding Behaviors and Filters to Text Objects

In one embodiment, filters and behaviors are applied to text objects in the same manner as they are applied to other object types. This section provides a quick start to applying Behaviors and Filters to text objects.

In one embodiment, to apply a behavior or filter to a text object, do one of the following:

In one embodiment, to apply a behavior to a text object, drag a behavior from Library>Behaviors>Behavior category>behavior name, or use the Behaviors file menu. In one embodiment, the text object Dashboard is replaced with the behavior Dashboard.

In one embodiment, to apply a filter to a text object, drag a filter from Library>Filters>Filter category>filter name, or use the Filters file menu.

Using the Dashboards—In one embodiment, a Dashboard can be displayed for any object. In one embodiment, to display a Dashboard, select the object and press H. In another embodiment, the Dashboard that is displayed represents the currently selected object. In yet another embodiment, the parameters contained in a Dashboard depend on the type of object that it represents. In one embodiment, for example, a text object Dashboard displays text-specific parameters, such as Typeface and Line Spacing. In another embodiment, a particle emitter Dashboard displays particle-specific controls, such as Particles per Second and Lifetime.

In one embodiment, as effects (e.g., behaviors and filters) are added to an object, the displayed Dashboard changes to the most recently added effect. In one embodiment, the Dashboard name is displayed on the top bar of the Dashboard window. In another embodiment, to cycle through the Dashboards for an object, press H. In yet another embodiment, the Dashboards cycle in the order that the effects are applied.

In one embodiment, to jump to a specific Dashboard, click a disclosure triangle next to the Dashboard name and select a Dashboard from the list.

iv. Fonts

In one embodiment, any supported font may be used. In one embodiment, supported fonts include OpenType, Type1 (or PostScript), TrueType, and LiveType.

In one embodiment, to preview the available fonts:

In one embodiment, in the Library, click the Fonts category and then select a font subcategory. In one embodiment, the fonts appear in the stack. In another embodiment, to view thumbnails of the fonts, set the Library to icon view.

In one embodiment, in the stack, select a font. In one embodiment, the font is previewed in the Preview window. In another embodiment, click a font to appear in the font browser.

a. Using the Font Browser

In one embodiment, a Library includes a font browser that allows a user to preview fonts, select fonts, or apply a font to an existing text object. In one embodiment, to access the font browser, click the Library tab and then click the Fonts category. In another embodiment, when working with a text object, fonts can be browsed using the Browse button in the Format panel of the Text Inspector.

In one embodiment, to use the font browser, do one of the following.

In one embodiment, to preview a font:

In one embodiment, in the Library, click the Fonts category.

In one embodiment, click the font sub-category to use. In one embodiment, if in list view, the font list appears in the font stack. In one embodiment, if in icon view, the font thumbnails appear in the font stack.

In one embodiment, in the stack, click a font thumbnail or name. In one embodiment, the font is displayed in the Preview window. In another embodiment, use the scroll bar on the left side of the browser to scrub through fonts in alphabetical order.

In one embodiment, to select a font:

In one embodiment, follow steps 1-3, above.

In one embodiment, create a text object. In one embodiment, the selected font is applied to the text object.

In one embodiment, to change the font of an existing text object:

In one embodiment, in the canvas or Layers list, select the text object.

In one embodiment, in the Library, click the Fonts category.

In one embodiment, click the font sub-category to use.

In one embodiment, in the stack, click a font.

In one embodiment, drag the font onto the text object in the Canvas. In one embodiment, the text object is changed to the selected font.

b. Navigating the Font Browser Lists

In one embodiment, to quickly locate a font by its name in the font stack, type the first letter or first few letters of the font name in the browser.

In one embodiment, to select a font by the first letter of its name:

In one embodiment, click in the font stack (on a font name or thumbnail).

In one embodiment, type the first letter of the font name. In one embodiment, the first font that begins with that letter is selected in the stack.

In another embodiment, it is also possible to quickly type the first few letters of the font name to select the font. In one embodiment, to select a font by the first few letters of its name:

In one embodiment, click in the font stack (on a font name or thumbnail).

In one embodiment, quickly type the first two letters of the font name. In one embodiment, if the second letter of the font name is not typed quickly, the selection is reset and jumps to the font whose name begins with the second letter entered.

v. Text Tools

In one embodiment, text becomes a text object when created. In one embodiment, a text object is like any other object type, with one exception. In another embodiment, text object properties can be animated, and behaviors and filters can be applied to text objects, similar to other object types. In yet another embodiment, however, text-specific parameters can be animated and Text Behaviors can be applied, unlike with other object types.

In one embodiment, behaviors and filters aside, there are two ways to edit a text object: (1) as an object using the object parameters in the Inspector>Properties tab (or the onscreen controls); and (2) as text using Text parameters in the Inspector>Text tab. This section discusses the tools that can be used with text objects, according to one embodiment of the invention.

In one embodiment, the following interface tools may be used to edit text:

Toolbar

Text Dashboards

Text Inspector

In one embodiment, when a text object is selected, the standard onscreen controls can be used to move and animate the text object in the Canvas.

a. Text Tool and the Toolbar

In one embodiment, a Text tool is located in a Toolbar above a Canvas. In one embodiment, in addition to the Text tool, other tools may be used with text objects, such as a Magnify tool, Grab tool, and Selection tool. In one embodiment, the Toolbar layout can be customized.

Text Tool—In one embodiment, a Text Tool may be used to create, select, and edit text. In one embodiment, to add text, do one of the following:

In one embodiment, select the Text tool (or press T), click in the canvas, and begin typing.

In one embodiment, select the Text tool, and click and drag in the Canvas to draw a custom margin. In one embodiment, once the margin is drawn, release the mouse and begin typing.

In one embodiment, select the Text tool, click in the canvas, and type in the Text Editor. In one embodiment, the Text Editor is located in the Format pane of the Text Inspector.

In one embodiment, to select text characters, do one of the following:

In one embodiment, select the Text tool, click and drag the text to select.

In one embodiment, position the cursor in between two characters, press Shift, and press the Right Arrow key to add characters to the right of the cursor to the selection, or press the Left Arrow key to add characters to the left of the cursor to the selection.

Selection Tool—In one embodiment, a Selection Tool may be used to select or deselect one or more object. In one embodiment, once a text object has been created, click the Selection tool (or press Esc) to select the text object. In another embodiment, once a text object has been selected, the object's Dashboard may be displayed (press H), or the object's Inspector may be displayed (press I). In yet another embodiment, when the Select tool is selected, double-clicking a text object automatically enters text editing mode.

Magnify Tool—In one embodiment, a Magnify Tool zooms in or out of the canvas. In one embodiment, to zoom in, click the Magnify tool, click in the cursor, and drag to the right. In another embodiment, to zoom out, drag to the left. In yet another embodiment, the zoom is based around the position of the cursor in the canvas.

Grab Tool—In one embodiment, a Grab Tool moves the image within the canvas. In one embodiment, to reposition the canvas, click the Grab tool, click in the canvas, and drag.

vi. Editing Text in the Inspector

In one embodiment, text controls are located in the Text tab of the Inspector. In one embodiment, the Text tab is divided into three panes: Format, Style, and Paragraph. In another embodiment, the Format pane contains text basics, such as font, size, and tracking. In yet another embodiment, text characteristics such as face, outline, and blur are controlled in the Style pane. In one embodiment, the Paragraph pane contains text layout controls, such as margins and justification.

vii. Editing Text Format

In one embodiment, the Text Format panel contains the controls for text basics, such as font, typeface, size, kerning, and character rotation. In one embodiment, most of the Format parameters can be animated (keyframed), including the font family. In another embodiment, if a parameter can be animated, the Animation menu icon appears next to the parameter in the Inspector.

In one embodiment, to show the Text Format panel, click the Text tab in the Inspector and click the Format button.

a. Text Format Controls

The following section describes the Text Format parameters, according to one embodiment of the invention.

Font Type—In one embodiment, two tools are provided for font filtering and selection:
  In one embodiment, a first pop-up menu that filters which fonts appear in the Family list (see below). The menu can show, for example, All Fonts, System Fonts, LiveFonts (LiveType), or Favorites. In one embodiment, fonts are displayed in alphabetical order.
  In one embodiment, a font browser.
  Collection
  Family—In one embodiment, the font family (the set of characters, letters, and symbols of a single typeface) of a text object may be set. In one embodiment, typing the first letter or few letters of a type family name into the Family text field jumps to that font.
  In one embodiment, to preview different font families for a text object in the canvas:
    In one embodiment, select the text object.
    In one embodiment, in the Text Format pane, click the Family list arrow. In one embodiment, the font family list appears.
    In one embodiment, click and hold the cursor in the font list, and scrub up or down to select a font.
    In one embodiment, as the font family list is scrubbed through, the text changes in the Canvas to the currently selected font family.
    In one embodiment, once the font has been selected, release the mouse.
  In one embodiment, the scroll bar can be used to move up and down the font list.
  Typeface—In one embodiment, the type style, such as Bold, Condensed, etc., may be set. In one embodiment, the available typefaces are specific to the selected font family.
  Size—In one embodiment, the size of the type may be set. In one embodiment, the size may be set by entering a value in the value field or using a slider. In another embodiment, the text may be scaled in the Canvas using onscreen controls, however, this scaling is independent of setting type point size in the Format controls. In yet another embodiment, to change font size, drag the Size slider left or right. In one embodiment, to change font sizes in single-point increments, press Option and drag the slider. In another embodiment, the slider value in the Dashboard and the slider value in the Inspector are limited to 288. In yet another embodiment, larger text can be created by typing a value in the Size value slider in the Inspector.
  Tracking—In one embodiment, Tracking determines the spacing between the characters of a text object. In one embodiment, Tracking applies a uniform value between each character.
  Kerning—In one embodiment, Kerning is used to adjust the spacing between individual characters of a text object.
    In one embodiment, to kern individual characters in a text object:
    In one embodiment, select the text object.
    In one embodiment, click the Text tool (or press T).
    In one embodiment, in the canvas, position the cursor in between the characters to kern, and do one of the following:
      In one embodiment, use the Kerning slider or value field to set a specific kerning value.
      In one embodiment, press Opt+Right Arrow to increase the space between the characters by one-pixel increments.
      In one embodiment, press Opt+Left Arrow to reduce the space between the characters by one-pixel increments.
  In one embodiment, once the cursor is positioned in between the adjacent characters to kern, use the Right Arrow and Left Arrow keys to move between the characters. In one embodiment, if there are multiple lines of text (with a single text object), use the Up Arrow and Down Arrow keys to move the cursor between the lines of text.
  Baseline—In one embodiment, Baseline adjusts the baseline of text characters. In one embodiment, a baseline is a horizontal "line" to which the bottom of characters is aligned.
  Slant—In one embodiment, Slant simulates italics by adding a slant value to the characters of a text object.
  Character Scale—In one embodiment, Character Scale scales the characters of the text object either proportionately, in X, or in Y. In one embodiment, to scale in only X or Y, click the disclosure triangle to enter separate X and Y scale values.
  Offset—In one embodiment, Offset offsets the text from the text bounding box. In one embodiment, enter a value in the Offset field to proportionally edit the X and Y offsets, or click the disclosure triangle to enter separate X and Y position values.
  Character Rotate—In one embodiment, Character Rotate rotates each text character around its base. In one embodiment, click and drag on the dial or enter a value in the value field to rotate the text characters.

Monospace—In one embodiment, when enabled, monospace applies a fixed amount of space between each text character.

All Caps—In one embodiment, All Caps sets all text characters to upper-case.

All Caps Size—In one embodiment, when All Caps is enabled, All Caps Size sets the size of the upper-case characters based on a percentage of the font point size.

In one embodiment, the following Format parameters appear in the text Dashboard: Family, Typeface, Size, and Tracking.

Using the Text Editor—In one embodiment, a Text Editor is an additional tool that allows text to be added and edited in the Inspector rather than the Canvas. In one embodiment, the Text Editor is useful when working with large amounts of text.

In one embodiment, to add or change text in the Text Inspector:

In one embodiment, in the Layers list, select the layer to which to add text.

In one embodiment, select the Text tool (e.g., click the tool or press T).

In one embodiment, click in the Canvas. In one embodiment, the cursor flashes in the Canvas.

In one embodiment, in the Text Inspector, click the Format pane.

In one embodiment, click in the Text Editor (e.g., in the lower portion of the Format pane), and begin typing. In one embodiment, when text is entered in the Text Editor, margins are automatically set based on project safe zones.

In one embodiment, the Text Editor can also be used to edit text objects in projects.

In one embodiment, to edit existing text using the Text Editor:

In one embodiment, in either the Layers List or the Canvas, select the text object to be edited.

In one embodiment, in the Text Inspector, click the Format pane. In one embodiment, the selected text appears in the Text Editor.

In one embodiment, make changes in the Text Editor.

viii. Editing Text Style

In one embodiment, use a Text Style pane to specify the fill of a text object and to adjust its opacity and softness. In one embodiment, a text object can be a solid color, an image, or a color gradient. In another embodiment, most of the style parameters can be animated. In yet another embodiment, outlines, glows, and drop shadows can be created for a text object in the Style pane.

In one embodiment, predefined Text Styles may be used in a project. In one embodiment, Text Styles use parameters in the Text Style pane to create a specific "look" for a text object. In another embodiment, for example, one style is a yellow-to-orange gradient with a soft white outline. In yet another embodiment, these styles are located in a Library. In one embodiment, to show the Text Style panel, click the Text tab in the Inspector and click Style.

In one embodiment, there are four main groups of controls in the Style pane: Face, Outline, Glow, and Drop Shadow. In one embodiment, a style can be enabled or disabled for a text object. In one embodiment, by default, Outline, Glow, and Drop Shadow are disabled.

a. Text Face Controls

In one embodiment, Text Face controls are used to specify whether the text is a solid color, a texture, or a color gradient. In one embodiment, the following Face parameters are available:

Enable—In one embodiment, the Enable parameter enables and disables the face of the text object. In one embodiment, the Face is enabled by default.

Fill with—In one embodiment, clicking the Fill with pop-up menu sets the fill for the text object. In one embodiment, the fill options are Color, Gradient, and Texture.

Color—In one embodiment, clicking the color box selects a color for the text object from the Colors window. In one embodiment, the individual Red, Green, Blue, and Alpha values for a text object can be adjusted by clicking the Color disclosure triangle.

Opacity—In one embodiment, the Opacity parameter sets the opacity of the text object. In one embodiment, the opacity is applied to the Color, Texture, and Gradient options.

Blur—In one embodiment, the Blur parameter sets the softness of the text object. In one embodiment, the blur is applied to the Color, Texture, and Gradient options.

Changing the Text Color—In one embodiment, to change the color of a text object, use the color picker in the text object Dashboard or in the Inspector. In one embodiment, to adjust individual color channels, use the Text Inspector.

In one embodiment, to set the text color in the Dashboard:
In one embodiment, select the text object.
In one embodiment, if the Dashboard is not displayed, press H.

In one embodiment, click the color picker and use the Colors window to set the text color. In one embodiment, the text object is dynamically updated as the color is selected. In another embodiment, once a Color has been set, that color becomes the default color for all new text objects added to a project. In yet another embodiment, to select a color from the Canvas (or anything on a computer's desktop), click the Color Picker/magnification tool in the Colors window, position the tool over the color, and click. In one embodiment, the Colors window is the color picker for the operating system.

In one embodiment, to set the text object color in the Inspector:
In one embodiment, select the text object.
In one embodiment, in the Inspector (I), click the Text tab.
In one embodiment, click Style.
In one embodiment, in the Fill with pop-up menu, ensure Color is selected.

In one embodiment, click the color picker and use the Colors window to set the text color.

In one embodiment, to adjust an individual color channel:
In one embodiment, in the Inspector, click the Color disclosure triangle to show the channel parameters.

In one embodiment, use the sliders or value fields to adjust the value of a color channel, or the alpha value of the text object. In one embodiment, text object colors can be animated.

Applying a Gradient to a Text Object—In one embodiment, in the Inspector, gradient fills for text objects can be created and animated. In one embodiment, the gradient controls for a text object are similar to the gradient controls for a shape or particle object. In another embodiment, a gradient preset can be applied to a text object. In yet another embodiment, the gradient presets are located in a Library. In one embodiment, a gradient that has been created can be saved to the Library for use in a current project or future projects.

In one embodiment, to create a text object gradient:
In one embodiment, select the text object.
In one embodiment, in the Inspector (I), click the Text tab.
In one embodiment, click Style.
In one embodiment, in the Fill with pop-up menu, select Gradient. In one embodiment, the Color controls are replaced with the gradient controls, and the gradient is applied to the selected text object. In another embodiment, the gradient is set to two colors: red and yellow, by default.

In one embodiment, to apply a gradient preset to a text object:

In one embodiment, follow steps 1-4, above.

In one embodiment, click the preset button (located next to the gradient display), and select a preset. In one embodiment, once a gradient preset is applied to a text object, the preset can be edited. In another embodiment, a user can preview a gradient preset.

Using the Gradient Editor—In one embodiment, a Gradient Editor can be used to change the color, color position, number of colors, opacity, and direction of a gradient. In one embodiment, the color and opacity of a gradient can be animated.

In one embodiment, the following sections assume that a text object is selected, and the Gradient option is selected from the "Fill with" pop-up menu in the Face controls.

In one embodiment, to change gradient colors:

In one embodiment, click the Gradient disclosure triangle to show the Gradient Editor. In one embodiment, the Gradient editor includes opacity controls (bar and tags), a gradient rep bar, a gradient editing bar, gradient tags, a color bar, and color position carets.

In one embodiment, to change the color of a gradient tag, do one of the following:

In one embodiment, double-click a gradient color tag. In one embodiment, the Colors window appears. Use the Colors window to set a new color for the tag.

In one embodiment, click a gradient color tag. In one embodiment, the color controls for that tag are enabled. In another embodiment, in the Color controls, either click the color picker to show the Colors window, or use the individual color channel controls to set a new color for the tag.

In one embodiment, to move the position of a color tag:

In one embodiment, click the color tag to move.

In one embodiment, do one of the following:

In one embodiment, drag the color tag left to right.

In one embodiment, in the Location parameter, use the slider to value field to enter a specific value. In one embodiment, a value of 100 percent is the right-most position of the gradient, and a value of 0 percent is the left-most position of the gradient.

In one embodiment, to change the spread of a gradient color, click and drag the triangle between the color tags. In one embodiment, the closer the triangle is to a color tag, the sharper the gradient.

In one embodiment, to add a color to a gradient, place the cursor in the lower gradient bar in the position to add the new color, and click. In one embodiment, a new color tag is added to the gradient. In another embodiment, the color of the new color tag is based on the last selected color in the color picker.

In one embodiment, although the colors and opacity of a gradient can be animated, the number of color and opacity tags cannot.

In one embodiment, to remove a color from a gradient, click and drag the color tag away from the gradient bar. In one embodiment, the color tag is removed.

In one embodiment, to change the opacity of a gradient color:

In one embodiment, in the opacity bar of the gradient Editor, click an opacity tag. In one embodiment, the Opacity controls are enabled.

In one embodiment, use the slider or value field to change the value of the Opacity. In one embodiment, the gradient opacity is applied to the area of a gradient, not to a specific color tag.

In one embodiment, the controls to move, change the spread, add, or remove a opacity tag are similar to those of the color tags.

In one embodiment, to reverse the gradient color or transparency direction, click the Change Tags button next to the opacity or lower gradient bars.

In one embodiment, to evenly distribute the gradient color or transparency tags, click the Divide Tags button next to the opacity or lower gradient bars.

Using a Texture—In one embodiment, an object (image, clip, or shape) can be used as the fill for a text object with the Texture option in the Face controls of the Inspector.

In one embodiment, to apply a texture to a text object:

In one embodiment, select the text object.

In one embodiment, in the Inspector (I), click the Text tab.

In one embodiment, click Style.

In the Fill with pop-up menu, select Texture. In one embodiment, the Color controls are replaced with the Texture controls.

In one embodiment, click the Texture disclosure triangle. In one embodiment, by default, no texture is applied to the text object.

In one embodiment, in the Layers or Media List (of the Project Panel), click and drag the image to use for the texture to the Input Image well. In one embodiment, the image appears in the well and is applied to the text object. In another embodiment, when selecting an image to put into the Input Image well, click and drag in one movement. In yet another embodiment, if the object is clicked on and the mouse is released, that object is selected and the relative Inspector appears. In one embodiment, this also applies to the Input Image well for masks.

Applying a Texture to a Character vs. Applying a Texture to a Text Object—In one embodiment, when an image (or object) is applied as the texture for a text object, the texture is applied to a character in the text object. In one embodiment, to use the image as a continual texture throughout a text object, use the text as a mask.

In one embodiment, to use a text object as a mask:

In one embodiment, in the Layers List or Canvas, select the object or layer to use as the texture.

In one embodiment, in the Inspector (I), click the Properties tab.

In one embodiment, in the Layers list, click and drag the text object to use as a mask to the Input Image well in the Mask controls of the Properties tab.

In one embodiment, the text object masks the image.

In one embodiment, to replace a texture:

In one embodiment, select the text object and display the expanded Texture controls.

In one embodiment, in the Layers or Media List, click and drag the image to use to replace the existing texture to the Input Image well. In one embodiment, the new image appears in the well and is applied to the text object. In one embodiment, when footage is replaced that is linked to a text object as a texture (or any object as a mask) in the Layers or Media lists, the texture is replaced for the text object with the new footage.

Editing a Texture—In one embodiment, the position of a texture that is applied to a text object can be adjusted using Image Offset in the Texture controls. In one embodiment, if the image used as the texture is offset and is cut off in a text object, the edge behavior of the texture can be specified. In another embodiment, if an image sequence is being used, certain frames can be specified to use as the texture.

In one embodiment, to change the position of a texture, do one of the following in the Texture controls:

In one embodiment, press Command and click and drag in the Image Input well.

In one embodiment, the image moves in the well and is offset in the text object in the Canvas.

In one embodiment, adjust the Image Offset values. In one embodiment, click the disclosure triangle to independently adjust the X and Y position values of the input texture.

Wrap Mode—In one embodiment, use the Wrap Mode controls to specify how the edge of a texture is treated when the texture is offset and appears cut off in the text object.

Clamp—In one embodiment, as the default wrap mode, the texture remains transparent beyond the edge of the source image.

Repeat—In one embodiment, similar to tiling behavior, the texture source is repeated beyond the edge of the source image.

Mirror—In one embodiment, beyond the edge of the source image, the texture source is reflected like in a mirror.

Frame—In one embodiment, use the Frame field to specify a frame or timecode value of the frame to use as the texture.

Lock/Unlock—In one embodiment, use Lock to use only the frame specified in the Frame field as the texture for all frames of s project. In one embodiment, unlock the Frame field to use the sequence of images as the texture.

Animating a Texture—In one embodiment, keyframes can be set for the offset values of the texture source to create a moving element within a text object.

In one embodiment, to animate the texture offset:

In one embodiment, go to the frame where the texture animation will begin.

In one embodiment, click the Animate button. In one embodiment, keyframing is enabled. In another embodiment, when Animate is enabled, any changes made to a project are keyframed.

In one embodiment, to position the texture, do one of the following:

In one embodiment, press Command and click and drag in the Image Input well.

In one embodiment, use Image Offset sliders or value fields to enter an offset value.

In one embodiment, go to the next frame where a keyframe will be set.

In one embodiment, move the texture to the new position.

In one embodiment, go to frame 1 (or the start frame of the animation) and play the clip. In one embodiment, the texture offset is animated.

In one embodiment, click Animate again to disable keyframing.

In one embodiment, the Animation Menu in the Inspector can also be used to set keyframes.

Using an Object with Applied Behaviors and Filters as a Texture Source—In one embodiment, an object (image, clip, shape, or layer) that has applied behaviors and filters can be used as the texture source for a text object. In one embodiment, if the object has applied, active filters, the result of the filters are included in the texture source; i.e., the result of the filters can be seen in the texture. In another embodiment, if the object has applied, active behaviors or transforms, the behaviors and transforms are ignored. In yet another embodiment, only the image appears as the texture. In one embodiment, use the following guidelines when using objects as texture sources.

In one embodiment, when using an object with an applied filter as a texture source:

In one embodiment, to use the object with the effect of the filter, use the steps similar to those given for applying a texture to a text object.

In one embodiment, if the object is an image or image sequence, use the object without the effect of the filters by dragging the image from the Media tab to the Texture Input Image well, rather than from the Layers List.

In one embodiment, to use an object without the effect of the applied filter, make a copy of the object in the Layers List, remove the filters from the object, and turn the object off. In one embodiment, the object can then be dragged from the Layers List to the input well.

In one embodiment, when using an object with an applied behavior or active transforms (e.g., rotate) as a texture source, use the steps similar to those given for applying a texture to a text object. In one embodiment, the effects of the behavior or transforms are ignored.

Changing the Text Opacity—In one embodiment, the Opacity slider or value field in the Dashboard or in the Inspector can be used to adjust the opacity of a text object.

In one embodiment, to set the text object opacity in the Dashboard:

In one embodiment, select the text object.

In one embodiment, press H to display the Dashboard. In one embodiment, the Opacity controls are located at the top of the Dashboard.

In one embodiment, click and drag the Opacity slider, or enter an opacity value in the field. In one embodiment, the text object opacity is dynamically updated as the slider is dragged.

In one embodiment, to set the opacity in the Inspector:

In one embodiment, select the text object.

In one embodiment, in the Inspector (I), click the Text tab.

In one embodiment, click Style.

In one embodiment, in the Face controls, click and drag the Opacity slider, or enter an opacity value in the field.

In one embodiment, because a text object is like objects of other types, its opacity can be adjusted in the Properties tab. In one embodiment, the changes are multiplicative. In another embodiment, in other words, if the Opacity of a text object is set in the Text Style parameters to 50 percent, the opacity of the text object is 50 percent. In yet another embodiment, if the Opacity in the Properties tab is then set to 50 percent, the opacity of the text object is 25 percent.

Setting the Text Blur—In one embodiment, use the Blur parameter to adjust the softness of the text object.

In one embodiment, to adjust the softness in the Inspector:

In one embodiment, select the text object.

In one embodiment, in the Inspector (I), click the Text tab.

In one embodiment, click Style.

In one embodiment, in the Face controls, click and drag the Blur slider, or enter a blur value in the field. In one embodiment, the text object softness is dynamically updated as the slider is dragged.

Text Outline Controls—In one embodiment, use the Outline controls in the Style pane to create text object outlines. In one embodiment, the color, opacity, softness, width, and fill of the outline can be changed.

Enable—In one embodiment, Enable enables and disables the text outline.

Fill with—In one embodiment, Fill with sets the fill for the text outline. In one embodiment, as with the Face controls, the outline fill can be set to Color, Gradient, or Texture.

Color—In one embodiment, Color sets the color for the text outline. In one embodiment, click the Color disclosure triangle to adjust the individual Red, Green, Blue, and Alpha values of the outline.

Opacity—In one embodiment, Opacity sets the opacity of the text outline.

Blur—In one embodiment, Blur sets the softness of the text outline.

Width—In one embodiment, Width sets the range of the outline.

Priority/Over/Under—In one embodiment, Priority/Over/Under specifies whether the outline is drawn over or under the text object face.

Adding a Text Outline—In one embodiment, to create a text outline, enable the Outline parameter in the Style pane of the Text Inspector.

In one embodiment, to create an outline for a text object:
In one embodiment, select the text object.
In one embodiment, in the Inspector (I), click the Text tab.
In one embodiment, click Style.
In one embodiment, in the Outline controls, turn on Outline.

In one embodiment, the outline only of a text object may be displayed by turning off the Face parameters.

Editing Text Object Outlines—In one embodiment, use the Outline controls to soften the opacity or blur of a text outline, change the width of an outline, or to set and edit the fill of an outline.

In one embodiment, to change the color of an outline, click the color picker and select a color from the Colors window.

In one embodiment, to adjust the opacity of an outline, use the Opacity slider or the value field to change the opacity of the outline.

In one embodiment, to adjust the blur of a text outline, use the Blur slider or the value field to change the blur of the outline.

In one embodiment, to change the width of a text outline, use the Width slider or the value field to change the width of the outline.

In one embodiment, the Outline fill controls are similar to the controls for the Face parameters.

Text Glow Controls—In one embodiment, use the Glow controls to create a glow around a text object.

Enable—In one embodiment, Enable enables and disables the text glow.

Fill with—In one embodiment, Fill with sets the fill for the text glow. In one embodiment, as with the Face and Outline controls, the outline fill can be set to Color, Gradient, or Texture.

Color—In one embodiment, Color sets the color for the text glow. In one embodiment, click the Color disclosure triangle to adjust the individual Red, Green, Blue, and Alpha values of the glow.

Opacity—In one embodiment, Opacity sets the opacity of the text glow.

Blur—In one embodiment, Blur sets the softness of the text glow.

Width—In one embodiment, Width sets the size of the glow.

Adding a Text Glow—In one embodiment, to create a text glow, enable the Glow parameter in the Style pane of the Text Inspector.

In one embodiment, to create a glow for a text object:
In one embodiment, select the text object.
In one embodiment, in the Inspector (I), click the Text tab.
In one embodiment, click Style.
In one embodiment, in the Outline controls, turn on Glow.

In one embodiment, the glow only of a text object may be displayed by turning off the Face (and any other active) parameters.

Editing Text Object Glow—In one embodiment, use the Glow controls to soften the opacity or blur of the text glow, change the size of the glow, or set and edit the fill of a glow.

In one embodiment, to change the color of the glow, click the color picker and select a color from the Colors window.

In one embodiment, to adjust the opacity of the glow, use the Opacity slider or the value field to change the opacity of the glow.

In one embodiment, to adjust the blur of the glow, use the Blur slider or the value field to change the softness of the glow.

In one embodiment, to change the width of the glow, use the Width slider or the value field to change the size of the glow.

In one embodiment, the Glow fill controls are similar to the controls for the Face parameters.

Creating a Drop Shadow—In one embodiment, use the Drop Shadow controls to create a drop shadow on a text object, and to adjust its color, opacity, offset from the text object, softness, and angle. In one embodiment, the Shadow parameters include:

Enable—In one embodiment, Enable enables and disables the drop shadow.

Color—In one embodiment, click the color box to select a color for the drop shadow from Colors window. In one embodiment, click the Color disclosure triangle to adjust the individual Red, Green, Blue, and Alpha values of the shadow.

Opacity—In one embodiment, Opacity sets the opacity of the drop shadow.

Distance—In one embodiment, Distance sets the distance, in pixels, of the drop shadow from the text object.

Blur—In one embodiment, Blur sets the softness of the drop shadow.

Angle—In one embodiment, Angle sets the angle (or direction) of the drop shadow.

Size—In one embodiment, Size determines the size, in points, of the drop shadow. In one embodiment, by default, the shadow is the same size as the font size.

Adding a Drop Shadow—In one embodiment, to create a text drop shadow, enable the Drop Shadow parameter in the Style pane of the Text Inspector.

In one embodiment, to add a drop shadow:
In one embodiment, select the text object.
In one embodiment, in the Inspector (I), click the Text tab.
In one embodiment, click Style.
In one embodiment, in the Drop Shadow parameters, turn on Drop Shadow. In one embodiment, the default drop shadow is applied to the text object.

Adjusting the Drop Shadow Parameters—In one embodiment, use the Drop Shadow controls to change the color or opacity of the shadow and to adjust the softness of the shadow. In one embodiment, the distance the shadow is offset from the text object, and its angle, may also be adjusted. In another embodiment, the Drop Shadow parameters can be animated.

In one embodiment, to change the color of the drop shadow, click the color box and use the Color window to set a new color.

In one embodiment, to change the opacity of the drop shadow, in the Opacity parameter, click and drag the slider or use the value field.

In one embodiment, to change the size of the drop shadow, in the Size parameter, click and drag the slider or use the value field.

In one embodiment, to change the distance of the shadow from the text object, in the Distance parameter, click and drag the slider or use the value field. In one embodiment, the distance the shadow is offset is represented in pixels.

In one embodiment, to change the angle of the shadow from the text object, click and drag in a circular motion on the Angle dial, or use the value field.

In one embodiment, the Shadow fill controls are similar to the controls for the Face parameters.

ix. Editing Text Paragraphs

In one embodiment, the Text Layout pane contains controls for type layout, such as setting margins, alignment, justification, and line spacing. In one embodiment, a "typewriter" effect can be created using the Type On parameter in the Layout pane.

In one embodiment, to show the Text Layout pane, in the Inspector, click the Text tab, and click Layout.

a. Text Layout Controls

In one embodiment, use the Text Layout controls to specify general "layout" of text. In one embodiment, these controls include specifying if the text flows in a single line, a paragraph with set margins, or on a path.

Layout Method—In one embodiment, Layout Method specifies whether the text layout is set to Type, Paragraph, or Path. In one embodiment, the default layout is Type, which creates a single line of text For a description of each layout.

Alignment—In one embodiment, Alignment sets the alignment of the lines of text. The options include Left, Center, or Right.

Justification—In one embodiment, Justification sets the justification of the lines of text. In one embodiment, the options include None, Partial, or Full.

Line Spacing—In one embodiment, Line Spacing specifies the distance between each line of text (leading) in point-sized increments.

Type On—In one embodiment, Type On creates a type-on effect, similar to a typewriter.

Left, Right, Top, and Bottom Margin—In one embodiment, Left, Right, Top, and Bottom Margin sets the margins for the text layout in the Canvas. In one embodiment, a user can create a custom margin, use the Margin controls, or draw a text box in the Canvas.

In one embodiment, to create a text box, do one of the following:

In one embodiment, select the Text tool (T), and click and drag a text box in the Canvas.

In one embodiment, in the Text Layout controls, set values using the Left, Right, Top, and Bottom Margin parameters.

b. Setting Text Margins

In one embodiment, if a user is working with a large amount of text and needs paragraph controls, he can establish margins. In one embodiment, a user can draw a custom text box in the Canvas, or set up margins in the Layout pane of the Text Inspector.

In one embodiment, the default type layout option is Type. In one embodiment, when Type is enabled, text is entered in one string that extends beyond the Canvas, unless the user manually breaks or returns at the end of his text lines.

Drawing Text Margins—In one embodiment, use the Text tool to draw a text box in the Canvas. A user can draw a box that extends beyond the edge of the Canvas.

In one embodiment, to draw a text box:

In one embodiment, select the Text tool (T).

In one embodiment, click and drag in the Canvas to draw the text box.

In one embodiment, begin typing.

In one embodiment, to resize the text margins, ensure the Text tool still selected and click and drag a control point on the text box. In one embodiment, a user can also resize the margins of the text box using the Margin controls in the Layout pane of the Text Inspector.

In one embodiment, press Esc or click the Selection (S) tool to select the text box and exit editing mode. In one embodiment, a user cannot use the Selection tool to resize only the text box margins and not the text. In another embodiment, if a user selects a control point of a text box with the Selection tool and resizes, the object itself is resized, not just the bounding box.

Using Margins with the Text Editor—In one embodiment, when entering text via the Text Editor, a user can set text margins using the Paragraph Layout Method option and the margin controls in the Layout pane.

In one embodiment, to set margins for text entered in the Text Editor:

In one embodiment, select the Text tool (T) and click in the Canvas.

In one embodiment, in the Inspector>Text tab, click Layout.

In one embodiment, select Paragraph from the Layout Method pop-up menu.

In one embodiment, use the margin controls in the lower portion of the Layout pane to set the text margins.

In one embodiment, click Format and enter the text in the Text Editor.

c. Working with Text on a Path

In one embodiment, a user can create text on a line or an ellipse. In one embodiment, a user can change the shape of a text path, as well as add or remove control points, as well as animate the text along the path.

Text Path Controls—In one embodiment, the following Text Path Controls are available:

Path Type—In one embodiment, Path Type sets the type of path. In one embodiment, the options include Line and Ellipse.

Inside—In one embodiment, when Inside is enabled, the baseline of text on an elliptical path is shifted so the text appears inside of the ellipse Outside—In one embodiment, when Outside is enabled, the baseline of text on an elliptical path is shifted so the text appears outside of the ellipse Path Offset—In one embodiment, Path Offset determines where the text begins on the path. In one embodiment, animate this value to move text along a path.

Creating Text on a Path—In one embodiment, use the Path options in the Layout pane to create text on a path.

d. Creating a Type-On Effect

In one embodiment, there are two ways to create a type-on text effect, the Type On parameters in the Text Layout controls, or the Type On behavior (in the Text Animation behavior category). In one embodiment, this section discusses using the Type On controls in the Layout pane.

In one embodiment, to create a type-on effect:

In one embodiment, select the Text object.

In one embodiment, in the Inspector (I), click the Text tab.

In one embodiment, click Layout.

In one embodiment, go to the frame where the animation should start.

In one embodiment, turn on Animate (in the Playback controls).

In one embodiment, in the Type On controls, enter 0 in the Start value field. In one embodiment, a user can also use the Animation menu rather then enabling Animate in the playback controls. In another embodiment, click the Animation Menu icon next to the Start parameter and select Add Keyframe.

In one embodiment, go to the frame where the animation should end (the type-on effect to be complete).

In one embodiment, enter 100 in the End value field.

In one embodiment, to create a softer fade in as the characters appear, turn on Fade In.

x. Using Text Animation Behaviors

In one embodiment, text behaviors create animation by applying a range of values to text parameters without creating keyframes. In one embodiment, in other words, behaviors work like expressions. In another embodiment, by dragging a behavior to a text object in the Canvas, Layers List, or Timeline, a user can easily set up a left or right text crawl, scroll, generate random text characters, create a type-on effect, or create a tracking animation. In yet another embodiment, a user can also use the Sequencing behavior to create custom behaviors that animate individual text properties. In one embodiment, for example, the user can select the Scale and Opacity properties and set them to animate through the text characters.

a. Applying Text Animation Behaviors

In one embodiment, text behaviors are applied in the same manner as other behaviors and filters. In one embodiment, for example, drag a behavior to an object in the Canvas, Layers List, or Timeline.

In one embodiment, Text animation behaviors include:

Crawl Left—In one embodiment, the Crawl Left behavior scrolls the text object to the left across the Canvas.

Crawl Right—In one embodiment, the Crawl Right behavior scrolls the text object to the right across the Canvas.

Scroll Up—In one embodiment, to scroll text upward in the Canvas:

In one embodiment, select the text object to which to apply the scroll.

In one embodiment, in the Library, select the Behaviors category and the Text Animation subcategory.

In one embodiment, click and drag the Scroll Up behavior to one of the following:

In one embodiment, the text object in the Canvas

In one embodiment, the text object in the Layers List

In one embodiment, the text object in the Timeline

Adjusting the Rate of the Scroll—In one embodiment, to adjust the rate of the Scroll Up (or any) behavior, shorten the duration of the behavior in the Timeline.

Scroll Down

Randomize—In one embodiment, the Randomize behavior randomly generates different characters in a text object. In one embodiment, to randomize the characters in a text object, select the text object to randomize.

Sequence
Position
Rotation
Opacity
Scale
Tracking—In one embodiment, to track from the center, text format should be set to Center Alignment.
Tracking
Type On xi. Applying Other Behaviors to Text Objects In one embodiment, a user can apply other behaviors to a text object.

xii. Creating Text Keyframes

In one embodiment, a user can create keyframes for text parameters. In one embodiment, as with objects of other types, there are two ways to create keyframes: In another embodiment, use the Animate button in the Playback controls, or the Animation Menu in the Inspector. In yet another embodiment, the following example uses both methods to animate text Tracking and Opacity.

In one embodiment, some text behaviors automatically animate the text parameters. In one embodiment, for example, when the Tracking behavior is applied to a text object, the tracking occurs at the rate specified in the behavior. In another embodiment, the user can adjust the rate of the tracking in the behavior parameters. In yet another embodiment, however, keep in mind that behaviors do not create keyframes.

a. Creating Text Object Tracking and Opacity Keyframes

In one embodiment, the following example creates text that fades in as the tracking animates. In one embodiment, a user can also create this effect using the Fade In/Fade Out behavior (in the Basic Motion behavior category) and the Tracking behavior (in the Text Animation behavior category).

Using Keyframes vs. Using Behaviors—In one embodiment, which text animation method is used (keyframing or behaviors) depends on a project, or more specifically, the project's timing needs. In one embodiment, in general, if the user needs a very specific action to happen at very specific point in time in a project, he should use keyframing. In another embodiment, for example, if the user wants a text object to be completely transparent at frame 1, become completely opaque at frame 60, become transparent again at frame 90, and opaque again at frame 120, he should use keyframing. In yet another embodiment, in other words, keyframing applies very specific values to an object's parameters.

In one embodiment, if the effect is more general, for example, the user wants the text be completely transparent at frame 1, opaque at frames 60-90, and become transparent by frame 120, he should use the Fade In/Fade Out behavior. In one embodiment, behaviors generate a range of values that are applied to an object's parameters, animating those parameters over the duration of the behavior.

In one embodiment, a user can combine keyframing and behaviors on an object. In one embodiment, for example, if a user keyframed the text opacity parameter, he can then apply the Tracking behavior to animate the text object tracking, or he can keyframe the tracking parameter. Keep in mind, however, that if a keyframe is applied to the text Opacity parameter, and then a Fade In/Fade Out behavior is applied to the text object, unexpected results may occur.

In one embodiment, to create text Tracking and Opacity keyframes:

In one embodiment, go to the frame where the tracking animation should start.

In one embodiment, select the text object.

In one embodiment, in the playback controls, click the Animate button. In one embodiment, when enabled, the Animate button appears bright red and a keyframe is automatically created whenever a value is changed.

In one embodiment, in the Inspector, click Format and set the first Tracking value. In one embodiment, because keyframing is enabled, a Tracking keyframe is created. In another embodiment, the lower the Tracking value, the closer the text characters are to each other.

In one embodiment, go to the frame where the tracking animation should end.

In one embodiment, enter the end tracking value.

In one embodiment, go to the frame where the opacity animation should start.

In one embodiment, click Style, and set the first Opacity value.

In one embodiment, go to the frame where the opacity animation should end.

In one embodiment, enter the end tracking value.

In one embodiment, to view the keyframes for a Text parameter in the Curve Editor, click its Animation menu and select Show in Curve Editor.

b. Onscreen Controls and Text Objects

In one embodiment, because text objects share most of the characteristics of objects of other types, a user can use the object onscreen controls (e.g., Shear, Four Corner, Pivot, Scale, and Drop Shadow) to transform a selected text object. In one embodiment, the onscreen tools are shortcuts to the object controls in the Inspector>Properties tab. In another embodiment, to set specific values, or fine tune any of the following transforms, use the Properties tab in the Inspector.

In one embodiment, the onscreen controls and the Inspector>Properties parameters are applied to the text as an object (such as a clip or image), not as editable text. In one embodiment, the controls for editing the text itself are located in the Inspector>Text tab. In another embodiment, although some object properties are similar to some text style and format controls, such as the Shear property and the Slant text format, the object properties are independent of the text format controls, and vice versa. In yet another embodiment, for example, if a user applies a Slant value of 20 in Inspector>Text>Format, a slant value of 20 is applied to each character in the word, simulating italics. In one embodiment, if a user applies a Shear value of 20 in Inspector>Properties (or using the onscreen controls), a shear value of 20 is applied to the object, not the individual text characters.

In one embodiment, the next section briefly describes how to transform a text object using the onscreen controls.

Using the Onscreen Controls—For all of the following transforms, ensure the text object is selected (e.g., a bounding box appears around a selected object in the Canvas).

In one embodiment, to select a text object:
In one embodiment, on the Toolbar, click the Selection tool (or press S).
In one embodiment, in the Canvas, click on the text object to transform. In one embodiment, a user can also select the text object in the Layers list.
In one embodiment, to move the text object, click in the bounding box and drag the text object.
In one embodiment, to rotate the text object, click the rotation handle and drag.
In one embodiment, to scale the text object, do one of the following:
In one embodiment, to scale in X, click a center left or right control point and drag.
In one embodiment, to scale in Y, click a center upper or lower control point and drag.
In one embodiment, to scale in X and Y, click one of the corner control points on the bounding box and drag.
In one embodiment, an object may be scaled around its pivot point. In one embodiment, to scale proportionally, press Shift while dragging any of the control points.
In one embodiment, to shear a text object:
In one embodiment, select Shear from the menu.
In one embodiment, do one of the following:
In one embodiment, to shear the object in X, click and drag on either of the upper or lower control points.
In one embodiment, to shear the object in Y, click and drag on either of the right or left control points.
In one embodiment, to use the four-corner controls:
In one embodiment, select Four-corner from the menu.
In one embodiment, click and drag one of the four-corner control points.

In one embodiment, to add a drop shadow to a text object:
In one embodiment, select Drop shadow from the menu.
In one embodiment, adjust the shadow parameters in the Dashboard, or in the Inspector>Properties.
In one embodiment, the shadow is applied to the object as a whole. In one embodiment, some object properties are similar to text styles and formats. In another embodiment, shadow controls specific to text are located in the Inspector>Text>Style controls.
In one embodiment, to change the anchor point of a text object:
In one embodiment, select Anchor point from the menu.
In one embodiment, click and drag anchor point to the new position.
In one embodiment, in addition to using the onscreen transform controls, a user can enter precise values for the transforms in Inspector>Properties.
In one embodiment, a user may select a single character in a text object. In one embodiment, a user may select multiple characters in a text object.

xiii. Using Text as a Particle Shape

In one embodiment, a user can use a text object as a particle shape.
In one embodiment, to add an emitter to a text object:
In one embodiment, select the text object.
In one embodiment, press E. In one embodiment, a particle emitter is added to the text object and the text object becomes the emitted particle shape.
In one embodiment, a user can edit the text after the fact.

xiv. Using Text Styles

In one embodiment, a user can apply a style to a text object.

xv. Using Text as a Mask

In one embodiment, a user can apply a mask to a text object.

xvi. Saving Custom Text Setups

In one embodiment, a user can save a custom text setup.

xvii. Using LiveType Fonts

In one embodiment, if a user has LiveFonts installed on his system, he can use the LiveType fonts.
In one embodiment, to use LiveFonts:
In one embodiment, ensure LiveFonts is installed. In one embodiment, by default, LiveType is installed with Final Cut Pro 4. In another embodiment, the LiveFonts are installed separately.
In one embodiment, in the Library, click the Fonts tab.
In one embodiment, the LiveType fonts appear in the lower portion.

B. Particle Systems

Figure 73:
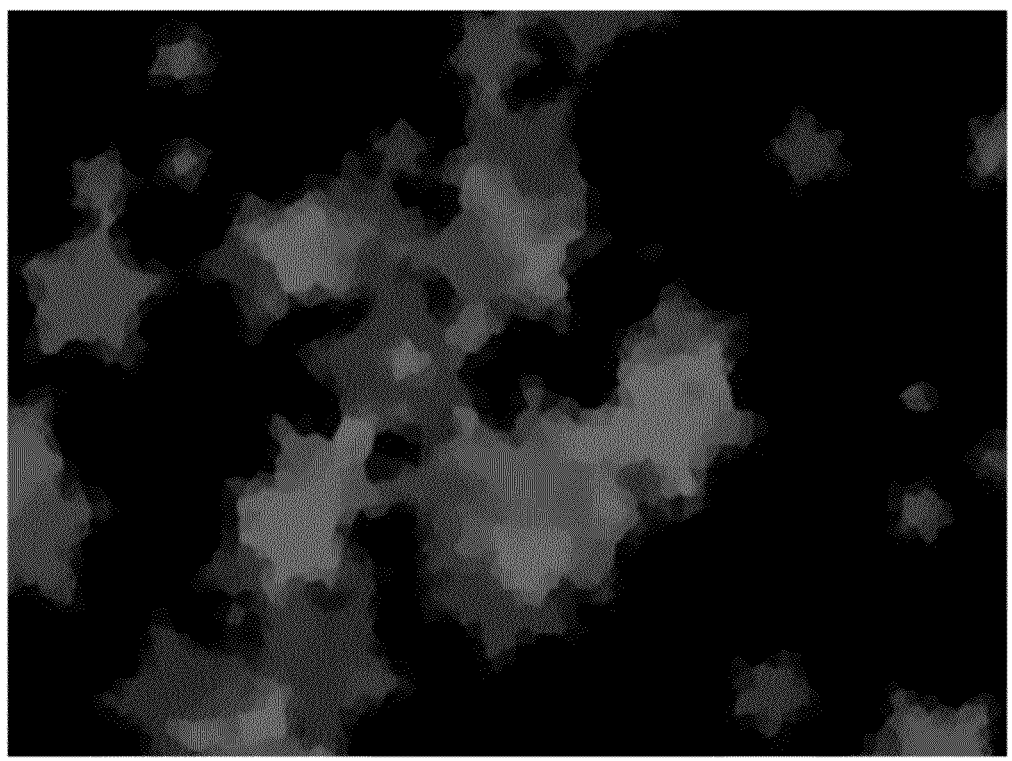
FIG. 73 illustrates one example of a particle system, according to one embodiment of the invention.
Figure 74:
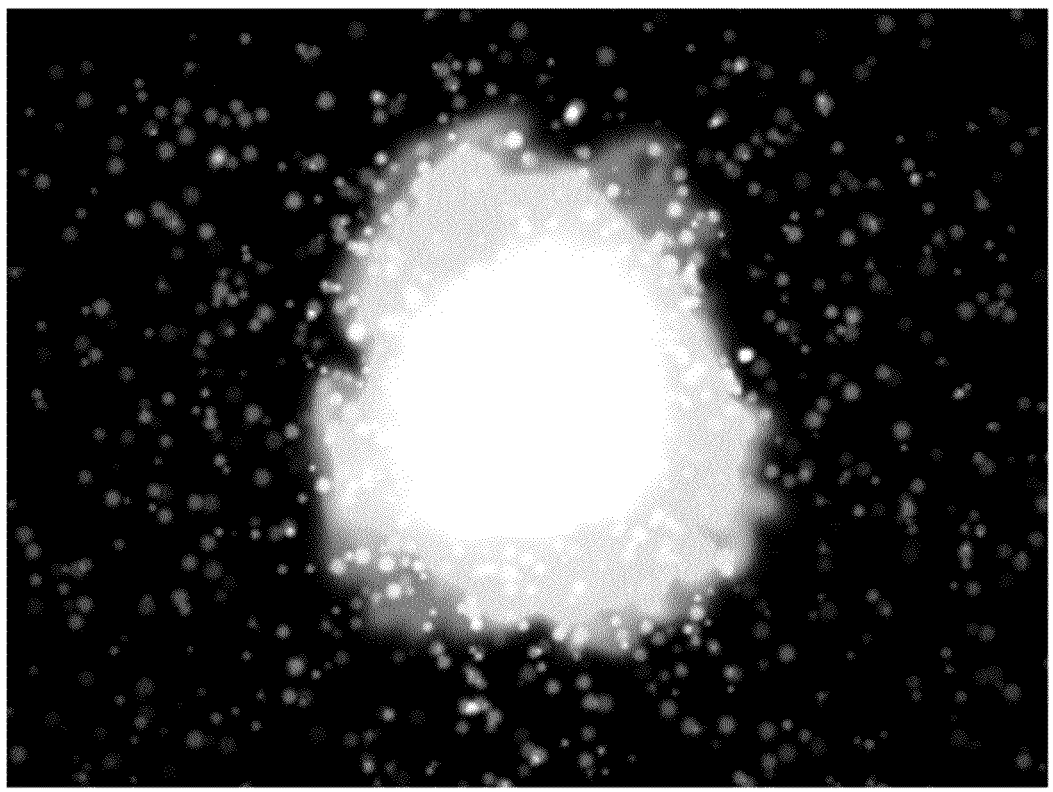
FIG. 74 illustrates another example of a particle system, according to one embodiment of the invention.
Figure 75:
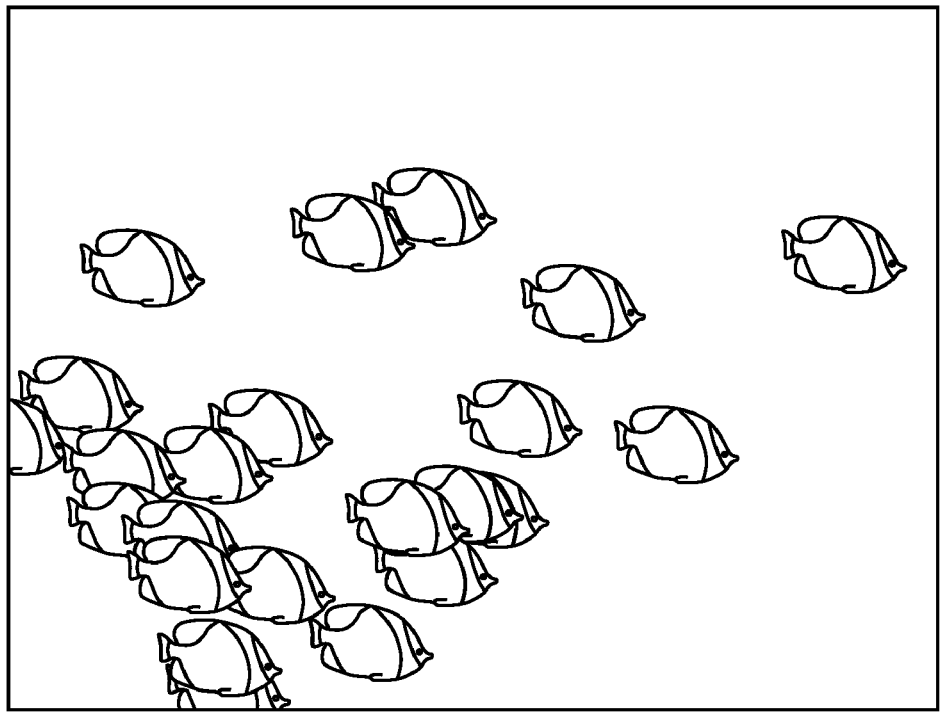
FIG. 75 illustrates yet another example of a particle system, according to one embodiment of the invention.

Using Particle Systems, a user can simulate real-world effects such as smoke and sparks, or he can create sophisticated abstract textures. Particle Systems allow a user to quickly and easily create sophisticated animated effects involving large numbers of automatically animated objects. A particle effects library can be used to add a pre-made particle system to a composition, or custom particle effects can be created using nearly any object in a project. Particle systems are flexible enough to create many different kinds of effects. FIG. 73 illustrates one example of a particle system, according to one embodiment of the invention. FIG. 74 illustrates another example of a particle system, according to one embodiment of the invention. FIG. 75 illustrates yet another example of a particle system, according to one embodiment of the invention.

Figure 76:
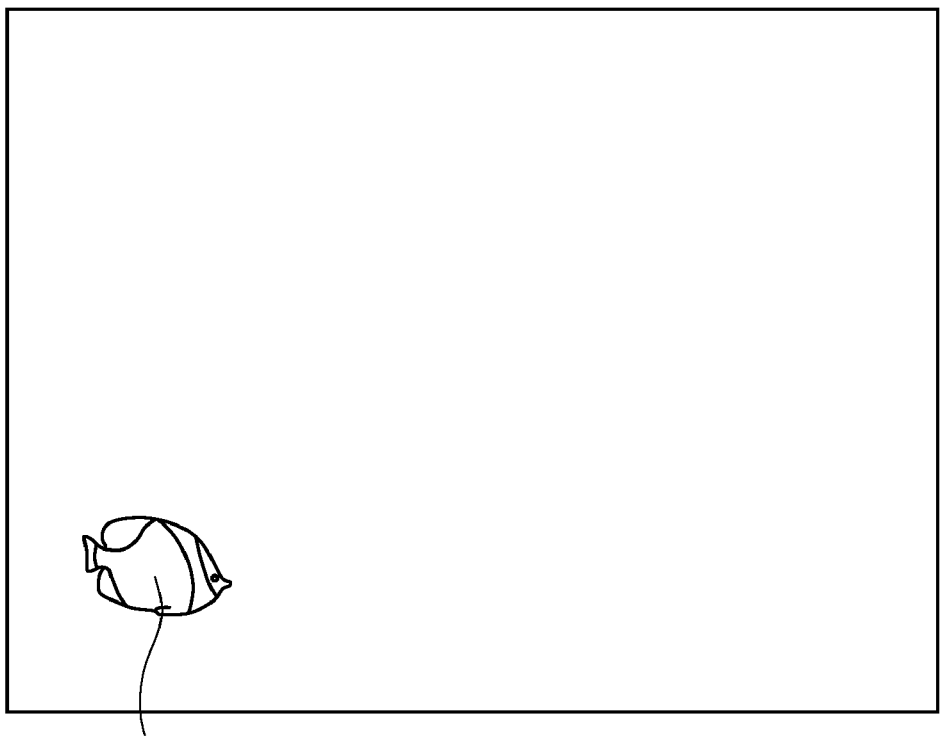
FIG. 76 illustrates an example of a cell, according to one embodiment of the invention.
Figure 77:
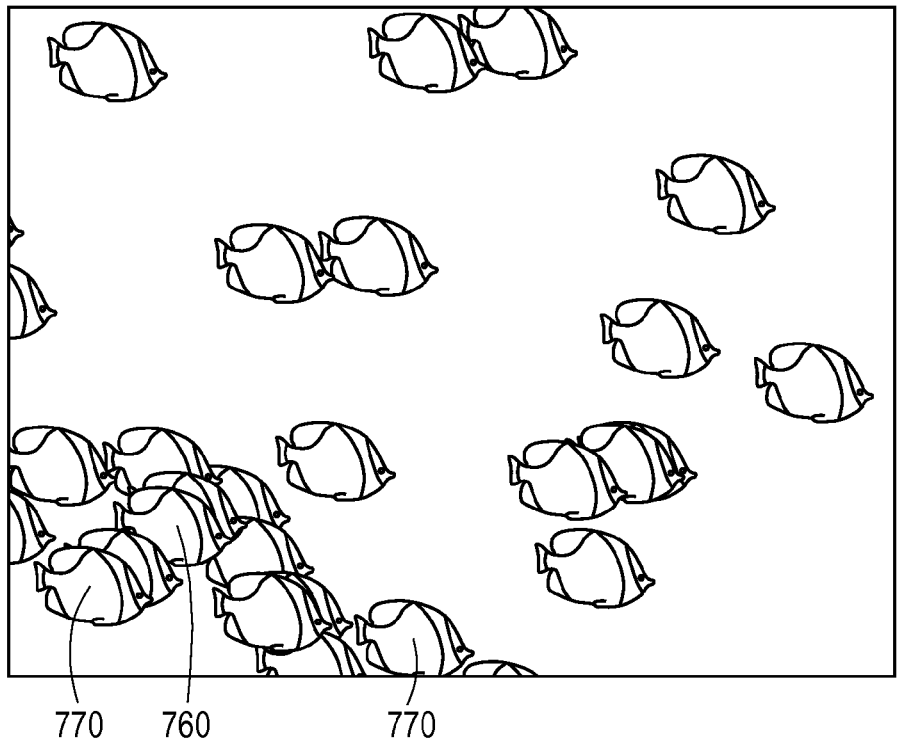
FIG. 77 illustrates an example of a particle system based on the cell of FIG. 76, according to one embodiment of the invention.

Particle systems work by using a specified object, referred to as a cell 760, as the model for the creation of numerous individual particles 770. Each particle 770 is essentially a duplicate of the original cell 760 and is animated according to the parameters for that particle system. This means that potentially hundreds of animated particles 770 can be created and animated using a single cell 760. FIG. 76 illustrates an example of a cell, according to one embodiment of the invention. FIG. 77 illustrates an example of a particle system based on the cell of FIG. 76, according to one embodiment of the invention.

Figure 78:
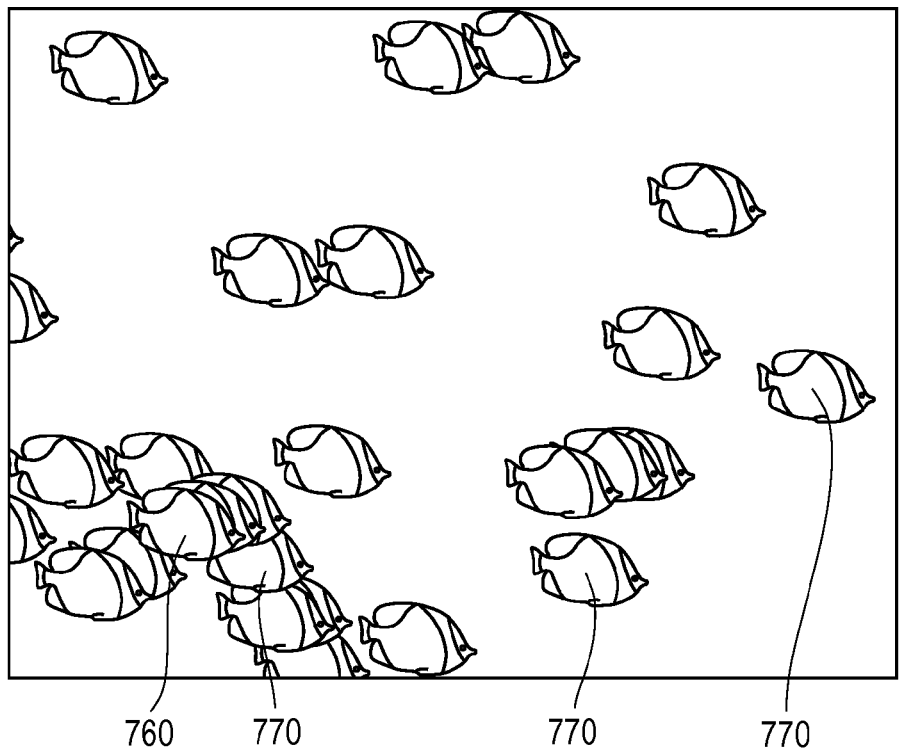
FIG. 78 illustrates an example of a particle system based on one cell, according to one embodiment of the invention.
Figures 79, 80:
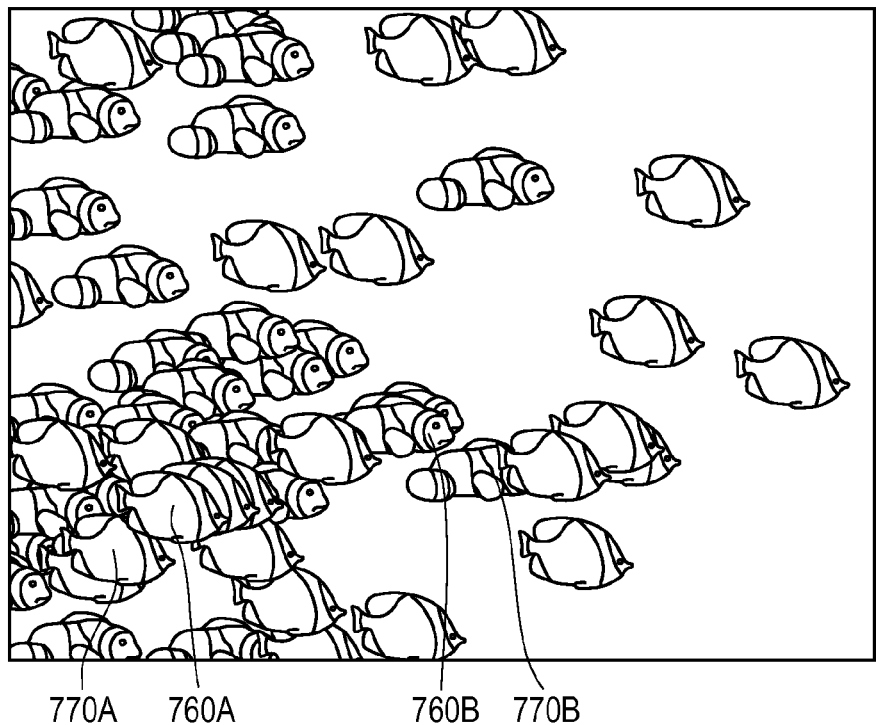
FIG. 79 illustrates an example of a particle system based on multiple cells 760A, 760B, according to one embodiment of the invention.
FIG. 80 illustrates an example of a Project pane showing an emitter that is based on two cells, according to one embodiment of the invention.

In one embodiment, the object used as a particle system's cell 760 determines how that particle system looks. Particle systems can contain multiple cells 760, resulting in the release of several types of particles 770 from a single emitter. Sophisticated particle presets may be constructed in this way. FIG. 78 illustrates an example of a particle system based on one cell, according to one embodiment of the invention. FIG. 79 illustrates an example of a particle system based on multiple cells 760A, 760B, according to one embodiment of the invention.

i. The Anatomy of a Particle System

Figure 81:
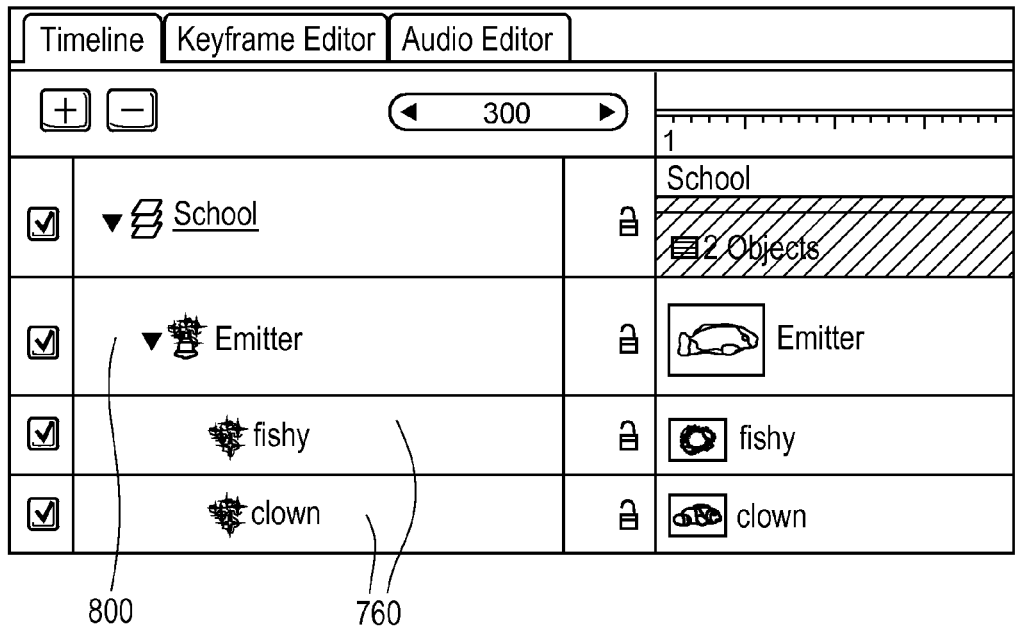
FIG. 81 illustrates an example of a Timeline showing an emitter that is based on two cells, according to one embodiment of the invention.

In one embodiment, a particle system comprises an emitter 800 and one or more cells 760. In one embodiment, a cell 760 is nested inside of the emitter 800 in a Project pane and a Timeline. FIG. 80 illustrates an example of a Project pane showing an emitter that is based on two cells, according to one embodiment of the invention. FIG. 81 illustrates an example of a Timeline showing an emitter that is based on two cells, according to one embodiment of the invention.

Figure 82:
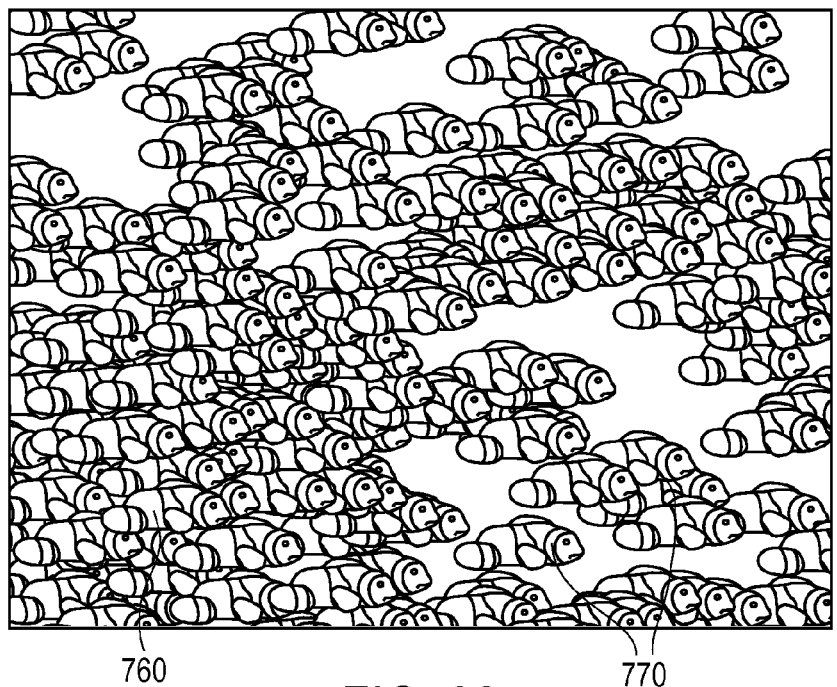
FIG. 82 illustrates an example of a particle system based on an emitter, according to one embodiment of the invention.
Figure 83:
FIG. 83 illustrates another example of a particle system based on the same emitter as in FIG. 82, according to one embodiment of the invention.
Figure 84:
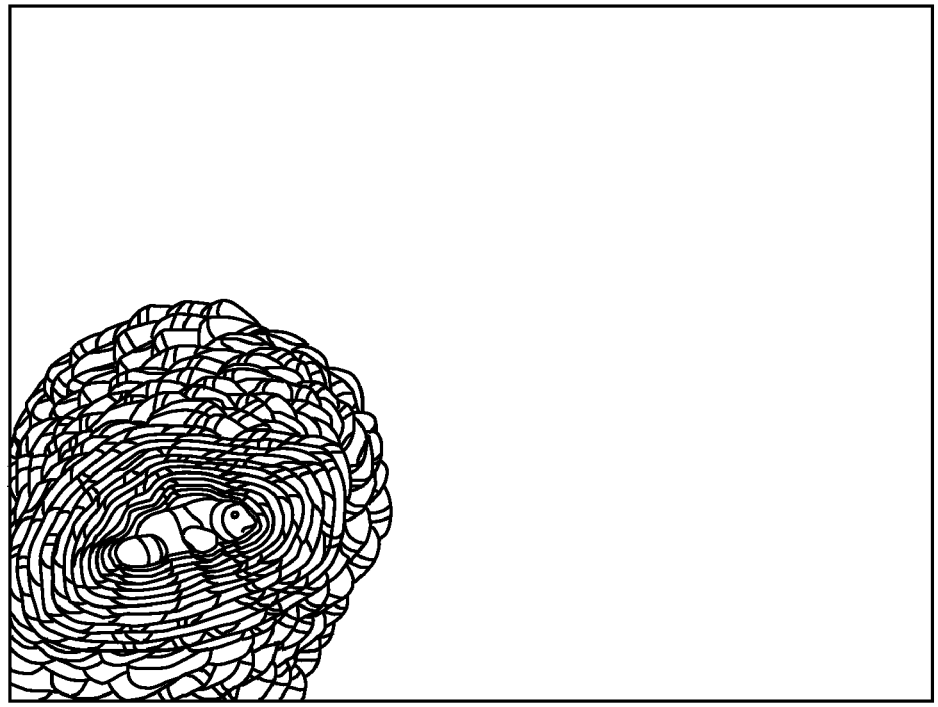
FIG. 84 illustrates yet another example of a particle system based on the same emitter as in FIGS. 82 and 83, according to one embodiment of the invention.

In one embodiment, the emitter and cells have separate sets of parameters that control the particle system's behavior. If a garden hose were a particle system, the nozzle would act as the emitter, while the water would represent the flow of particles. Changing the parameters of the emitter changes the direction and number of particles that are created, while changing the cell's parameters affects each individual particle. By changing a few parameters, it's possible to create very different effects using the same cell. FIG. 82 illustrates an example of a particle system based on an emitter, according to one embodiment of the invention. FIG. 83 illustrates another example of a particle system based on the same emitter as in FIG. 82, according to one embodiment of the invention. FIG. 84 illustrates yet another example of a particle system based on the same emitter as in FIGS. 82 and 83, according to one embodiment of the invention.

Figure 85:
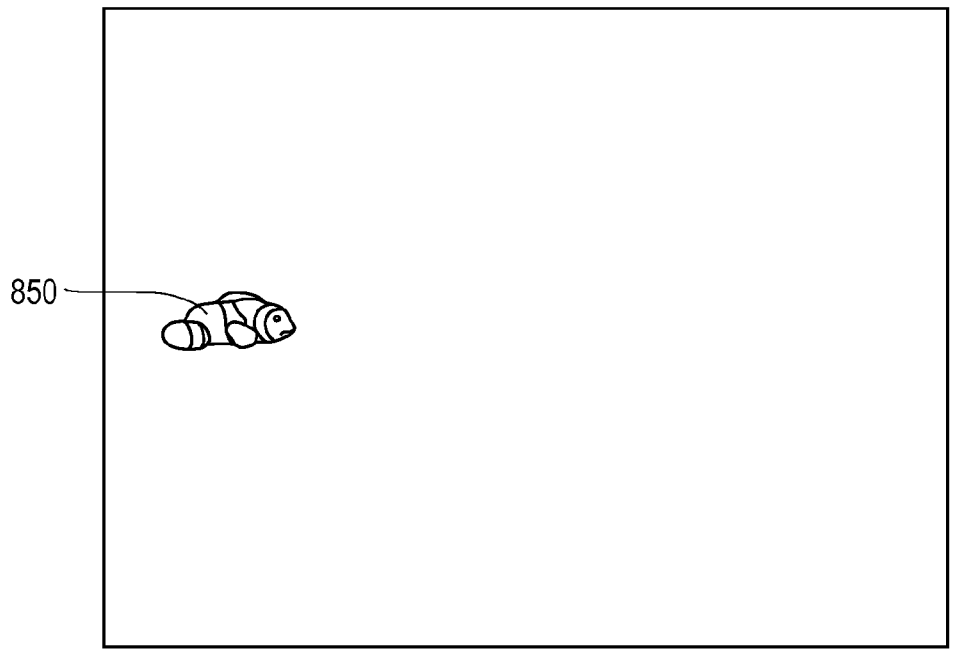
FIG. 85 illustrates an example of an object, according to one embodiment of the invention.
Figure 86:
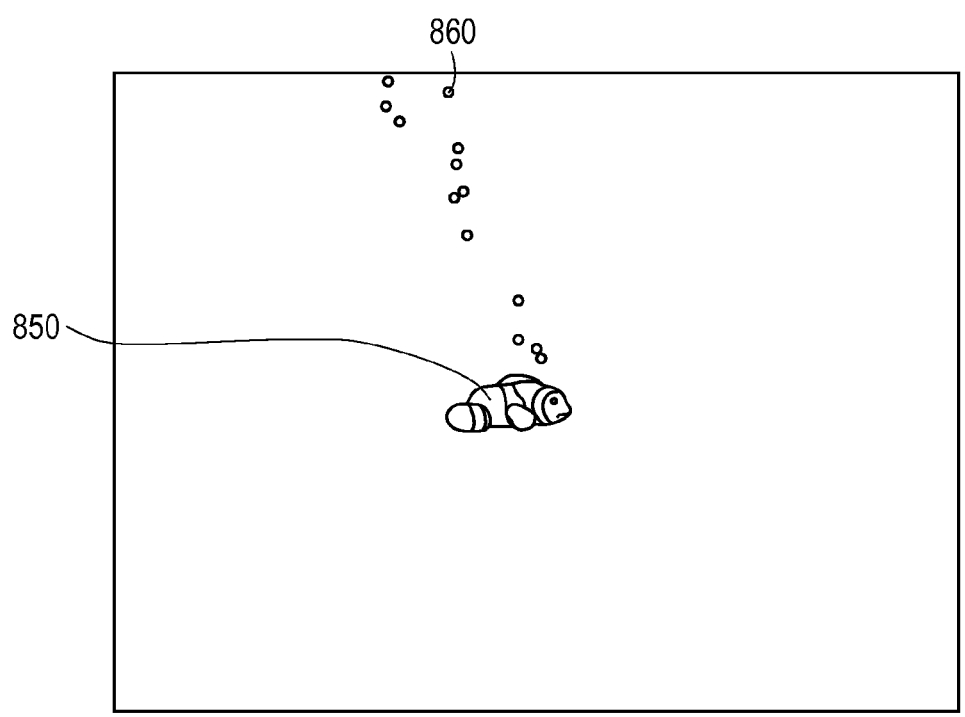
FIG. 86 illustrates an example of a particle system of bubbles along with the object of FIG. 85, according to one embodiment of the invention.
Figure 87:
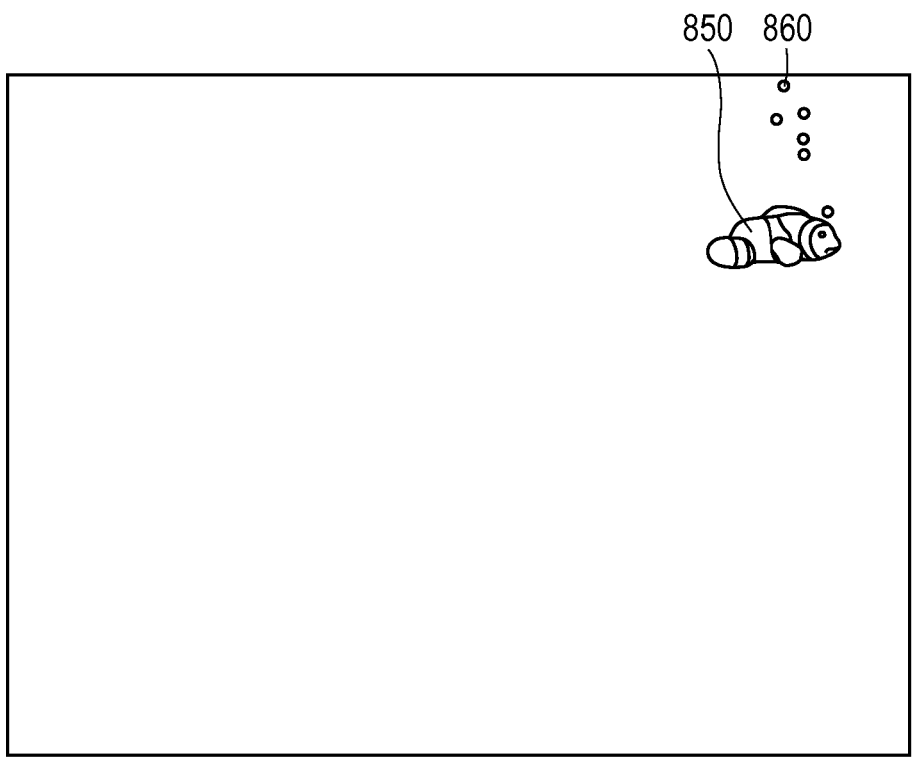
FIG. 87 illustrates another example of a particle system of bubbles along with the object of FIG. 85, according to one embodiment of the invention.

Particle system parameters can be keyframed in order to change a particle effect's dynamics over time. For example, by keyframing an emitter's 800 Position property in a Keyframe Editor, a path 860 of bubbles can be created that follows an object 850 onscreen. FIG. 85 illustrates an example of an object, according to one embodiment of the invention. FIG. 86 illustrates an example of a particle system of bubbles along with the object of FIG. 85, according to one embodiment of the invention. FIG. 87 illustrates another example of a particle system of bubbles along with the object of FIG. 85, according to one embodiment of the invention.

Behaviors can be added to a cell to create even more varied effects. In one embodiment, simulation behaviors can be especially effective. In one embodiment, a behavior that is applied to a cell is in turn applied to a particle that it generates. This enables almost limitless variation. Adding behaviors to particles in addition to the particle system's own parameters is an easy way to create complex, organic motion that would be impossible to accomplish any other way. For example, if a Repel behavior is added to a cell, it causes emitted particles to weave around one another like amoebas under a microscope.

ii. Using Particle Systems

Adding a particle system to a project can be fast and easy. Pre-made particle systems can be used from a particle library. A simple particle system can be created.

a. Using a Particle Library

In one embodiment, a particle library, found in a Content category of a Library, is a collection of pre-made particle effects that can be added to a project. There are many types of particle effects to choose from. The easiest way to add a particle system to a project is to use one from a particle library. If a user finds one that's close to what he needs, he can easily customize its parameters after he has added it to his project. Particle systems are added to a project exactly like any other object.

In one embodiment, to add a particle effect from a library:
Open the Library, select the Content category, and click <Particle Library>.
Select a particle preset in the Library Stack, and click a Play button in a Preview pane of a Browser to see an animated preview of the selected particle effect.
To use a particle preset, do one of the following:
Click Apply to add the selected particle system to a project at the center of a Canvas. It appears in its own layer in a Layers tab and Timeline.
Drag the particle system into the Canvas at the position where it should appear. It appears in its own layer in the Layers tab and Timeline.
Drag the particle system into a layer in the Layers tab or Timeline. It appears at the center of the Canvas.
The new particle system object appears in the project. In one embodiment, the new object appears composited against any other objects that have already been added.

Customizing Preset Particle Systems—Once a particle system has been added from a Library, it acts as it appeared in the library preview animation. If necessary, a particle system's Emitter parameters can be edited in a Dashboard to tailor the particle system. In one embodiment, a particle system can only be modified after it has been added to a project.

In one embodiment, a Dashboard displays a selected particle system's most essential parameters, including, for example, the size and number of particles that are created, how long they remain onscreen, how fast they move, and the direction and area in which they travel. In one embodiment, a cell may also be selected in a Layers tab or Timeline to edit its parameters in the Dashboard.

b. Creating a Simple Custom Particle System

Figure 88:
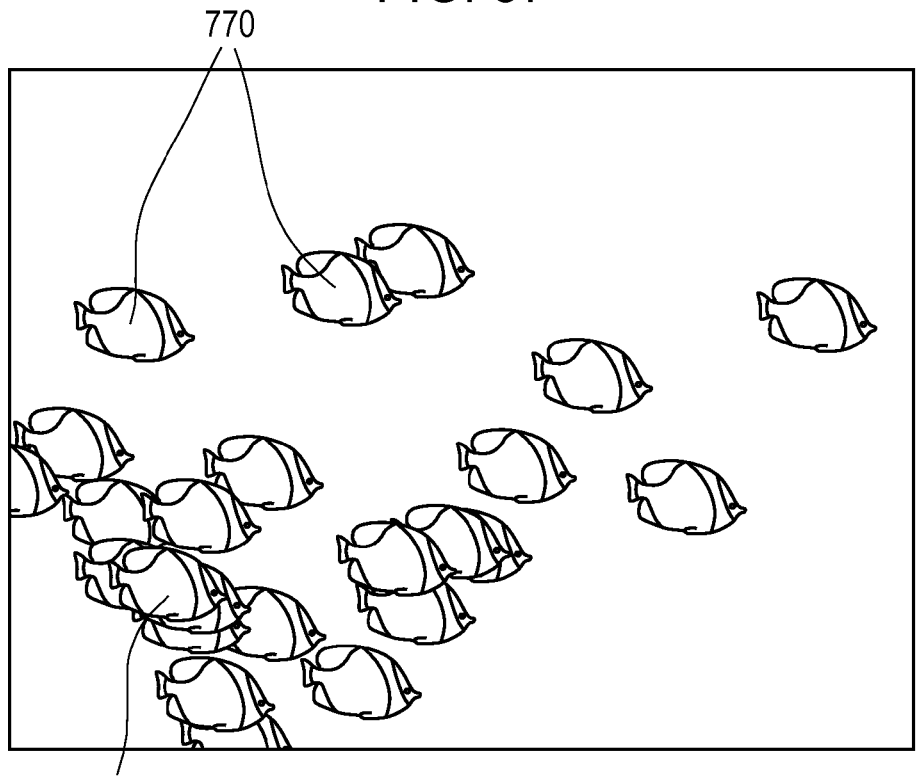
FIG. 88 illustrates an example of a particle system including an emitter and individual particles based on the emitter, according to one embodiment of the invention.

In one embodiment, creating a particle system begins by selecting an object 12 in a project and using it as a cell 760 within a new particle emitter 800. In a particle system, the emitter is a source of particles that are created. Particle systems are very flexible, and any object in a project can be used as a cell in an emitter, including still graphics, animation or video clips, or shape objects. In one embodiment, the object 12 selected when an emitter 800 is created becomes the first Cell 760 in that particle system. In one embodiment, cells are nested inside of emitters and are used to create the actual particles 770 in that system. FIG. 88 illustrates an example of a particle system including an emitter and individual particles based on the emitter, according to one embodiment of the invention.

Figure 89:
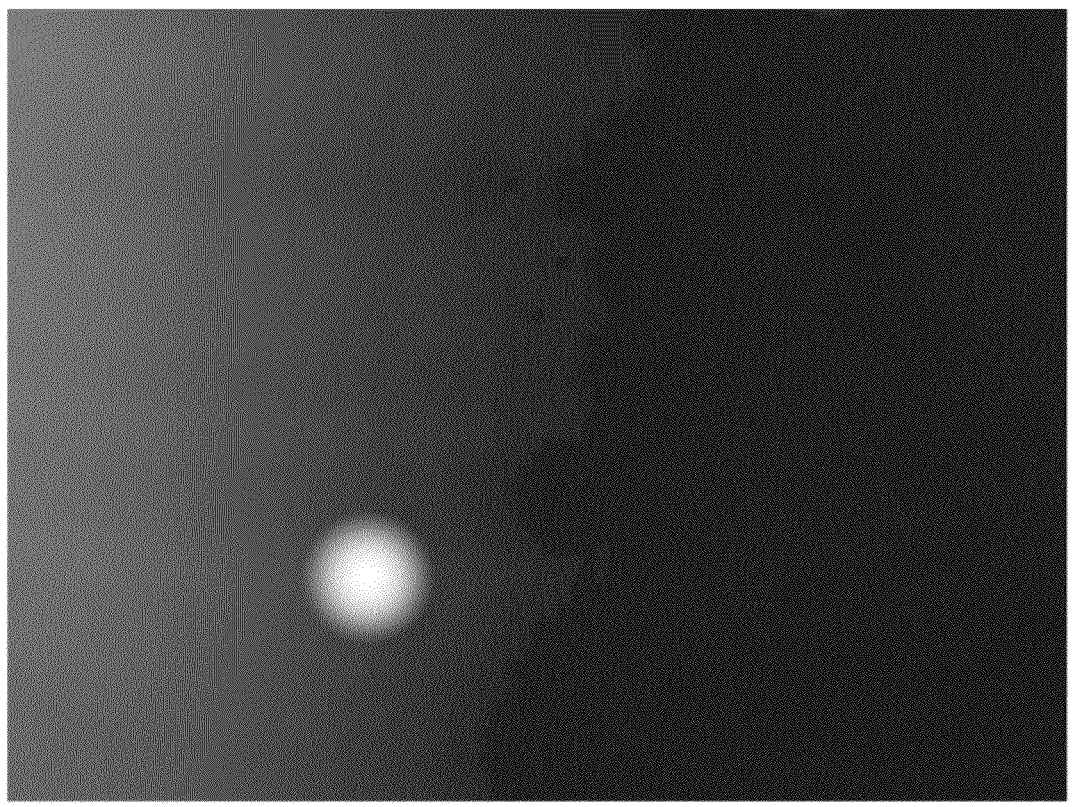
FIG. 89 illustrates a simple white circular gradient, according to one embodiment of the invention.

In one embodiment, to create an emitter:
Place an object that will be used to generate particles into a project. This example will use a graphic of a simple white circular gradient 890 that was created with an alpha channel. FIG. 89 illustrates a simple white circular gradient, according to one embodiment of the invention.
If necessary, move the object in a Timeline to a frame where the particle effect will begin.
Move the object in a Canvas to a location where the center of the particle system will be.
Select the object, and do one of the following:

Click an Emitter button 900 in the Toolbar.

Press the E key.

Figure 90:
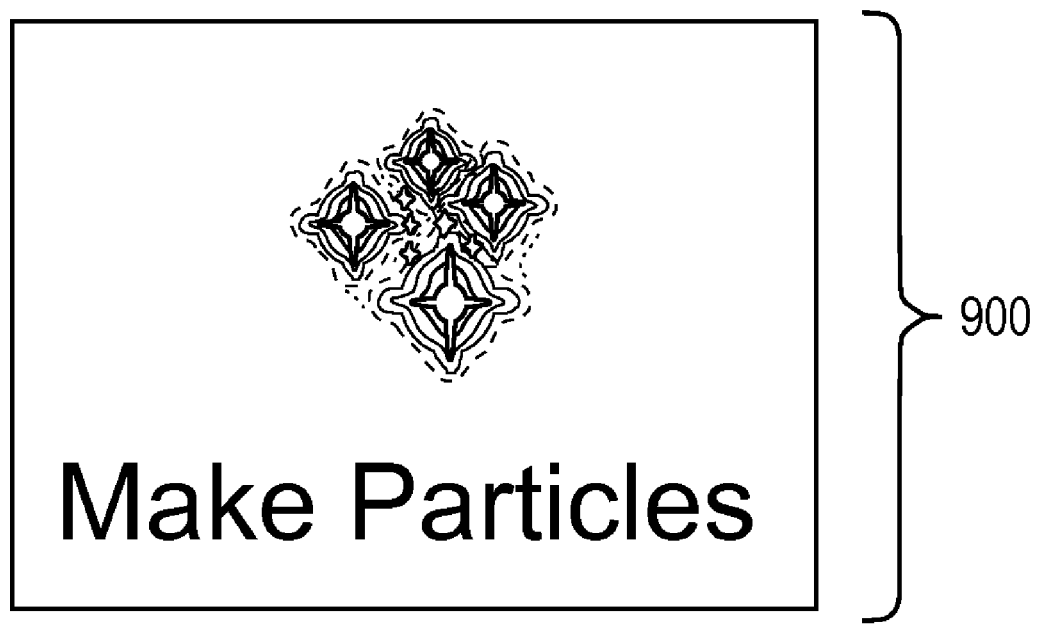
FIG. 90 illustrates an Emitter button, according to one embodiment of the invention.

FIG. 90 illustrates an Emitter button, according to one embodiment of the invention. The object 12 selected is replaced by an emitter 800, represented by a transform control in the Canvas. In one embodiment, the emitter 800 appears at the same location in the Canvas as the original object 12. In one embodiment, a cell 760 with the same name as the object 12 first selected is nested within this emitter 800. In one embodiment, the original object remains in the Layers tab, but is turned off.

Figure 91:
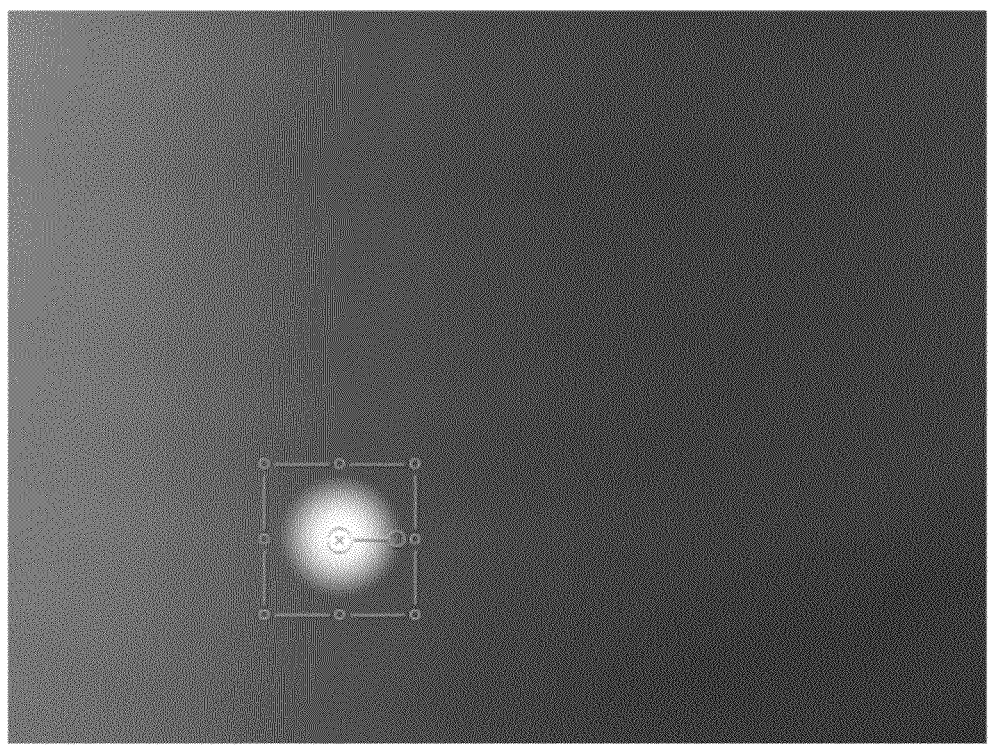
FIG. 91 illustrates a new emitter, at the first frame of the particle effect, according to one embodiment of the invention.

FIG. 91 illustrates a new emitter, at the first frame of the particle effect, according to one embodiment of the invention. In one embodiment, by default, the first frame of a new particle system has three particles. If the project is played, additional particles are generated, emerging from the center of the emitter.

Figure 92:
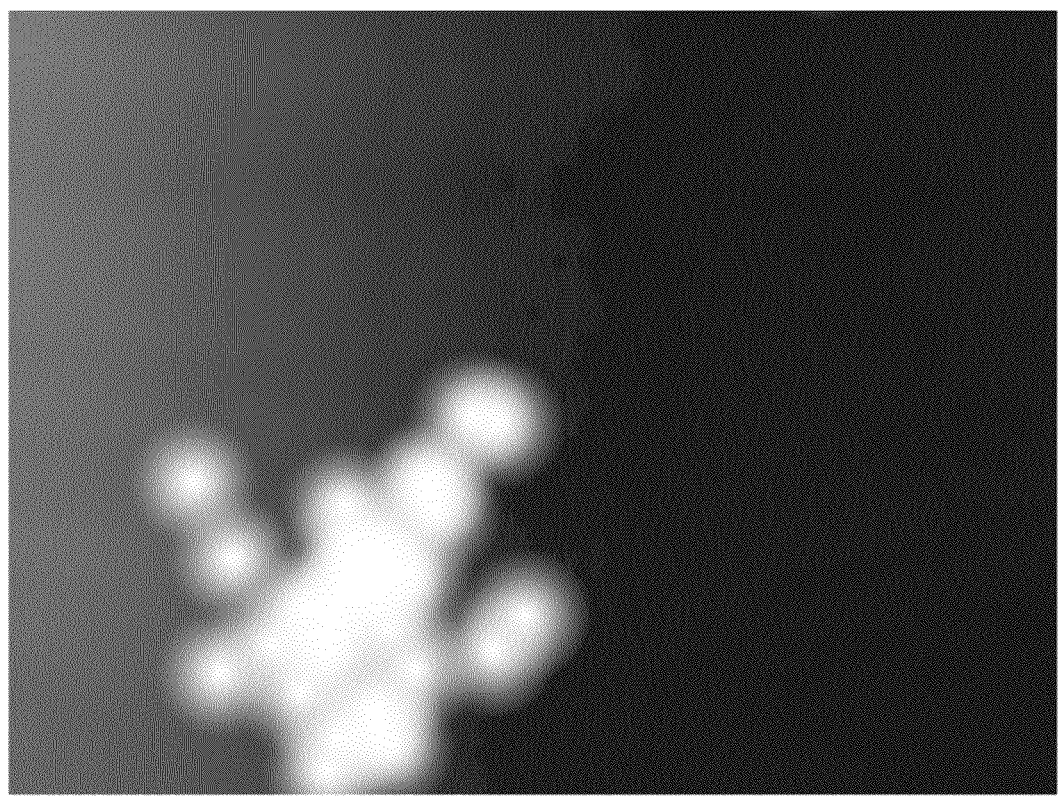
FIG. 92 illustrates an active particle system, such as the emitter of FIG. 91 but at a later frame, according to one embodiment of the invention.

In one embodiment, by default, a new cell 760 emits one particle 770 per frame in all directions, and each particle 770 moves 100 pixels per frame away from the emitter 800 over a lifetime of 100 frames. FIG. 92 illustrates an active particle system, such as the emitter of FIG. 91 but at a later frame, according to one embodiment of the invention. In one embodiment, the Initial Number parameter in the Emitter or Particle Cell tabs changes the default behavior so that a particle system begins with a burst of particles at the first frame.

The Predictability of Particle Systems—When a particle system is created or a parameter of an existing particle system is modified, the path of a particle in that system is immediately calculated and predetermined. While the number and motion of particles may seem random, they are actually predictable based on that system's parameters. Playing the same particle system twice with the same parameters results in the same particle motion, so that once a particle system is created that looks right, it will always be the same.

c. Customizing a Particle System's Emitter

When an emitter is created, the particle system starts working according to the default parameters in its Emitter and Particle Cell tabs. In one embodiment, these are located in the Inspector. The emitter Dashboard 110 can be used to easily change the most important of these parameters. Select an emitter to see its parameters in the Dashboard.

Emitter Dashboard Parameters—In one embodiment, the Dashboard contains emitter controls that modify a particle system's size and shape. In one embodiment, these parameters are a subset of those found in the Emitter tab of the Inspector. In one embodiment, the Dashboard contains a group of sliders and an Emission control. In one embodiment, an Emission control provides a visual way to manipulate three different particle system parameters—Emission Range, Emission Angle, and Speed.

Figure 93:
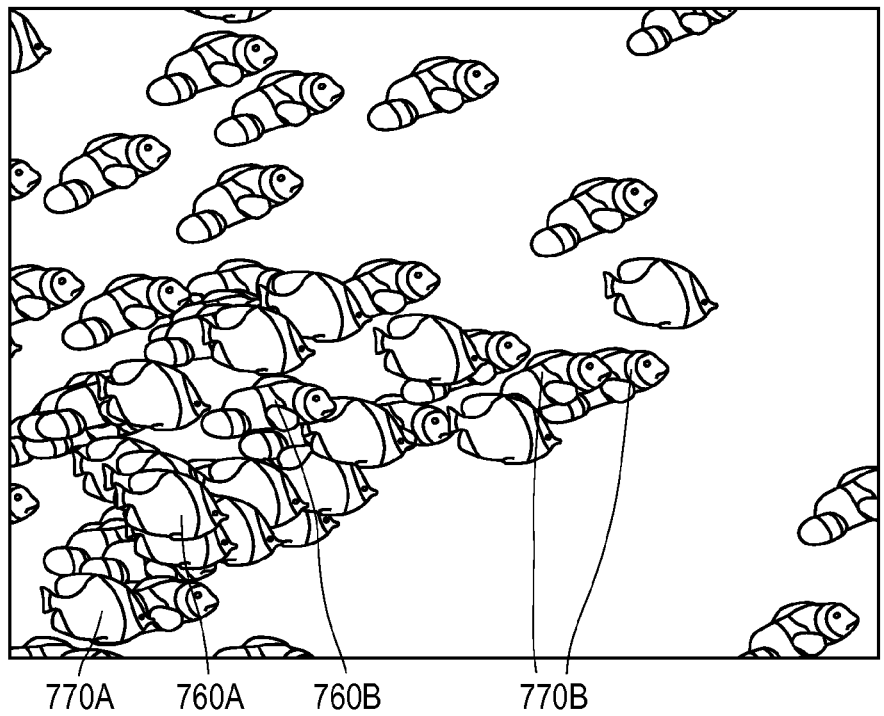
FIG. 93 illustrates a particle system, according to one embodiment of the invention.
Figure 94:
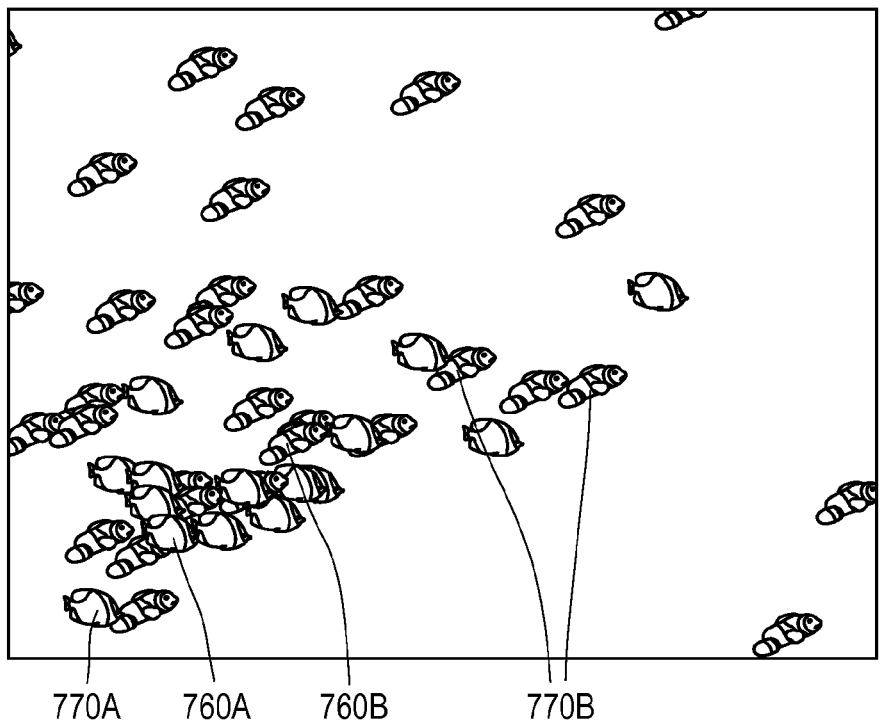
FIG. 94 illustrates the particle system of FIG. 93 after it has been rescaled, according to one embodiment of the invention.

In one embodiment, for particle systems containing multiple cells 760, the emitter 800 Dashboard 110 parameters simultaneously modify the effect of each cell's parameters relative to one another. This means that for a particle system consisting of three cells with different Scale values, changing the scale in the Dashboard 110 resizes all three cells simultaneously. For example, increasing the scale in the Dashboard 110 by 130 percent does not change the scale of all three cells to 130 percent. Instead, it multiplies the scale of each cell by 130 percent, so that all are resized relative to their original scale values. FIG. 93 illustrates a particle system, according to one embodiment of the invention. FIG. 94 illustrates the particle system of FIG. 93 after it has been rescaled, according to one embodiment of the invention. For this reason, in one embodiment, the Dashboard parameters are displayed as percentages, since they represent the percent at which these particle cell parameters are modified.

Figure 95:
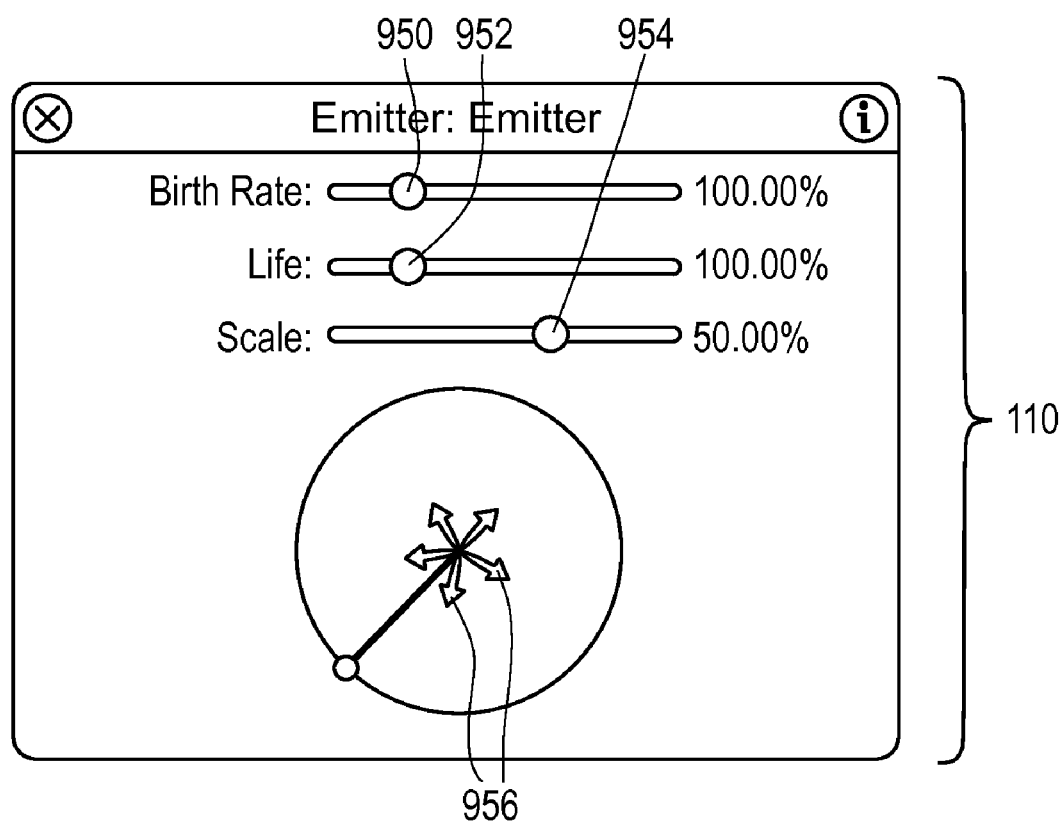
FIG. 95 illustrates a Dashboard for a particle system, according to one embodiment of the invention.

FIG. 95 illustrates a Dashboard for a particle system, according to one embodiment of the invention. In one embodiment, emitter parameters in the Dashboard include:

Birth Rate: In one embodiment, a slider 950 defines how many particles are created every second. In conjunction with the Life parameter, this defines how many particles appear in the Canvas at a given time.

Life: In one embodiment, a slider 952 defines how long each particle remains on-screen before disappearing from existence.

Scale: In one embodiment, a slider 954 defines the size of each particle, relative to original size of the cell.

Emission Range: In one embodiment, moving two points 1012 on the outer ring of the graphical Emission control defines a segment 1010 of the circumference about the center of the emitter from which particles emerge.

Emission Angle: In one embodiment, if the Emission Range into which particles emerge is constrained to a subsection of the Emission control, dragging the inside of this section changes the direction into which particles will be emitted.

Speed: In one embodiment, draggable arrows 956 within the defined Emission Range of the Emission control can be shortened or lengthened to define how quickly particles move away from the emitter.

Figure 96:
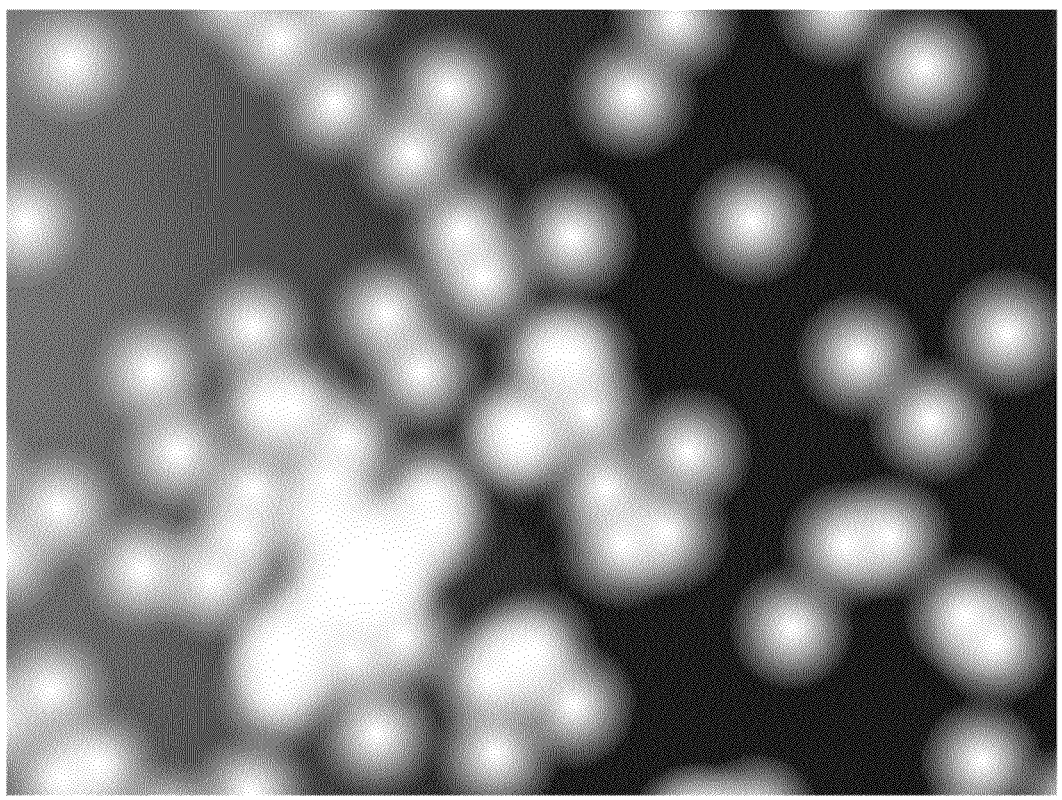
FIG. 96 illustrates the particle system of FIGS. 91 and 92 in full effect, according to one embodiment of the invention.

Using the Dashboard to Create a Simple Smoke Effect—In this example, the emitter controls in the Dashboard are used to create a smoke effect using the emitter created in the procedure "Creating a Simple Custom Particle System." In one embodiment, to create a smoke effect using the emitter Dashboard:

Before making adjustments to the selected particle system, it may be helpful to move the playhead forward in the Timeline to a frame where the particle system can be seen in full effect. That way, any adjustments made will be readily apparent. FIG. 96 illustrates the particle system of FIGS. 91 and 92 in full effect, according to one embodiment of the invention.

Figure 97:
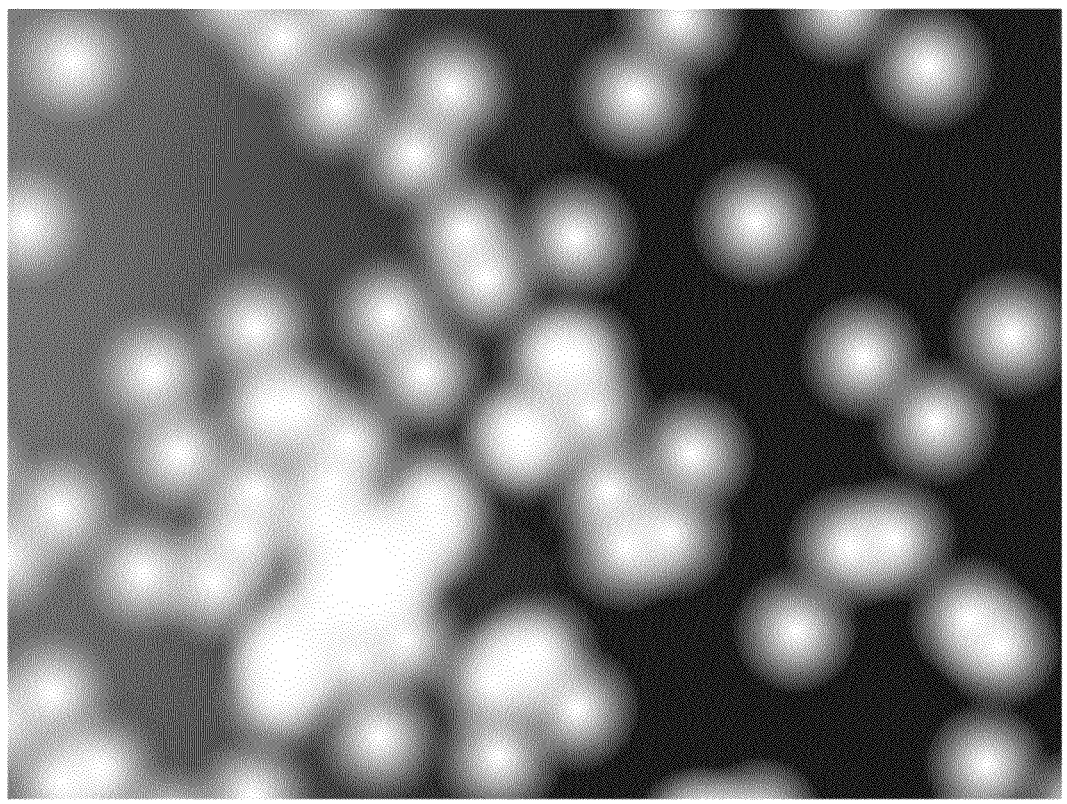
FIG. 97 illustrates the particle system of FIG. 96 at anther point in time, according to one embodiment of the invention.
Figure 98:
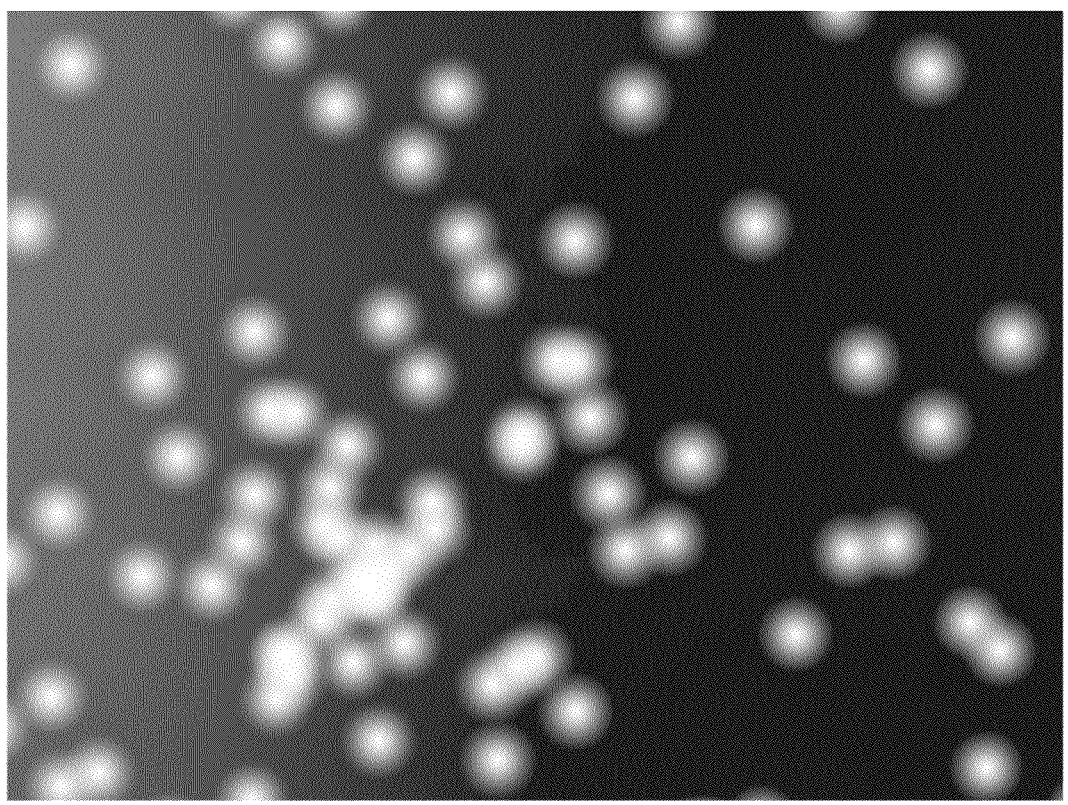
FIG. 98 illustrates the particle system of FIG. 97 after the value of Scale has been reduced, according to one embodiment of the invention.

Currently, the size of each particle is so big, it's difficult to make out any texture in the particle system. With the emitter Dashboard open, drag the Scale slider to the left to reduce every particle's size so that the individual particles are more textured. FIG. 97 illustrates the particle system of FIG. 96 at anther point in time, according to one embodiment of the invention. FIG. 98 illustrates the particle system of FIG. 97 after the value of Scale has been reduced, according to one embodiment of the invention.

Figure 99:
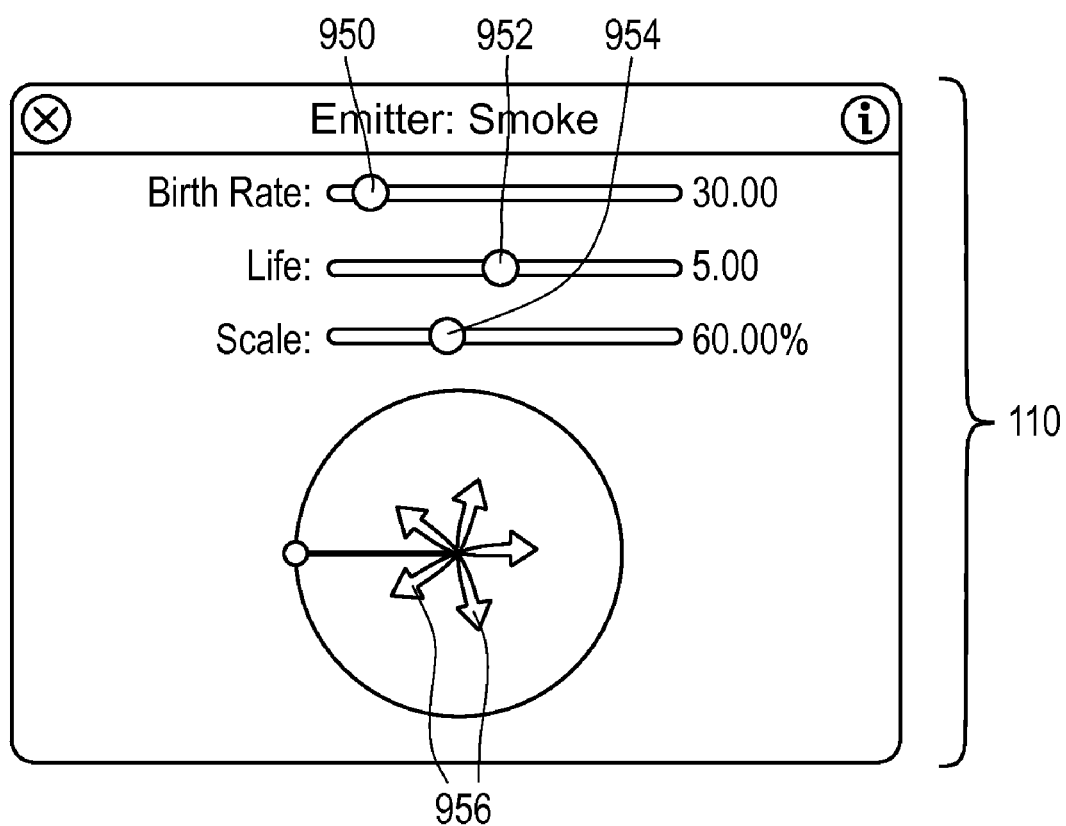
FIGS. 99 and 100 illustrate the Dashboard and the particle system, respectively, before the previously mentioned actions have been performed, according to one embodiment of the invention.
Figure 100:
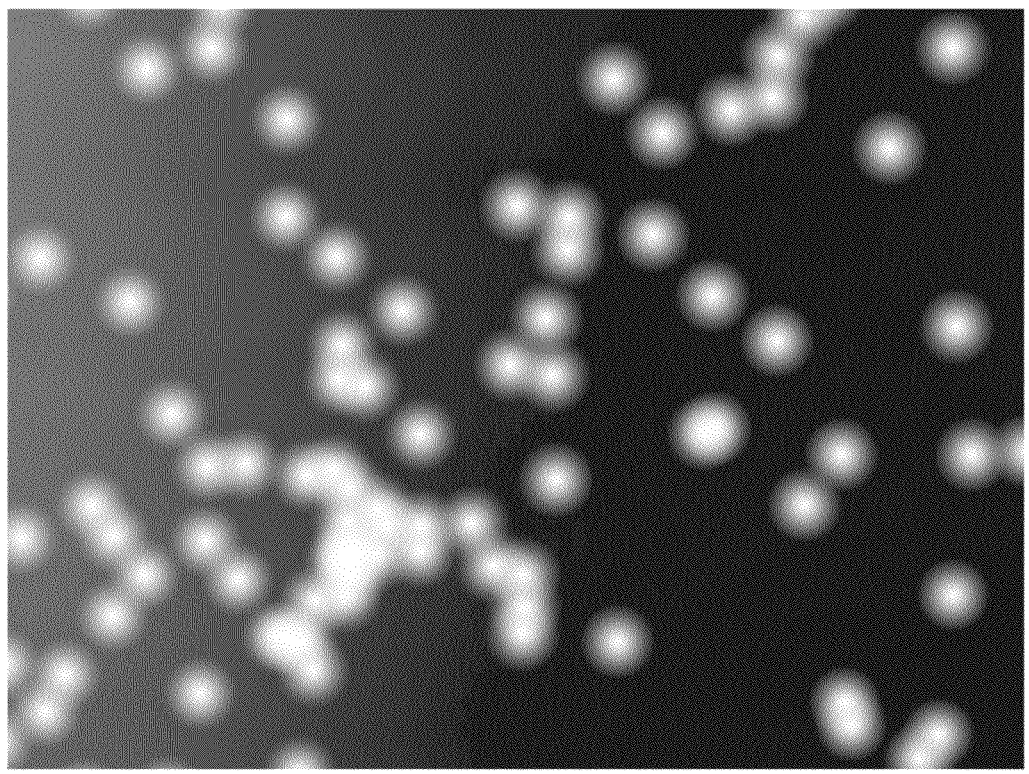
Figure 101:
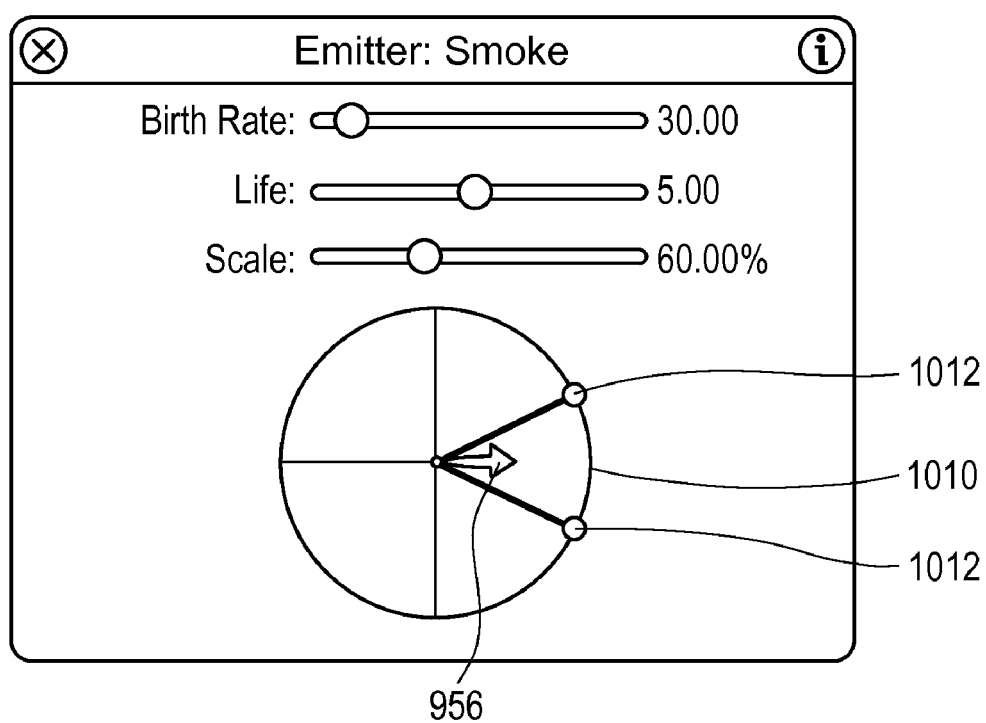
FIGS. 101 and 102 illustrate the Dashboard and the particle system, respectively, after the previously mentioned actions have been performed, according to one embodiment of the invention.
Figure 102:
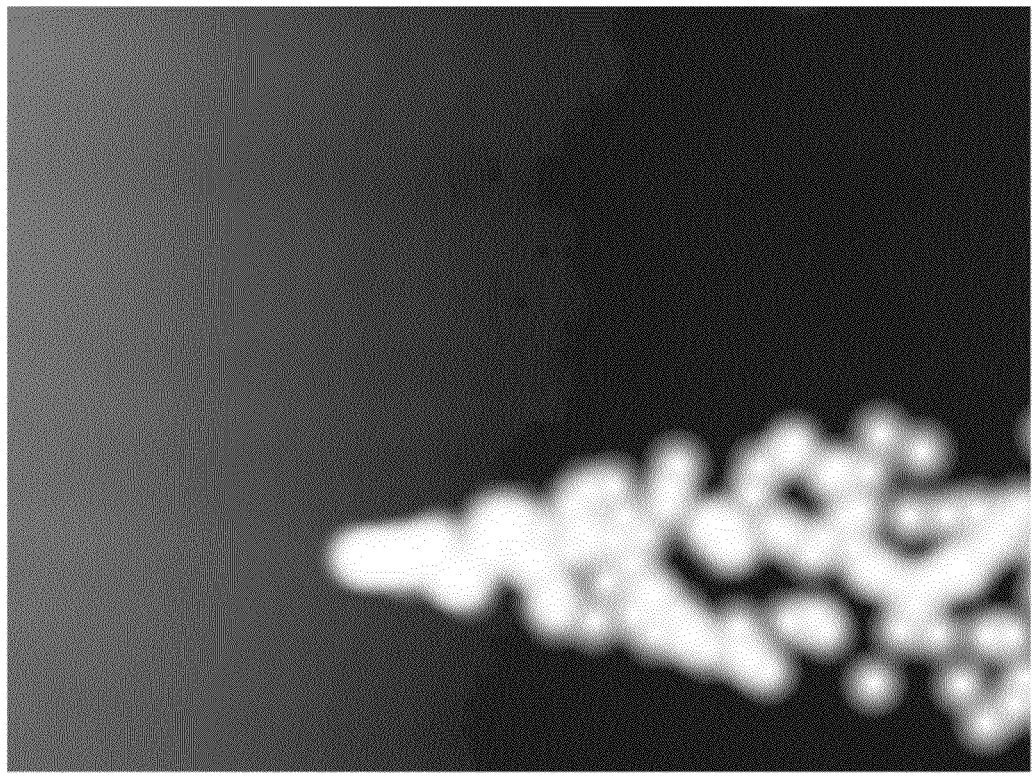

In the Dashboard, click anywhere along the outer edge of the Emission control and drag to define a narrow segment 1010 that limits the area in which particles are created (the Emission Range). In one embodiment, both points 1012 defining the segment rotate around the center of the emission control symmetrically, so the initial wedge points to the right. As the Emission Range is adjusted, the particles rearrange themselves in the Canvas so the resulting effect can be seen. FIGS. 99 and 100 illustrate the Dashboard and the particle system, respectively, before the previously mentioned actions have been performed, according to one embodiment of the invention. FIGS. 101 and 102 illustrate the Dashboard and the particle system, respectively, after the previously mentioned actions have been performed, according to one embodiment of the invention.

Figure 103:
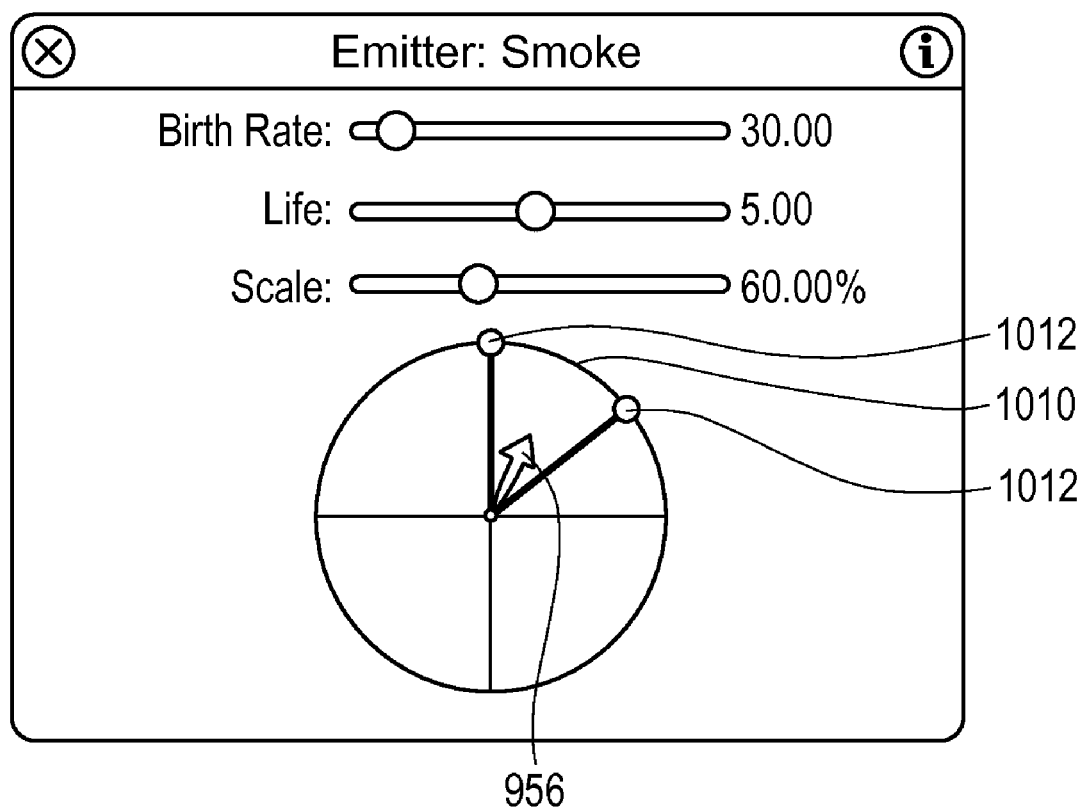
FIGS. 103 and 104 illustrate the Dashboard and the particle system, respectively, after the previously mentioned actions have been performed, according to one embodiment of the invention.
Figure 104:
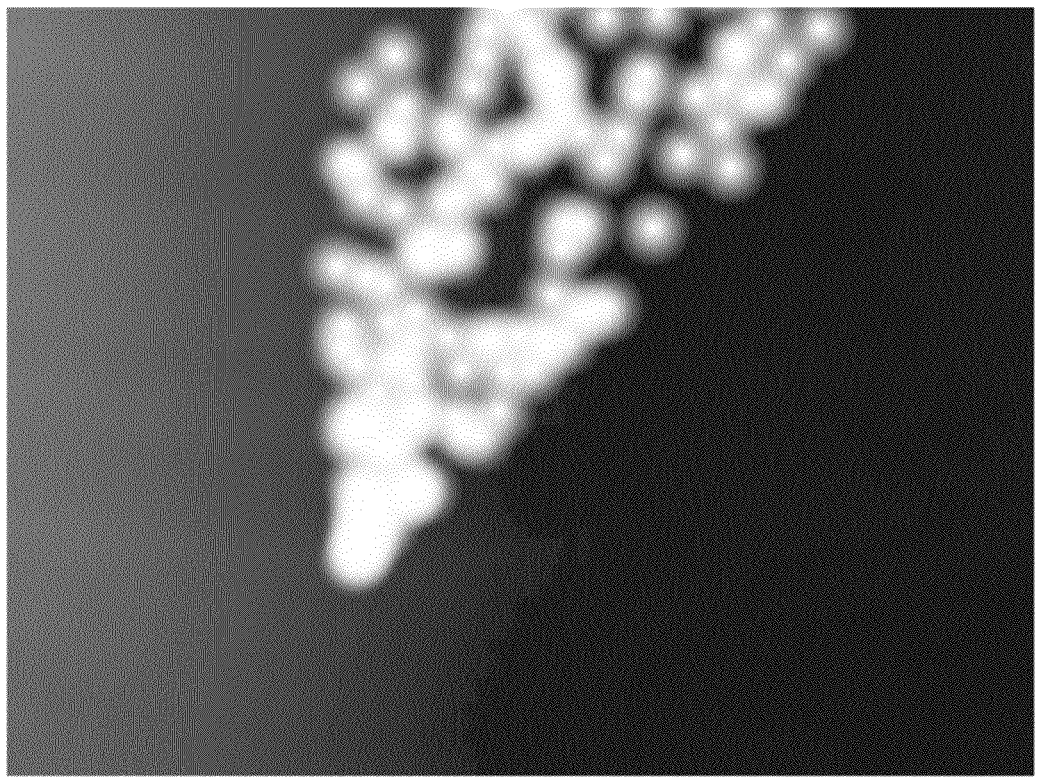

To make the particles drift upwards, click in the middle of the Emission Range segment that was defined and drag to rotate the Emission Angle up and slightly to the left of the center control. FIGS. 103 and 104 illustrate the Dashboard and the particle system, respectively, after the previously mentioned actions have been performed, according to one embodiment of the invention.

Figure 105:
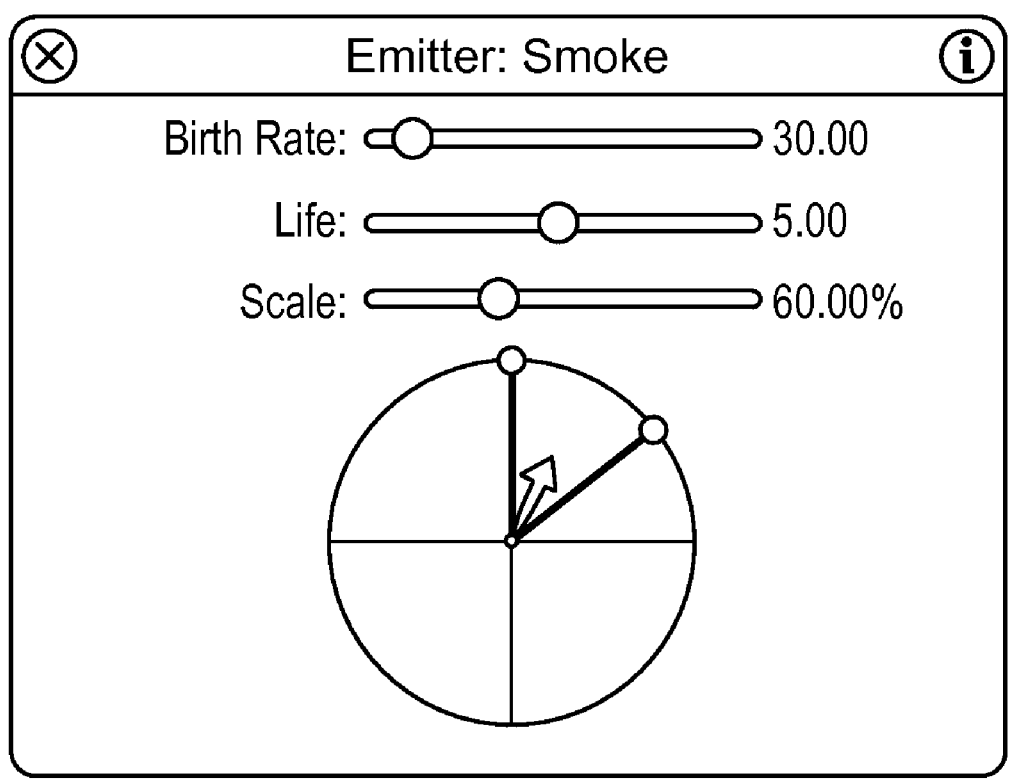
FIGS. 105 and 106 illustrate the Dashboard and the particle system, respectively, after the previously mentioned actions have been performed, according to one embodiment of the invention.
Figure 106:
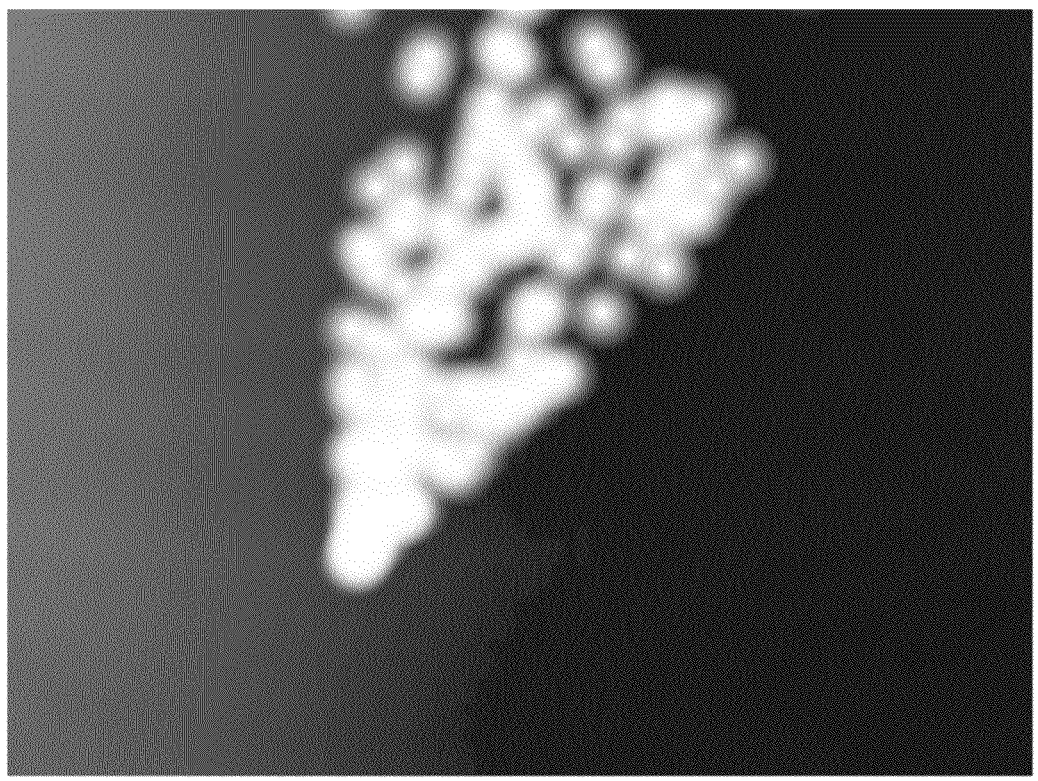

In one embodiment, the middle of the Emission Range segment can be dragged towards or away from the center of the Emission control to adjust the Speed of the particles flying away from the emitter. As this adjustment is made, in one embodiment, one or more arrows within the currently defined Emission Range become longer to indicate a faster speed or shorter for a slower speed. Drag the Speed arrow so that it's approximately halfway between the center and the edge of the Emission control to create a slowly drifting column of particles. FIGS. 105 and 106 illustrate the Dashboard and the particle system, respectively, after the previously mentioned actions have been performed, according to one embodiment of the invention.

Figure 107:
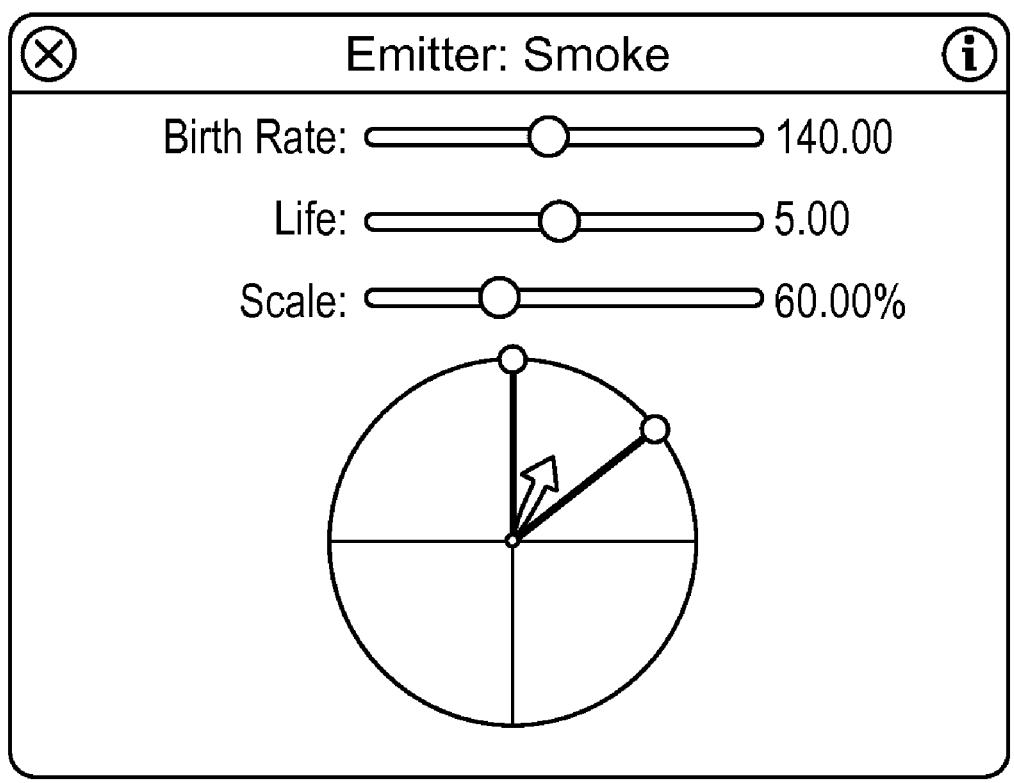
FIGS. 107 and 108 illustrate the Dashboard and the particle system, respectively, after the previously mentioned actions have been performed, according to one embodiment of the invention.
Figure 108:
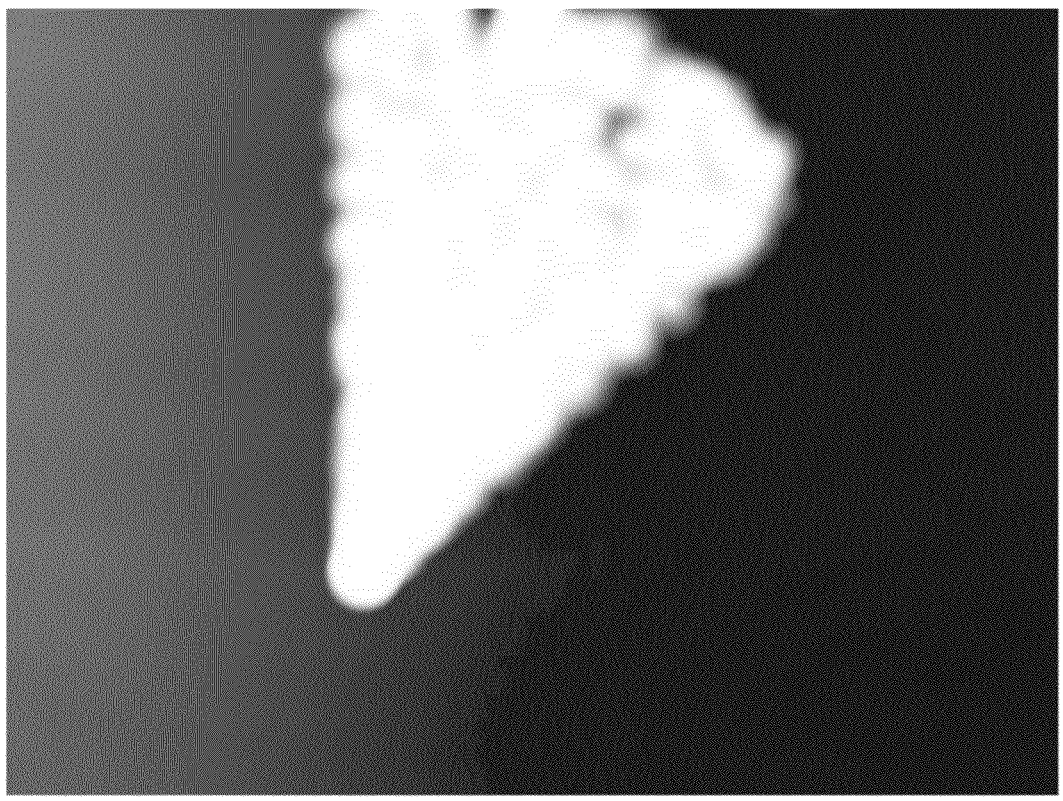

At this point, the particles are all moving in the correct direction, but there aren't very many of them (there isn't much of a fire, yet). Move the Birth Rate slider to the right, increasing the number of particles created by the emitter. In one embodiment, moving this slider to the right creates more particles. In one embodiment, at 430 percent or over, a nearly unified column of particles is created that move farther apart as they drift away from the emitter. FIGS. 107 and 108 illustrate the Dashboard and the particle system, respectively, after the previously mentioned actions have been performed, according to one embodiment of the invention.

Figure 109:
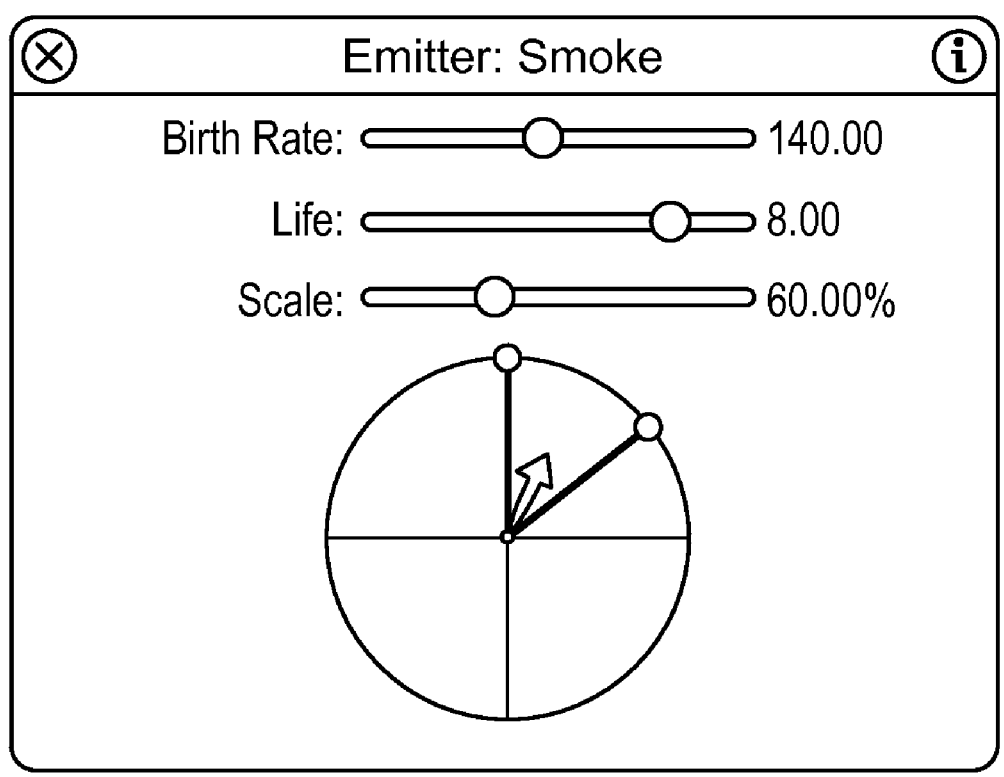
FIGS. 109 and 110 illustrate the Dashboard and the particle system, respectively, after the previously mentioned actions have been performed, according to one embodiment of the invention.
Figure 110:
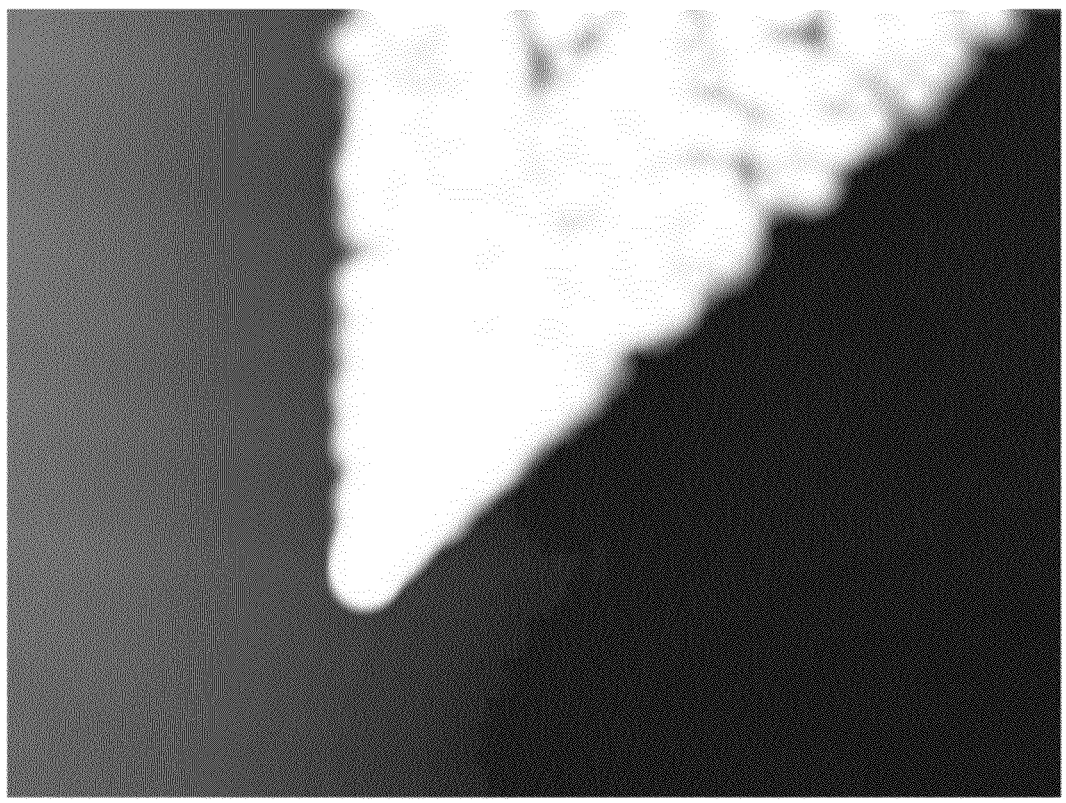

Finally, adjust the Lifetime slider to define the length of the column of smoke. In one embodiment, moving this slider to the left reduces the duration each particle remains on the screen. This results in a shorter column of particles. In one embodiment, moving it to the right increases each particle's duration, creating a longer column of particles. In one embodiment, moving this slider to 130 percent or over creates a smoke-like column of particles drifting all the way past the edge of the Canvas. FIGS. 109 and 110 illustrate the Dashboard and the particle system, respectively, after the previously mentioned actions have been performed, according to one embodiment of the invention.

A single object can thus be used to create a credible column of smoke rising gently into the sky. While the Dashboard controls are quite powerful, in one embodiment, the Emitter and Particle Cell tabs in the Inspector have many more parameters that can be customized.

d. Modifying Emitter Properties

Figure 111:
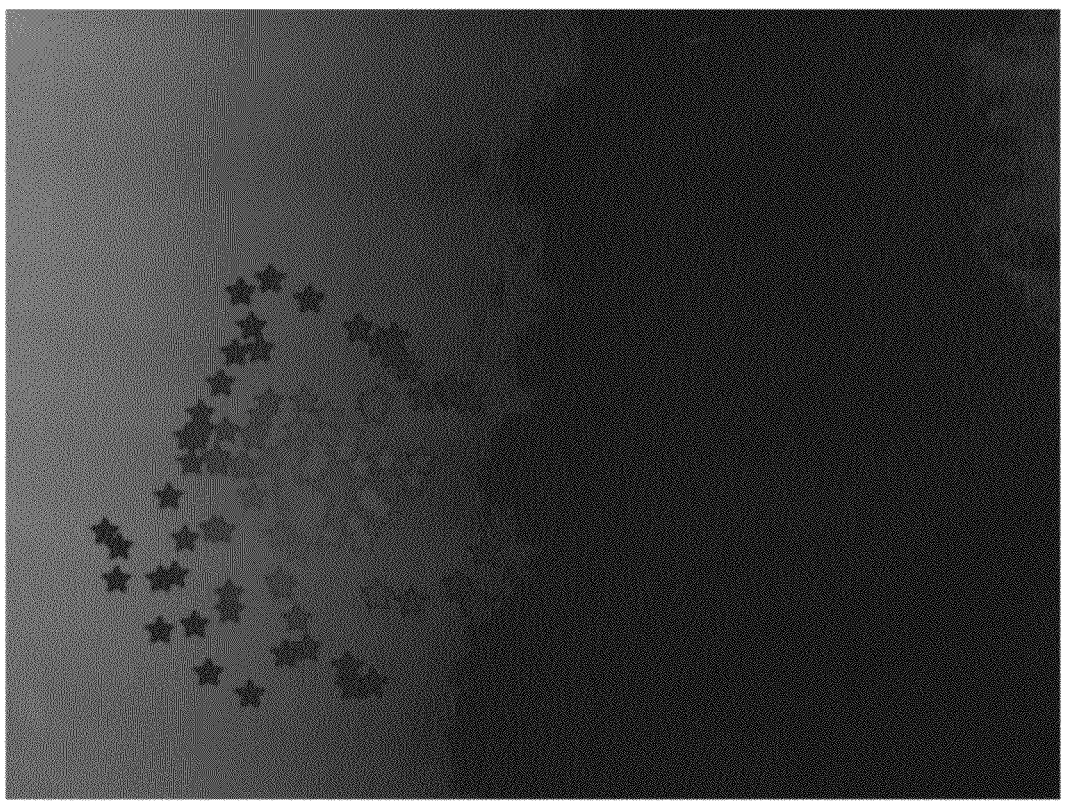
FIG. 111 illustrates a particle system, according to one embodiment of the invention.
Figure 112:
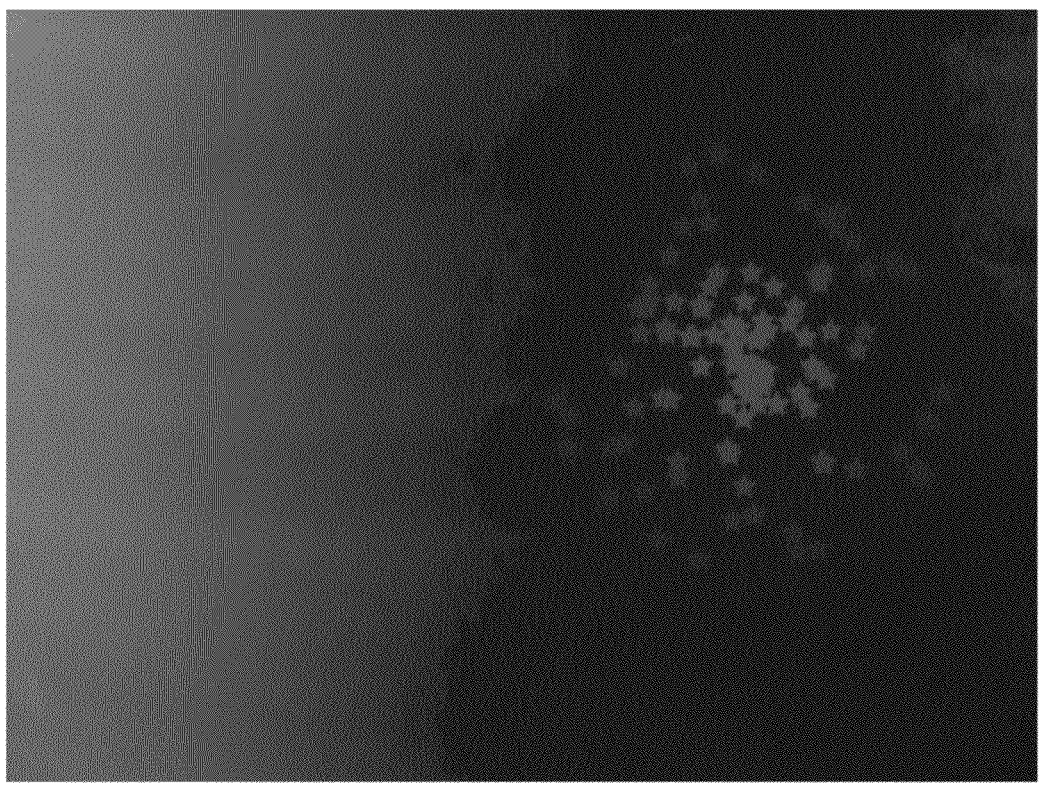
FIG. 112 illustrates the particle system of FIG. 111 after the emitter has been moved, according to one embodiment of the invention.

In one embodiment, emitter parameters can be modified in the Properties tab of the Inspector like any other object. Since particle systems are collections of independently generated objects, these parameters have a different effect then they do with other objects. In one embodiment, the only parameter that appears for cells in the Properties tab of the Inspector is Timing Transform Controls—As a particle system plays, in one embodiment, cells 760 in that system are duplicated according to the parameters for that system to create individual particles 770. Since particles 770 emerge from the position of the emitter 800, changing the emitter's position in the Canvas also changes the position of particles 770 in that system. This results in the particle system being moved as a unit. FIG. 111 illustrates a particle system, according to one embodiment of the invention. FIG. 112 illustrates the particle system of FIG. 111 after the emitter has been moved, according to one embodiment of the invention.

Figure 113:
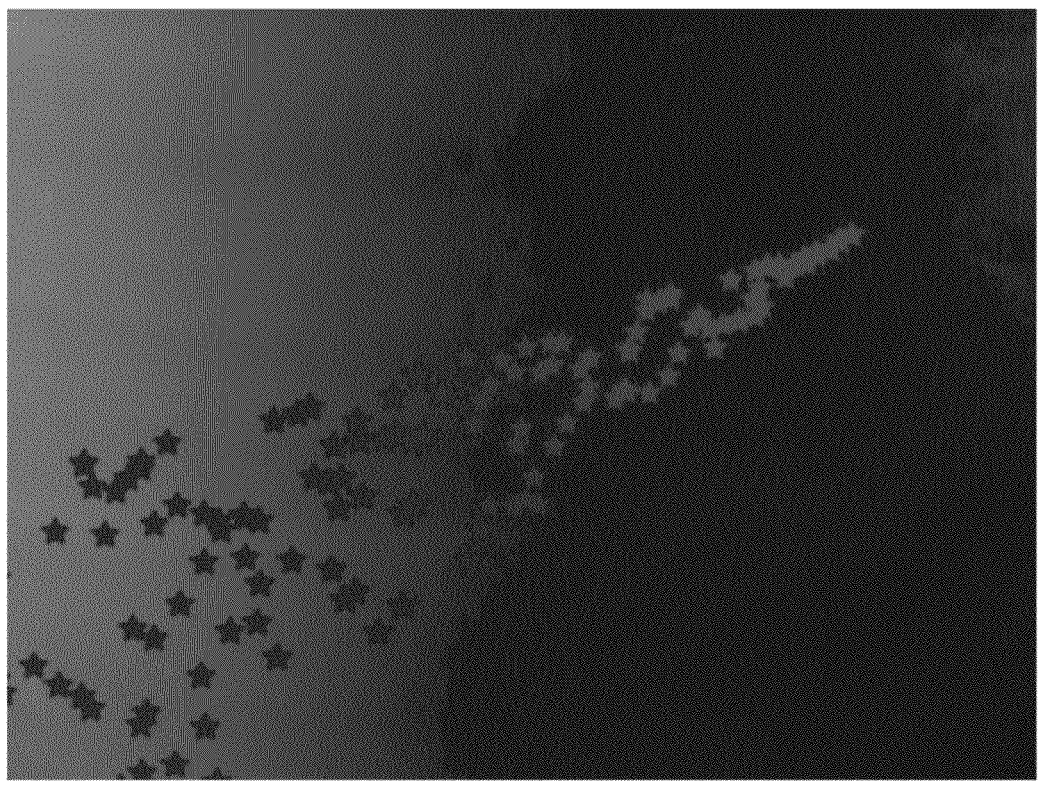
FIG. 113 illustrates a particle system where the emitter's position has been animated using a behavior, or keyframed, according to one embodiment of the invention.

In one embodiment, if the emitter's 800 position is animated using a behavior, or keyframed, the particle system does not move as a unit. In this case, particles 770 emerging from the emitter's position at each frame continue to move relative to that position, regardless of changes to the emitter's position in subsequent frames. This results in a trail 1130 of particles 770 following the path of the emitter 800. FIG. 113 illustrates a particle system where the emitter's position has been animated using a behavior, or keyframed, according to one embodiment of the invention.

Figure 114:
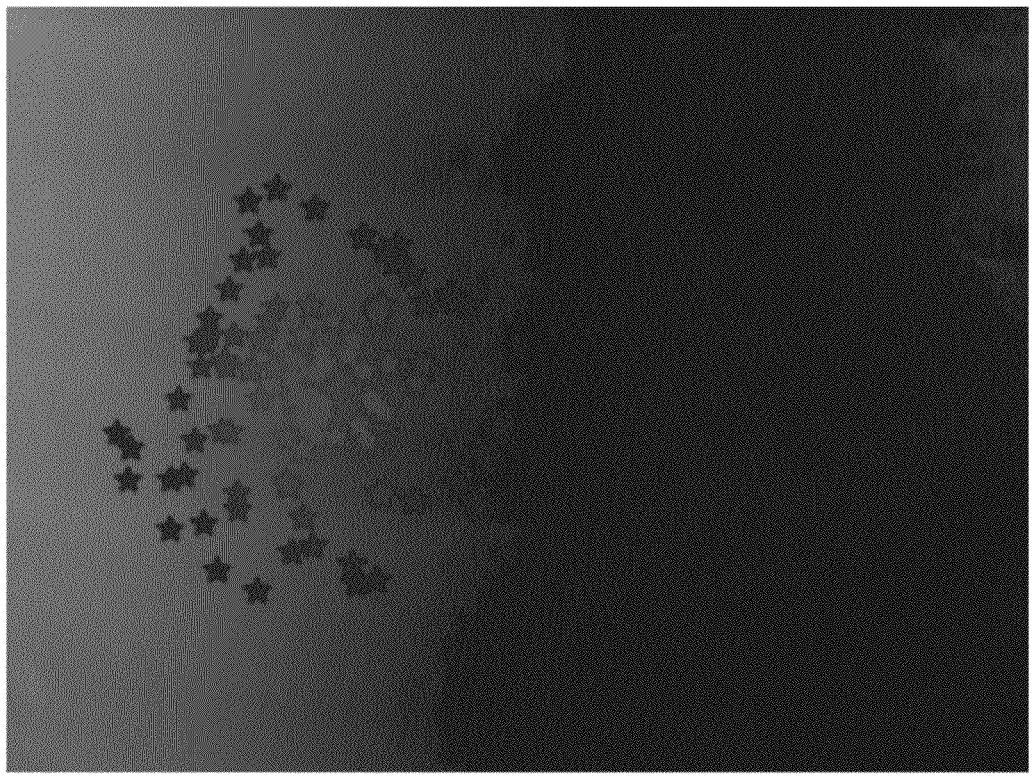
FIG. 114 illustrates a particle system, according to one embodiment of the invention.
Figure 115:
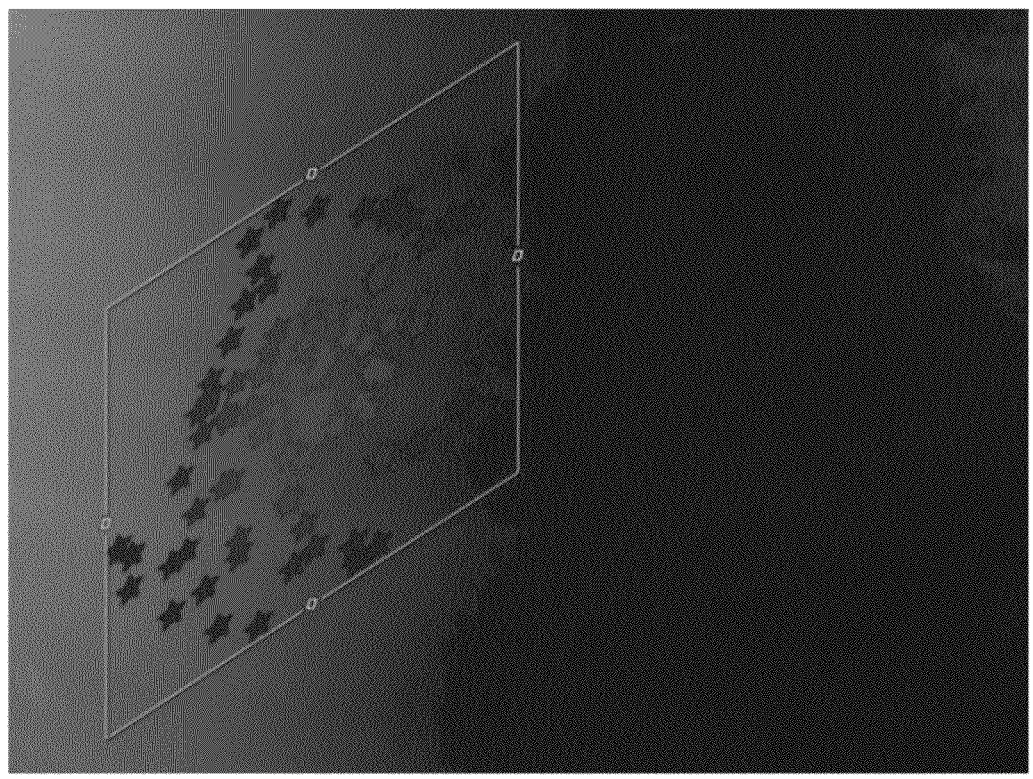
FIG. 115 illustrates the particle system of FIG. 114 after the emitter's Shear parameter has been modified, according to one embodiment of the invention.

In one embodiment, modifying an emitter's other geometric parameters (e.g., Rotation, Scale, and Shear) changes the distribution of particles from that emitter, as well as transforming each individual particle. For example, in one embodiment, if an emitter's Shear parameter is modified, the distribution of the emitted particles changes to reflect the new plane of the emitter, and the particles are sheared along the same plane. FIG. 114 illustrates a particle system, according to one embodiment of the invention. FIG. 115 illustrates the particle system of FIG. 114 after the emitter's Shear parameter has been modified, according to one embodiment of the invention.

Blending—In one embodiment, any changes made to the opacity or blend mode parameters for an emitter are applied to the particle system as a whole.

Mask and Drop Shadow Parameters—In one embodiment, masks and drop shadows cannot be applied to particle systems.

Figure 116:
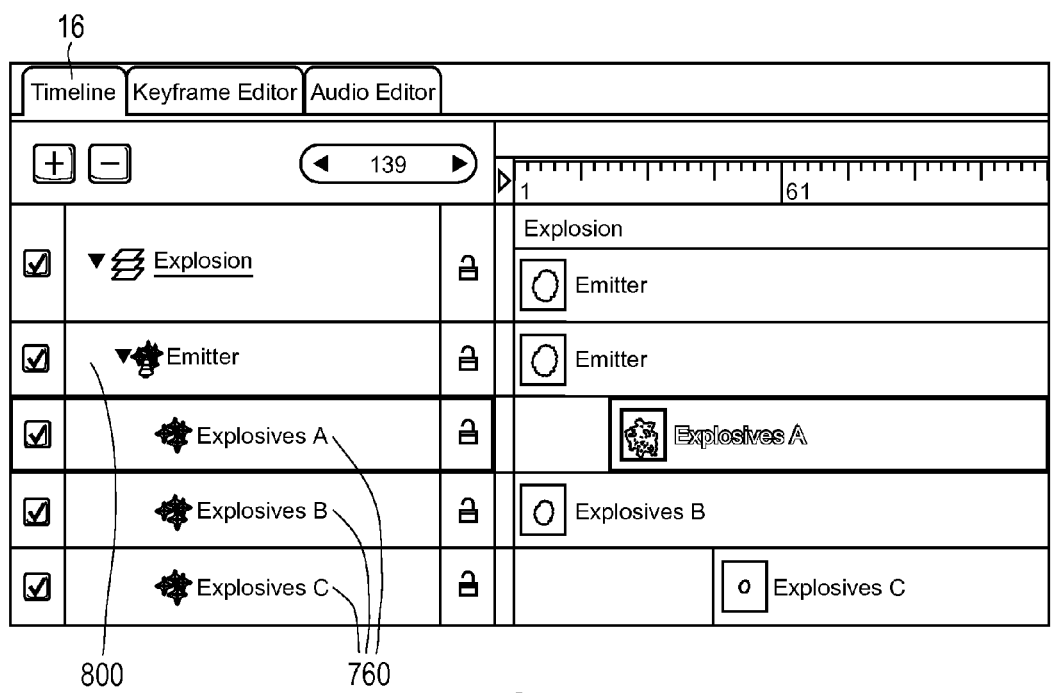
FIG. 116 illustrates a particle system in the Timeline that comprises one emitter and three nested cells, according to one embodiment of the invention.

Timing—In one embodiment, once a particle system has been created, its duration can be as long or short as necessary, regardless of the duration of the original objects 12 used to create the particle system. The duration of a particle system is defined by the duration of the emitter 800. In one embodiment, changing the out point of an emitter 800 in the Timeline 16 changes the duration of the entire particle system. FIG. 116 illustrates a particle system in the Timeline that comprises one emitter and three nested cells, according to one embodiment of the invention.

In one embodiment, by default, a cell in a system generates particles over the entire duration of the emitter. In another embodiment, the duration of an individually generated particle is defined by the Lifetime parameter of the cell that generated it, and not by the duration of the nested cell itself. In one embodiment, the duration of the nested cell itself controls the duration for which it generates particles. In another embodiment, a cell's duration can be changed by dragging either its overall position or its in and out points in the Timeline. In this way, the timing that defines when each cell's particles emerge can be adjusted.

Figure 117:
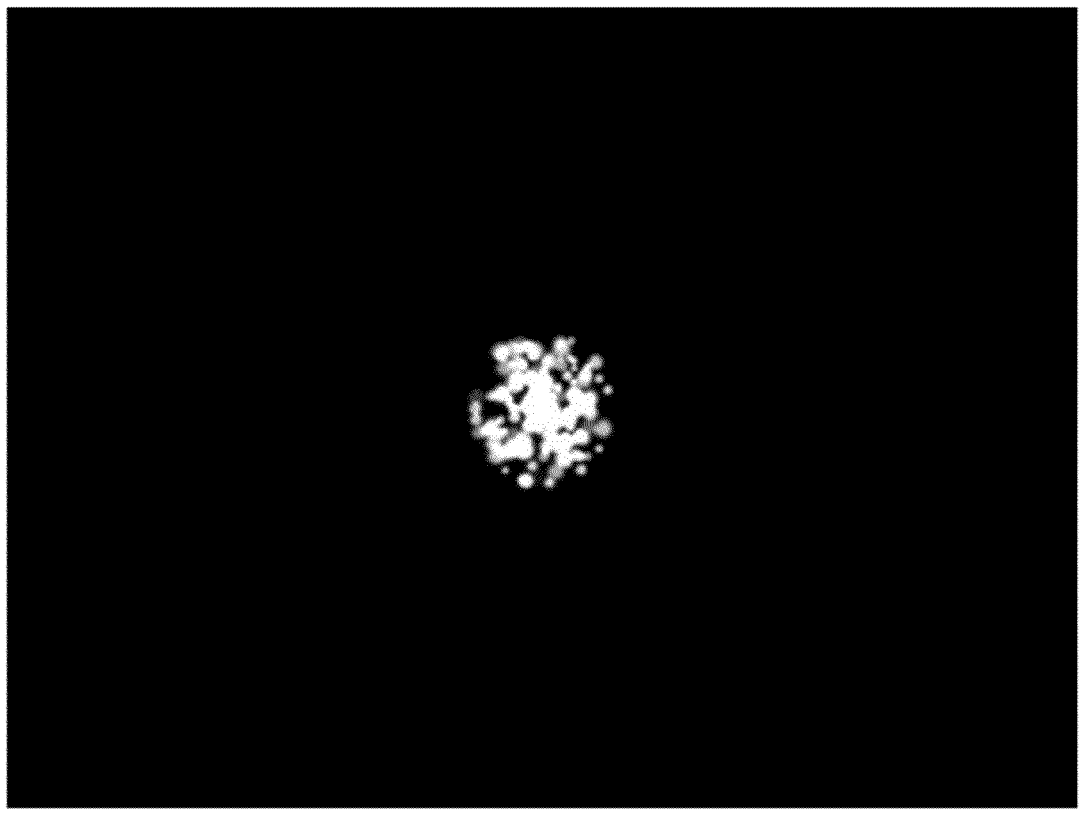
FIG. 117 illustrates a particle system with dense white particles emerging from the center, according to one embodiment of the invention.
Figure 118:
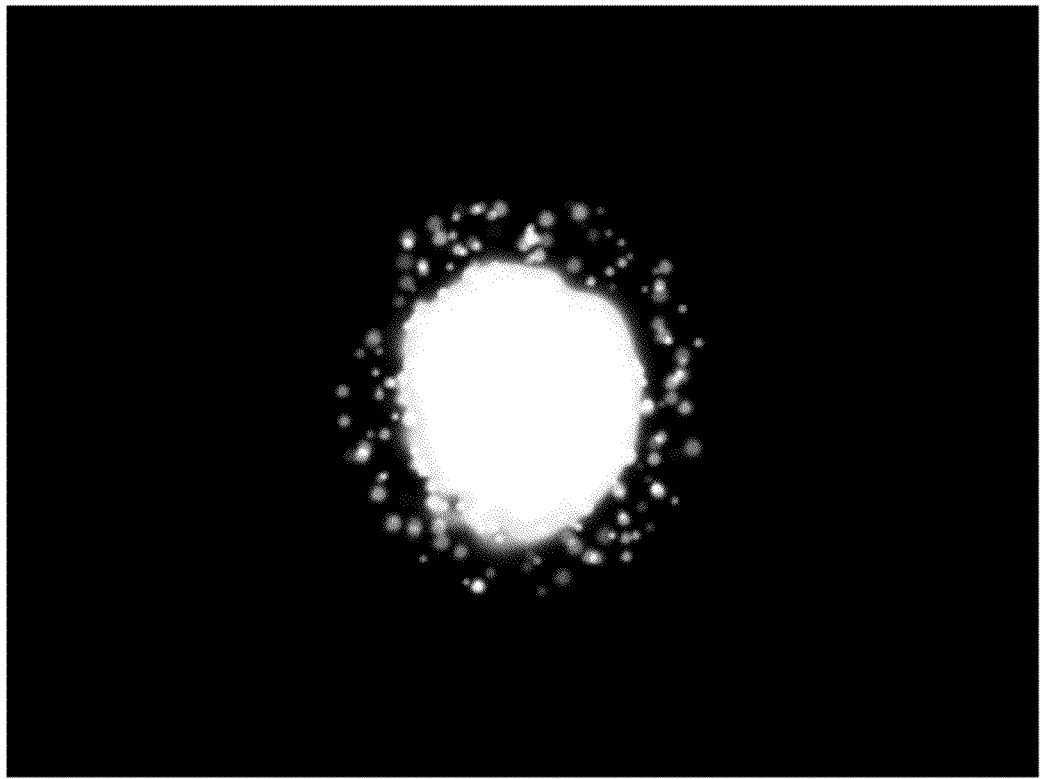
FIG. 118 illustrates the particle system of FIG. 117 with more diffuse orange particles appearing around a larger area, according to one embodiment of the invention.
Figure 119:
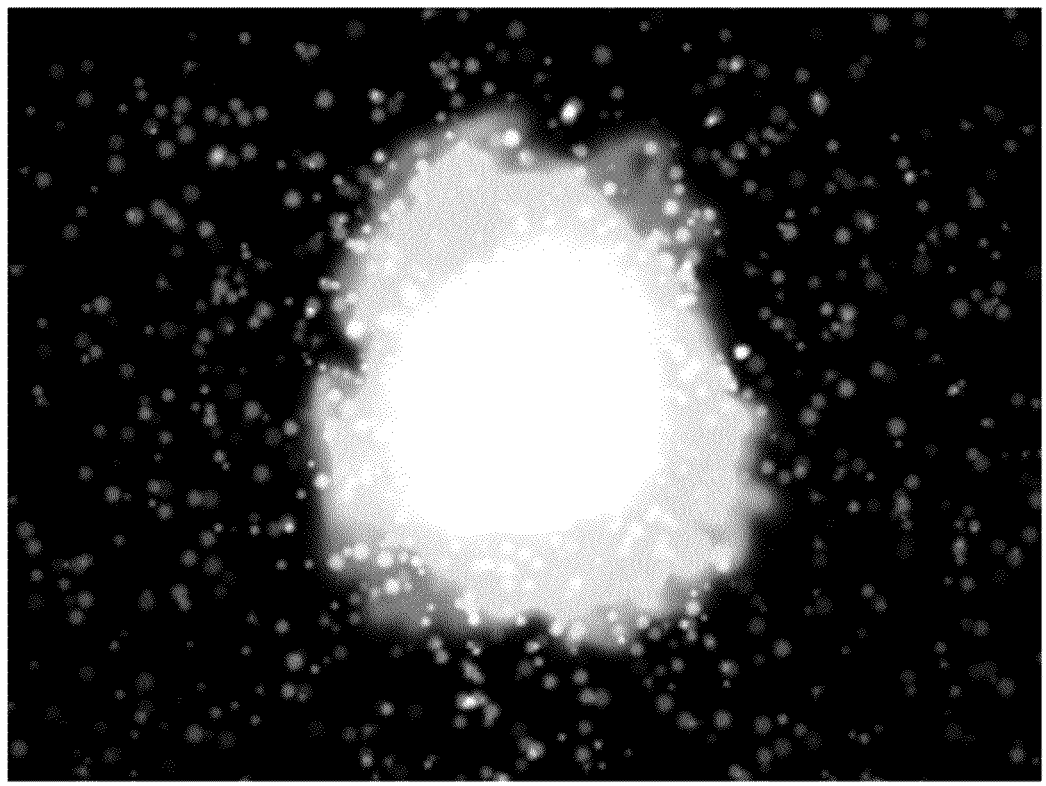
FIG. 119 illustrates the particle system of FIG. 118 with small sparks emerging from underneath both of the previous layers as they fade away, according to one embodiment of the invention.

For example, a particle system can be created that simulates an explosion by offsetting the appearance of three different types of particles. First, dense white particles 770A emerge from the center. FIG. 117 illustrates a particle system with dense white particles emerging from the center, according to one embodiment of the invention. FIG. 118 illustrates the particle system of FIG. 117 with more diffuse orange particles appearing around a larger area, according to one embodiment of the invention. Once second after that, small sparks emerge from underneath both of these layers as they fade away. FIG. 119 illustrates the particle system of FIG. 118 with small sparks emerging from underneath both of the previous layers as they fade away, according to one embodiment of the invention.

iii. Creating Graphics and Animations for Particle Systems

In one embodiment, creating new particle systems from scratch begins with designing the particles that will be emitted. Any graphic or video clip may be a cell.

a. Creating Still Image Graphics for Particle Systems

Still images are the easiest to create, and are often all that is necessary to create a compelling particle system. Here are some guidelines for creating graphics for use as particles.

Graphics Size—In one embodiment, it's a good idea to make graphics larger rather than smaller. The size of the particles may be reduced without a loss of quality, but increasing the size of particles beyond the size of the original graphic may introduce unwanted artifacts.

Particle Edges—In one embodiment, the quality of the edges of graphics can be extremely important for creating convincing particles. Soft, translucent edges might look better than hard, over-defined ones.

Object Color—In one embodiment, by default, particles are created using the original colors of the image being used as the cell. If necessary, the emitted particles can be tinted using the Color Mode, Color, and Color Over Life parameters in the Emitter and Particle Cell tabs. In one embodiment, particles may be tinted by a single color, or they may be tinted with a gradiated tint that changes color over time. In one embodiment, tinting particles applies the tint color uniformly over the entire object.

Create Graphics With an Alpha Channel—In one embodiment, create graphics to use as cells with pre-defined alpha channels. In one embodiment, if a graphic with a pre-multiplied alpha channel is imported, the "Is Premultiplied" parameter in the Particle Cell tab can be turned on for that cell to eliminate any edge fringing.

b. Creating Animations to Use as Cells

Video clips, such as QuickTime movies, may also be used as cells. For example, in one embodiment, an animation can be created, rendered as a QuickTime movie, and used as a cell. In general, the same recommendations for creating still graphics apply to the creation of animation or video clips to use as cells, but in one embodiment, there are additional considerations.

Create Clips That Loop—In one embodiment, particles created from video clips loop over and over for the duration of each individual particle's life. If the clip doesn't loop well, there will be a jump cut at every loop point.

Use Video Clips With Minimal Compression—Ideally, in one embodiment, video clips to be used as particles should be saved using an uncompressed codec, such as Animation or Uncompressed 8- and 10-bit 4:2:2. In other embodiments, other codecs can be used, but they may introduce unwanted artifacts depending on the level of compression used.

iv. Advanced Particle System Controls

In one embodiment, while the Dashboard provides a fast way to modify a particle system's main parameters, the particle system's Emitter and Particle Cell tabs in the Inspector provide total control over every aspect of a particle system. This includes, for example, individual parameters for each cell in a system.

a. The Difference Between Emitter and Particle Cell Parameters

In one embodiment, Emitter and Particle Cell parameters, though closely related, serve different purposes. In one embodiment, emitter parameters control the overall shape and direction of the animated mass of particles generated by the system. In another embodiment, other emitter parameters simultaneously modify the parameters of cells nested inside an emitter. In yet another embodiment, Particle Cell parameters, on the other hand, control the behavior of particles generated from a cell that's nested inside the particle emitter separately.

In one embodiment, to open a particle system's Emitter tab:

Select an emitter object.

Open an Inspector.

Figure 120:
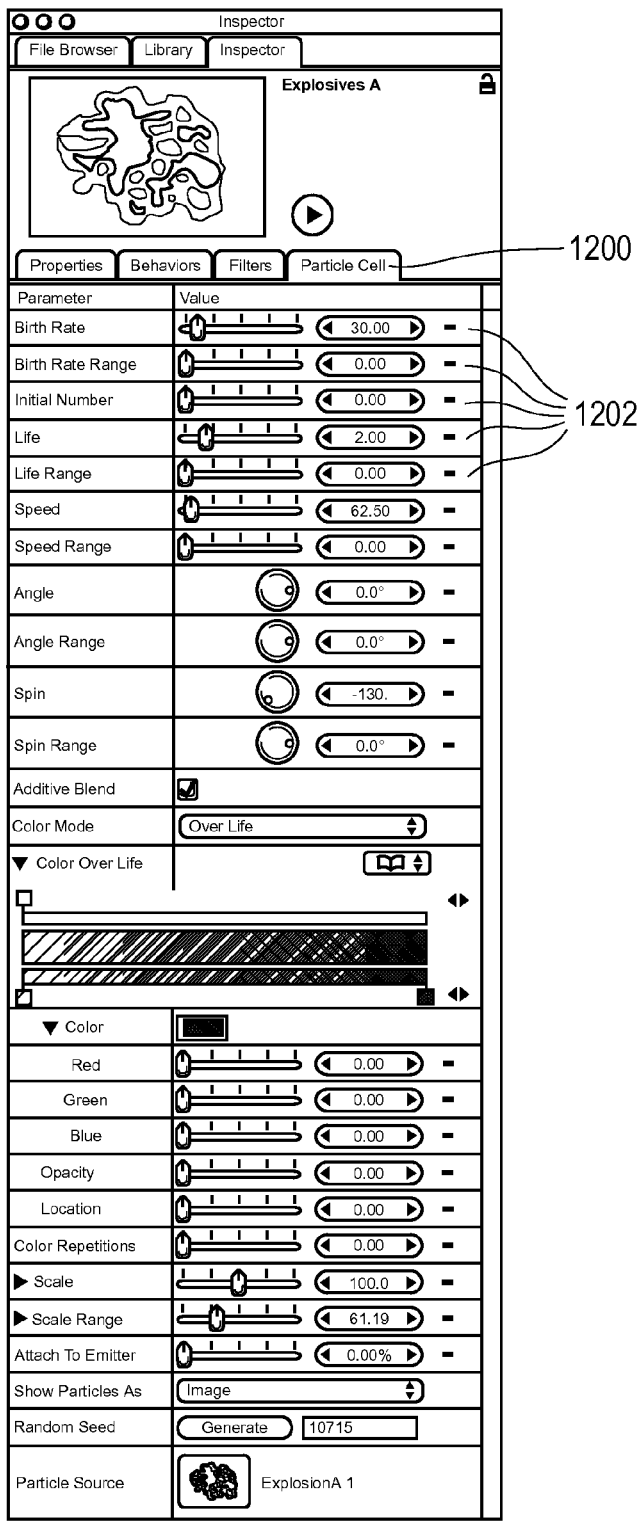
FIG. 120 illustrates an Emitter tab and Emitter parameters, according to one embodiment of the invention.

Click an Emitter tab 1200. Emitter parameters 1202 appear, ready to edit. FIG. 120 illustrates an Emitter tab and Emitter parameters, according to one embodiment of the invention.

b. Emitter Parameters

Figure 121:
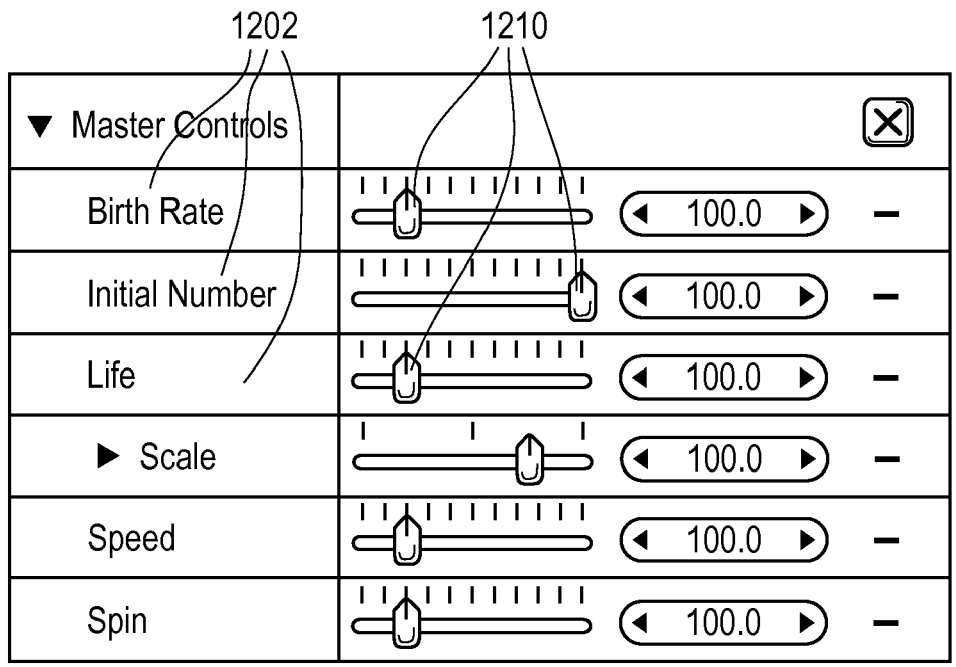
FIG. 121 illustrates an Emitter tab and individual controls for several Emitter parameters, according to one embodiment of the invention.

In one embodiment, several parameters 1202 in an Emitter tab 1200 are identical to those found in an emitter Dashboard 110, with one difference. In one embodiment, while the Emission control in the emitter Dashboard 110 allows manipulation of the Range, Angle, and Speed parameters using a single, graphical control, the Emitter tab 1200 lists individual controls 1210 for each parameter 1202. FIG. 121 illustrates an Emitter tab and individual controls for several Emitter parameters, according to one embodiment of the invention. In one embodiment, the contents of the Emitter tab are dynamic, and different parameters appear depending on the number of cells in the particle system, as well as the emitter shape that's used.

Single Cell vs. Multi-Cell Emitter Parameters—In one embodiment, at first glance, many of the parameters in the Emitter tab appear to mirror identically named parameters in the Particle Cell tabs for each cell within a system. In one embodiment, if a particle system has only one cell, then the Emitter tab displays parameters for the nested cell alongside the emitter's own parameters. In this case, an aspect of the particle system may be controlled directly from this tab, without having to go back and forth between the Emitter and Particle Cell tabs.

Figure 122:
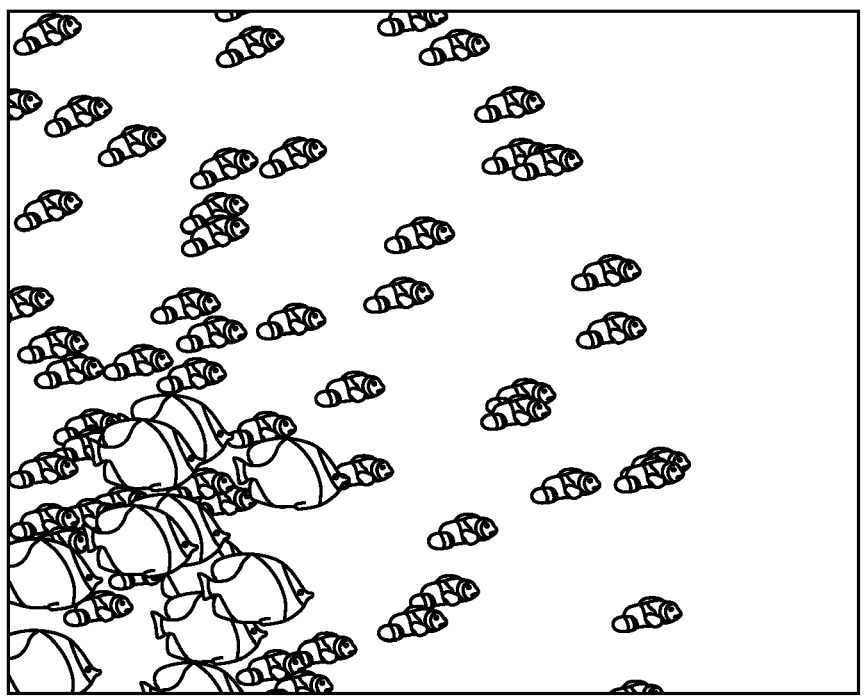
FIG. 122 illustrates a particle system, according to one embodiment of the invention.
Figure 123:
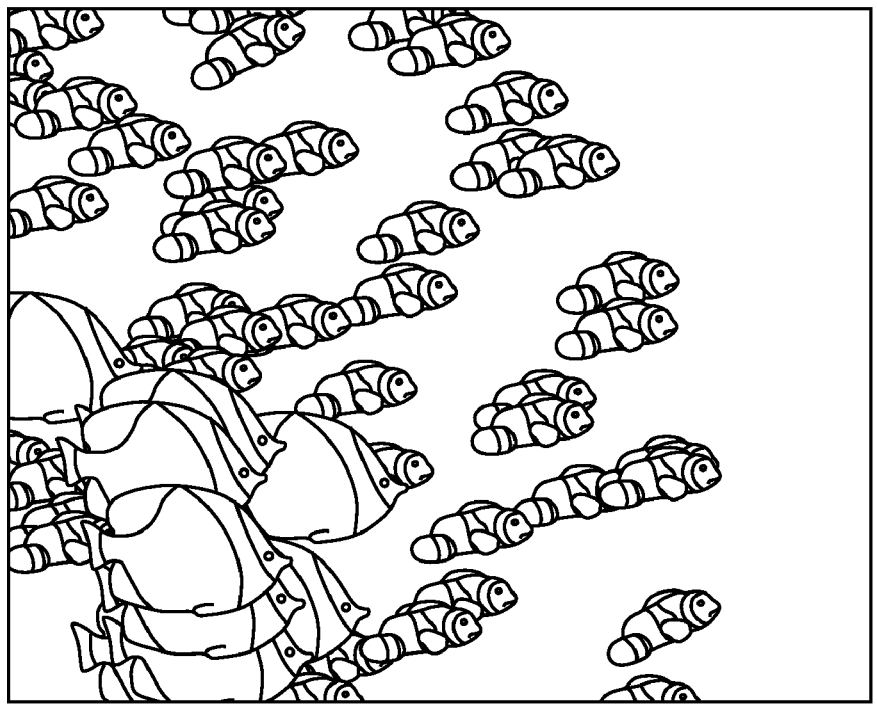
FIG. 123 illustrates the particle system of FIG. 122 after the value of the Scale parameter in the Emitter tab has been increased, according to one embodiment of the invention.

In one embodiment, if a particle system has multiple cells, an Emitter tab looks different. In one embodiment, the list of parameters is shorter, and some cell parameters are replaced with a smaller group of master controls. In one embodiment, changes made using the master controls modify the effect of a cell's parameters relative to other cells in a system. This means that, in one embodiment, for a particle system with three cells that have different Scale values, increasing the Scale parameter in the Emitter tab multiplies the Scale value of all three cells by the same percentage. In one embodiment, this has the result of increasing or reducing the size of a particle in the system, while keeping the size of a particle relative to other particles the same. FIG. 122 illustrates a particle system, according to one embodiment of the invention. FIG. 123 illustrates the particle system of FIG. 122 after the value of the Scale parameter in the Emitter tab has been increased, according to one embodiment of the invention.

Options in the Emitter Shape Parameter—In one embodiment, the first parameter 1202 in an Emitter tab 1200 is an Emitter Shape pop-up menu. In one embodiment, the options in this menu significantly alter the distribution of generated particles 770. In one embodiment, when an emitter 800 shape is chosen, different Emitter tab 1200 parameters 1202 are revealed which are unique to that shape. These parameters provide additional control over the distribution of particles 770.

Figure 124:
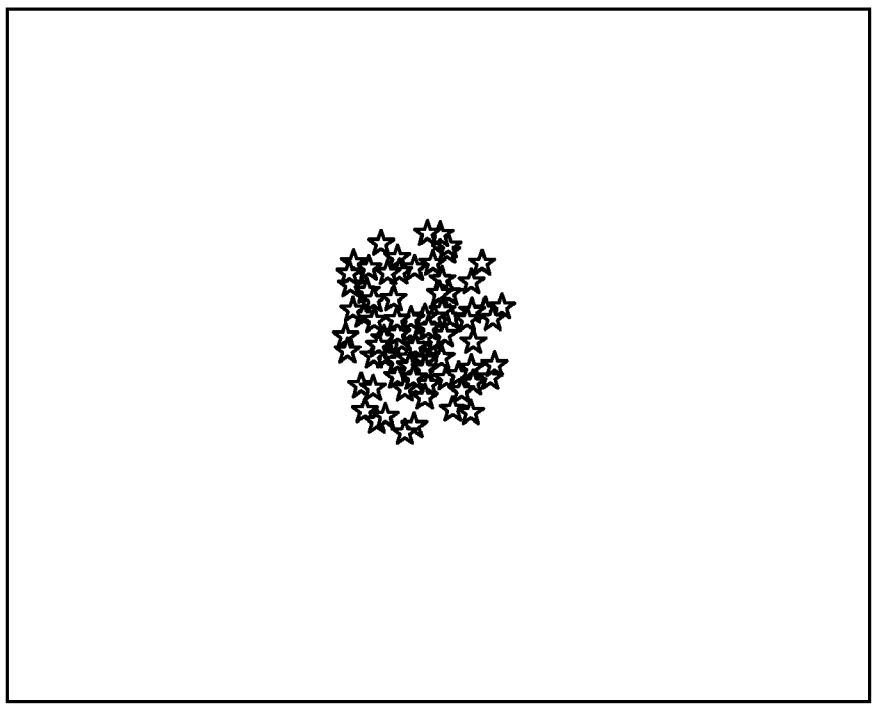
FIG. 124 illustrates a particle system with a Point emitter shape, according to one embodiment of the invention.

In one embodiment, there are six Emitter Shapes:

Point: In one embodiment, this is the simplest emitter shape and is the default shape for newly created emitters. In one embodiment, it specifies a single point of emission for a particle system. In one embodiment, there are no additional parameters for the Point shape. FIG. 124 illustrates a particle system with a Point emitter shape, according to one embodiment of the invention.

Figure 125:
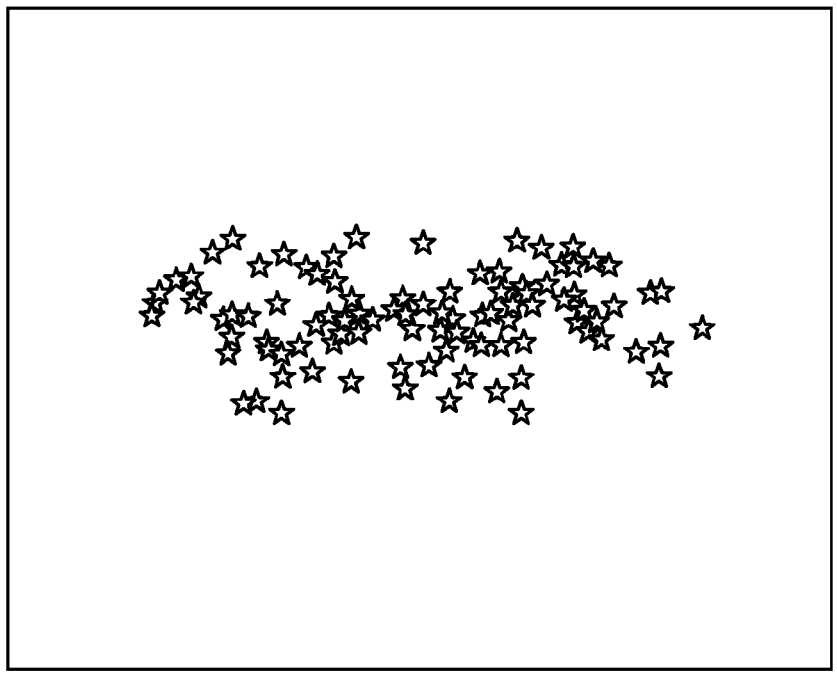

Line: In one embodiment, particles emerge from a line stretching through a Canvas. In one embodiment, the length and location of the line segment may be specified, as well as how widely particle emission points are distributed across the line segment. In one embodiment, this emitter shape is good for creating sheets of particles that cascade over a wide area. In one embodiment, the Line shape displays additional parameters, such as Start Point, End Point, and Emit at Points. FIG. 125 illustrates a particle system with a Line emitter shape, according to one embodiment of the invention.

Figure 126:
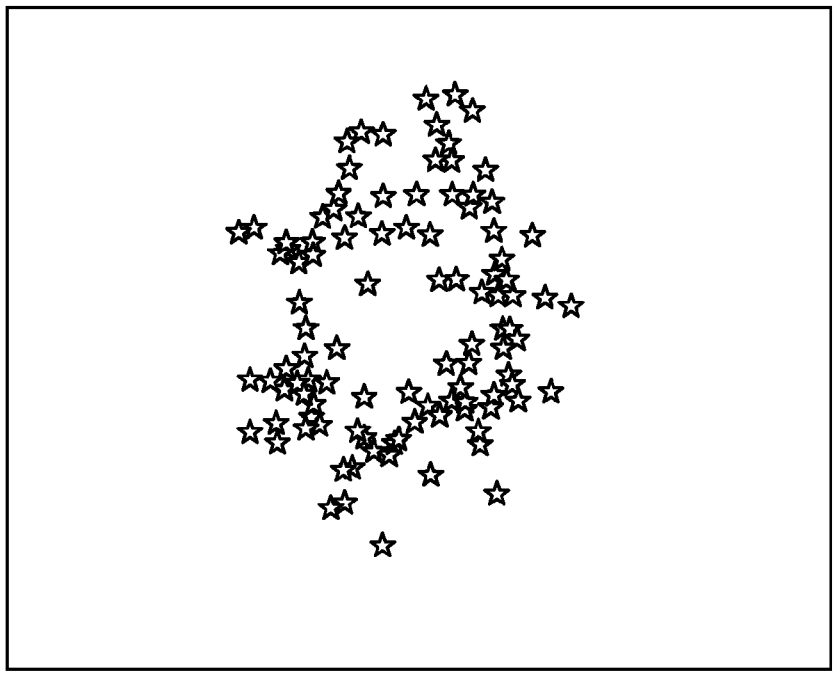

Circle: In one embodiment, particles emerge from an edge of a radius around a position of an emitter. In one embodiment, this emitter shape is good for surrounding an element in a composition with particles that emerge from the element's edge. In one embodiment, the Circle shape displays additional parameters, such as Radius and Emit at Points. FIG. 126 illustrates a particle system with a Circle emitter shape, according to one embodiment of the invention.

Figure 127:
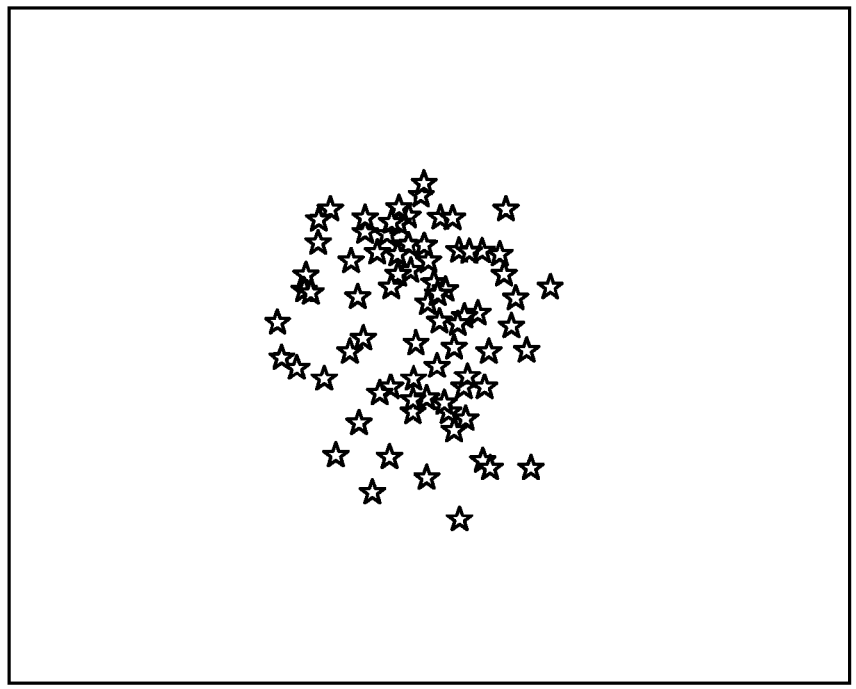

Filled Circle: In one embodiment, particles emerge from an area within a circle surrounding a position of an emitter. In one embodiment, this emitter shape is good for creating a cluster of particles that spreads from within a defined area of a Canvas, rather than from a single point. In one embodiment, the Filled Circle shape displays additional parameters, such as Radius and Emit at Points. FIG. 127 illustrates a particle system with a Filled Circle emitter shape, according to one embodiment of the invention.

Figure 128:
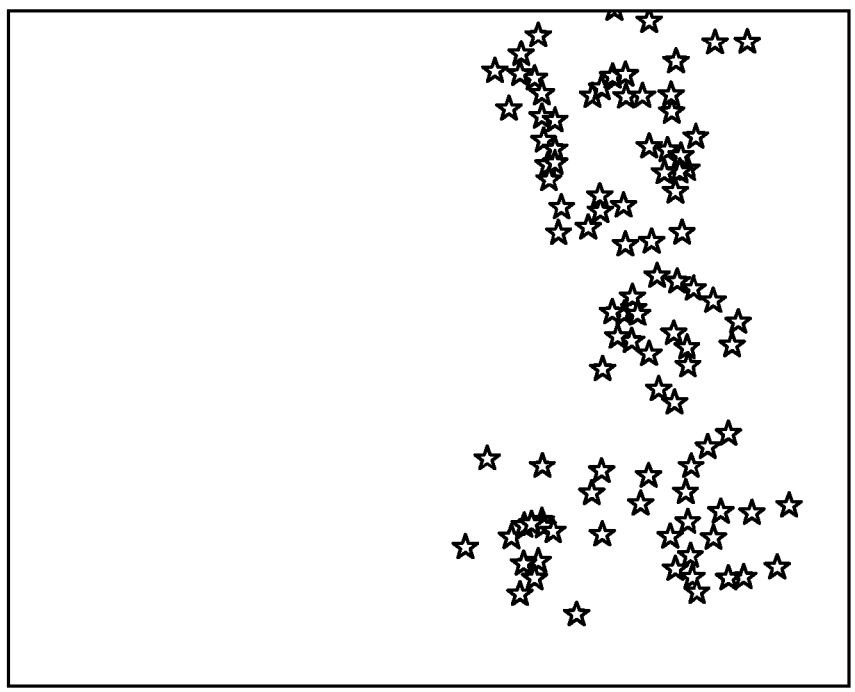
Figure 129:
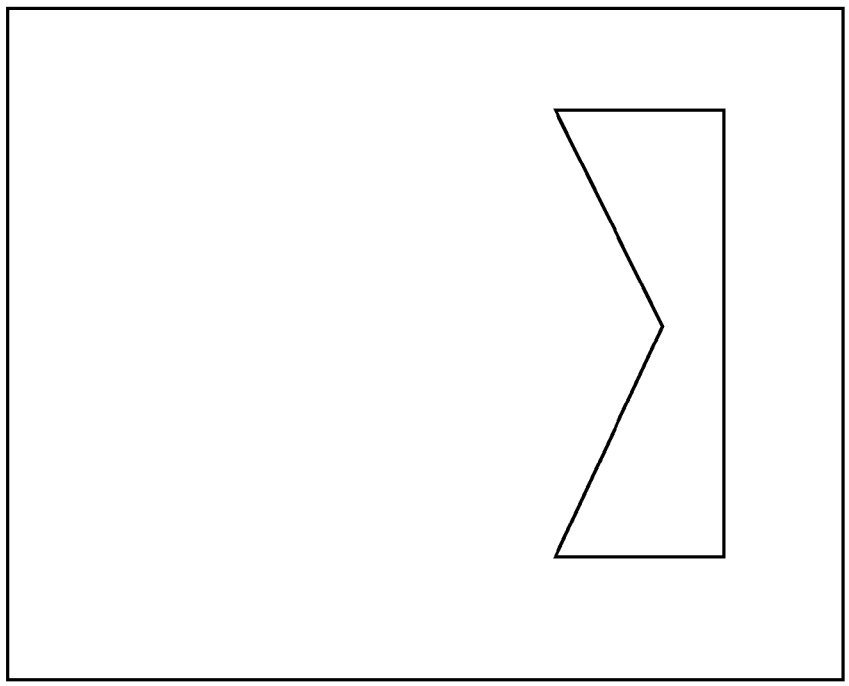

Geometry: In one embodiment, particles emerge from an edge of a shape. In one embodiment, a spline object is used as the shape source. In one embodiment, the Geometry shape displays additional parameters, such as Shape Source and Emit at Points. FIG. 128 illustrates a particle system with a Geometry emitter shape, according to one embodiment of the invention. FIG. 129 illustrates the shape that was used as the Geometry emitter shape for the particle system of FIG. 128, according to one embodiment of the invention.

Figure 130:
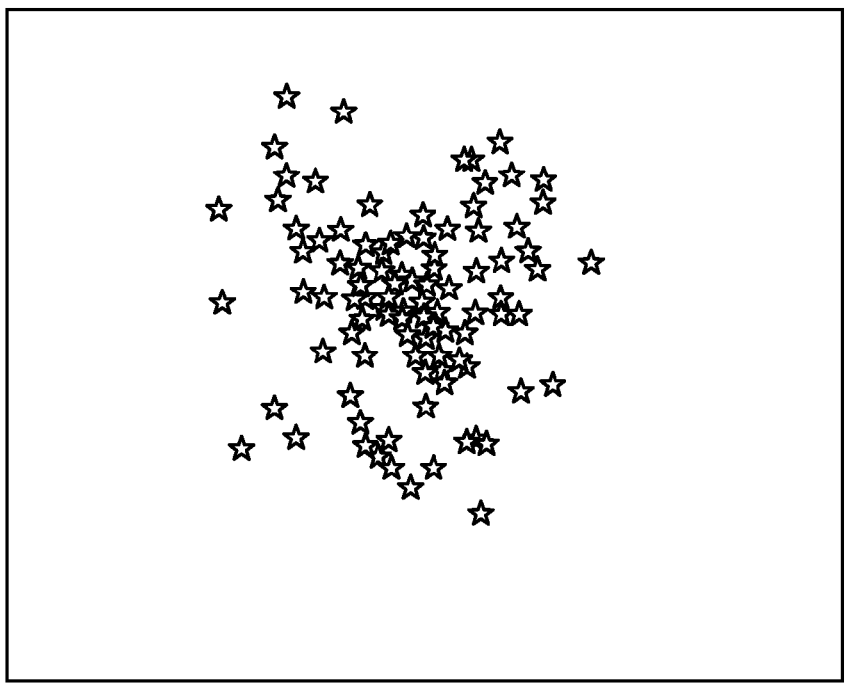
Figure 131:
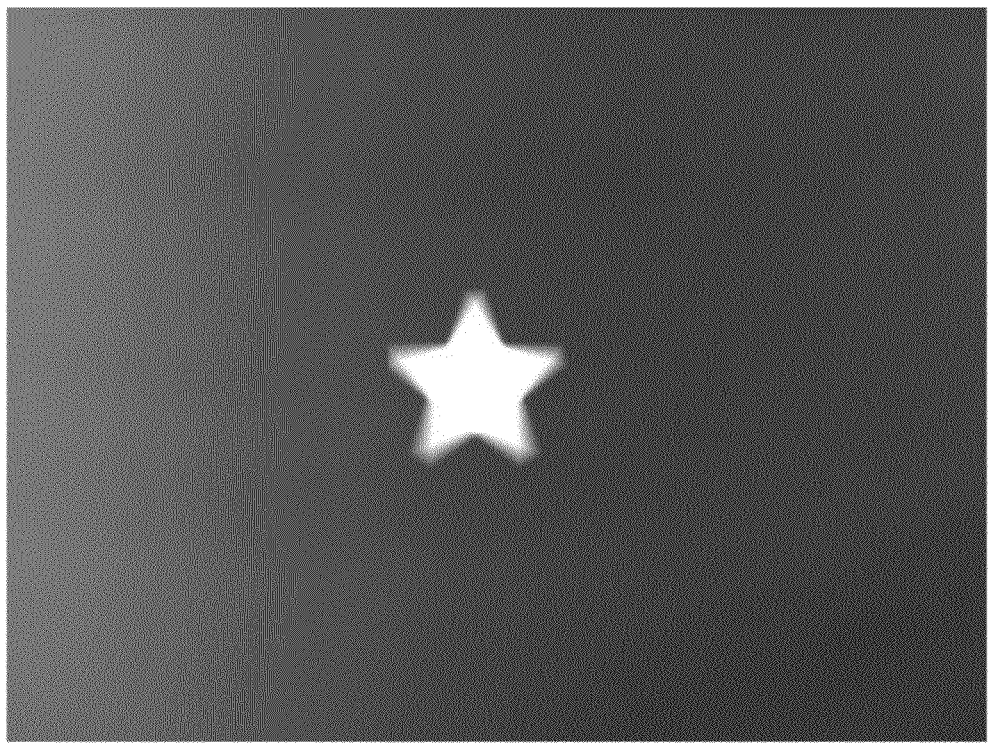

Image: In one embodiment, particles emerge from within an area defined by an image. The image may or may not have an alpha channel. In one embodiment, if it does have an alpha channel, the shape of the alpha channel may be used to define the emitter shape. In one embodiment, the Image shape displays additional parameters, such as Image Source, Emit at Alpha, Emission Alpha Cutoff, and Emit at Points. FIG. 130 illustrates a particle system with an Image emitter shape, according to one embodiment of the invention. FIG. 131 illustrates the image that was used as the Image emitter shape for the particle system of FIG. 130, according to one embodiment of the invention.

In one embodiment, the following parameters are available for Emitters:

Start Point: (Line) In one embodiment, two infinite sliders define, in X and Y coordinates, the first point of the line used as the emitter shape.

End Point: (Line) In one embodiment, two infinite sliders define, in X and Y coordinates, the second point of the line used as the emitter shape.

Radius: (Circle and Filled Circle) In one embodiment, a slider defines the size of the circle used as the emitter shape.

Shape Source: (Geometry) In one embodiment, an object defines the shape of the emitter. In one embodiment, either paint or spline objects may be dropped onto this control to assign the desired shape.

Image Source: (Image) In one embodiment, an object defines the image used to define the shape of the emitter. In one embodiment, any graphic or video clip may be dropped onto this control to assign the desired shape.

Emit at Alpha: (Image) In one embodiment, a checkbox controls whether or not an image's alpha channel will be used to define the shape of the emitter. In one embodiment, if Emit at Alpha is turned off, the entire image is used as the emitter shape. In one embodiment, if Emit at Alpha is turned on, the shape of the alpha channel defines the emitter. In another embodiment, an Emission Alpha Cutoff parameter modifies how the shape of the alpha channel defines the emitter (see below).

Emission Alpha Cutoff: (Image) In one embodiment, if the Emit at Alpha parameter is turned on, this slider determines how much of the alpha channel is used to define the emitter area.

Emission Angle: In one embodiment, a dial sets the direction in which particles travel. In another embodiment, this parameter works in conjunction with the Emission Range parameter. In yet another embodiment, the Emission Angle parameter is similar to one of the functions of the visual Emission control in the Dashboard. In one embodiment, this parameter is unique to the emitter object. In one embodiment, when using an emitter shape other than a point, such as a line, circle, or shape, setting the Emission Angle parameter to 0 degrees restricts the emission of particles to the outside of the shape. In another embodiment, setting the Emission Angle to 180 degrees restricts the emission of particles to the inside of the shape.

Emission Range: In one embodiment, a dial restricts the area around the center of the emitter into which particles are generated, in the direction of the Emission Angle. In another embodiment, the Emission Range parameter is similar to one of the functions of the visual Emission control in the Dashboard. In yet another embodiment, this parameter is unique to the emitter object. In one embodiment, when using an emitter shape other than a point, such as a line, circle, or shape, setting the Emission Range parameter to 0 degrees keeps particles perpendicular to the emitter when they emerge.

Emit at Points: (for all shapes except Point) In one embodiment, a checkbox defines whether or not points on an edge of a shape emit particles. In one embodiment, if the Emit at Points parameter is turned off, particles may emerge from anywhere on the line. In one embodiment, if the Emit at Points parameter is turned on, particles may emerge from a limited number of locations on the edge of the shape, as defined by the Num Points parameters.

Points: (Line, Circle, Geometry) In one embodiment, a slider defines the number of points on the edge of the currently selected Emitter Shape that emit particles. In one embodiment, emitter points are distributed evenly around the circle. In one embodiment, this parameter is available for Line, Circle, and Geometry Emitter Shapes.

Grid X: (Filled Circle, Image) In one embodiment, a slider specifies the horizontal number of emitter points on a grid that is overlaid on the selected Emitter Shape. In one embodiment, in the case of an irregular shape (non-rectangular), grid points that fall outside the shape are ignored. In one embodiment, this parameter is available for Filled Circle and Image Emitter Shapes.

Grid Y: (Filled Circle, Image) In one embodiment, a slider specifies the vertical number of emitter points on a grid that is overlaid on the selected Emitter Shape. In one embodiment, in the case of an irregular shape (non-rectangular), grid points that fall outside the shape are ignored. In one embodiment, this parameter is available for Filled Circle and Image Emitter Shapes.

Render Order: In one embodiment, a pop-up menu determines whether new particles are drawn on top of, or underneath, particles that have already been generated. In one embodiment, there are two options:

- Oldest First: New particles appear on top of older particles.
- Oldest Last: New particles appear underneath older particles.

Interleave Particle Cells: In one embodiment, turning on this checkbox blends particles generated from multiple cells together. In one embodiment, turning off this checkbox layers particles in the same order as the nested cells that generate them.

Figure 132:
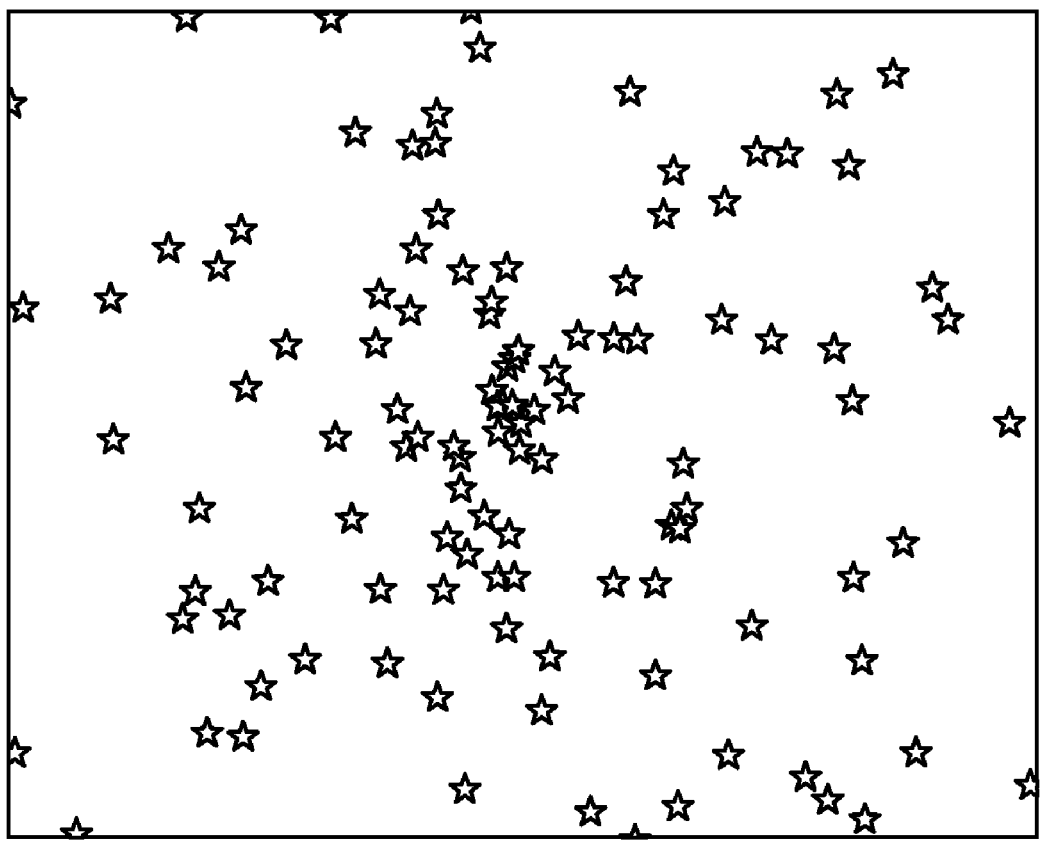
Figure 133:
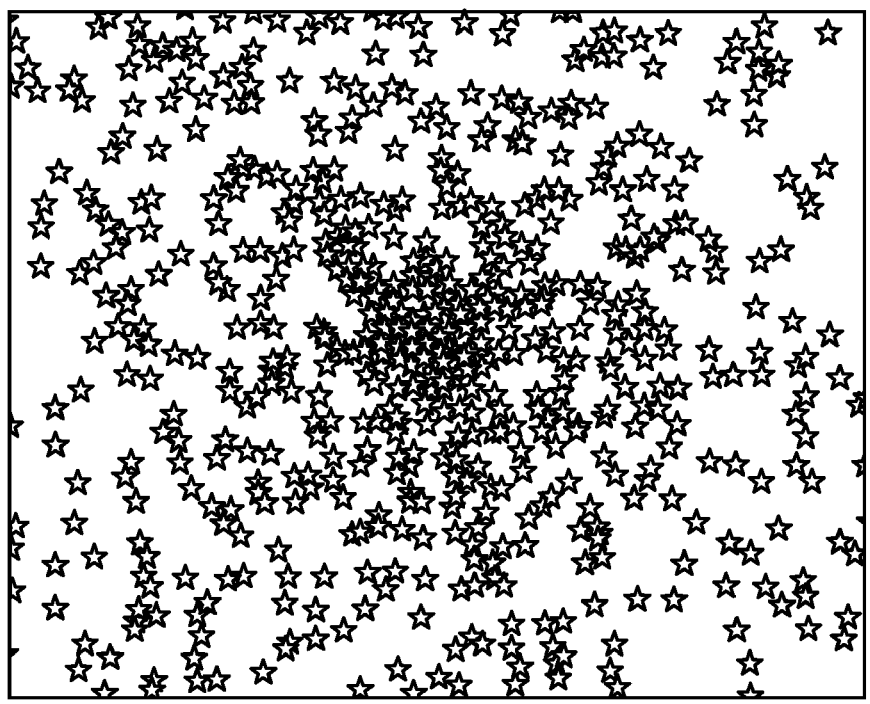

In one embodiment, the following parameters are available for Single-Cell Emitters and Particle Elements:

Birth Rate: In one embodiment, a slider defines how much to increase or decrease the Birth Rate of a cell in a system. In another embodiment, the Birth Rate parameter defines how many particles emerge from an emitter every second. In yet another embodiment, higher values create denser particle effects. FIG. 132 illustrates a particle system with a lower birth rate, according to one embodiment of the invention. FIG. 133 illustrates the particle system of FIG. 132 but with a higher birth rate, according to one embodiment of the invention.

Birth Rate Range: In one embodiment, a slider defines an amount of variance in the Birth Rate of particles generated. In one embodiment, a value of 0 results in no variance; i.e., particles emerge from the emitter at the same rate. In another embodiment, a value greater than 0 introduces a variance defined by the Birth Rate parameter, plus or minus a predetermined random value falling within the Birth Rate Range.

Figure 134:
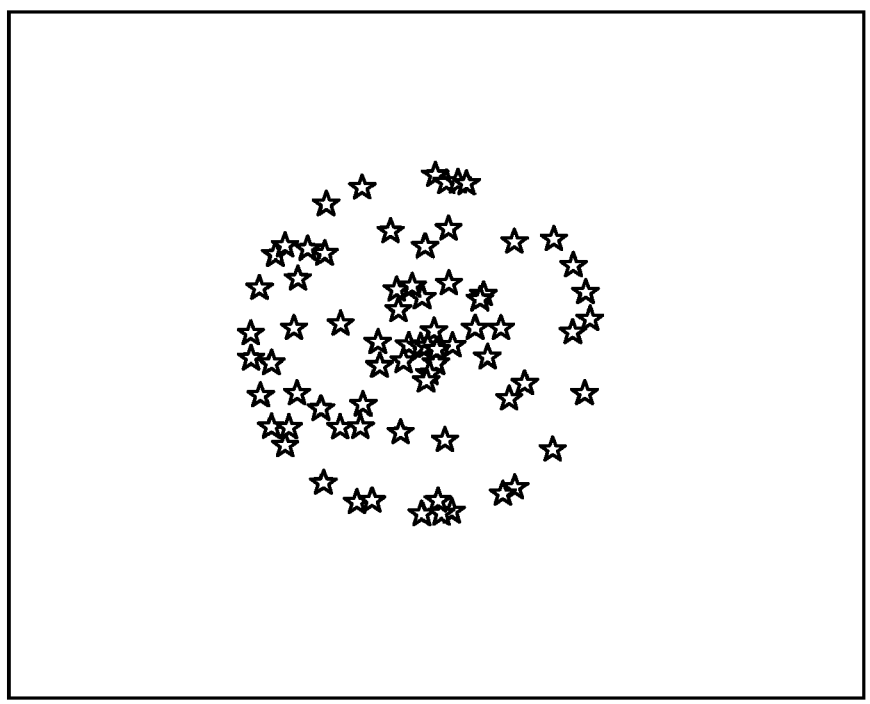
Figure 135:
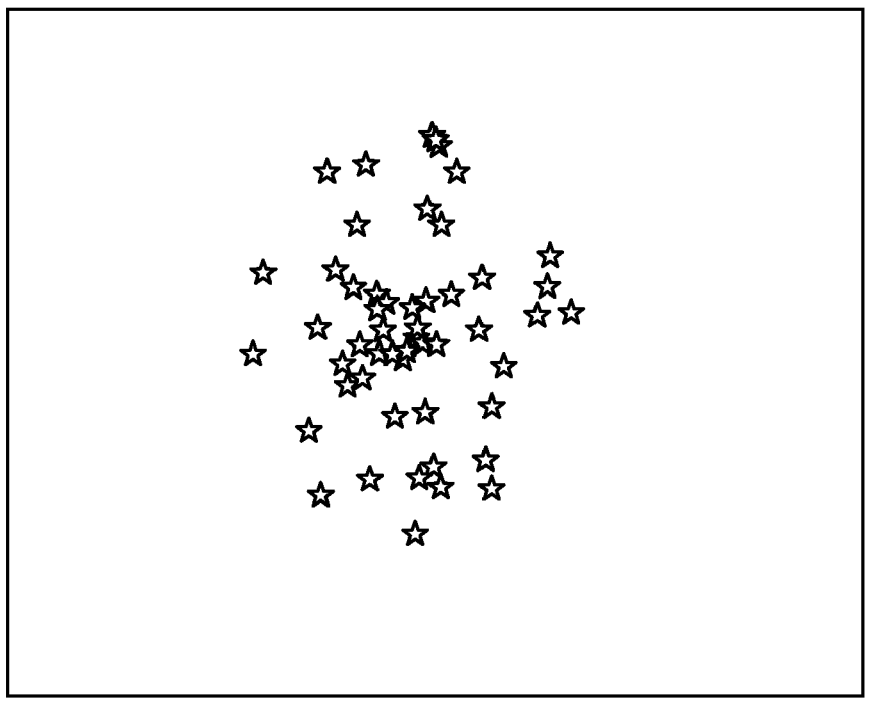

Initial Number: In one embodiment, a slider defines how much to increase or decrease the Initial Number of every cell in a system. In one embodiment, this parameter determines how many particles appear at the first frame of a particle effect. In another embodiment, the result is an initial burst of particles that eventually even out according the Birth Rate parameter. FIG. 134 illustrates a particle system with a higher initial number, according to one embodiment of the invention. FIG. 135 illustrates the particle system of FIG. 134 but with a lower initial number, according to one embodiment of the invention.

Life: In one embodiment, a slider defines how much to increase or decrease the duration over which a cell lasts. In one embodiment, the Life parameter determines how long a particle lasts before vanishing from existence, similar to how sparks disappear after flying away from a sparkler. In another embodiment, unless the Color Over Life or Opacity Over Life parameters are used to fade each particle out over its life, a particle will immediately vanish at the end of its lifetime. FIG. 136 illustrates a particle system with a longer life, according to one embodiment of the invention. FIG. 137 illustrates the particle system of FIG. 136 but with a shorter life, according to one embodiment of the invention.

Life Range: (single cell emitter/particle cell parameter) In one embodiment, a slider defines an amount of variance in the Life parameter of generated particles. In one embodiment, a value of 0 results in no variance; i.e., particles from the selected cell emerge with the same lifetime. In another embodiment, a value greater than 0 introduces a variance defined by the Lifetime parameter, plus or minus a predetermined random value falling within the Lifetime Range.

Speed: In one embodiment, a slider defines how much to increase or decrease the Speed of a cell in a system. In one embodiment, this determines how quickly each particle flies away from the emitter. In another embodiment, the Speed parameter, in conjunction with the Lifetime and Birth Rate parameters, determines how many particles appear in the Canvas at any given frame. In yet another embodiment, the Speed parameter is similar to one of the functions of the visual Emission control in the Dashboard.

Speed Range: (single cell emitter/particle cell parameter) In one embodiment, a slider defines an amount of variance in the Speed parameter of generated particles. In one embodiment, a value of 0 results in no variance; i.e., particles from the selected cell emerge with the same speed. In another embodiment, a value greater than 0 introduces a variance defined by the Speed parameter, plus or minus a predetermined random value falling within the Speed Range.

Angle: (single cell emitter/particle cell parameter) In one embodiment, a dial defines an angle of rotation, in degrees, with which new particles are created.

Angle Range: (single cell emitter/particle cell parameter) In one embodiment, a dial defines an amount of variance in the Angle parameter of generated particles.

Spin: In one embodiment, a dial animates particles in a system by spinning an individual particle around its center. In one embodiment, adjustments to this control are in degrees per second.

Spin Range: (single cell emitter/particle cell parameter) In one embodiment, a dial defines an amount of variance in the Spin parameter for a generated particle. In another embodiment, a value of 0 results in no variance; i.e., particles from the selected cell spin at the same rate. In yet another embodiment, a value greater than 0 introduces a variance defined by the Spin parameter, plus or minus a predetermined random value falling within the Spin Range.

Additive Blend: (single cell emitter/particle cell parameter) In one embodiment, by default, particles are composited together using the blending mode specified in a Properties tab of a particle system's emitter object. When Additive Blend is on, all overlapping generated particles are composited together using the Additive blending mode. In one embodiment, this compositing occurs in addition to whichever compositing method is already being used. In another embodiment, the result is that the brightness of overlapping objects is intensified. FIG. 138 illustrates a particle system with the Additive Blend parameter turned off, according to one embodiment of the invention. FIG. 139 illustrates a particle system with the Additive Blend parameter turned on, according to one embodiment of the invention.

Premultiplied: (single cell emitter/particle cell parameter) In one embodiment, if a cell's source image has a premultiplied alpha channel, the Premultiplied parameter may be turned on to eliminate any fringing that appears around the edge of particles generated from this object.

Color Mode: (single cell emitter/particle cell parameter) In one embodiment, a pop-up menu determines if and how particles will be tinted. In one embodiment, there are five options:

- Original: In one embodiment, particles are generated using their original colors. In one embodiment, when Original is chosen, the Opacity Over Life parameter appears, which is a gradient control that allows changes to the opacity of particles to be animated over time.
- Solid: In one embodiment, particles are tinted using the color specified in the Color parameter. In one embodiment, additional parameters appear, such as Color and Opacity Over Life. FIG. 140 illustrates a particle system with a Solid Color Mode, according to one embodiment of the invention.
- Over Life: In one embodiment, particles are tinted based on their age. In one embodiment, a gradient control defines the range of color that a particle assumes as it ages, beginning with the leftmost color in the gradient, and progressing through the range of colors until finally reaching the rightmost color at the end of its life. In another embodiment, an additional grayscale gradient control at the top functions as an Opacity Over Life control. FIG. 141 illustrates a particle system with an Over Life Color Mode, according to one embodiment of the invention.

Range: In one embodiment, particles are tinted at random, and the range of possible colors is defined by a color gradient control. FIG. 142 illustrates a particle system with a Range Color Mode, according to one embodiment of the invention.

Take Image Color: In one embodiment, when this checkbox is turned on, a new particle's color is based on the color of the image at the position of the emitter point from which the particle was generated. FIG. 143 illustrates a particle system with a Take Image Color Mode, according to one embodiment of the invention.

Scale: In one embodiment, a slider defines how much to increase or decrease the Scale of a cell in a system. In one embodiment, the Scale parameter defines how large each particle in the system is. In another embodiment, opening the disclosure triangle of the Scale parameter reveals separate X Scaling and Y Scaling sub-parameters, which can be optionally used to scale the width and height of generated particles separately. FIG. 144 illustrates a particle system with a larger Scale parameter, according to one embodiment of the invention. FIG. 145 illustrates the particle system of FIG. 144 but with a smaller Scale parameter, according to one embodiment of the invention.

Scale Range: (single cell emitter/particle cell parameter) In one embodiment, a slider defines an amount of variance in the Scale parameter of generated particles. In one embodiment, a value of 0 results in no variance i.e., particles from the selected cell emerge with the same size. In another embodiment, a value greater than 0 introduces a variance defined by the Scale parameter, plus or minus a predetermined random value falling within the Scale Range. In yet another embodiment, opening the disclosure triangle of the Scale parameter reveals separate X and Y sub-parameters, which can be used to set the width and height of the Scale Range separately.

Attach to Emitter: (single cell emitter/particle cell parameter) In one embodiment, a checkbox determines if particles follow the position of the emitter when the emitter is animated with keyframes or behaviors. In one embodiment, if the Attach to Emitter parameter is turned off, a particle follows its own path after being emitted, resulting in a trail of particles that trails along the motion path the emitter is following. In another embodiment, if the Attach to Emitter parameter is turned on, then generated particles follow along with the emitter, surrounding the emitter in a moving cloud of particles.

Show Particles As: (single cell emitter/particle cell parameter) In one embodiment, by default, the Show Particles As parameter is set to Image, which displays each particle as the intended duplicate of the object being used as the particle system's cell. In one embodiment, the particles in a system may be viewed in one of a variety of preview modes. In another embodiment, these modes play more efficiently when viewing a complex particle system and also provide other ways of analyzing particle motion. In yet another embodiment, there are four options to choose from:

Point: In one embodiment, each particle 770 is represented by a single point 1460. In one embodiment, this is the fastest preview mode and is useful for displaying the type and speed of particle motion in a system. FIG. 146 illustrates a particle system with a Point Show Particles As parameter, according to one embodiment of the invention.

Line: In one embodiment, each particle 770 is represented by a line 1470. In one embodiment, this is a good preview mode to use to analyze the vector of each particle's motion. In another embodiment, the length of a line represents a particle's speed, and the angle of a line represents a particle's direction. FIG. 147 illustrates a particle system with a Line Show Particles As parameter, according to one embodiment of the invention.

Outline: In one embodiment, a particle 770 is represented by a bounding box 1480. In one embodiment, because a bounding box is a good indicator of a particle's orientation in a system, this preview mode is useful for evaluating the movements of individual particles. In one embodiment, for example, it's easy to see the angle of rotation for a particle that is spinning or following a complex motion path. FIG. 148 illustrates a particle system with an Outline Show Particles As parameter, according to one embodiment of the invention.

Image: In one embodiment, this is the final particle system effect. FIG. 149 illustrates a particle system with an Image Show Particles As parameter, according to one embodiment of the invention.

Random Seed: (single cell emitter/particle cell parameter) In one embodiment, although a particle system seems random, it is actually deterministic. In one embodiment, this means that the random variation in a particle system is created based on the random seed number shown here. In another embodiment, unless this seed number is changed, a particle system with the same parameter settings will play back with the same motion. In yet another embodiment, in order to change the current random motion or distribution of the particle system, change the seed number by typing in a new number or clicking Generate. In one embodiment, this changes the random calculations performed for that system.

Particle Shape, or individual cells: In one embodiment, in a particle system with multiple cells, a cell appears at the bottom of the Emitter tab. In one embodiment, a cell parameter has a checkbox that can be used to enable or disable that cell, a name field, and an image well for that object.

Additional Cell Parameters for Animation or Video Clips—In one embodiment, if a particle system uses an animation or video clip as a cell, additional parameters are available. In one embodiment, these parameters are:

Animate Image: In one embodiment, a checkbox controls playback looping. In one embodiment, if the Animate Image parameter is turned on, it loops the playback of the animation or video clip used to generate each particle. In another embodiment, if the Animate Image parameter is turned off, particles are generated using a still frame specified by a Hold Frames slider.

Random Start Frame: In one embodiment, a checkbox introduces variation into animated particles generated from animation or video clips. If the Random Start Frame parameter is turned on, a newly generated particle begins at a different frame of the animation.

Hold Frames: In one embodiment, a Hold Frames parameter overrides the automatic animation that occurs for animation or video clips being used as particle cells. In one embodiment, setting the hold frames parameter to a value other than 0 chooses a still frame from the source animation or video clip to use to generate particles.

Hold Frames Range: In one embodiment, a Hold Frames Range parameter varies the frame that's chosen to generate unanimated particles based on a source animation or video clip.

In one embodiment, if Random Start Frame is turned off, the following parameter appears:

Source Start Frame: In one embodiment, a slider defines which frame of an animation to use as the still frame.

Additional Cell Parameters Based on the Selected Color Mode—In one embodiment, an option in the Color Mode pop-up menu displays a different set of parameters, based on the option.

Color: (Original) In one embodiment, a color may be specified that will be used to tint particles from a cell in a system. In one embodiment, a particle's alpha channel may also be modified, altering its opacity. In another embodiment, changes made to this parameter do not take effect until the Emitter Tint Amount slider is set to a value other than 0 percent. In yet another embodiment, this parameter is unique to the emitter object. In one embodiment, a color may be chosen by, for example, clicking a color control to choose a color from a color picker or opening a disclosure triangle and using Red, Green, Blue, and Alpha channel sliders.

Opacity Over Life: (Original, Solid) In one embodiment, a gradient control changes the opacity of a particle based on the particle's age. In one embodiment, this gradient control is limited to grayscale values, which are used to represent varying levels of transparency. In another embodiment, white represents solid particles, progressively darker levels of grey represent decreasing opacity, and black represents complete transparency. In yet another embodiment, a simple white to black gradient represents a particle that is solid when first generated and that fades out gradually over its lifetime until finally vanishing at the end. In one embodiment, the Opacity Over Life parameter has four controls:

Gradient Favorites pop-up menu: In one embodiment, a Gradient Favorites pop-up menu displays favorite gradients that a user has saved. In one embodiment, choose a gradient from this menu to load it into a Gradient control.

Alpha Gradient control: In one embodiment, to add a new color to a gradient, click anywhere within the gradient bar to create a new color tag. In one embodiment, color tags in an Alpha Gradient control are limited to shades of grey. In another embodiment, click a gradient tag to select it and use an Opacity slider to change its color. In yet another embodiment, to change the distribution of color, drag a selected gradient tag along the gradient bar or select a gradient tag and use the Location slider. In one embodiment, change the spread of color between each segment between two gradient tags using the triangles. In another embodiment, to delete a gradient tag, drag it up off of the gradient bar until it disappears.

Opacity slider: In one embodiment, an Opacity slider changes the shade of the selected gradient tag, from 100 (solid/white) to 0 (transparent/black).

Location slider: In one embodiment, a location slider changes the location of the selected gradient tag relative to the gradient bar. A gradient tag may also be dragged directly to slide it along the gradient control.

Color Over Life: (Over Life) In one embodiment, a gradient control changes the color of a generated particle based on its age. In one embodiment, when born, a particle is tinted with the leftmost color in the gradient. In another embodiment, over its life, its color changes through the range of the gradient, from left to right, until finally reaching the rightmost color at the end of its life. In yet another embodiment, similar to the Opacity Over Life parameter, the Color Over Life parameter has five controls:

Gradient Favorites pop-up menu: In one embodiment, a Gradient Favorites pop-up menu displays favorite gradients that a user has saved. In one embodiment, choose a gradient from this menu to load it into the Gradient control.

Alpha Gradient control: In one embodiment, a gradient control changes the opacity of a generated particle based on its age. In one embodiment, color tags are limited to shades of grey.

Color Gradient control: In one embodiment, a gradient control tints a particle based on its age.

Color control: In one embodiment, when a color tag is selected in the Color Gradient control, its color may be changed by clicking the Color control and choosing a color using the Color Picker.

Opacity slider: In one embodiment, when a color tag is selected in the Alpha Gradient control, an Opacity slider may be used to change its shade, from 100 (solid/white) to 0 (transparent/black).

Location slider: In one embodiment, a Location slider changes the location of the selected gradient tag in either gradient control relative to the gradient bar. A gradient tag may also be dragged directly to slide it along the gradient control.

Color Range: (Range) In one embodiment, a gradient control defines a range of colors used to randomly tint new particles. In one embodiment, the number of colors that appear within the gradient is relevant but the direction of the gradient colors is not. In another embodiment, the Color Range parameter has the same controls as the Color Over Life parameter.

c. Particle Cell Parameters

In one embodiment, parameters in the Particle Cell tab 1500 control the behavior of an individual particle 770 that is generated by the system, independently of the parameters governing the emitter 800. In one embodiment, in particle systems with multiple cells, a cell has its own particle cell parameters 1502. In another embodiment, this enables the creation of a particle system made up of many kinds of particles, each with distinctly different behaviors.

In one embodiment, to open a cell's Particle Cell tab 1500:

Select a cell nested underneath an emitter in the Layers tab or Timeline.

Open the Inspector, and click the Particle Cell tab.

The Particle Cell parameters will appear. FIG. 150 illustrates a Particle Cell tab, according to one embodiment of the invention.

v. Using Multiple Cells Within a Single Emitter

In one embodiment, a particle system may use multiple cells. In one embodiment, a particle system may emit different kinds of overlapping particles by nesting multiple cells inside of a single emitter. In another embodiment, any number of cells may be nested within a single emitter object. In yet another embodiment, a cell has its own particle cell parameters, which govern how particles from that cell are created. In one embodiment, a particle system with multiple cells generates particles from each cell simultaneously, according to each cell's parameters.

In one embodiment, to nest an additional cell within an emitter:

In one embodiment, select an object 12 to use as a cell 760, and drag it to a position in the Layers tab 14 or Timeline 16 directly underneath the Emitter 800 to nest the new cell 760 inside the emitter 800. In one embodiment, as a user moves the object 12, a position indicator 1510 appears underneath the object 12 that indicates its new position. FIG. 151 illustrates an object that is being dragged to a position in the Layers tab, according to one embodiment of the invention.

In one embodiment, when the object has been dragged to the desired position within the emitter hierarchy, release the mouse button. In one embodiment, the object that was dragged now appears nested within the emitter object. FIG. 152 illustrates the object of FIG. 151, now nested within an emitter, according to one embodiment of the invention.

In one embodiment, in a particle system with multiple cells, the Interleave Particles parameter determines how particles generated from the different cells blend together.

vi. Animating Objects in Particles Systems

In one embodiment, any Emitter or Cell parameter in a particle system can be animated by using Parameter Behaviors or by keyframing the parameter directly. In one embodiment, if an emitter-specific parameter is animated, such as Emission Angle and Emission Range, the position and distribution of new particles generated by that emitter are animated. In another embodiment, animation occurs relative to the duration of the emitter. In one embodiment, when a cell parameter is animated, on the other hand, the actual duration of the original behavior or keyframes is ignored. In another embodiment, the resulting animation is instead scaled to fit the Life parameter of each generated particle. In yet another embodiment, if the Life parameter is increased or decreased, the keyframed animation will scale to the new duration of each particle.

a. Animating Emitters and Cells

In one embodiment, animating an emitter's Property tab parameters is useful for altering the position and geometric distribution of a particle system over time. In one embodiment, keyframing an emitter object's Position parameter moves the source of newly emitted particles without affecting any particles that were generated at previous frames, which creates a trail of particles. In another embodiment, keyframing an emitter's Emitter tab parameters is a good way to modify the particle system's overall characteristics over time, such as increasing or decreasing the size, speed, or lifetime of newly generated particles.

vii. Using Behaviors With Particle Systems

In one embodiment, adding behaviors to a particle system's emitter, or to the cells themselves, can quickly achieve sophisticated, organic effects with very little effort. In one embodiment, behaviors may be added to a particle system's emitter, or to the cells themselves.

a. Applying Behaviors to Emitters

In one embodiment, when a Basic Motion behavior is applied to an emitter, the position of the source of all new particles generated by that system is affected. In one embodiment, once an individual particle emerges, it is unaffected by changes to the position of the emitter, so moving the emitter around the screen using behaviors results in the creation of a trail of particles that behave according to their particle cell parameters. In another embodiment, this behavior can be overridden by turning on a cell's Attach to Emitter parameter.

In one embodiment, to apply a behavior to an emitter, drag a behavior from the Library onto an emitter in the Canvas, Layers tab, or Timeline. In one embodiment, the behavior is applied to the emitter, which begins to move according to the parameters of the behavior.

b. Applying Behaviors to Cells

In one embodiment, a behavior that is applied directly to a cell is in turn applied to individual particles generated from that cell. In one embodiment, this can result in some extremely complex interactions as dozens of particles weave and collide according to the defined behaviors. In another embodiment, a behavior applied to a Cell has no effect on the position of the Emitter.

In one embodiment, to apply a behavior to a cell, drag a behavior from the Library to a cell in the Layers tab or Timeline. In one embodiment, the behavior is applied to the cell, and all particles generated from that cell begin to move according to the parameters of the behavior.

The Particle Behavior Category—In one embodiment, there's a category that contains a behavior specifically for use with the cells in a particle system. In one embodiment, the Particles category contains the Scale Over Life behavior. In another embodiment, this behavior grows or shrinks a particle in a system over the duration of the particle's life. In yet another embodiment, the Scale Over Life behavior has two parameters:

Increment Type: In one embodiment, choose which method is used to resize particles generated with a particle effect. In one embodiment, there are three options:

Rate:—In one embodiment, Rate specifies a steady rate at which particles change size over their entire lifetime. In one embodiment, a Scale Rate parameter appears, allowing the user to define how quickly each particle changes size. In one embodiment, positive values grow particles over time, while negative values shrink particles over time.

Birth and Death Values—In one embodiment, Birth and Death Values specify starting and ending scale percentages that are used to animate each particle's size over its lifetime. In one embodiment, two parameters appear when this option is selected. In one embodiment, Scale at Birth determines the initial size of particles when they are first created. In one embodiment, Scale at Death determines the size each particle changes to at the end of its lifetime.

Custom—In one embodiment, Custom reveals the Custom Scale parameter, which allows a user to set the size of each particle generated by a cell. In one embodiment, a user can apply a parameter behavior to this parameter to create different animated effects.

viii. Applying Filters to Particle Systems

In one embodiment, a filter may be applied only to a particle system's emitter. In one embodiment, as a result, a filter affects an entire particle system, including every cell, as if it were a single object. In another embodiment, an individual cell cannot have a separate filter applied to it. FIG. 153 illustrates a particle system, according to one embodiment of the invention. FIG. 154 illustrates the particle system of FIG. 153 after a Sphere filter has been applied, according to one embodiment of the invention.

ix. Particle System Examples

This section presents three examples of how to use particle systems to create very different effects, according to one embodiment of the invention.

a. Example 1

Creating an Animated Background

In this first example, an animated background is created using a single still image, according to one embodiment of the invention. In one embodiment, by using parameters available in the Emitter tab, a single image can be turned into a complex animated texture.

In one embodiment, to create an animated background from a single image:

In one embodiment, drag a file to use into the Canvas. This example uses a simple graphic 1550 with a premultiplied alpha channel, according to one embodiment of the invention. FIG. 155 illustrates a simple graphic with a premultiplied alpha channel, according to one embodiment of the invention.

In one embodiment, with the new object selected, click the Emitter button 1560 in the Toolbar to turn it into an emitter (or press the E key). FIG. 156 illustrates an Emitter button, according to one embodiment of the invention. In one embodiment, the original object is replaced with an Emitter, but nothing happens yet because the Playhead is at the first frame of the project, and no particles have been created yet.

In one embodiment, open the Inspector, and choose Filled Circle from the Emitter Shape pop-up menu. In one embodiment, set the Initial Number parameter to 12. In another embodiment, this creates a distributed group of particles 770 that partially fills the Canvas. FIG. 157 illustrates a distributed group of particles that partially fills the Canvas, according to one embodiment of the invention.

In one embodiment, to turn the particles into a uniform abstract mass, adjust the following parameters:

In one embodiment, set Life to 4.
In one embodiment, set Speed to 140.
In one embodiment, turn the Spin dial to 60.
In one embodiment, turn the Spin Range dial to 15.
In one embodiment, turn on Additive Blend.
In one embodiment, set Color Mode to Pick From Range.
In one embodiment, set Scale to 65.
In one embodiment, set Scale Range to 150.
In one embodiment, set Random Seed to 10000.

In one embodiment, advance to frame 100. FIG. 158 illustrates the resulting image, according to one embodiment of the invention.

In one embodiment, an additional step might be to apply a filter to the emitter. In this example, adding the Crystallize filter creates an even more abstract effect, according to one embodiment of the invention. In one embodiment, color correction may also be applied to make the background fit more appropriately with the foreground elements. FIG. 159 illustrates the resulting image, according to one embodiment of the invention.

b. Example 2

Creating Animated Pixie Dust

In this example, a particle system is created that uses two different cells to generate a streak of particles that trails behind another animated object, according to one embodiment of the invention. In one embodiment, using two cells adds more variation to a particle system than can be achieved with a single set of cell parameters.

In one embodiment, to create a two-celled particle system that trails:

In one embodiment, drag a first graphics file into the Canvas. This example uses a small graphic 1600 of a lens flare against black, with a built-in alpha channel, according to one embodiment of the invention. FIG. 160 illustrates the resulting image, according to one embodiment of the invention.

In one embodiment, while the object is selected, click the Emitter button in the Toolbar to turn it into an emitter (or press the E key). In one embodiment, the original object is replaced with an Emitter, but nothing happens yet because the Playhead is at the first frame of the project, and no particles have been created. In another embodiment, move the Playhead forward five seconds to view the particle system at a frame where more particles have been generated. In yet another embodiment, this allows the particle system to be viewed in action without having to play it. FIG. 161 illustrates the resulting image, according to one embodiment of the invention.

In one embodiment, to create a variety of particles, nest an additional image into the emitter that was just created. In one embodiment, the easiest way to do this is to open the Layers tab, and drag each additional file to use underneath the emitter. FIG. 162 illustrates the resulting image, according to one embodiment of the invention.

In one embodiment, to make the particles generated by different cells mingle together, select the emitter, open the Inspector, and turn the Interleave Particle Cells parameter on. FIG. 163 illustrates the resulting image, according to one embodiment of the invention.

In one embodiment, select the topmost cell in the Layers tab to adjust its parameters, which automatically appear in the Inspector.

In one embodiment, adjust the Scale slider to 45 to reduce the size of the particles generated by this cell. FIG. 164 illustrates the resulting image, according to one embodiment of the invention.

In one embodiment, change the color of the particles generated by this cell by doing the following:

In one embodiment, choose Solid from the Color Mode pop-up menu.
In one embodiment, click the color control in the Color parameter that appears.
In one embodiment, choose a color in the Color Picker window that appears. In this example, we'll use a light red, according to one embodiment of the invention.
In one embodiment, close the Color Picker window.

In one embodiment, particles generated by that cell are now small and red. FIG. 165 illustrates the resulting image, according to one embodiment of the invention.

In one embodiment, use the Opacity Over Life gradient to make this cell's particles fade out over their lives. In one embodiment, for a simple fade-out, use one of the gradient favorites that exists in the system. FIG. 166 illustrates the resulting image, according to one embodiment of the invention.

In one embodiment, to make these particles spin as they move away, turn the dial in the Spin parameter clockwise, to 60 degrees.

In one embodiment, adjust the second cell's parameters. In one embodiment, in the Layers tab, select the second cell of the particle system. The second cell's parameters automatically appear in the Inspector.

In one embodiment, adjust the Scale slider to 125.

In one embodiment, follow the procedure in Step 8 to make these particles light yellow.

In one embodiment, to make the particles generated from this cell spin in the opposite direction, turn the dial in the Spin parameter counter-clockwise, to −60. FIG. 167 illustrates the resulting image, according to one embodiment of the invention.

In one embodiment, to create a trail of particles, the emitter is animated to follow the required motion path. FIG. 168 illustrates the resulting image, according to one embodiment of the invention.

x. Saving Custom Particle Effects to the Library

In one embodiment, a particle system can be saved as a particle preset in the Favorites folder of the Library for future use. In one embodiment, once a particle system has been saved in the Library, it can be used just like any other particle preset.

In one embodiment, to save a particle system to the particle library:

In one embodiment, open the Library and select either the Favorites or Favorites Menu categories.

In one embodiment, drag the emitter object to be saved, along with any custom objects used by that emitter, into the stack at the bottom of the Library. In one embodiment, for organizational purposes, it may be useful to create a new folder in the Favorites or Favorites Menu categories to put created particle systems.

In one embodiment, when a particle preset is saved, the particle preset is saved as a file. In one embodiment, any custom objects used to create the particle system that were stored in the library appear in the same directory as this file. In another embodiment, particle presets that have been created may be copied from this location to give to other users, or particle presets received from other users can be added to this same directory. In yet another embodiment, whenever a particle preset file is copied, any graphics or video clips used by the particle preset should also be copied.

Setting Parameters of Behaviors

In one embodiment, a visual effect, from a behavior to a particle system to a gradient, is controlled by a collection of parameters that modify the various attributes for that effect. In one embodiment, for example, a Blur filter has an amount slider that controls how much blur is applied. In another embodiment, a system may contain thousands of parameters. In yet another embodiment, many different types of controls may be used to set these parameters. These controls may include, for example, sliders, dials, and shortcut menus.

In one embodiment, even objects without effects applied to them have many parameters that can be modified to alter the nature of the object and how it appears in a project. In one embodiment, these parameters include the object's scale, opacity, and position on screen, as well as more obscure attributes such as its pixel aspect ratio or field dominance.

A. The Inspector

In one embodiment, parameters that control a visual effect are accessed in an Inspector. In one embodiment, the Inspector contains four tabs, each of which contains a set of parameters for the selected object. In another embodiment, the first three tabs, Properties, Behaviors, and Filters are present for any selected object. In yet another embodiment, the fourth tab, generically called the Object tab, changes its name and contents depending on the type of object selected.

i. Type of Controls

In one embodiment, there are eleven different types of controls that may appear in the Inspector. In one embodiment, a control provides the opportunity to change the value of a parameter in a special way. In another embodiment, since different types of objects and effects require different parameters, selecting different things will cause different controls to populate the Inspector.

In one embodiment, the various types of controls include:

Slider—In one embodiment, dragging the thumb 1690 of a slider 1692 changes the value of the parameter. In one embodiment, typically, dragging to the right increases the value and dragging to the left decreases the value. In another embodiment, an example of a parameter that uses a slider is Scale. FIG. 169 illustrates one example of a slider, according to one embodiment of the invention.

Value Slider—In one embodiment, a Value Slider 1700 is a special type of slider that includes the numerical value of the parameter in the control. In one embodiment, dragging the middle area 1702 (where the number is) works just like an ordinary slider; i.e., dragging to the right increases the value and dragging to the left decreases the value. In another embodiment, some parameters allow a value slider to increase or decrease the value indefinitely. In yet another embodiment, additionally, a user can click the Increment 1704 or Decrement 1706 arrows to change the value one step at a time. In one embodiment, a user can double-click the number itself to convert the slider 1700 into a value field so that he can type a specific number directly into the control. In another embodiment, an example of a parameter that uses a value slider is Position. FIG. 170 illustrates one example of a value slider, according to one embodiment of the invention.

Dial—In one embodiment, a Dial 1710 is used for values based on angles or degrees. In one embodiment, rotate the dial by dragging it in a clockwise or counter-clockwise motion. In another embodiment, a parameter that uses a dial is Rotation. FIG. 171 illustrates one example of a dial, according to one embodiment of the invention.

Value Field—In one embodiment, a Value Field 1720 allows direct entry of text to set the value of the parameter. In one embodiment, an example of a parameter that uses a value field is the Text Entry field. FIG. 172 illustrates one example of a value field, according to one embodiment of the invention.

Pop-up Menu—In one embodiment, a Pop-up Menu 1730 is a menu with preset values. In one embodiment, click the menu and choose the desired value. In another embodiment, an example of a pop-up menu is Throw Increment. FIG. 173 illustrates one example of a pop-up menu, according to one embodiment of the invention.

Value List—In one embodiment, a Value List 1740 is another type of shortcut menu. In one embodiment, a user can click the arrow 1742 to the right of the field to display preset values or he can type a value directly into the Value field 1744. In another embodiment, an example of a value list is Typeface. FIG. 174 illustrates one example of a value list, according to one embodiment of the invention.

Activation Checkbox—In one embodiment, an Activation Checkbox 1750 is an on/off toggle for a parameter. In one embodiment, an example of an Activation Checkbox is Preserve Opacity. FIG. 175 illustrates one example of an activation checkbox, according to one embodiment of the invention.

Color Well—In one embodiment, a Color Well 1760 enables a user to select a color. In one embodiment, the Color well can be used either by clicking on the box 1762, which opens the Colors window, Control-clicking and picking a color from the pop-up picker 1770, or by clicking the disclosure triangle 1764 and manipulating the individual RGB 176A, 176B, 176C and A 176D sliders. In another embodiment, an example of a color well is Drop Shadow Color. FIG. 176 illustrates one example of a color well, according to one embodiment of the invention. FIG. 177 illustrates one example of a pop-up picker, according to one embodiment of the invention.

Gradient—In one embodiment, a Gradient 1780 enables a user to select a preset gradient style or create a new one. In one embodiment, when a Gradient is collapsed, a user can choose from only the Preset shortcut menu 1782 to choose an existing preset. In another embodiment, alternately, click the disclosure triangle 1784 to reveal the Gradient Editor 1786. In yet another embodiment, a user can set the gradient's opacity as well as its color values. FIG. 178 illustrates one example of a gradient, according to one embodiment of the invention.

Drop Well—In one embodiment, a Drop Well 1790 enables a user to drag an object 12 (e.g., a clip or still image) to provide input data for a type of effect. In one embodiment, for example, a bump map filter needs an image to provide the bumps, or a Repel From behavior needs to know what object to Repel. In another embodiment, an example of a Drop Well is the Attracted To behavior's Object parameter. FIG. 179 illustrates one example of a drop well, according to one embodiment of the invention.

Parameter Selection Field—In one embodiment, a Parameter Selection Field 1800 is a special type of shortcut menu, specifically for Parameter Behaviors. In one embodiment, when a Parameter Behavior is applied to an object, the user needs to identify which parameter the behavior should affect. In another embodiment, a user can either type the name of the parameter directly into the value field 1802, or he can choose from the Go shortcut menu 1804 (which lists all current parameters). In yet another embodiment, an example of the Parameter Selection Field is the Average behavior's Apply To parameter. FIG. 180 illustrates one example of a parameter selection field, according to one embodiment of the invention.

In one embodiment, in addition to the parameter control types listed above, several other controls are used within the Inspector tab. In one embodiment, these controls include:

Reset Button—In one embodiment, a Reset button 1810 automatically restores the parameter value (or, in some cases, an entire set of parameters) back to their default values. FIG. 181 illustrates one example of a reset button, according to one embodiment of the invention.

Manage Presets Button—In one embodiment, some parameter settings (e.g., Gradients and Type Styles) are so complex that they are commonly stored in presets. In one embodiment, whenever a Manage Presets Button 1820 is displayed, a user can save that particular parameter (or set of parameters) into a preset. In another embodiment, for example, the Text Style pane has a Manage Presets control at the top of the parameter list that allows a user to save styles, formats, or both. In yet another embodiment, this enables a user to save all of the settings in the window. In one embodiment, in some cases, a user can also use this control to load an existing preset. FIG. 182 illustrates one example of a manage presets button, according to one embodiment of the invention.

In one embodiment, to save a preset:

In one embodiment, set the parameter values to the settings to save.

In one embodiment, click the Manage Presets button, and then choose Save from the pop-up menu. In one embodiment, a dialog appears.

In one embodiment, type a name for the preset to save, then click OK.

In one embodiment, the preset is now stored as a file on the hard disk. In one embodiment, it will appear in the Manage Presets menu in this and future projects until it is manually deleted in the Finder.

In one embodiment, to load an existing preset, click the Manage Presets button, and then choose the preset from the list in the pop-up menu. In one embodiment, the current parameter settings are replaced by the settings in the preset.

Animation Menu Button—In one embodiment, most parameters of an item are animateable. In one embodiment, this means that a user can assign specific values to certain frames (keyframes) so the parameter value changes over time. In another embodiment, a parameter that can be animated has an Animation Menu Button 1830 to the right of the parameter settings. In yet another embodiment, depending on the current condition of the parameter, the Animation Menu Button displays a different icon. FIG. 183 illustrates one example of an animation menu button, according to one embodiment of the invention.

In one embodiment, clicking on the Animation Menu Button displays a shortcut menu 1840 filled with Animation related controls. FIG. 184 illustrates one example of a shortcut menu filled with Animation related controls, according to one embodiment of the invention. In one embodiment, these menu items include:

Enable/Disable Animation—In one embodiment, the Enable/Disable Animation menu item 1842 remains dim until keyframing is applied to the parameter, either by using the Record button or by adding a keyframe. In one embodiment, once the parameter has some animation applied, the menu item is automatically renamed "Disable Animation." In another embodiment, activating it at that point effectively hides the keyframes that have been set, restoring the parameter to its default value. In yet another embodiment, however, the keyframes are not thrown away. In one embodiment, choosing Enable Animation restores the channel to its last keyframed state.

Reset Parameter—In one embodiment, Reset Parameter 1843 removes all keyframes and settings for this parameter. In one embodiment, the parameter value is reset to its default value.

Add Keyframe—In one embodiment, Add Keyframe 1844 adds a keyframe at the current frame. In one embodiment, if the playhead is positioned on a frame where a keyframe has already been added, this menu item is dimmed.

Delete Keyframe—In one embodiment, Delete Keyframe 1845 deletes the current keyframe. In one embodiment, Delete Keyframe command is available only if the playhead is positioned on a frame where a keyframe already exists.

Previous Keyframe—In one embodiment, Previous Keyframe 1846 moves the playhead to the previous keyframe for this parameter. In one embodiment, Previous Keyframe is available only if a keyframe exists earlier in the project.

Next Keyframe—In one embodiment, Next Keyframe 1847 moves the playhead to the next keyframe for this parameter. In one embodiment, Next Keyframe is available only if a keyframe exists later in the project.

Show In Keyframe Editor—In one embodiment, Show In Keyframe Editor 1848 opens the Keyframe Editor if it is not showing and displays the graph for the parameter that is being modified.

ii. Inspector Tabs

In one embodiment, the parameters in the inspector are grouped into four categories:

Properties—In one embodiment, the Properties tab contains basic attributes about the selected object, such as Transformation (e.g., position, scale, and rotation), Blending (e.g., opacity and blend mode), Drop Shadow controls, Corner Pinning, and the object's In and Out points.

Behaviors—In one embodiment, whenever a behavior is applied to an object, the parameters associated with that behavior appear in the Behaviors tab. In one embodiment, multiple behaviors are grouped by the behavior name.

Filters—In one embodiment, whenever a filter is applied to an object, the parameters associated with that filter appear in the Filters tab. In one embodiment, multiple filters are grouped by the filter name.

Object—In one embodiment, the title and contents of the Object tab change depending on what type of object is selected. In one embodiment, there are seven types of Object tabs, corresponding to seven types of objects.

Media—In one embodiment, a Media tab appears when a media object is selected. In one embodiment, the Media tab contains parameters that deal mostly with attributes of a file on disk or how a file is interpreted. In another embodiment, because multiple objects can point to a single media file, the Inspector Media tab contains a list of linked objects including the name of the layer where the objects exist. In yet another embodiment, making changes in this tab affects all objects that refer to the selected media file.

Text—In one embodiment, a Text tab appears when a text object is selected. In one embodiment, a Text tab contains controls that affect the text object. In another embodiment, the Text tab is divided into three panes: Format, Style and Layout.

Format—In one embodiment, the Format pane contains standard type controls such as font, size, tracking, and kerning. In one embodiment, the Format pane also contains a large text entry box where a user can edit the actual contents of the text.

Style—In one embodiment, the Style pane controls the color, texture, and similar attributes for the typeface, outline, glow, and drop shadow. In one embodiment, each of these sections is grouped and can be turned on or off by clicking the activation checkbox next to the category name.

Layout—In one embodiment, the Layout pane contains paragraph style controls such as justification, alignment, and line spacing (leading). In one embodiment, this pane also contains controls to create a type-on effect or to modify text path options.

Mask—In one embodiment, a Mask tab appears when a mask object is selected. In one embodiment, the only keyframeable attribute is the feather (softness) parameter, but a user can also control the mask type and how multiple masks interact by setting the Mask Blend mode.

Shape—In one embodiment, a Shape tab appears when a shape object is selected. In one embodiment, controls include the Shape type, fill and outline colors, and textures.

Emitter—In one embodiment, an Emitter tab appears when a particle emitter is selected. In one embodiment, the Emitter tab controls aspects of the emitter such as the emitter shape, angle, and range. In one embodiment, the Emitter tab also provides access to cell controls. For Emitters with multiple cells, these controls affect all cells.

Particle Cell—In one embodiment, a Particle Cell tab appears when a particle cell object is selected. In one embodiment, particle cell objects are only selectable in the Layers list. In one embodiment, the Particle Cell tab contains attributes such as birth rate, speed, angle, and color.

Generators—In one embodiment, a Generators tab displays the parameters and attributes of the selected generator (e.g., the colors and number of bars in a checkerboard). In one embodiment, the specific parameters listed depend on the specific generator that is selected.

iii. Locking the Inspector

In one embodiment, the Inspector 19 typically changes dynamically based on the selection in the Canvas. In one embodiment, however, sometimes a user wants to select another object 12 while continuing to look at the parameters 290 for the current object 12. In one embodiment, when a user locks the Inspector 19, the view of the Inspector will not change based on the user's selection.

In one embodiment, to lock the Inspector, do one of the following:

In one embodiment, click the Lock icon 1850 in the upper right corner of the Preview area of the Inspector 19. FIG. 185 illustrates one example of a Lock icon, according to one embodiment of the invention.

In one embodiment, choose Window>Create Locked Inspector. In one embodiment, this creates a new Inspector window showing the parameters of the currently selected object. In another embodiment, the main Inspector window continually updates to reflect whatever object is selected.

B. The Dashboard

In one embodiment, a Dashboard 110 is a dynamically updating floating window. In one embodiment, the Dashboard contains the most common controls 1860 for any selected object 12. In another embodiment, the Dashboard provides graphical animation control over images and other items that appear in the canvas window.

In one embodiment, the Dashboard 110 is semi-transparent. In one embodiment, a user can set the opacity (transparency) of the Dashboard. FIG. 186 illustrates one example of a Dashboard, according to one embodiment of the invention.

In one embodiment, the Dashboard is designed to keep a selected object visible even while using the Dashboard to adjust the object's parameters. In another embodiment, this enables a user to keep his eye on the screen instead of switching his eye line from a main window to a utility panel and back.

i. Choosing Control Sets

In one embodiment, the Dashboard can show a variety of controls, even for a single object. In one embodiment, for example, if a Throw behavior is applied to a shape with a blur filter on it, the Dashboard could conceivably show the shape controls, the blur controls, or the Throw controls. In another embodiment, the Dashboard shows all three. In yet another embodiment, a user can choose between which set of controls to view in the Dashboard using the pop-up menu in the title bar.

In one embodiment, when an object 12 with multiple effects is selected, the Dashboard 110 title bar 1870 displays a downward facing arrow 1872 to the right of the name 1874. In one embodiment, clicking the arrow 1872 displays a pop-up menu 1880 that lists all of the possible control sets that can be displayed in the Dashboard for the selected object. FIG. 187 illustrates one example of a Dashboard title bar displaying a downward facing arrow, according to one embodiment of the invention. FIG. 188 illustrates one example of a pop-up menu that lists all of the possible control sets that can be displayed in the Dashboard for the selected object, according to one embodiment of the invention.

In one embodiment, to switch between control sets on a selected item, click on the Dashboard title bar, and then choose from the pop-up menu the control set to view. In one embodiment, most of the time, the Dashboard displays a subset of the parameters visible in the Inspector for the selected object. In another embodiment, if a user is working in the Dashboard, he can quickly jump to the corresponding Inspector to access the remainder of the controls for that object.

In one embodiment, to jump to the Inspector from the Dashboard, click the Inspector icon in the upper-right corner of the Dashboard. In one embodiment, the Inspector is opened and the tab corresponding to the Dashboard controls is brought to the front.

ii. Special Controls

In one embodiment, a Dashboard contains controls that resemble controls used in the Inspector, such as sliders, checkboxes, and pop-up menu buttons. In one embodiment, the Dashboard contains special controls for certain types of effects such as Basic Motion Behaviors and particle systems. In another embodiment, these unique controls allow a user to set multiple parameters simultaneously and in an intuitive way. In yet another embodiment, these controls use standard English-like terminology and simple graphical diagrams that, when dragged interactively, cause the target image to react immediately to the changes in the diagram.

In one embodiment, for example, the Particle System Dashboard 110 contains a single control 1890 that lets a user set shape, angle, and range of a particle system simultaneously. FIG. 189 illustrates one example of a Dashboard for a particle system, according to one embodiment of the invention. FIG. 190 illustrates one example of a Dashboard for a Grow/Shrink behavior, according to one embodiment of the invention. FIG. 191 illustrates one example of a Dashboard for a Fade In/Fade Out behavior, according to one embodiment of the invention.

a. Throw

In one embodiment, the Throw behavior and corresponding special control make an image move in a certain direction at a controlled speed. In one embodiment, to control the movement, the user clicks and drags in a graphical "dish" 1920 to set the direction and speed of the object. In another embodiment, the dish appears initially with a small "+" 1922 in the center to indicate no movement. In yet another embodiment, as the user drags the mouse, a small arrow 1930 appears in the center region. In one embodiment, the size of the arrow determines speed (larger=faster), while the direction of the arrow is the angle of movement.

FIG. 192 illustrates one example of a Dashboard for a Throw behavior where the special control specifies no movement, according to one embodiment of the invention. FIG. 193 illustrates one example of a Dashboard for a Throw behavior where the special control specifies movement in a southeastern direction at a low speed, according to one embodiment of the invention. FIG. 194 illustrates one example of a Dashboard for a Throw behavior where the special control specifies movement in the same direction as in FIG. 193, but at a higher speed, according to one embodiment of the invention. In one embodiment, these images illustrate how the image's speed increases as the arrow increases in size.

In one embodiment, a slider 1924 at the right side of the window controls the "zoom" of the dish. In one embodiment, dragging the slider upwards zooms out to display more area of the dish. In another embodiment, if more area of the dish is displayed, the control becomes more sensitive, so dragging the arrow will create more dramatic motion. In yet another embodiment, dragging the slider downward zooms in to display a smaller region, so dragging the arrow will create finer control over the movement.

b. Wind

In one embodiment, the Wind behavior and corresponding special control make an image move in a certain direction and speed. In one embodiment, the graphical controls are similar to those of Throw. In another embodiment, however, unlike Throw, the Wind behavior is designed to emulate real-life wind. In yet another embodiment, instead of a single, initial force, Wind pushes on the image constantly and ramps up over time. In one embodiment, for example, the object starts out moving slowly and picks up speed over time.

FIG. 195 illustrates one example of a Dashboard for a Wind behavior where the special control specifies no movement, according to one embodiment of the invention. FIG. 196 illustrates one example of a Dashboard for a Wind behavior where the special control specifies movement in a northeastern direction at a high speed, according to one embodiment of the invention.

c. Spin

In one embodiment, the Spin behavior and corresponding special control make an image rotate at a constant rate. In one embodiment, to control the spin, the user clicks and drags in the graphical "dish" 1970 to set the speed and rotation direction (clockwise or counterclockwise) of the object. In another embodiment, the dish appears initially with a small "+" 1972 at the upper edge of the dish to indicate no movement. In yet another embodiment, as the user drags the mouse, a small arrow 1980 appears around the dish and follows the edge. In one embodiment, the length of the arrow determines speed (longer=faster spin), while the direction of the arrow is the rotation direction.

FIG. 197 illustrates one example of a Dashboard for a Spin behavior where the special control specifies no movement, according to one embodiment of the invention. FIG. 198 illustrates one example of a Dashboard for a Spin behavior where the special control specifies movement in a clockwise direction at a low speed, according to one embodiment of the invention. FIG. 199 illustrates one example of a Dashboard for a Spin behavior where the special control specifies movement in the same direction as in FIG. 198, but at a higher speed, according to one embodiment of the invention.

In one embodiment, as the amount of spin increases beyond the circumference of the dish, the arrow overlaps the trailing line and displays a small multiplier 2020 (e.g., "×3") in the lower right corner of the control, indicating revolutions. FIG. 200 illustrates one example of a Dashboard for a Spin behavior where the special control specifies no movement, according to one embodiment of the invention. FIG. 201 illustrates one example of a Dashboard for a Spin behavior where the special control specifies movement in a counterclockwise direction at a low speed, according to one embodiment of the invention. FIG. 202 illustrates one example of a Dashboard for a Spin behavior where the special control specifies movement in the same direction as in FIG. 201, but at a much higher speed, according to one embodiment of the invention.

d. Grow/Shrink

In one embodiment, the Grow/Shrink behavior and corresponding special control make an image grow or shrink at a constant rate. In one embodiment, to control the size, the user clicks and drags in the rectangular area in the center to set the speed and direction (grow or shrink) of the object. In another embodiment, the control appears initially with a dotted rectangle 2030 in the center to indicate the "normal" size. In yet another embodiment, as the user drags the mouse, an additional rectangle 2040 and several arrows 2042 appear to indicate the rate of change from the initial state to the new state (either larger or smaller than the initial state). In one embodiment, the size of the box and the size of the arrows indicate growth or reduction.

FIG. 203 illustrates one example of a Dashboard for a Grow/Shrink behavior where the special control specifies no movement, according to one embodiment of the invention. FIG. 204 illustrates one example of a Dashboard for a Grow/Shrink behavior where the special control specifies a high grow rate, according to one embodiment of the invention. In one embodiment, the outer box displays arrows that show the progression from the initial state to the larger state of the image over time.

FIG. 205 illustrates one example of a Dashboard for a Grow/Shrink behavior where the special control specifies no movement, according to one embodiment of the invention. FIG. 206 illustrates one example of a Dashboard for a Grow/Shrink behavior where the special control specifies a high shrink rate, according to one embodiment of the invention. In one embodiment, the box is now smaller than the initial state, and displays arrows that show the progression from the initial state to the smaller state of the image over time.

In one embodiment, the grow/shrink special control also has small draggable handles 2032 at the four edges of the user-defined box to set the rate differently for the horizontal vs. vertical axes. In one embodiment, for example, an image can shrink horizontally over time, but simultaneously grow vertically over time. FIG. 207 illustrates one example of a Dashboard for a Grow/Shrink behavior where the special control specifies shrinking in the horizontal direction and simultaneous growing in the vertical direction, according to one embodiment of the invention.

In one embodiment, a slider 2034 at the right side of the window controls the "zoom" of the control. In one embodiment, dragging the slider upwards zooms out to display more area of the control. In another embodiment, the control becomes more sensitive, so dragging the box and arrows will create more dramatic motion. In yet another embodiment, dragging the slider downward zooms in to display a smaller region, so dragging the box and arrows will create finer control over the movement.

e. Fade In/Fade Out

In one embodiment, the Fade In/Fade Out behavior and corresponding special control make an image fade in and/or fade out. In one embodiment, to control the fade, the user clicks and drags in the sloped, shaded regions at the left 2080A and right 2080B edges of the graphic to set the fade in or fade out time (displayed in number of frames) of the object. In another embodiment, the control appears initially with a predefined fade time of 20 frames at either end. In yet another embodiment, as the user drags the mouse, the slope changes to indicate a longer or shorter fade time.

FIG. 208 illustrates one example of a Dashboard for a Fade In/Fade Out behavior where the special control specifies a fade in time and a fade out time of equivalent length, according to one embodiment of the invention. FIG. 209 illustrates one example of a Dashboard for a Fade In/Fade Out behavior where the special control specifies a shorter fade in time than in FIG. 208 and no fade out time (i.e., no fade out at all), according to one embodiment of the invention. FIG. 210 illustrates one example of a Dashboard for a Fade In/Fade Out behavior where the special control specifies a similar fade in time to that in FIG. 208 and a longer fade out time than in FIG. 208, according to one embodiment of the invention.

f. Particle Emitter

In one embodiment, a particle emitter is a special type of image object that starts with one or more small images as sources and automatically generates large numbers of copies (particles) of those images. In one embodiment, a particle emitter has numerous controls specifying, for example, how many copies are created, where they are created, how fast they move, and what direction they move in.

In one embodiment, a Dashboard for an emitter includes both traditional sliders 2110A, 2110B, 2110C and a custom graphical element. In one embodiment, the custom graphical element is a dish 2112 that simultaneously controls three different aspects of the particles: Direction, Speed, and Range. In another embodiment, draggable arrows 2114 radiate out from the center of the dish to indicate direction and speed, similar to the Throw and Wind controls.

In one embodiment, however, there is an additional control around the ring of the dish that defines a restricted range 2120 of where the particles travel outwards. In one embodiment, this ring resembles a "pie" shape. In another embodiment, it acts as a graphical representation of the emitter "nozzle." In yet another embodiment, as the range narrows, the particles move in a "stream" defined by the shaded area of the pie.

FIG. 211 illustrates one example of a Dashboard for a particle emitter where the special control specifies that particles should be emitted in all directions (i.e., there is no specified range) at a medium/high speed, according to one embodiment of the invention. FIG. 212 illustrates one example of a Dashboard for a particle emitter where the special control specifies that particles should be emitted in only certain directions (i.e., there is a specified range) and at a medium speed, according to one embodiment of the invention. FIG. 213 illustrates one example of a Dashboard for a particle emitter where the special control specifies that particles should be emitted in only certain directions (i.e., there is a specified range, and the range is narrower than the range in FIG. 211) and at a low speed, according to one embodiment of the invention. FIG. 214 illustrates one example of a Dashboard for a particle emitter where the special control specifies that particles should be emitted in only certain directions (i.e., there is a specified range, and the range is narrower than the range in FIG. 212) and at a high speed, according to one embodiment of the invention.

iii. Other Controls

Close Button—In one embodiment, a Dashboard can be closed by clicking an "x" in the upper left of the Dashboard window.

Inspector Button—In one embodiment, if the user wants more controls over the image that is being manipulated, clicking on the small "i" in the upper right corner of the Dashboard will bring an Inspector window to the front. In one embodiment, the user can then use the Inspector to control the image via standard controls such as sliders, checkboxes, and numeric text fields. In another embodiment, this provides two levels of control over the animation: level 1 is an interactive graphical diagram, and level 2 is based on more traditional entry of values in the Inspector.

Algorithms Underlying Behaviors

A. Motion and Simulation Behaviors

In one embodiment, simulation behaviors implement two main functions: accumForces and accumInitialValues. accumForces takes as input the current state of the object being simulated, including the position, rotation, velocity and angular velocity, and outputs the forces that should be applied at the given time. accumInitialValues takes the same inputs and sets up the initial velocity of the object.

For a given object, the simulator traverses a data structure, such as a tree structure, to find the behaviors affecting the object. The simulator iterates across the list of behaviors and accumulates the forces on the object. If this is the first frame of the object, then the initial velocity is first calculated. Derivatives are then fed into a "mid-point method" differential solver to calculate a new position. The simulator then traverses the list of simulation behaviors for collision behaviors. Collision behaviors examine the current state to determine if a collision has occurred. If so, it adjusts the state of the system to maintain the collision constraints. The simulation is iteratively stepped forward in this fashion until the desired frame is reached.

In one embodiment, position and rotation properties that are keyframed are handled by a special "motion to forces" behavior which converts the keyframes into a series of forces that when applied produce a motion similar to that represented by the keyframe. This is done by examining the velocity and acceleration at the current frame and deriving the necessary forces from these values. These forces can then be input into the simulator so that they can interact with the other behaviors.

B. Parameter Behaviors

In one embodiment, parameter behaviors are evaluated as a stack of operations on a range of values. First the stack is traversed to determine if all evaluations can be done using only the current value of the behavior before it in the stack. If so, an optimized path is taken which only passes the single value up the stack of operations. If not, then each behavior is queried to discover what range of input values will be needed to compute the requested output range. This stack of ranges is then used to evaluate each parameter behavior in turn, passing it the input it requested in the first step. Parameter behaviors such as Average use a range of values to compute a single output value, so they generally follow this second path. Also, while updating the curve editor, a large range of values can be calculated in one batch. This improves cache locality and reduces re-computation of partial values needed in the evaluation of an individual parameter behavior.

Dynamic Rendering

In one embodiment, objects to which behaviors have been applied are dynamically rendered. In one embodiment, for example, a behavior animation changes in real-time after the value of a behavior parameter has been changed.

In one embodiment, caching is used to achieve dynamic rendering. In one embodiment, for example, a behavior animation for an object is generated by rendering each frame sequentially and calculating a current frame based on a previous frame. In another embodiment, the result of evaluating the effect of a behavior on a previous frame is cached, thereby enabling the effect of a behavior on a current frame to be evaluated more rapidly.

In yet another embodiment, an interval cache is also kept. In one embodiment, values are periodically added to the interval cache to speed up behavior evaluation when jumping to random frames.

In one embodiment, multithreading is used to achieve dynamic rendering. In one embodiment, for example, frames are rendered sequentially. In another embodiment, while a first thread renders a current frame, a second thread simultaneously evaluates behaviors for the next frame.

Hardware Acceleration Methods

In one embodiment, hardware acceleration enables users to work effectively with behaviors. In one embodiment, hardware acceleration methods include, for example: using multithreading (so that a program can, e.g., run on multiple CPUs); "Altivec'ing" algorithms, i.e., modifying algorithms to take advantage of G4 and/or G5 Altivec hardware on which they will be run (e.g., by vectorizing the algorithms); and using OpenGL (e.g., standard OpenGL, OpenGL vertex shaders, and OpenGL pixel shaders).

In one embodiment, recent advancements in the OpenGL standard, such as pixel shaders, are used to accelerate various image processing tasks (such as, for example, applying filters) and enable custom blending. A pixel shader is a graphics function that calculates effects on a per-pixel basis. Depending on resolution, in excess of 2 million pixels may need to be rendered, lit, shaded, and colored for each frame, at 60 frames per second. That creates a tremendous computational load. Per-pixel shading brings out an extraordinary level of surface detail, allowing a user to see effects beyond the triangle level. The basics of pixel shader technology are known to those of ordinary skill in the relevant art and are further described in the course notes for Course 17: "State of the Art in Hardware Shading" at SIGGRAPH 2002. The course is described at http://www.siggraph.org/s2002/conference/courses/ crs17.html and the course notes are available at http://www.c-see.umbc.edu/~olano/s2002c17.

Until now, however, no commercial software application has used pixel shaders for motion graphics or compositing.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs, which are stored in computer readable mediums. Furthermore, these arrangements of operations can be equivalently referred to as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calculating" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be loaded to reside on and be operated from different type of computing platforms.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and illustrations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for animating an object, wherein animating the object comprises creating one or more duplicates of the object and animating the one or more duplicates according to a range in which the one or more duplicates moves, the method comprising:
    displaying a user interface comprising:
        a control area comprising an ellipse;
        a first user-manipulable control element located on the circumference of the ellipse, wherein the first user-manipulable control element specifies a first point on the circumference of the ellipse;
        a second user-manipulable control element located on the circumference of the ellipse, wherein the second user-manipulable control element specifies a second point on the circumference of the ellipse, and wherein the first point and the second point together specify a sector of the ellipse, and wherein a size of the sector specifies a size of a range in which one or more duplicates of an object moves, and wherein a position of the sector specifies a location of the range; and
        a third user-manipulable control element located within the sector;
    receiving user input via the first user-manipulable control element, the input comprising dragging the first user-manipulable control element to set the sector's size and the sector's position;
    receiving user input via the second user-manipulable control element, the input comprising dragging the second user-manipulable control element to set the sector's size and the sector's position;
    receiving user input via the third user-manipulable control element, the input comprising dragging the third user-manipulable control element to set the sector's position without affecting the sector's size; and
    animating the object based on the received input.

2. The method of claim 1, wherein animating the object further comprises animating the one or more duplicates according to a speed with which the one or more duplicates moves, and wherein the user interface further comprises a fourth user-manipulable control element located mostly within the ellipse, wherein the fourth user-manipulable control element comprises a representation of a vector having a variable magnitude, and wherein the magnitude of the vector directly specifies the speed, and wherein the representation of the vector comprises an arrow having a straight body and a tail located in the center of the ellipse, the arrow pointing toward a point on the circumference of the ellipse, the method further comprising:
    receiving user input via the fourth user-manipulable control element, the input comprising dragging a head of the representation of the vector to set the vector's magnitude.

3. The method of claim 1, wherein animating the object further comprises creating the one or more duplicates according to a Birth Rate parameter that specifies how many particles are created per second.

4. The method of claim 3, wherein the user interface further comprises a slider that indicates a value for the Birth Rate parameter.

5. The method of claim 3, wherein a value of the Birth Rate parameter is a percentage.

6. The method of claim 1, wherein animating the object further comprises removing the one or more duplicates according to a Life parameter that specifies how long a particle is displayed before disappearing.

7. The method of claim 6, wherein the user interface further comprises a slider that indicates a value for the Life parameter.

8. The method of claim 6, wherein a value of the Life parameter is a percentage.

9. The method of claim 1, wherein animating the object further comprises creating the one or more duplicates according to a Scale parameter that specifies how large a duplicate is relative to the object.

10. The method of claim 9, wherein the user interface further comprises a slider that indicates a value for the Scale parameter.

11. The method of claim 9, wherein a value of the Scale parameter is a percentage.

12. The method of claim 1, wherein a portion of the user interface is semi-transparent.

13. The method of claim 1, wherein the user interface is non-modal.

14. A non-transitory computer-readable medium having stored thereon data representing instructions that, when executed by a processor, cause the processor to perform operations comprising:
    displaying a user interface comprising:
        a control area comprising an ellipse;
        a first user-manipulable control element located on the circumference of the ellipse, wherein the first user-manipulable control element comprises specifies a first point on the circumference of the ellipse;
        a second user-manipulable control element located on the circumference of the ellipse, wherein the second user-manipulable control element specifies a second point on the circumference of the ellipse, and wherein the first point and the second point together specify a sector of the ellipse, and wherein a size of the sector specifies a size of a range in which one or more duplicates of an object moves, and wherein a position of the sector specifies a location of the range; and a third user-manipulable control element located within the sector;

receiving user input via the first user-manipulable control element, the input comprising dragging the first user-manipulable control element to set the sector's size and the sector's position;

receiving user input via the second user-manipulable control element, the input comprising dragging the second user-manipulable control element to set the sector's size and the sector's position;

receiving user input via the third user-manipulable control element, the input comprising dragging the third user-manipulable control element to set the sector's position without affecting the sector's size; and animating the object based on the received input.

15. The computer-readable medium of claim 14, wherein animating the object further comprises animating the one or more duplicates according to a speed with which the one or more duplicates moves, and wherein the user interface further comprises a fourth user-manipulable control element located mostly within the ellipse, wherein the fourth user-manipulable control element comprises a representation of a vector having a variable magnitude, and wherein the magnitude of the vector directly specifies the speed, and wherein the representation of the vector comprises an arrow having a straight body and a tail located in the center of the ellipse, the arrow pointing toward a point on the circumference of the ellipse, the operations further comprising:

receiving user input via the fourth user-manipulable control element, the input comprising dragging a head of the representation of the vector in order to set the vector's magnitude.

16. The computer-readable medium of claim 14, wherein animating the object further comprises creating the one or more duplicates according to a Birth Rate parameter that specifies how many particles are created per second.

17. The computer-readable medium of claim 14, wherein animating the object further comprises removing the one or more duplicates according to a Life parameter that specifies how long a particle is displayed before disappearing.

18. The computer-readable medium of claim 14, wherein animating the object further comprises creating the one or more duplicates according to a Scale parameter that specifies how large a duplicate is relative to the object.

19. A system for animating an object, wherein animating the object comprises creating one or more duplicates of the object and animating the one or more duplicates according to a range in which the one or more duplicates moves, the system comprising a processor configured to perform a method, the method comprising:

displaying a user interface comprising:
a control area comprising an ellipse;
a first user-manipulable control element located on the circumference of the ellipse, wherein the first user-manipulable control element specifies a first point on the circumference of the ellipse;
a second user-manipulable control element located on the circumference of the ellipse, wherein the second user-manipulable control element specifies a second point on the circumference of the ellipse, and wherein the first point and the second point together specify a sector of the ellipse, and wherein a size of the sector specifies a size of a range in which one or more duplicates of an object moves, and wherein a position of the sector specifies a location of the range; and
a third user-manipulable control element located within the sector;

receiving user input via the first user-manipulable control element, the input comprising dragging the first user-manipulable control element to set the sector's size and the sector's position;

receiving user input via the second user-manipulable control element, the input comprising dragging the second user-manipulable control element to set the sector's size and the sector's position;

receiving user input via the third user-manipulable control element, the input comprising dragging the third user-manipulable control element to set the sector's position without affecting the sector's size; and animating the object based on the received input.

* * * * *